(12) United States Patent
Bell et al.

(10) Patent No.: US 6,936,672 B2
(45) Date of Patent: Aug. 30, 2005

(54) MOLD ADDITION POLYMERIZATION OF NORBORNENE-TYPE MONOMERS USING GROUP 10 METAL COMPLEXES

(75) Inventors: Andrew Bell, Lakewood, OH (US); Larry F. Rhodes, Silver Lake, OH (US); Brian L. Goodall, Ambler, PA (US); John C. Fondran, Broadview Heights, OH (US); Lester H. McIntosh, III, Green Lane, PA (US); Dennis A. Barnes, Medina, OH (US)

(73) Assignee: Sumitomo Bakelite Co., Ltd., Tokyo (JP)

(*) Notice: Subject to any disclaimer, the term of this patent is extended or adjusted under 35 U.S.C. 154(b) by 168 days.

(21) Appl. No.: 09/921,051

(22) Filed: Aug. 2, 2001

(65) Prior Publication Data
US 2003/0120006 A1 Jun. 26, 2003

Related U.S. Application Data

(62) Division of application No. 09/456,780, filed on Dec. 8, 1999, now Pat. No. 6,350,832.
(60) Provisional application No. 60/111,585, filed on Dec. 9, 1998.

(51) Int. Cl.[7] .............................. C08F 4/44; C08F 4/70; C08F 132/08; C08F 232/08
(52) U.S. Cl. .................... 526/281; 526/134; 526/169.1; 526/171; 526/90; 526/192; 526/196; 526/226; 526/340.3
(58) Field of Search ................................. 526/281, 134, 526/169.1, 171, 340.3

(56) References Cited

U.S. PATENT DOCUMENTS

| | | | | |
|---|---|---|---|---|
| 4,100,338 A | * | 7/1978 | Suld et al. | 526/142 |
| 5,071,812 A | * | 12/1991 | Kelsey | 502/164 |
| 5,629,398 A | * | 5/1997 | Okamoto et al. | 526/281 |
| 5,714,556 A | * | 2/1998 | Johnson et al. | 526/135 |

OTHER PUBLICATIONS

Grant & Hackh's Chemical Dictionary, Fifth Edition, McGraw-Hill (1987) 290.*

R. Chang, Chemistry Third Edition, McGraw-Hill (1988) 9.*

* cited by examiner

Primary Examiner—Roberto Rabago
(74) Attorney, Agent, or Firm—Hudak, Shunk & Farine Co. L.P.A.

(57) ABSTRACT

A catalyst system and a process for the bulk addition polymerization or of polycyclic olefins, such as norbornene, methylnorbornene, ethylnorbornene, butylnorbornene or hexylnorbornene, 1,2,3,4,4a,5,8,8a-octahydro-1,4:5,8-dimethanonapthalene, 5,5'-(1,2-ethanediyl)bisbicyclo[2.2.1]hept-2-ene, and 1,4,4a,4b,5,8,8a,8b-octahydro-1,4:5,8-dimethanobiphenylene are disclosed. The catalyst includes an organonickel or organopalladium transition metal procatalyst and an activator compound. Polymerization can be carried out in a reaction injection molding process to yield thermoplastic and thermoset molded polymeric articles possessing high glass transition temperatures.

27 Claims, 2 Drawing Sheets

MOLD ADDITION POLYMERIZATION OF NORBORNENE-TYPE MONOMERS USING GROUP 10 METAL COMPLEXES

CROSS-REFERENCE

This is a division of application Ser. No. 09/456,780, filed on Dec. 8, 1999, now U.S. Pat. No. 6,350,832 B1, of Andrew Bell et al., for IN MOLD ADDITION POLYMERIZATION OF NORBORNENE-TYPE MONOMERS USING GROUP 10 METAL COMPLEXES, which claims benefit to U.S. Provisional Application No. 60/111,585 filed Dec. 9, 1998.

FIELD OF THE INVENTION

The present invention relates to nickel and palladium catalysts that are capable of polymerizing polycyclic olefins via addition polymerization to yield saturated, high glass transition temperature polymers. The saturated polymers can be prepared as thermoplastic or thermoset materials and have improved oxidative resistance, high temperature behavior, and better mechanical properties after aging than cyclic polymers prepared by ring-opening metathesis polymerization.

BACKGROUND OF THE INVENTION

Preparation of thermoset cycloolefin polymers by the ring opening metathesis polymerization (ROMP) is a relatively recent development in the polymer art. Reaction injection molding (RIM) of polyolefins by the ring-opening of metathesis polymerizable polycyclic olefinic monomers in the presence of alkylidene complexes is a particularly important aspect of polycyclic olefin chemistry. For example, Klosiewicz (U.S. Pat. Nos. 4,400,340 and 4,520,181) discusses a method whereby polydicyclopentadiene can be prepared by combining a plurality of reactant monomer streams. Klosiewicz discloses the preparation of ROMP polymers from dicyclopentadiene via a two-stream reaction injection molding technique wherein one stream, includes a "procatalyst", and the second stream, includes a "procatalyst activator" or "activator". The monomer reactant streams are combined in a mix head where the procatalyst and activator generate an active metathesis catalyst. The reactive catalyst/monomer mixture is immediately injected into a mold where, within a matter of seconds, polymerization takes place forming a solid article in the shape of the mold. Although such metathesis catalysts are very effective in the polymerization of polycyclic olefins, the unsaturated nature of the starting monomers is retained in the polymer backbone. In addition, the resultant polymer contains a repeat unit with one less cyclic unit than did the starting monomer as shown in the reaction scheme below.

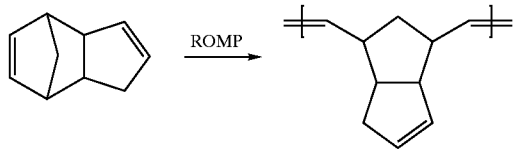

In sharp contrast, despite being formed from the same monomer, an addition-polymerized polycyclic olefin is clearly distinguishable over a ROMP polymer. Because of the different (addition) mechanism, the addition polymer has no backbone C=C unsaturation as shown in the reaction scheme below.

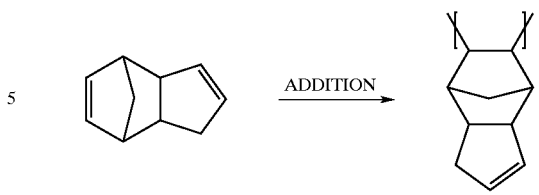

The difference in structures of ROMP and addition polymers of polycyclic monomers is evidenced in their properties, e.g., thermal properties, mechanical properties after aging, and polymer surface quality. The addition-type polymer of polycyclic olefins such as norbornene has a high Tg of about 350° C. The unsaturated ROMP polymer of norbornene exhibits a Tg of about 35° C., and exhibits poor thermal stability at high temperature above 200° C. because of its high degree of backbone unsaturation.

Ring-opened metathesis polymers and copolymers of dicyclopentadiene are known to have excellent glass transition temperatures (Tg) and high impact resistance. Because of their high Tg values, however, these polymers are difficult to melt process once formed. Crosslinking in the melt also occurs when the ring-opened polymer or copolymer contains a pendant five member unsaturated ring such as results when dicyclopentadiene is used to form the polymer or copolymer. Crosslinked polymers are extremely difficult to melt process. This poses a significant disadvantage to solution polymerized polymers which must be melt processed to provide finished articles. In contrast, for polymers and copolymers prepared in bulk, processing, in terms of melt flow, is less of a problem since the polymerization takes place in a mold and in the shape desired. Melt processing for such bulk polymerized polymers and copolymers is normally not required. Therefore, bulk polymerization provides significant advantages where high temperature resistance is desired in the finished article.

Suld, Schneider, and Myers (U.S. Pat. No. 4,100,338) disclose a method to polymerize norbornadiene to a solid polymer in the presence of a catalytic system of nickel acetylacetonate or a nickel-phosphine complex and an alkyl aluminum chloride. They note that if the temperature increases too much then cooling is required to successfully polymerize the monomer. Typically, polynorbornadiene is processed at temperatures of less than 100° C. Generally, however, the polymerization of the norbornadiene with an optimal amount of the catalyst system is not characterized by a rapid exotherm.

In similar fashion, Brownscombe and Willis (U.S. Pat. No. 4,451,633) polymerized an olefinic monomer feed in the presence of a Ziegler-Natta type coordination catalyst system comprising a Group IV metal containing component and activator hydrides and halides, an organometal activator selected from Groups I to III. This method permits the production of polyolefinic articles that are difficult or impossible to produce from polyolefinic powder or pellets by convention methods. The monomer feed in U.S. Pat. No. 4,451,633 comprises aliphatic and cycloaliphatic alpha olefins as well as other diolefins (producing polymeric articles containing some unsaturation).

Polymers having improved heat resistance can be obtained through the use of comonomers. For example, the heat resistance of dicyclopentadiene can be increased by copolymerizing DCPD with a crosslinking or bulky comonomer. However, the improved heat resistance is obtained at the cost of decreased impact resistance.

Sjardijn and Snel (U.S. Pat. No. 5,093,441) employed ring-opening metathesis polymerization on specifically bulky norbornenes (generated from the 1:1 Diels-Alder adducts of cyclopentadiene and norbornene, norbornadiene and cyclooctadiene) to provide copolymers showing tailored properties, such as increased glass transition temperature. Likewise, Hara, Endo, and Mera (European Patent Application No. 287762 A2) prepared highly crosslinked copolymers by metathesis from heat treated cyclooctadiene and dicyclooctadiene.

Tsukamoto and Endo (Japanese Patent Application, 9-188714, 1997) polymerized ethylidene norbornene via Ziegler type polymerization in a RIM process to yield addition polymerized solid objects. The disclosed catalyst comprise a Group IV metal containing procatalyst and Group III metal containing activator.

Nagaoka et. al. (Japanese Published Application No. 8-325329, 1996) describe a process for the polymerization of a polycycloolefin polymer via reaction injection molding (RIM) in the presence of a Group 10 transition metal compound and a cocatalyst. A molded article containing no unsaturated bonds is polymerized from norbornene-type monomers containing only one polymerizable norbornene functionality. There is no disclosure or suggestion of a crosslinked polymer product or a procatalyst species containing both a Group 15 electron donating ligand (e.g., triphenylphosphine) and a hydrocarbyl ligand that are coordinated to the Group 10 metal. The co-catalyst species are selected from a myriad of compounds including organoaluminums, Lewis acids, and various borate salts. The use of simple Group 1, Group 2 and transition metal salts are not discussed or exemplified. Accordingly, a Group 10 metal catalytic species that requires the presence of both a Group 15 electron donating ligand and a hydrocarbyl ligand are not contemplated. In addition, there is no suggestion, implication, or teaching of the important combination of a Group 10 metal procatalyst containing a Group 15 electron donor ligand and a hydrocarbyl ligand in combination with a weakly coordinating anion salt activator.

Goodall et al. (U.S. Pat. Nos. 5,705,503; 5,571,881; 5,569,730; and 5,46,819) have shown that Group 10 catalyst systems are useful in generating thermoplastic addition polymers from a variety of norbornene derivatives in polar and non-polar solvents. The catalyst system employs a Group 10 metal ion source, a Lewis acid, an organoaluminum compound, and a weakly coordinating anion. The glass transition temperature of the polymers are in the range of 150° C. to 350° C. In the absence of a "chain transfer agents" polynorbornene polymers are generated whose molecular weights (Mw) are over 1,000,000. Polymers formed with too low a molecular weight are of limited utility in thermoplastic articles. Polymers with too high a molecular weight can only be cast from solution and in some cases are completely insoluble and difficult to thermoform. "Melt-processable" means that the polymer is adequately flowable to be thermoformed in a temperature window above its Tg, but below its decomposition temperature. There is no disclosure of a method to directly polymerize a polycyclic olefinic monomer directly into a polymeric article of manufacture.

Thermoset polymers with high impact strength and high modulus find useful applications as engineering polymers in such articles of manufacture as automobiles, containers, appliances, recreational equipment, and pipe.

Any good thermoset polymer should meet at least two criteria. It should have desirable physical properties and it should lend itself to easy synthesis and forming. Among the most desirable physical properties for many polymers is a combination of high impact strength, high temperature performance, and high modulus. A standard test for impact strength is the notched Izod impact test, ASTM No. D-256. For an unreinforced thermoset polymer to have good impact strength, its notched Izod impact should be at least 1.5 ft. lb./in. notch. It is desirable that this good impact strength be combined with a modulus of at least about 150,000 psi at ambient temperature. Among the critical factors in the synthesis and forming of a thermoset polymer are the conditions required to make the polymer set up or gel. Many thermoset polymers require considerable time, elevated temperature and pressure, or additional steps after the reactants are mixed before the setting is complete.

Not only is it desirable that the thermoset polymer have high impact strength, but it is also desirable that it be easily synthesized and formed. A RIM process achieves this second goal by in-mold polymerization. The process involves the mixing of two or more low viscosity reactive streams. The combined streams are then injected into a mold where they quickly set up into a solid infusible mass. RIM is especially suited for molding large intricate objects rapidly and in low cost equipment. Because the process requires only low pressures, the molds are inexpensive and easily changed. Furthermore, since the initial materials have low viscosity, massive extruders and molds are not necessary and energy requirements are minimal compared to the injection molding or compression molding commonly used.

For a RIM system to be of use with a particular polymer, certain requirements must be met: (1) The individual streams must be stable and must have a reasonable shelf life under ambient conditions. (2) It must be possible to mix the streams thoroughly without their setting up in the mixing head. (3) When injected into the mold, the materials must set up to a solid system rapidly. (4) Any additives (i.e., fillers, stabilizers, pigments, etc.) must be added before the material sets up. Therefore, the additives selected must not interfere with the polymerization reaction.

It can be seen that when developing a RIM process a tradeoff must be made. It is desirable that the polymer set up quickly, but the polymerization cannot be too quick. The components cannot be so reactive that they set up in the mixing head before they can be injected into the mold. Once in the mold, however, the polymer should set up as quickly as possible. It is not desirable that the polymer take a long time or require additional steps to gel completely.

There is an interest in stabilizing Group 10 transition metal cationic catalysts with anionic species. It would be desirable to provide a catalyst for the polymerization of norbornene, other hydrocarbon polycyclic olefins and crosslinkable polycyclic olefins, and norbornenes bearing functional groups. In particular, it is desirous to develop weakly coordinating anions which are stable at a wide variety of temperatures, resistant to impurities, not hazardous to make or use, inexpensive, and capable of being used with a wide a variety of monomers and solvents, including those with functional groups. One very desirable attribute is hydrocarbon solubility for both the cation weakly coordinating anion pair activator as well as the resultant Group 10 transition metal cationic catalyst.

There is a need for polycyclic olefinic polymers that have very low levels of residual monomer, no solvent, higher levels of heat resistance, and resistance to oxidation and degradation, while maintaining other properties, such as impact and tensile strengths at levels similar to those found in the prior art. In the case of dicyclopentadiene polymerization, if the reaction is not virtually quantitative, there will be unreacted monomer in the thermoset product and the molded article will have an undesirable odor. This odor greatly limits the applications in which polymerized product can be used.

Highly converted, crosslinked, and toughened polyolefinic articles have not been produced by carrying out the addition polymerization of a polycyclic monomer with a coordination catalyst in a mold having the shape of the desired article.

SUMMARY OF INVENTION

This invention encompasses a method for producing a high impact strength, high temperature resistant homopolymer or copolymer comprising addition polymerized units of norbornene-type monomers by using a two or more part addition polymerization catalyst system. The polymer is a tough, rigid material with high modulus and excellent impact strength. The flexural modulus is in the range of about 150,000 to about 300,000 psi. and the notched Izod impact strength is at least 1.5 ft. lb./in. notch.

The polymer can be synthesized by reacting norbornene-type monomers with a two part addition polymerization catalyst system. The first part of the catalyst system is comprised of an addition polymerization procatalyst, preferably a neutral, ($\pi$-allyl)palladium(triflate) (trialkylphosphine) derivative. The second part of the addition polymerization catalyst system is comprised of an activator such as lithium tetrakis(hexafluoropropoxyphenyl) aluminate ($LiAl(OC(CF_3)_2Ph)_4$) or lithium tetrakis (pentafluorophenyl)borate. In a preferred embodiment the two addition polymerization catalyst system components, plus the monomer or comonomers, form the basis for at least two separate reactant streams which are mixed in the head of a RIM machine to form a reactive composition which is then injected into a mold where it will quickly setup into a tough, infusible mass. Various additives such as fillers, stabilizers, colorants, and reinforcement materials can be added to modify the properties of the polymer.

The invention also provides a storage stable activator component of a reactive formulation wherein the reactive formulation comprises at least two components, and at least one polycyclic monomer.

It is an object of the invention to provide a method for producing polymeric article in the shape of a mold cavity comprising a polycyclic repeating unit said method comprises polymerizing a polycyclic olefinic monomer feed in the presence of a Group 10 coordination catalyst.

It is another object of this invention to provide a process for molding olefinic polymers by mixing two or more reactant solutions of a polycyclic olefin and addition polymerizing them into a solid thermoplastic or thermoset polymeric object using a nickel or palladium procatalyst and an activator.

Another object of this invention is to provide a method for the preparation of a unicomponent addition polymerization catalyst by mixing a Group 10 metal containing procatalyst and a weakly coordinating anion based activator. In addition, this invention will also provide a process to obtain a molded article by employing a preformed catalyst generated from procatalyst and activator components in a suitable medium which is mixed as a stream with other monomer streams and then transferred into a mold where the mixture polymerizes into a solid object.

It is another object of this invention to provide catalysts that are more efficient in polymerizing polycyclic olefins.

It is still another object of this invention to provide a catalyst for the polymerization of polycyclic olefins capable of high monomer to polymer conversion.

It is a further object of the invention to provide a Group 10 metal procatalyst containing a hydrocarbyl ligand and a Group 15 electron donor ligand.

It is a another object of the invention to activate a Group 10 metal procatalyst containing a hydrocarbyl ligand and a Group 15 electron donor ligand with a salt of a weakly coordinating anion.

Therefore, it is a further object of this invention to provide catalyst compositions that polymerize strained ring polycycloolefins producing polymers with a higher level of heat resistance and resistance to aging than prior art polymers while maintaining their impact strength.

It is still a further object of the invention to provide a reaction mixture that contains a Group 10 metal procatalyst in combination with a weakly coordinating anion salt, a polycycloolefin monomer and a multifunctional polycycloolefin monomer containing at least two polymerizable norbornene moieties.

It is another object of the invention to provide a reaction mixture that contains monomers that release exothermic energy upon polymerization.

It is another object of the invention to polymerize a polycycloolefin selected from triethoxysilyl norbornene, butylnorbornene, norbornene, dimethanotetrahydronaphthalene (TDD), and mixtures thereof in the presence of a catalyst composition comprising (a) a Group 10 transition metal compound, and (b) an activator.

A further object of this invention is to provide activators with superior hydrocarbon and monomer solubility.

DETAILED DESCRIPTION OF THE INVENTION

Figure 1:
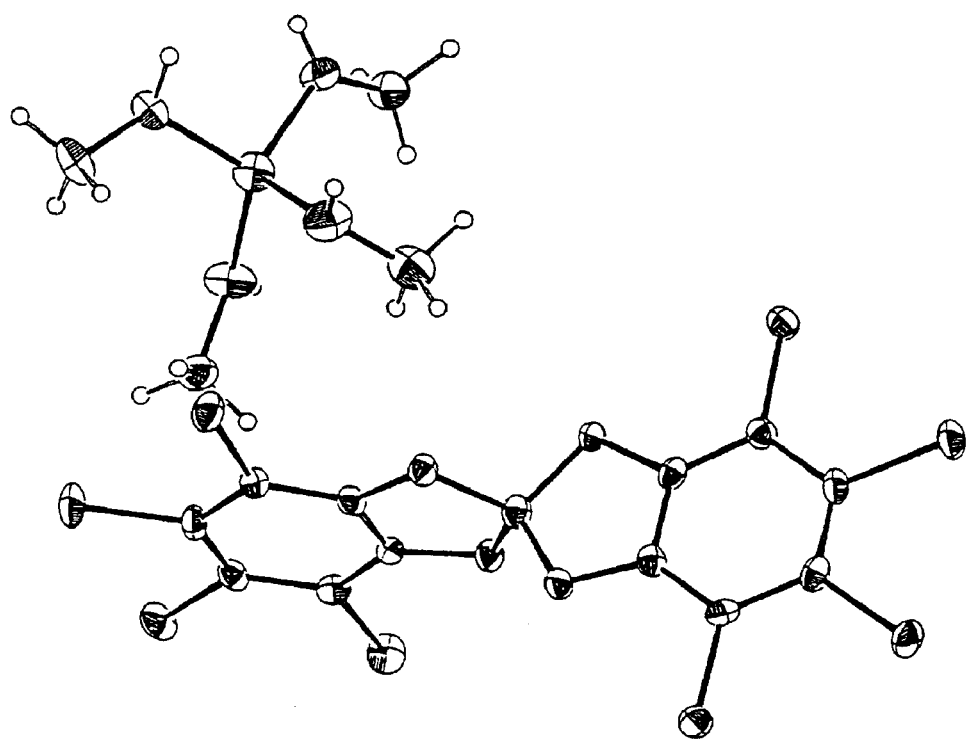
FIG. 1 represents an Oak Ridge Thermal Ellipsoid Plot (ORTEP) of $Li(HOCH_3)_4[B(O_2C_6Cl_4)_2]$.

To mold plastic articles by reaction injection molding (RIM), resin transfer molding (RTM), liquid injection molding (LIM), casting, lay up or spray up procedures, a reactive formulation of monomers which polymerize to substantially complete conversion to polymer is provided. The reactive formulation of the invention contains polycycloolefin monomers in combination with an activated addition polymerization catalyst system which polymerizes the monomers to at least 90% conversion. This invention provides storage stable activator components of such reactive formulations. A polymerization system is provided wherein a storage stable activator component is combined with a separately stored procatalyst component. When the storage stable components of the polymerization system are combined in monomer, a reaction mixture is obtained. In preferred embodiments, the polymerization system can be used as a complete feedstock for reaction injection molding (RIM), RTM or LIM processes. The polycyclic monomers within the storage stable components provided by this invention are characterized by the presence of at least one norbornene moiety.

Catalyst System

The catalyst of the invention comprises a Group 10 metal cation complex and a weakly coordinating counteranion complex represented by Formula I below:

$$[R'M(L')_x(L'')_y]_b[WCA]_d \qquad \text{I}$$

wherein M represents a Group 10 transition metal; R' represents an anionic hydrocarbyl ligand; L' represents a Group 15 neutral electron donor ligand; L" represents a labile neutral electron donor ligand; x is 0, 1 or 2 (preferably 1 or 2); y is 0, 1, or 2; and b and d are numbers representing the number of times the cation complex and weakly coordinating counteranion complex (WCA), respectively, are taken to balance the electronic charge of the overall catalyst complex.

The weakly coordinating counteranion complex is an anion which is only weakly coordinated to the cation complex. It is sufficiently labile to be displaced by a neutral Lewis base, solvent or monomer. More specifically, the WCA anion functions as a stabilizing anion to the cation complex and does not transfer to the cation complex to form a neutral product. The WCA anion is relatively inert in that it is non-oxidative, non-reducing, and non-nucleophilic.

An anionic hydrocarbyl ligand is any hydrocarbyl ligand which when removed from the metal center M in its closed shell electron configuration, has a negative charge.

A neutral electron donor is any ligand which when removed from the metal center M in its closed shell electron configuration, has a neutral charge.

A labile neutral electron donor ligand is any ligand which is not as strongly bound to metal center M, is easily displaced therefrom, and when removed from the metal center in its closed shell electron configuration has a neutral charge.

In the cation complex above, M represents a Group 10 metal selected from nickel, palladium, and platinum, with palladium being the most preferred metal.

Representative anionic hydrocarbyl ligands defined under R include hydrogen, linear and branched $C_1$–$C_{20}$ alkyl, $C_5$–$C_{10}$ cycloalkyl, linear and branched $C_2$–$C_{20}$ alkenyl, $C_6$–$C_{15}$ cycloalkenyl, allylic ligands or canonical forms thereof, $C_6$–$C_{30}$ aryl, $C_6$–$C_{30}$ heteroatom containing aryl, and $C_7$–$C_{30}$ aralkyl, each of the foregoing groups can be optionally substituted with hydrocarbyl and/or heteroatom substituents preferably selected from linear or branched $C_1$–$C_5$ alkyl, linear or branched $C_1$–$C_5$ haloalkyl, linear or branched $C_2$–$C_5$ alkenyl and haloalkenyl, halogen, sulfur, oxygen, nitrogen, phosphorus, and phenyl optionally substituted with linear or branched $C_1$–$C_5$ alkyl, linear or branched $C_1$–$C_5$ haloalkyl, and halogen.

The cycloalkyl, and cycloalkenyl ligands can be monocyclic or multicyclic. The aryl ligands can be a single ring (e.g., phenyl) or a fused ring system (e.g., naphthyl). In addition, any of the cycloalkyl, cycloalkenyl and aryl groups can be taken together to form a fused ring system. Each of the monocyclic, multicyclic and aryl ring systems described above optionally can be monosubstituted or multisubstituted with a substituent independently selected from hydrogen, linear and branched $C_1$–$C_5$ alkyl, linear and branched $C_1$–$C_5$ haloalkyl, linear and branched $C_1$–$C_5$ alkoxy, halogen selected from chlorine, fluorine, iodine and bromine, $C_5$–$C_{10}$ cycloalkyl, $C_6$–$C_{15}$ cycloalkenyl, and $C_6$–$C_{30}$ aryl. An example of a multicycloalkyl moiety is a norbornyl ligand. An example of a multicycloalkenyl moiety is a norbornenyl ligand. Examples of aryl ligand groups include phenyl and naphthyl. For purposes of illustration Structure I below represents a cationic complex wherein R' is a cycloalkenyl ligand derived from 1,5-cyclooctadiene. Structures II and III illustrate cationic complexes wherein R' represents multicycloalkyl and multicycloalkenyl ligands, respectively. In Structure III the norbornenyl ligand is substituted with a alkenyl group.

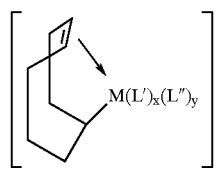

Structure I

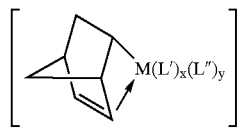

Structure II

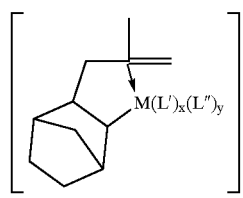

Structure III wherein M, L', L", x and y are as previously defined.

Additional examples of cationic complexes where R' represents a ring system is illustrated in Structures IV to IVc below.

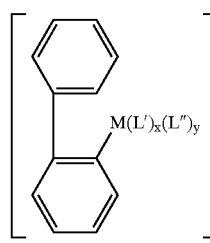

Structure IV

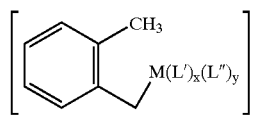

Structure IVa

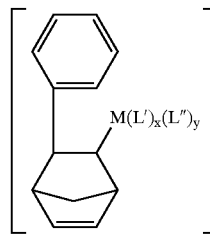

Structure IVb

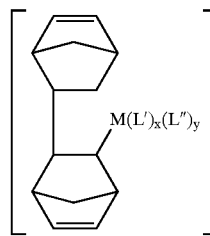

Structure IVc wherein M, L', L", x and y are as previously defined.

In another embodiment of the invention R' represents a hydrocarbyl ligand containing a terminal group that coordinates to the Group 10 metal. The terminal coordination group containing hydrocarbyl ligand are represented by the formula —$C_{d'}H_{2d'}X\rightarrow$, wherein d' represents the number of carbon atoms in the hydrocarbyl backbone and is an integer from 3 to 10, and X→ represents an alkenyl or heteroatom containing moiety that coordinates to the Group 10 metal center. The ligand together with the Group 10 metal forms a metallacycle or heteroatom containing metallacycle. Any of the hydrogen atoms on the hydrocarbyl backbone in the formulae above can be independently replaced by a substituent selected from $R^{1'}$, $R^{2'}$, and $R^{3'}$ which are defined below.

A cation complex of the terminal coordination group containing hydrocarbyl metallacycle embodiment is represented by Structure V shown below:

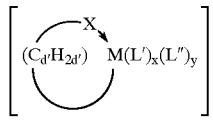

Structure V wherein M, L', L", d', x and y are as previously defined, and X represents a radical selected from the group —$CHR^{4'}$=$CHR^{4'}$, —$OR^{4'}$, —$SR^{4'}$, —$N(R^{4'})_2$, —N=$NR^{4'}$, —$P(R^{4'})_2$, —$C(O)R^{4'}$, —$C(R^{4'})$=$NR^{4'}$, —$C(O)OR^{4'}$, —OC(O)$OR^{4'}$, —$OC(O)R^{4'}$, and $R^{4'}$ represents hydrogen, halogen, linear and branched $C_1$–$C_5$ alkyl, linear and branched $C_1$–$C_5$ haloalkyl, $C_5$–$C_{10}$ cycloalkyl, linear or branched $C_2$–$C_5$ alkenyl, linear or branched $C_2$–$C_5$ haloalkenyl, substituted and unsubstituted $C_6$–$C_{18}$ aryl, and substituted and unsubstituted $C_7$–$C_{24}$ aralkyl.

The substituted terminal group containing hydrocarbyl metallacycles can be represented by structure Va, below.

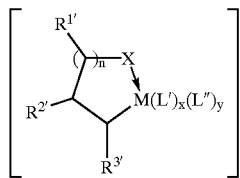

Structure Va wherein M, L', L", X, x and y are as previously defined, n represents an integer from 1 to 8 and $R^{1'}$, $R^{2'}$, and $R^{3'}$ independently represent hydrogen, linear and branched $C_1$–$C_5$ alkyl, linear and branched $C_1$–$C_5$ haloalkyl, linear or branched $C_2$–$C_5$ alkenyl, linear and branched $C_2$–$C_5$ haloalkenyl, substituted and unsubstituted $C_6$–$C_{30}$ aryl, substituted and unsubstituted $C_7$–$C_{30}$ aralkyl, and halogen. Any of $R^{1'}$, $R^{2'}$, and $R^{3'}$ can be taken together along with the carbon atoms to which they are attached can form a substituted or unsubstituted aliphatic $C_5$–$C_{20}$ monocyclic or polycyclic ring system, a substituted or unsubstituted $C_6$–$C_{10}$ aromatic ring system, a substituted and unsubstituted $C_{10}$–$C_{20}$ fused aromatic ring system, and combinations thereof. When substituted, the rings described above can contain monosubstitution or multisubstitution where the substituents are independently selected from hydrogen, linear and branched $C_1$–$C_5$ alkyl, linear and branched $C_1$–$C_5$ haloalkyl, linear and branched $C_1$–$C_5$ alkoxy, and halogen selected from chlorine, fluorine, iodine and bromine. In Structure Va above it should be noted that when n is 0, X is bonded to the carbon atom that contains the $R^{2'}$ substituent.

Representative terminal group containing hydrocarbyl metallacycle cation complexes wherein the substituents are taken together to represent aromatic and aliphatic ring systems are illustrated below under Structures Vb and Vc.

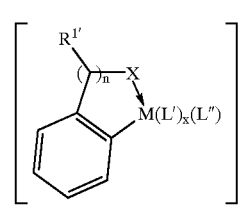

Structure Vb

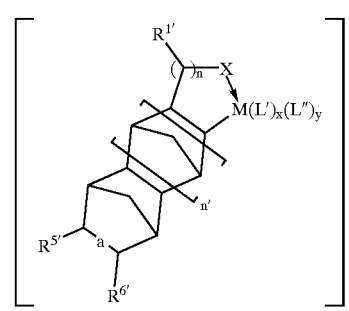

Structure Vc

Additional examples of terminal group containing hydrocarbyl metallacycle cation complexes wherein any of $R^{1'}$ to $R^{3'}$ can be taken together to form aromatic ring systems are set forth in Structures Vd to Vg below.

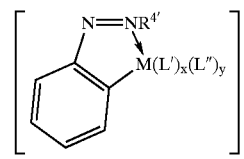

Structure Vd

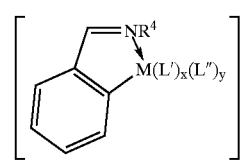

Structure Ve

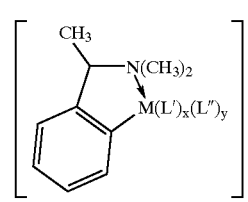

Structure Vf

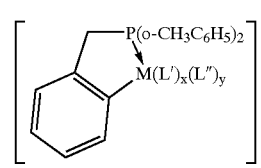

Structure Vg

Illustrative examples of cation complexes containing polycyclic aliphatic ring systems are set forth under structures Vh, Vi, and Vj below:

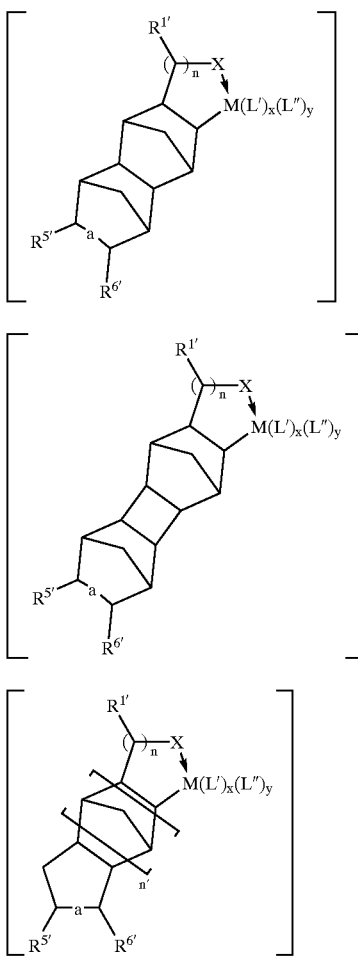

Structure Vh

Structure Vi

Structure Vj

In Structures V through Vj above, n' is an integer from 0 to 5; and X, M, L', L", "a", n, x, y, $R^{1'}$ and $R^{4'}$, are as previously defined, and $R^{5'}$ and $R^{6'}$ independently represent hydrogen, and linear and branched $C_1$–$C_{10}$ alkyl, $R^{5'}$ and $R^{6'}$ together with the carbon atoms to which they are attached can form a saturated and unsaturated cyclic group containing 5 to 15 carbon atoms.

Examples of heteroatom containing aryl ligands under R' are pyridinyl and quinolinyl ligands.

The allyl ligand in the cationic complex can be represented by the following structure:

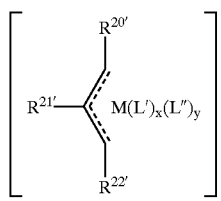

Structure VI wherein $R^{20'}$, $R^{21'}$, and $R^{22'}$ each independently represent hydrogen, halogen, linear and branched $C_1$–$C_5$ alkyl, $C_5$–$C_{10}$ cycloalkyl, linear and branched $C_1$–$C_5$ alkenyl, $C_6$–$C_{30}$ aryl, $C_7$–$C_{30}$ aralkyl, each optionally substituted with a substituent selected from linear and branched $C_1$–$C_5$ alkyl, linear and branched $C_1$–$C_5$ haloalkyl, halogen, and phenyl which can optionally be substituted with linear and branched $C_1$–$C_5$ alkyl, linear and branched $C_1$–$C_5$ haloalkyl, and halogen. Any two of $R^{20'}$, $R^{21'}$, and $R^{22'}$ can be linked together with the carbon atoms to which they are attached to form a cyclic or multicyclic ring, each optionally substituted with linear or branched $C_1$–$C_5$ alkyl, linear or branched $C_1$–$C_5$ haloalkyl, and halogen. Examples of allylic ligands suitable in the cationic complexes of the invention include but are not limited to allyl, 2-chloroallyl, crotyl, 1,1-dimethyl allyl, 2-methylallyl, 1-phenylallyl, 2-phenylallyl, and β-pinenyl.

Representative cationic complexes containing an allylic ligand are shown below.

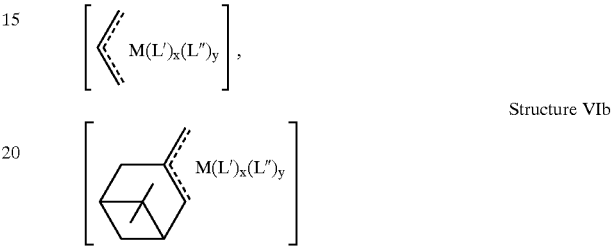

Structure VIa

Structure VIb

In Structures VI, VIa, and VIb M, L', L", x and y are as previously defined.

Additional examples of allyl ligands are found in R. G. Guy and B. L. Shaw, *Advances in Inorganic Chemistry and Radiochemistry*, Vol. 4, Academic Press Inc., New York, 1962; J. Birmingham, E. de Boer, M. L. H. Green, R. B. King, R. Köster, P. L. I. Nagy, G. N. Schrauzer, *Advances in Organometallic Chemistry*, Vol. 2, Academic Press Inc., New York, 1964; W. T. Dent, R. Long and A. J. Wilkinson, J. Chem. Soc., (1964) 1585; and H. C. Volger, Rec. Trav. Chim. Pay Bas, 88 (1969) 225; which are all hereby incorporated by reference.

Representative neutral electron donor ligands under L' include amines, pyridines organophosphorus containing compounds and arsines and stibines, of the formula:

$E(R^{7'})_3$ wherein E is arsenic or antimony, and $R^{7'}$ is independently selected from hydrogen, linear and branched $C_1$–$C_{10}$ alkyl, $C_5$–$C_{10}$ cycloalkyl, linear and branched $C_1$–$C_{10}$ alkoxy, allyl, linear and branched $C_2$–$C_{10}$ alkenyl, $C_6$–$C_{12}$ aryl, $C_6$–$C_{12}$ aryloxy, arylsufides (e.g., PhS), $C_7$–$C_{18}$ aralkyl, cyclic ethers and thioethers, tri(linear and branched $C_1$–$C_{10}$ alkyl)silyl, tri($C_6$–$C_{12}$ aryl)silyl, tri(linear and branched $C_1$–$C_{10}$ alkoxy)silyl, triaryloxysilyl, tri(linear and branched $C_1$–$C_{10}$ alkyl)siloxy, and tri($C_6$–$C_{12}$ aryl)siloxy, each of the foregoing substituents can be optionally substituted with linear or branched $C_1$–$C_5$ alkyl, linear or branched $C_1$–$C_5$ haloalkyl, $C_1$–$C_5$ alkoxy, halogen, and combinations thereof. Representative alkyl groups include but are not limited to methyl, ethyl, propyl, isopropyl, n-butyl, isobutyl, sec-butyl, tert-butyl, pentyl, neopentyl, hexyl, heptyl, octyl, nonyl, decyl, and dodecyl. Representative cycloalkyl groups include but are not limited to cyclopentyl and cyclohexyl. Representative alkoxy groups include but are not limited to methoxy, ethoxy, and isopropoxy. Representative cyclic ether and cyclic thioether groups include but are not limited furyl and thienyl, respectively. Representative aryl groups include but are not limited to phenyl, o-tolyl, and naphthyl. Representative aralkyl groups include but are not limited to benzyl, and phenylethyl (i.e., —$CH_2CH_2PH$). Representative silyl groups include but are not limited to triphenylsilyl, trimethylsilyl, and triethylsilyl. As in the general definition above each of the foregoing groups can be optionally substituted with linear or branched $C_1$–$C_5$ alkyl, linear or branched $C_1$–$C_5$ haloalkyl, and halogen.

Representative pyridines include lutidine (including 2,3-; 2,4-; 2,5-; 2,6-; 3,4-; and 3,5-substituted), picoline (including 2-,3-, or 4-substituted), 2,6-di-t-butylpyridine, and 2,4-di-t-butylpyridine.

Representative arsines include triphenylarsine, triethylarsine, and triethoxysilylarsine.

Representative stibines include triphenylstibine and trithiophenylstibine.

Suitable amine ligands can be selected from amines of the formula $N(R^{8'})_3$, wherein $R^{8'}$ independently represents hydrogen, linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_7$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative amines include but are not limited to ethylamine, triethylamine, diisopropylamine, tributylamine, N,N-dimethylaniline, N,N-dimethyl-4-t-butylaniline, N,N-dimethyl-4-t-octylaniline, and N,N-dimethyl-4-hexadecylaniline.

The organophosphorus containing ligands include phosphines, phosphites, phosphonites, phosphinites and phosphorus containing compounds of the formula:

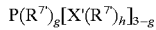

$$P(R^{7'})_g[X'(R^{7'})_h]_{3-g}$$

wherein X' is oxygen, nitrogen, or silicon, $R^{7'}$ is as defined above and each $R^{7'}$ substituent is independent of the other, g is 0, 1, 2, or 3, and h is 1, 2, or 3, with the proviso that when X' is a silicon atom, h is 3, when X' is an oxygen atom h is 1, and when X' is a nitrogen atom, h is 2. When g is 0 and X' is oxygen, any two or 3 of $R^{7'}$ can be taken together with the oxygen atoms to which they are attached to form a cyclic moiety. When g is 3 any two of $R^{7'}$ can be taken together with the phosphorus atom to which they are attached to represent a phosphacycle of the formula:

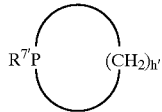

wherein $R^{7'}$ is as previously defined and h' is an integer from 4 to 11.

Representative phosphine ligands include, but are not limited to trimethylphosphine, triethylphosphine, ti-n-propylphosphine, triisopropylphosphine, tri-n-butylphosphine, tri-sec-butylphosphine, tri-i-butylphosphine, tri-t-butylphosphine, tricyclopentylphosphine, triallylphosphine, tricyclohexylphosphine, triphenylphosphine, trinaphthylphosphine, tri-p-tolylphosphine, tri-o-tolylphosphine, tri-m-tolylphosphine, tribenzylphosphine, tri(p-trifluoromethylphenyl)phosphine, tris(trifluoromethyl)phosphine, tri(p-fluorophenyl)phosphine, tri(p-trifluoromethylphenyl)phosphine, allyldiphenylphosphine, benzyldiphenylphosphine, bis(2-furyl)phosphine, bis(4-methoxyphenyl)phenylphosphine, bis(4-methylphenyl) phosphine, bis(3,5-bis(trifluoromethyl)phenyl)phosphine, t-butylbis(trimethylsilyl)phosphine, t-butyldiphenylphosphine, cyclohexyldiphenylphosphine, diallylphenylphosphine, dibenzylphosphine, dibutylphenylphosphine, dibutylphosphine, di-t-butylphosphine, dicyclohexylphosphine, diethylphenylphosphine di-i-butylphosphine, dimethylphenylphosphine, dimethyl(trimethylsilyl)phosphine, diphenylphosphine, diphenylpropylphosphine, diphenyl(p-tolyl)phosphine, diphenyl(trimethylsilyl)phosphine, diphenylvinylphosphine, divinylphenylphosphine, ethyldiphenylphosphine, (2-methoxyphenyl)methylphenylphosphine, tri-n-octylphosphine, tris(3,5-bis(trifluoromethyl)phenyl) phosphine, tris(3-chlorophenyl)phosphine, tris(4-chlorophenyl)phosphine, tris(2,6-dimethoxyphenyl) phosphine, tris(3-fluorophenyl)phosphine, tris(2-furyl) phosphine, tris(2-methoxyphenyl)phosphine, tris(3-methoxyphenyl)phosphine, tris(4-methoxyphenyl) phosphine, tris(3-methoxypropyl)phosphine, tris(2-thienyl) phosphine, tris(2,4,6-trimethylphenyl)phosphine, tris (trimethylsilyl)phosphine, isopropyldiphenylphosphine, dicyclohexylphenylphosphine, (+)-neomenthyldiphenylphosphine, tribenzylphosphine, diphenyl(2-methoxyphenyl)phosphine, diphenyl (pentafluorophenyl)phosphine, bis(pentafluorophenyl) phenylphosphine, and tris(pentafluorophenyl)phosphine.

The phosphine ligands can also be selected from phosphine compounds that are water soluble thereby imparting the resulting catalysts with solubility in aqueous media. Selected phosphines of this type include but are not limited to carboxylic substituted phosphines such as 4-(diphenylphosphine)benzoic acid, and 2-(diphenylphosphine)benzoic acid, sodium 2-(dicyclohexylphosphino)ethanesulfonate, 4,4'-(phenylphosphinidene)bis(benzene sulfonic acid) dipotassium salt, 3,3',3"-phosphinidynetris(benzene sulfonic acid) trisodium salt, 4-(dicyclohexylphosphino)-1,1-dimethylpiperidinium chloride, 4-(dicyclohexylphosphino)-1,1-dimethylpiperidinium iodide, quaternary amine-functionalized salts of phosphines such as 2-(dicyclohexylphosphino)-N,N,N-trimethylethanaminium chloride, 2,2'-(cyclohexylphosphinidene)bis[N,N,N-trimethylethanaminium dichloride, 2,2'-(cyclohexylphosphinidene)bis(N,N,N-trimethylethanaminium) diiodide, and 2-(dicyclohexylphosphino)-N,N,N-trimethylethanaminium iodide.

Examples of phosphite ligands include but are not limited to trimethylphosphite, diethylphenylphosphite, triethylphosphite, tris(2,4-di-t-butylphenyl)phosphite, tri-n-propylphosphite, triisopropylphosphite, tri-n-butylphosphite, tri-sec-butylphosphite, triisobutylphosphite, tri-t-butylphosphite, dicyclohexylphosphite, tricyclohexylphosphite, triphenylphosphite, tri-p-tolyiphosphite, tris(p-trifluoromethylphenyl)phosphite, benzyldiethylphosphite, and tribenzylphosphite.

Examples of phosphinite ligands include but are not limited to methyl diphenylphosphinite, ethyl diphenylphosphinite, isopropyl diphenylphosphinite, and phenyl diphenylphosphinite.

Examples of phosphonite ligands include but are not limited to diphenyl phenylphosphonite, dimethyl phenylphosphonite, diethyl methylphosphonite, diisopropyl phenylphosphonite, and diethyl phenylphosphonite.

Representative labile neutral electron donor ligands (L") are, DMF, DMSO, cyclooctadiene (COD), water, chlorinated alkanes, alcohols, ethers, ketones, nitrites, arenes, phosphine oxides, organic carbonates and esters.

Representative chlorinated alkanes include but are not limited to dichloromethane, 1,2-dichloroethane, and carbon tetrachloride.

Suitable alcohol ligands can be selected from alcohols of the formula $R^{9'}OH$, wherein $R^{9'}$ represents linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, substituted and unsubstituted $C_6$–$C_{18}$ aralkyl and substituted and unsubstituted norbornenyl. When substituted, the cycloalkyl, aryl, aralkyl, and norbornenyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative alcohol ligands include but are not limited to methanol, ethanol, n-propanol, isopropanol, butanol, hexanol, t-butanol, neopentanol, phenol, 2,6-di-i-propylphenol, 4-t-octylphenol, 5-norbornene-2-methanol, and dodecanol.

Suitable ether ligands and thioether ligands can be selected from ethers and thioethers of the formulae ($R^{10'}$—O—$R^{10'}$) and ($R^{10'}$—S—$R^{10'}$), respectively, wherein $R^{10'}$ independently represents linear and branched $C_1$–$C_{10}$ alkyl radicals, linear and branched $C_1$–$C_{20}$ haloalkyl, substituted and unsubstituted $C_3$–$C_{20}$ cycloalkyl, linear and branched $C_1$–$C_{20}$ alkoxy substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. taken together along with the oxygen or sulfur atom to which they are attached to form a cyclic ether or cyclic thioether. Representative ethers include but are not limited to dimethyl ether, dibutyl ether, methyl-t-butyl ether, di-i-propyl ether, diethyl ether, dioctyl ether, 1,4-dimethoxyethane, THF, 1,4-dioxane and tetrahydrothiophene.

Suitable ketone ligands are represented by ketones of the formula $R^{11'}C(O)R^{11'}$ wherein $R^{11'}$ independently represents hydrogen, linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative ketones include but are not limited to acetone, methyl ethyl ketone, cyclohexanone, and benzophenone.

The nitrile ligands can be represented by the formula $R^{12'}CN$, wherein $R^{12'}$ represents hydrogen, linear and branched $C_1$–$C_{20}$ alkyl, linear and branched $C_1$–$C_{20}$ haloalkyl, substituted and unsubstituted $C_3$–$C_{20}$ cycloalkyl, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine. bromine, and fluorine. Representative nitriles include but are not limited to acetonitrile, propionitrile, benzonitrile, benzyl cyanide, and 5-norbornene-2-carbonitrile.

The arene ligands can be selected from substituted and unsubstituted $C_6$–$C_{12}$ arenes containing monosubstitution or multisubstitution, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative arenes include but are not limited to toluene, benzene, o-, m-, and p-xylenes, mesitylene, fluorobenzene, o-difluorobenzene, p-difluorobenzene, chlorobenzene, pentafluorobenzene, o-dichlorobenzene, and hexafluorobenzene.

Suitable trialkyl and triaryl phosphine oxide ligands can be represented by phosphine oxides of the formula $P(O)(R^{13'})_3$, wherein $R^{13'}$ independently represents linear and branched $C_1$–$C_{20}$ alkyl, linear and branched $C_1$–$C_{20}$ haloalkyl, substituted and unsubstituted $C_3$–$C_{20}$ cycloalkyl, linear and branched $C_1$–$C_{20}$ alkoxy, linear and branched $C_1$–$C_{20}$ haloalkoxy, substituted and unsubstituted $C_6$–$C_{18}$ aryl, and substituted and unsubstituted $C_6$–$C_{18}$ aralkyl. When substituted, the cycloalkyl, aryl and aralkyl groups can be monosubstituted or multisubstituted, wherein the substituents are independently selected from hydrogen, linear and branched $C_1$–$C_{12}$ alkyl, linear and branched $C_1$–$C_5$ haloalkyl, linear and branched $C_1$–$C_5$ alkoxy, $C_6$–$C_{12}$ aryl, and halogen selected from chlorine, bromine, and fluorine. Representative phosphine oxides include but are not limited to triphenylphosphine oxide, tributylphosphine oxide, trioctylphosphine oxide, tributylphosphate, and tris(2-ethylhexyl)phosphate.

Representative carbonates include but are not limited to ethylene carbonate and propylene carbonate.

Representative esters include but are not limited to ethyl acetate and i-amyl acetate.

WCA Description

The weakly coordinating counteranion complex, [WCA], of Formula I can be selected from borates and aluminates, boratobenzene anions, carborane and halocarborane anions.

The borate and aluminate weakly coordinating counteranions are represented by Formulae II and III below:

$$[M'(R^{24'})(R^{25'})(R^{26'})(R^{27'})]^- \qquad \text{II}$$

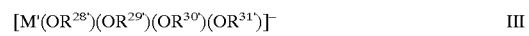

$$[M'(OR^{28'})(OR^{29'})(OR^{30'})(OR^{31'})]^- \qquad \text{III}$$

wherein in Formula II M' is boron or aluminum and $R^{24'}$, $R^{25'}$, $R^{26'}$, and $R^{27'}$ independently represent fluorine, linear and branched $C_1$–$C_{10}$ alkyl, linear and branched $C_1$–$C_{10}$ alkoxy, linear and branched $C_3$–$C_5$ haloalkenyl, linear and branched $C_3$–$C_{12}$ trialkylsiloxy, $C_{18}$–$C_{36}$ triarylsiloxy, substituted and unsubstituted $C_6$–$C_{30}$ aryl, and substituted and unsubstituted $C_6$–$C_{30}$ aryloxy groups wherein $R^{24'}$ to $R^{27'}$ can not all simultaneously represent alkoxy or aryloxy groups. When substituted the aryl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_5$ haloalkoxy, linear and branched $C_1$–$C_{12}$ trialkylsilyl, $C_6$–$C_{18}$ triarylsilyl, and halogen selected from chlorine, bromine, and fluorine, preferably fluorine.

Representative borate anions under Formula II include but are not limited to tetrakis(pentafluorophenyl)borate, tetrakis (3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-i-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)ethyl]-5-(trifluoromethyl)phenyl]borate.

Representative aluminate anions under Formula II include but are not limited to tetrakis(pentafluorophenyl)aluminate, tris(nonafluorobiphenyl)fluoroaluminate, (octyloxy)tris(pentafluorophenyl)aluminate, tetrakis(3,5-bis(trifluoromethyl)phenyl)aluminate, and methyltris(pentafluorophenyl)aluminate.

In Formula III M' is boron or aluminum, $R^{28'}$, $R^{29'}$, $R^{30'}$, and $R^{31'}$ independently represent linear and branched $C_1$–$C_{10}$ alkyl, linear and branched $C_1$–$C_{10}$ haloalkyl, $C_2$–$C_{10}$ haloalkenyl, substituted and unsubstituted $C_6$–$C_{30}$ aryl, and substituted and unsubstituted $C_7$–$C_{30}$ aralkyl groups, subject to the proviso that at least three of $R^{28'}$ to $R^{31'}$ must contain a halogen containing substituent. When substituted the aryl and aralkyl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine, preferably fluorine. The groups $OR^{28'}$ and $OR^{29'}$ can be taken together to form a chelating substituent represented by —O—$R^{32'}$—O—, wherein the oxygen atoms are bonded to M' and $R^{32'}$ is a divalent radical selected from substituted and unsubstituted $C_6$–$C_{30}$ aryl and substituted and unsubstituted $C_7$–$C_{30}$ aralkyl. Preferably, the oxygen atoms are bonded, either directly or through an alkyl group, to the aromatic ring in the ortho or meta position. When substituted the aryl and aralkyl groups can be monosubstituted or multisubstituted, wherein the substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine, preferably fluorine. Representative structures of divalent $R^{32'}$ radicals are illustrated below:

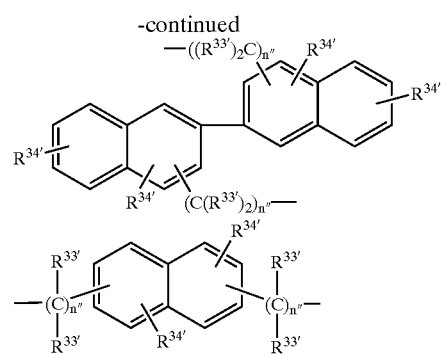

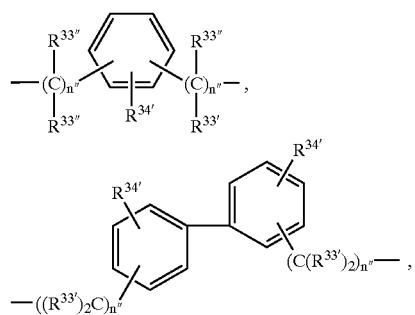

wherein $R^{33'}$ independently represents hydrogen, linear and branched $C_1$–$C_5$ alkyl, linear and branched $C_1$–$C_5$ haloalkyl, and halogen selected from chlorine, bromine, and fluorine, preferably fluorine; $R^{34'}$ can be a monosubstituent or taken up to four times about each aromatic ring depending on the available valence on each ring carbon atom and independently represents hydrogen, linear and branched $C_1$–$C_5$ alkyl, linear and branched $C_1$–$C_5$ haloalkyl, linear and branched $C_1$–$C_5$ alkoxy, linear and branched $C_1$–$C_{10}$ haloalkoxy, and halogen selected from chlorine, bromine, and fluorine, preferably fluorine; and n" independently represents an integer from 0 to 6. It should be recognized that when n" is 0 the oxygen atom in the formula —O—$R^{32'}$—O— is bonded directly to a carbon atom in the aromatic ring represented by $R^{32'}$. In the above divalent structural formulae the oxygen atom(s), i.e., when n" is 0, and the methylene or substituted methylene group(s), —(C($R^{33'}$)$_2$)$_{n''}$—, are preferably located on the aromatic ring in the ortho or meta positions. Representative chelating groups of the formula —O—$R^{32'}$—O— include but are not limited to are 2,3,4,5-tetrafluorobenzenediolate (—O$C_6F_4$O—), 2,3,4,5-tetrachlorobenzenediolate (—O$C_6Cl_4$O—), and 2,3,4,5-tetrabromobenzenediolate (—O$C_6Br_4$O—), and bis(1,1'-bitetrafluorophenyl-2,2'-diolate).

Representative borate and aluminate anions under Formula III include but are not limited to [B(O$_2$C$_6$F$_4$)$_2$]$^-$, [B(OC(CF$_3$)$_2$(CH$_3$))$_4$]$^-$, [B(OC(CF$_3$)$_2$H)$_4$]$^-$, [B(OC(CF$_3$)(CH$_3$)H)$_4$]$^-$, [Al(OC(CF$_3$)$_2$Ph)$_4$]$^-$, [B(OCH$_2$(CF$_3$))$_4$]$^-$, [Al(OC(CF$_3$)$_2$C$_6$H$_4$—CH$_3$)$_4$]$^-$, [Al(OC(CF$_3$)$_3$)$_4$]$^-$, [Al(OC(CF$_3$)(CH$_3$)H)$_4$]$^-$, [Al(OC(CF$_3$)$_2$H)$_4$]$^-$, [Al(OC(CF$_3$)$_2$C$_6$H$_4$-4-i-Pr)$_4$]$^-$, [Al(OC(CF$_3$)$_2$C$_6$H$_4$-4-t-butyl)$_4$]$^{-1}$, [Al(OC(CF$_3$)$_2$C$_6$H$_4$-4-SiMe$_3$)$_4$,]$^-$, [Al(OC(CF$_3$)$_2$C$_6$H$_4$-4-Si-i-Pr$_3$)$_4$]$^-$, [Al(OC(CF$_3$)$_2$C$_6$H$_2$-2,6-(CF$_3$)$_2$-4-Si-i-Pr$_3$)$_4$]$^-$, [Al(OC(CF$_3$)$_2$ C$_6$H$_3$-3,5-(CF$_3$)$_2$)$_4$]$^-$, [Al(OC(CF$_3$)$_2$C$_6$H$_2$-2,4,6-(CF$_3$)$_3$)$_4$]$^-$, and [Al(OC(CF$_3$)$_2$C$_6$F$_5$)$_4$]$^-$.

The boratobenzene anions useful as the weakly coordinating counteranion can be represented by Formula IV below:

IV

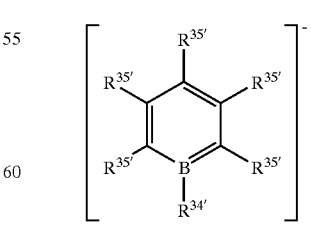

wherein $R^{34'}$ is selected from fluorine, fluorinated hydrocarbyl, perfluorocarbyl, and fluorinated and perfluorinated ethers. As used here and throughout the specification, the term halohydrocarbyl means that at least one hydrogen atom on the hydrocarbyl radical, e.g., alkyl, alkenyl, alkynyl, cycloalkyl, aryl, and aralkyl groups, is replaced with a halogen atom selected from chlorine, bromine, iodine, and fluorine. The term fluorohydrocarbyl means that at least one hydrogen atom on the hydrocarbyl radical is replaced by fluorine. The degree of halogenation can range from at least one hydrogen atom being replaced by a halogen atom (e.g., a monofluoromethyl group) to full halogenation (perhalogenation) wherein all hydrogen atoms on the hydrocarbyl group have been replaced by a halogen atom (e.g., perhalocarbyl such as trifluoromethyl (perfluoromethyl)). The fluorinated hydrocarbyl and perfluorocarbyl radicals preferably contain 1 to 24 carbon atoms, more preferably, 1 to 12 carbon atoms and most preferably 6 carbon atoms and can be linear or branched, cyclic, or aromatic. The fluorinated hydrocarbyl and perfluorocarbyl radicals include but are not limited to fluorinated and perfluorinated linear and branched $C_1$–$C_{24}$ alkyl, fluorinated and perfluorinated $C_3$–$C_{24}$ cycloalkyl, fluorinated and perfluorinated $C_2$–$C_{24}$ alkenyl, fluorinated and perfluorinated $C_3$–$C_{24}$ cycloalkenyl, fluorinated and perfluorinated $C_6$–$C_{24}$ aryl, and fluorinated and perfluorinated $C_7$–$C_{24}$ aralkyl. The fluorinated and perfluorocarbyl ether substituents are represented by the formulae —$(CH_2)_mOR^{36'}$, or —$(CF_2)_mOR^{36'}$ respectively, wherein $R^{36'}$ is a fluorinated or perfluorocarbyl group as defined above, m is and integer of 0 to 5. It is to be noted that when m is 0 the oxygen atom in the ether moiety is directly bonded attached to the boron atom in the boratobenzene ring.

Preferred $R^{34'}$ radicals include those that are electron withdrawing in nature such as, for example, fluorinated and perfluorinated hydrocarbyl radicals selected from trifluoromethyl, perfluoroethyl, perfluoropropyl, perfluoroisopropyl, pentafluorophenyl and bis(3,5-trifluoromethyl)phenyl.

$R^{35'}$ independently represents hydrogen, halogen, perfluorocarbyl, and silylperfluorocarbyl radicals, wherein the perfluorocarbyl and silylperfluorocarbyl are as defined previously. Preferred halogen groups are selected from chlorine, fluorine, with fluorine being especially preferred. When $R^{35'}$ is halogen, perfluorocarbyl, and/or silylperfluorocarbyl, the radical(s) are preferably ortho or para (more preferably para) to the boron atom in the boratobenzene ring.

Representative boratobenzene anions include but are not limited to [1,4-dihydro-4-methyl-1-(pentafluorophenyl)]-2-borate, 4-(1,1-dimethyl)-1,2-dihydro-1-(pentafluorophenyl)-2-borate, 1-fluoro-1,2-dihydro-4-(pentafluorophenyl)-2-borate, and 1-[3,5-bis(trifluoromethyl)phenyl]-1,2-dihydro-4-(pentafluorophenyl)-2-borate.

The carborane and halocarborane anions useful as the weakly coordinating counteranion include but are not limited to $CB_{11}(CH_3)_{12}^-$, $CB_{11}H_{12}^-$, 1-$C_2H_5CB_{11}H_{11}^-$, 1-$Ph_3SiCB_{11}H_{11}^-$, 1-$CF_3CB_{11}H_{11}^-$, 12-$BrCB_{11}H_{11}^-$, 12-$BrCB_{11}H_{11}^-$, 7,12-$Br_2CB_{11}H_{10}^-$, 12-$ClCB_{11}H_{11}^-$, 7,12-$Cl_2CB_{11}H_{10}^-$, 1-H-$CB_{11}F_{11}^-$, 1-$CH_3$—$CB_{11}F_{11}^-$, 1-$CF_3$—$CB_{11}F_{11}^-$, 12-$CB_{11}H_{11}F^-$, 7,12-$CB_{11}H_{11}F_2^-$, 7,9,12-$CB_{11}H_{11}F_3^-$, $CB_{11}H_6Br_6^-$, 6-$CB_9H_9F^-$, 6,8-$CB_9H_8F_2^-$, 6,7,8-$CB_9H_7F_3^-$, 6,7,8,9-$CB_9H_6F_4^-$, 2,6,7,8,9-$CB_9H_5F_5^-$, $CB_9H_5Br_5^-$, $CB_{11}H_6Cl_6^-$, $CB_{11}H_6F_6^-$, $CB_{11}H_6F_6^-$, $CB_{11}H_6I_6^-$, $CB_{11}H_6Br_6^-$, 6,7,9,10,11,12-$CB_{11}H_6F_6^-$, 2,6,7,8,9,10-$CB_9H_5F_5^-$, 1-H-$CB_9F_9^-$, 12-$CB_{11}H_{11}(C_6H_5)^-$, 1-$C_6F_5$—$CB_{11}H_5Br_6^-$, $CB_{11}Me_{12}^-$, $CB_{11}(CF_3)_{12}^-$, $Co(B_9C_2H_{11})_2^-$, $CB_{11}(CH_3)_{12}^-$, $CB_{11}(C_4H_9)_{12}^-$, $CB_{11}(C_6H_{13})_{12}^-$, $Co(C_2B_9H_8)_2^-$, $Co(Br_3C_2B_9H_8)_2^-$ and dodecahydro-1-carbadodecaborate.

Catalyst Preparation

The catalysts of Formula I can be prepared as a preformed single component catalyst in solvent or can be prepared in situ by admixing the catalyst precursor components in the desired monomer to be polymerized.

The single component catalyst of Formula I can be prepared by admixing the catalyst precursors in an appropriate solvent, allowing the reaction to proceed under appropriate temperature conditions, and isolating the catalyst product. In another embodiment, a Group 10 metal procatalyst is admixed with a Group 15 electron donor compound and/or a labile neutral electron donor compound, and a salt of a weakly coordinating anion in an appropriate solvent to yield the preformed catalyst complex set forth under Formula I above. In another embodiment a Group 10 metal procatalyst containing a Group 15 electron donor ligand is admixed with a salt of a weakly coordinating anion in an appropriate solvent to yield the preformed catalyst complex.

The catalyst preparation reactions are carried out in solvents that are inert under the reaction conditions. Examples of solvents suitable for the catalyst preparation reaction include but are not limited to alkane and cycloalkane solvents such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; ethers such as THF and diethylether; aromatic solvents such as benzene, xylene, toluene, mesitylene, chlorobenzene, and o-dichlorobenzene; and halocarbon solvents such as Freon® 112; and mixtures thereof. Preferred solvents include benzene, fluorobenzene, o-difluorobenzene, p-difluorobenzene, pentafluorobenzene, hexafluorobenzene, o-dichlorobenzene, chlorobenzene, toluene, o-, m-, and p-xylenes, mesitylene, cyclohexane, THF, and dichloromethane.

A suitable temperature range for carrying out the reaction is from about –80° C. to about 150° C., preferably from about –30° C. to about 100° C., more preferably from about 0° C. to about 65° C., and most preferably from about 10° C. to about 40° C. Pressure is not critical but may depend on the boiling point of the solvent employed, i.e. sufficient pressure to maintain the solvent in the liquid phase. Reaction times are not critical, and can range from several minutes to 48 hours. The reactions are preferably carried out under inert atmosphere such as nitrogen or argon.

The reaction is carried out by dissolving the procatalyst in a suitable solvent and admixing the appropriate ligand(s) and the salt of the desired weakly coordinating anion with the dissolved procatalyst, and optionally heating the solution until the reaction is complete. The preformed single component catalyst can be isolated or can be used directly by adding aliquots of the preformed catalyst in solution to the polymerization medium. Isolation of the product can be accomplished by standard procedures, such as evaporating the solvent, washing the solid with an appropriate solvent, and then recrystallizing the desired product. The molar ratios of catalyst components employed in the preparation the preformed single component catalyst of the invention is based on the metal contained in the procatalyst component. In a preferred embodiment the molar ratio of procatalyst/Group 15 electron donor component/WCA salt is 1:1–10:1–100, more preferably, 1:1–5:1–20, and most preferably, 1:1–2:1–5. In embodiments of the invention where the procatalyst is ligated with a Group 15 electron donor ligand and/or a labile neutral electron donor ligand the molar ratio of procatalyst (based on the metal content) to WCA salt 1:1–100, preferably, 1:1–20, and more preferably, 1:1–5.

In one embodiment, a Group 10 metal procatalyst dimer of the formula [R'MA']$_2$ is admixed with a Group 15 electron donor compound, (L'), and a salt of a suitable weakly coordinating anion in an appropriate solvent to produce the single component catalyst product as shown in equation (1) below.

$$[R'MA']_2 + xL' + yL'' + [WCA]\text{salt} \rightarrow [R'M(L')_x(L'')_y]_b[WCA]_d \quad 1.$$

Suitable procatalyst dimers of the formula [R'MA']$_2$ include but are not limited to the following compositions (allyl) palladiumtrifluoroacetate dimer, (allyl)palladiumchloride dimer, (crotyl)palladiumchloride dimer, (allyl) palladiumiodide dimer, (β-pinenyl)palladiumchloride dimer, methallylpalladium chloride dimer, 1,1-dimethylallylpalladium chloride dimer, (allyl) palladiumacetate dimer, [CH$_2$C(CH$_3$)CH$_2$(C$_{10}$H$_{10}$)Ni (O$_2$CCF$_3$)] (the inserted moiety C$_{10}$H$_{10}$ is derived from dicyclopentadiene), [CH$_2$C(CH$_3$)CH$_2$(C$_7$H$_{10}$)Ni(O$_2$CCF$_3$)]$_2$)] (the inserted moiety C$_7$H$_{10}$ is derived from norbornene), [CH$_2$C(CH$_3$)CH$_2$(C$_{13}$H$_{22}$)Ni(O$_2$CCF$_3$)]$_2$ (the inserted moiety C$_{13}$H$_{22}$ is derived from hexylnorbornene), [CH$_2$C(CH$_3$)CH$_2$(C$_{14}$H$_{16}$)Ni(O$_2$CCF$_3$)]$_2$ (the inserted moiety C$_{10}$H$_{10}$ is derived from norbornadiene dimer, [NBD]$_2$), [CH$_2$C(CH$_3$)CH$_2$(C$_{15}$H$_{15}$)Ni(O$_2$CCF$_3$)]$_2$(the inserted moiety C$_5$H$_{15}$ is derived from tricyclopentadiene), [CH$_2$C(CH$_3$)CH$_2$(exo-C$_{12}$H$_{20}$)Ni(O$_2$CCF$_3$)]$_2$ (the inserted moiety exo-C$_{12}$H$_2$ is derived from exo-pentylnorbornene), and [CH$_2$C(CH$_3$)CH$_2$(C$_{13}$H$_{22}$)Ni(O$_2$CCF$_3$)]$_2$ (the inserted moiety C$_{13}$H$_{22}$ is derived from hexylnorbornene).

In another embodiment, a ligated Group 10 metal procatalyst of the formula [R'M(L'')$_y$A'] is admixed with a Group 15 electron donor compound, (L'), and a salt of a suitable weakly coordinating anion in an appropriate solvent to produce the single component catalyst product as shown in equation (2) below.

$$[R'M(L'')_y A'] + xL' + [WCA]\text{salt} \rightarrow [R'M(L')_x(L'')_y]_b[WCA]_d \quad 2.$$

A representative procatalyst of the formula [R'M(L'')$_y$A'] includes but is not limited to (COD)palladium (methyl) chloride.

In a further embodiment, a Group 10 metal ligated procatalyst of the formula [R'M(L')$_x$A'] containing the Group 15 electron donor ligand (L') is admixed with a salt of a suitable weakly coordinating anion in an appropriate solvent to produce the single component catalyst product as shown in equation (3) below.

$$[R'M(L')_x A'] + yL'' + [WCA]\text{salt}''[R'M(L')_x(L'')_y]_b[WCA]_d \quad 3.$$

Suitable procatalysts of the formula [R'M(L')$_x$A'] include but are not limited to the following compositions:
(allyl)palladium(tricyclohexylphosphine)chloride,
(allyl)palladium(tricyclohexylphosphine)triflate,
(allyl)palladium(triisopropylphosphine)triflate,
(allyl)palladium(tricyclopentylphosphine)triflate,
(allyl)palladium(tricyclohexylphosphine)trifluoroacetate,
(allyl)palladium(tri-o-tolylphosphine)chloride,
(allyl)palladium(tri-o-tolylphosphine)triflate,
(allyl)palladium(tri-o-tolylphosphine)nitrate,
(allyl)palladium(tri-o-tolylphosphine)acetate,
(allyl)palladium(triisopropylphosphine)triflimide,
(allyl)palladium(tricyclohexylphosphine)triflimide,
(allyl)palladium(triphenylphosphine)triflimide.
(allyl)palladium(trinaphthylphosphine)triflate,
(allyl)palladium(tricyclohexylphosphine) p-tolylsulfonate,
(allyl)palladium(triphenylphosphine)triflate,
(allyl)palladium(triisopropylphosphine)trifluoroacetate,
(allyl)platinum(tricyclohexylphosphine)chloride,
(allyl)platinum(tricyclohexylphosphine)triflate,
(1,1-dimethylallyl)palladium(triisopropylphosphine) trifluoroacetate.
(2-chloroallyl)palladium(triisopropylphosphine) trifluoroacetate,
(crotyl)palladium(triisopropylphosphine)triflate,
(crotyl)palladium(tricyclohexylphosphine)triflate,
(crotyl)palladium(tricyclopentylphosphine)triflate,
(methallyl)palladium(tricyclohexylphosphine)triflate,
(methallyl)palladium(triisopropylphosphine)triflate,
(methallyl)palladium(tricyclopentylphosphine)triflate,
(methallyl)palladium(tricyclohexylphosphine)chloride,
(methallyl)palladium(triisopropylphosphine)chloride,
(methallyl)palladium(tricyclopentylphosphine)chloride,
(methallyl)palladium(tricyclohexylphosphine)triflimide,
(methallyl)palladium(triisopropylphosphine)triflimide,
(methallyl)palladium(tricyclopentylphosphine)triflimide,
(methallyl)palladium(tricyclohexylphosphine) trifluoroacetate,
(methallyl)palladium(triisopropylphosphine) trifluoroacetate,
(methallyl)palladium(tricyclopentylphosphine) trifluoroacetate,
(methallyl)palladium(tricyclohexylphosphine) acetate,
(methallyl)palladium(triisopropylphosphine)acetate,
(methallyl)palladium(tricyclopentylphosphine)acetate,
(methallyl)nickel(tricyclohexylphosphine)triflate,
{2-[(dimethylamino)methyl]phenyl-C,N-}-palladium (tricyclohexylphosphine)chloride,
[(dimethylamino)methyl]phenyl-C,N-}-palladium (tricyclohexylphosphine)triflate,
(hydrido)palladium bis(tricyclohexylphosphine)chloride,
(hydrido)palladium bis(triisopropylphosphine)chloride,
(hydrido)palladium bis(tricyclohexylphosphine)nitrate,
(hydrido)palladium bis(tricyclohexylphosphine) trifluoroacetate,
(hydrido)palladiumbis(triisopropylphosphine)triflate,
(hydrido)palladiumbis(tricyclohexylphosphine)triflate, and
(hydrido)palladiumbis(tricyclohexylphosphine)formate.

Other procatalyst components suitable for use in the foregoing process include (Me$_2$NCH$_2$C$_6$H$_4$)Pd(O$_3$SCF$_3$)P(cyclohexyl)$_3$ (i.e., ortho-metallatedphenylmethlyenedimethylamino palladium tricyclohexylphosphine), (Me$_2$NCH$_2$C$_6$H$_4$)Pd(O$_3$SCF$_3$)P(i-Pr)$_3$ (i.e., ortho-metallatedphenylmethlyenedimethylamino palladium triisopropylphosphine), (allyl)PdP(i-Pr)$_3$C$_6$F$_5$, (allyl)Pd(PCy$_3$)C$_6$F$_5$, (CH$_3$)Pd(PMe$_3$)$_2$Cl, (C$_2$H$_5$)Pd (PMe$_3$)$_2$ Cl, (Ph)Pd(PMe$_3$)$_2$Cl, (CH$_3$)Pd(PMe$_3$)$_2$Br, (CH$_3$)Pd(PMe$_2$Ph)$_2$Cl, (C$_2$H$_5$)Pd(PMe$_3$)$_2$Br, (C$_2$H$_5$)Pd(PMe$_3$)$_2$Br, (Ph)Pd(PMe$_3$)$_2$Br, (CH$_3$)Pd(PMe$_3$)NO$_3$, (CH$_3$)Pd(P(i-Pr)$_3$)$_2$(O$_3$SCF$_3$), (η$^1$-benzyl)Pd(PEt$_3$)$_2$Cl, (allyl)Pd(PMe$_3$)OC(O)CH$_2$CH=CH$_2$, (allyl)Pd(AsPh$_3$)Cl, (allyl)Pd(PPh$_3$)Cl, (allyl)Pd(SbPh$_3$)Cl, (methylallyl)Pd(PPh$_3$)Cl, (methylallyl)Pd(AsPh$_3$)Cl, (methylallyl)Pd(SbPh$_3$)Cl, (methylallyl)Pd(PBu$_3$)Cl, and (methylallyl)Pd(P[(OCH$_2$)$_3$]CH)Cl.

In another embodiment, the catalyst can be formed by protonating a procatalyst of the formula:

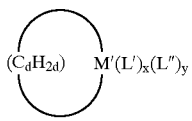

in the presence of a Brønsted acid based WCA salt or an equivalent reaction utilizing a carbonium or silylium based WCA salt to yield an active catalyst as illustrated in Eq. 4.

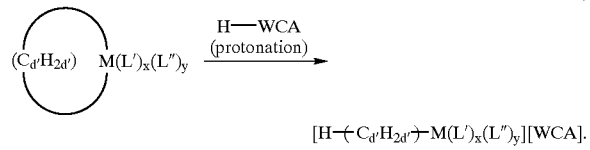

In this embodiment R' is a divalent hydrocarbyl ligand of the formula —($C_{d'}H_{2d'}$)— that is taken together with the Group 10 metal center M to form a metallacycle where d' represents the number of carbon atoms in the divalent hydrocarbyl backbone and is an integer from 3 to 10. Any of the hydrogen atoms on the divalent hydrocarbyl backbone can be replaced by linear and branched $C_1$–$C_5$ alkyl, linear and branched $C_1$–$C_5$ haloalkyl, $C_5$–$C_{10}$ cycloalkyl, and $C_6$–$C_{10}$ aryl. The cycloalkyl and aryl moieties can optionally be substituted with a halogen substituent selected from bromine, chlorine, fluorine, and iodine, preferably fluorine. In addition, any two or three of the alkyl substituents taken together with the hydrocarbyl backbone carbon atoms to which they are attached can form an aliphatic or aromatic ring system. The rings can be monocyclic, polycyclic, or fused. Protonation occurs at one of the hydrocarbyl/metal center bond interfaces to yield a cation complex with a monovalent hydrocarbyl ligand coordinated to the metal center M.

In another embodiment a Group 10 metal ligated procatalyst of the formula [R'M(L')$_x$(L")$_y$A'] containing a Group 15 electron donor ligand (L') and a labile neutral electron donor ligand (L") is admixed with a salt of a suitable weakly coordinating anion in an appropriate solvent to produce the single component catalyst product as shown in equation (4) below.

[R'M(L')$_x$(L")$_y$A']+[WCA]salt→[R'M(L')$_x$(L")$_y$]$_b$[WCA]$_d$   5.

Suitable procatalysts of the formula [R'M(L')$_x$(L")$_y$A'] include but are not limited to the following compositions: [(allyl)Pd(NCCH$_3$)P(i-Pr)$_3$][B(O$_2$-3,4,5,6-Cl$_4$C$_6$)$_2$], [(allyl) Pd(HOCH$_3$)P(i-Pr)$_3$][B(O$_2$-3,4,5,6-C$_{14}$C$_6$)$_2$], [(allyl)Pd (HOCH$_3$)(P(i-Pr)$_3$)][B(O$_2$-3,4,5,6-Br$_4$C$_6$)$_2$], [(allyl)Pd (HOCH$_3$)(P(i-Pr)$_3$)][B(O$_2$C$_6$H$_4$)$_2$], [(allyl)Pd(OEt$_2$)(P(i-Pr)$_3$)][BPh$_4$], [(allyl)Pd(OEt$_2$)(P(i-Pr)$_3$)][SbF$_6$], [(allyl)Pd(OEt$_2$)(P(i-Pr)$_3$)][BF$_4$], [allyl)Pd(OEt$_2$)(PCy$_3$)] [BF$_4$], [(allyl)Pd(OEt$_2$)(PPh$_3$)][BF$_4$], [(allyl)Pd(OEt$_2$)(P(i-Pr)$_3$)][PF$_6$], [(allyl)Pd(OEt$_2$)(PCy$_3$)][PF$_6$], [(allyl)Pd(OEt$_2$) (PPh$_3$)][PF$_6$], [(allyl)Pd(OEt$_2$)(P(i-Pr)$_3$)] [ClO$_4$], [(allyl)Pd (OEt$_2$)(PCy$_3$)][ClO$_4$], [(allyl)Pd(OEt$_2$)(PPh$_3$)][ClO$_4$], [(allyl)Pd(OEt$_2$)(P(i-Pr)$_3$)][SbF$_6$], [(allyl)Pd(OEt$_2$)(PCy$_3$)] [SbF$_6$], and [(allyl)Pd(OEt$_2$)(PPh$_3$)][SbF$_6$].

In the above equations and formulae, R', M, L', L", [WCA], b, d, x, and y are as defined above, A' is an anionic leaving group which is defined below, [WCA] salt is a metal salt of the weakly coordinating anion [WCA], and the abbreviations Me, Et, Ph, Pr, Bu, and Cy as used here and throughout the specification refer to methyl, ethyl, phenyl, propyl, butyl, and cyclohexyl, respectively.

The foregoing Group 10 metal procatalyst components are commercially available or can be synthesized by techniques well known in the art.

Leaving Groups

A' represents an anionic leaving group that can be readily displaced by the weakly coordinating anion that is provided by the WCA salt. The leaving group forms a salt with the cation on the WCA salt. Leaving group A' is selected from halogen, nitrate, triflate (trifluoromethanesulfonate), triflimide (bistrifluoromethanesulfonimide), trifluoroacetate, tosylate, AlBr$_4^-$, AlF$_4^-$, AlClhd 4$^-$, AlF$_3$O$_3$SCF$_3^-$, AsC$_6^-$, SbCl$_6^-$, SbF$_6^-$, PF$_6^-$, BF$_4^-$, ClO$_4^-$, HSO$_4^-$, acetates, carbonates, aluminates, and borates.

In another embodiment the leaving group can be a hydrocarbyl group or halogenated hydrocarbyl group when a Brønsted acid based WCA salt is utilized as the activator. In this embodiment the activator protonates the hydrocarbyl or halogenated hydrocarbyl forming a neutral moiety. The leaving group moiety is preferably selected from the hydride, linear and branched $C_1$–$C_5$ alkyl, linear and branched $C_1$–$C_5$ haloalkyl, $C_5$–$C_{10}$ cycloalkyl, and $C_6$–$C_{10}$ aryl. The cycloalkyl and aryl moieties can optionally be substituted with a halogen substituent selected from bromine, chlorine, fluorine, and iodine, preferably fluorine. In this embodiment, A' is protonated to yield the neutral moiety A'H. Methyl and pentafluorophenyl groups are representative examples of leaving groups under this embodiment.

Halogen leaving groups include chlorine, iodine, bromine and fluorine. The acetates include groups of the formula $R^{38'}$C(O)O—, and the carbonates include groups of the formula $R^{38'}$OC(O)O, wherein $R^{38'}$ represents linear and branched $C_1$–$C_5$ alkyl, linear and branched $C_1$–$C_5$ haloalkyl (preferably fluorine), linear or branched $C_1$–$C_5$ alkenyl, $C_6$–$C_{12}$ aryl, optionally monosubstituted or independently multisubstituted with linear and branched $C_1$–$C_5$ alkyl, linear and branched $C_1$–$C_5$ haloalkyl, and halogen (preferably fluorine).

The aluminate and borate leaving groups can be represented by the formulae M'($R^{39'}$)$_4^-$, M'(G$R^{39'}$)$_4^-$, M'(—C≡CPh)$_4^-$, or a moiety represented by the following structures:

wherein G is a sulfur or oxygen atom Ph represents phenyl and substituted

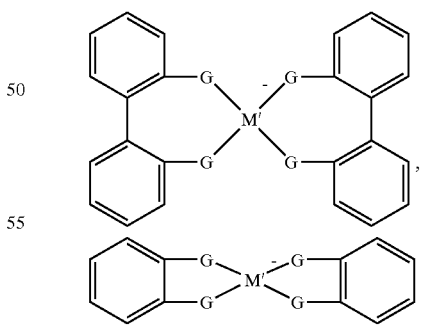

phenyl as defined below, and $R^{39'}$ independently represents linear and branched $C_1$–$C_{10}$ alkyl, linear and branched $C_1$–$C_{10}$ chloro- or bromoalkyl, $C_5$–$C_{10}$cycloalkyl, substituted and unsubstituted aryl, preferably, phenyl and substituted phenyl, substituted and unsubstituted $C_7$–$C_{20}$ aralkyl, preferably, phenylalkyl and substituted phenylalkyl. By substituted is meant that the aryl or phenyl groups can contain one or more of linear and branched $C_1$–$C_5$ alkyl, linear and branched $C_1$–$C_5$ haloalkyl, chlorine, and bromine substituents, and combinations thereof.

Representative aluminate groups include but are not limited to tetraphenoxyaluminate, tetrakis(cyclohexanolato) aluminate, tetraethoxyaluminate, tetramethoxyaluminate, tetrakis(isopropoxy)aluminate, tetraksi(2-butanolato) aluminate, tetrapentyloxyaluminate, tetrakis(2-methyl-2-propanolato)aluminate, tetrakis(nonyloxy)aluminate, and bis(2-methoxyethanolate-O,O')bis(2-methoxyethanolate-O') aluminate, tetrakis(phenyl)aluminate, tetrakis(p-tolyl) aluminate, tetrakis(m-tolyl)aluminate, tetrakis(2,4-dimethylphenyl)aluminate, and tetrakis(3,5-dimethylphenyl)aluminate.

Representative borate groups include tetraphenylborate, tetrakis(4-methylphenyl)borate, tetrakis(4-chlorophenyl) borate, tetrakis(4-bromophenyl)borate, tetrakis(2-bromo-4-chlorophenyl)borate, butyltriphenylborate, tetrakis(4-methoxyphenyl)borate, tetrakis(phenylethynyl)borate, bis (1,2-benzenediolato)borate. triphenyl(phenylethynyl)borate, bis(tetrafluorobenzenediolate)borate, bis (tetrachlorobenzenediolate)borate, bis (tetrabromobenzenediolate)borate, bis(1,1'-biphenyl-2,2'-diolato)borate, tetrakis(thiophenolyl)borate, bis(3,5-di-tert-butylbenzenediolate)borate, tetrakis(2,4-dimethylphenyl) borate, tetrakis(p-tolyl)borate, tetrakis(3,5-dimethylphenyl) borate, and tetrakis(m-tolyl)borate.

In addition to the anionic leaving groups described above, A' can also be selected from highly fluorinated and perfluorinated alkylsulfonyl and arylsulfonyl containing anions of the formulae $(R^{40'}SO_2)_2CH^-$, $(R^{40'}SO_2)_3C^-$, and $(R^{40'}SO_2)_2 N^-$, wherein $R^{40'}$ independently represents linear and branched $C_1$–$C_{20}$ highly fluorinated and perfluorinated alkyl, $C_5$–$C_{15}$ highly fluorinated and perfluorinated cycloalkyl, and highly fluorinated and perfluorinated $C_6$–$C_{22}$ aryl. Optionally, the alkyl and cycloalkyl groups can contain a heteroatom in the chain of cyclic structure, respectively. Preferred heteroatoms include divalent (non-peroxidic) oxygen (i.e., —O—), trivalent nitrogen, and hexavalent sulfur. Any two of $R^{40'}$ can be taken together to form a ring. When $R^{40'}$ is a cycloalkyl substituent, a heterocycloalkyl substituent, or is taken with another $R^{40'}$ group to form a ring, the ring structures preferably contain 5 or 6 atoms, 1 or 2 of which can be heteroatoms.

In the above formulae the term highly fluorinated means that at least 50 percent of the hydrogen atoms bonded to the carbon atoms in the alkyl, cycloalkyl, and aryl moieties are replaced by fluorine atoms. Preferably, at least 2 out of every 3 hydrogen atoms on the alkyl, cycloalkyl, and aryl moieties under $R^{40'}$ are replaced by fluorine. More preferably, at least 3 out of every 4 hydrogen atoms are replaced by fluorine, and most preferably all of the hydrogen atoms on the $R^{40'}$ substituent are replaced by fluorine to give the perfluorinated moiety. In addition to or in lieu of fluorine atom substitution on the aryl ring(s), the aryl groups can contain linear and branched $C_1$–$C_{10}$ highly fluorinated and perfluorinated alkyl groups, such as, for example, trifluoromethyl. In embodiments where hydrogen atoms remain on the alkyl, cycloalkyl, and aryl moieties, a portion or all of the remaining hydrogen atoms can be replaced with bromine and/or chlorine atoms.

Representative highly fluorinated and perfluorinated alkylsulfonyl and arylsulfonyl containing anions of the foregoing formulae include but are not limited to $(C_2F_5SO_2)_2 N^-$, $(C_4F_9SO_2)_2N^-$, $(CF_3SO_2)_2N^-$, $(CF_3 SO_2)$ $(C_4F_9SO_2)N^-$, $((CF_3)_2NC_2F_4SO_2)_2N^-$, $(C_6F_5SO_2)(CF_3SO_2) N^-$, $(CF_3SO_2)(CHF_2SO_2)N^-$, $(C_2F_5SO_2)(CF_3SO_2)N^-$, $(C_3F_7SO_2)_2N^-$, $((CF_3)_2(F)CSO_2)_2N^-$, $(C_4F_8(CF_3)_2NSO_2)_2 N^-$, $(C_8F_{17}SO_2)_3C^-$, $(CF_3SO_2)_3C^-$, $(CF_3SO_2)_2CH^-$, $(C_4F_9SO_2)_3C^-$, $(CF_3SO_2)_2(C_4F_9SO_2)C^-$, $((CF_3)_2 NC_2F_4SO_2)C(SO_2CF_3)_2$, $(3,5$-$bis(CF_3)C_6H_3)SO_2N (SO_2CF_3)^-$, $(C_6F_5SO_2)C(SO_2CF_3)_2^-$, and the structures exemplified below:

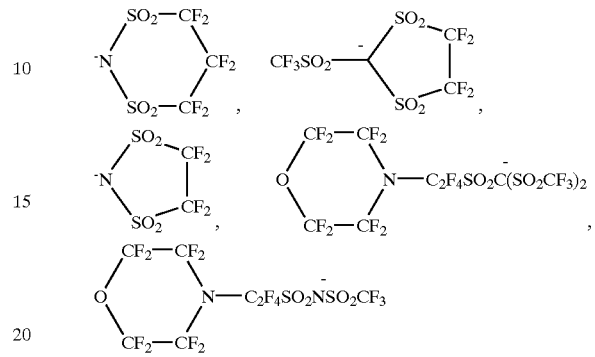

Additional highly fluorinated and perfluorinated alkylsulfonyl and arylsulfonyl anions suitable as leaving groups are described in Turowsky and Seppelt, *Inorganic Chemistry*, 1988, 27, 2135–2137, and in U.S. Pat. Nos. 4,387,222; 4,505,997; 5,021,308; 5,072,040; 5,162,177; and 5,273,840 the disclosures of which are hereby incorporated by reference.

WCA Salts

The salt of the weakly coordinating anion employed in the process of the present invention can be represented by the formula $[C(L'')_z]_b$ $[WCA]_d$, wherein C represents a proton ($H^+$), an alkali metal cation (Group 1A), an alkaline earth metal cation (Group 2A), a transition metal cation or an organic group containing cation, L" and WCA, are as defined above, z is an integer from 0 to 8, and b and d represent the number of times the cation complex and weakly coordinating counteranion complex (WCA), respectively, are taken to balance the electronic charge on the overall salt complex.

The alkali metal cations include Group 1 metals selected from lithium, sodium, potassium, rubidium, and cesium. The preferred Group 1 metal cations are lithium, sodium and potassium.

The alkali earth metal cations include Group 2 metals selected from beryllium, magnesium, calcium, strontium, and barium. The preferred Group 2 metal cations are magnesium, calcium, strontium, and barium. The transition metal cation is selected from zinc, silver, and thallium.

The organic group cation is selected from ammonium, phosphonium, carbonium and silylium cations, i.e., $[NHR^{41'}_3]^+$, $[NR^{41'}_4]^+$, $[PHR^{41'}_3]$, $[PR^{41'}_4]$, $[R^{41'}_3C]^+$, and $[R^{41'}_3Si]^+$, where $R^{41'}$ independently represents a hydrocarbyl, silylhydrocarbyl, or perfluorocarbyl group, each containing 1 to 24 carbon atoms, more preferably, from 1 to 12 carbons arranged in a linear, branched, or ring structure. By perfluorocarbyl is meant that all carbon bonded hydrogen atoms are replaced by a fluorine atom. Representative hydrocarbyl groups include but are not limited to linear and branched $C_1$–$C_{20}$ alkyl, $C_3$–$C_{20}$ cycloalkyl, linear and branched $C_2$ to $C_{20}$ alkenyl, $C_3$–$C_{20}$ cycloalkenyl, $C_6$–$C_{24}$ aryl, and $C_7$–$C_{24}$ aralkyl, and organometallic cations. The organic cations are selected from trityl, trimethylsilylium, triethylsilylium, tris(trimethylsilyl) silylium, tribenzylsilylium, triphenylsilylium, tricyclohexylsilylium, dimethyloctadecylsilylium, and triphenylcarbenium (i.e., trityl). In addition to the above cation complexes ferrocenium cations such as [(C$_5$H$_5$)$_2$Fe]$^+$ and [(C$_5$(CH$_3$))$_2$Fe]$^+$ are also useful as the cation in the WCA salts of the invention.

Examples of WCA salts having a weakly coordinating anion described under Formula II include but are not limited to
lithium tetrakis(2-fluorophenyl)borate, sodium tetrakis(2-fluorophenyl)borate, silver tetrakis(2-fluorophenyl)borate, thallium tetrakis(2-fluorophenyl)borate, lithium tetrakis(3-fluorophenyl)borate, sodium tetrakis(3-fluorophenyl)borate, silver tetrakis(3-fluorophenyl)borate, thallium tetrakis(3-fluorophenyl)borate, ferrocenium tetrakis(3-fluorophenyl) borate, ferrocenium tetrakis(pentafluorophenyl)borate, lithium tetrakis(4-fluorophenyl)borate, sodium tetrakis(4-fluorophenyl)borate, silver tetrakis(4-fluorophenyl)borate, thallium tetrakis(4-fluorophenyl)borate, lithium tetrakis(3,5-difluorophenyl)borate, sodium tetrakis(3,5-difluorophenyl) borate, thallium tetrakis(3,5-difluorophenyl)borate, trityl tetrakis(3,5-difluorophenyl)borate, 2,6-dimethylanilinium tetrakis(3,5-difluorophenyl)borate, lithium tetrakis (pentafluorophenyl)borate, lithium(diethyl ether) tetrakis (pentafluorophenyl)borate, lithium(diethyl ether)$_{2.5}$ tetrakis (pentafluorophenyl)borate, lithium tetrakis(2,3,4,5-tetrafluorophenyl)borate, lithium tetrakis(3,4,5,6-tetrafluorophenyl)borate, lithium tetrakis(1,2,2-trifluoroethylenyl)borate, lithium tetrakis(3,4,5-trifluorophenyl)borate, lithium methyltris(perfluorophenyl) borate, lithium phenyltris(perfluorophenyl)borate, lithium tris(isopropanol) tetrakis(pentafluorophenyl)borate, lithium tetrakis(methanol) tetrakis(pentafluorophenyl)borate, silver tetrakis(pentafluorophenyl)borate, tris(toluene)silver tetrakis(pentafluorophenyl)borate, tris(xylene)silver tetrakis (pentafluorophenyl)borate, trityl tetrakis(pentafluorophenyl) borate, trityl tetrakis(4-triisopropylsilyltetrafluorophenyl) borate, trityl tetrakis(4-dimethyl-tert-butylsilyltetrafluorophenyl)borate, thallium tetrakis[3,5-bis (trifluoromethyl)phenyl]borate, N,N-dimethylanilinium tetrakis(pentafluorophenyl)borate, N,N-dimethylanilinium tetrakis[3,5-bis(trifluoromethyl)phenyl]borate lithium (triphenylsiloxy)tris(pentafluorophenyl)borate, sodium (triphenylsiloxy)tris(pentafluorophenyl)borate, sodium tetrakis(2,3,4,5-tetrafluorophenyl)borate, sodium tetrakis(3, 4,5,6-tetrafluorophenyl)borate, sodium tetrakis(1,2,2-trifluoroethylenyl)borate, sodium tetrakis(3,4,5-trifluorophenyl)borate, sodium methyltris(perfluorophenyl) borate, sodium phenyltris(perfluorophenyl)borate, thallium tetrakis(2,3,4,5-tetrafluorophenyl)borate, thallium tetrakis (3,4,5,6-tetrafluorophenyl)borate, thallium tetrakis(1,2,2-trifluoroethylenyl)borate, thallium tetrakis(3,4,5-trifluorophenyl)borate, sodium methyltris(perfluorophenyl) borate, thallium phenyltris(perfluorophenyl)borate, trityl tetrakis(2,3,4,5-tetrafluorophenyl)borate, trityl tetrakis(3,4, 5,6-tetrafluorophenyl)borate, trityl tetrakis(1,2,2-trifluoroethylenyl)borate, trityl tetrakis(3,4,5-trifluorophenyl)borate, trityl methyltris(pentafluorophenyl) borate, trityl phenyltris(perfluorophenyl)borate, silver tetrakis[3,5-bis(trifluoromethyl)phenyl]borate, silver (toluene) tetrakis[3,5-bis(trifluoromethyl)phenyl]borate, thallium tetrakis[3,5-bis(trifluoromethyl)phenyl]borate, lithium (hexyltris(pentafluorophenyl)borate, lithium triphenylsiloxytris(pentafluorophenyl)borate, lithium (octyloxy)tris(pentafluorophenyl)borate, lithium tetrakis(3, 5-bis(trifluoromethyl)phenyl)borate, sodium tetrakis (pentafluorophenyl)borate, sodium(octyloxy)tris (pentafluorophenyl)borate, sodium tetrakis(3,5-bis (trifluoromethyl)phenyl)borate, potassium tetrakis (pentafluorophenyl)borate, trityl tetrakis(pentafluorophenyl) borate, potassium(octyloxy)tris(pentafluorophenyl)borate, potassium tetrakis(3,5-bis(trifluoromethyl)phenyl)borate, magnesium tetrakis(pentafluorophenyl)borate, magnesium magnesium(octyloxy)tris(pentafluorophenyl)borate, magnesium tetrakis(3,5-bis(trifluoromethyl)phenyl)borate, calcium tetrakis(pentafluorophenyl)borate, calcium (octyloxy) tris(pentafluorophenyl)borate, calcium tetrakis(3,5-bis (trifluoromethyl)phenyl)borate, lithium tetrakis[3,5-bis [1-methoxy-2,2,2-trifluoro-1-(trifluoromethyl)ethyl]phenyl] borate, sodium tetrakis[3,5-bis[1-methoxy-2,2,2-trifluoro-1-(trifluoromethyl)ethyl]phenyl]borate, silver tetrakis[3,5-bis [1-methoxy-2,2,2-trifluoro-1-(trifluoromethyl)ethyl]phenyl] borate, thallium tetrakis[3,5-bis[1-methoxy-2,2,2-trifluoro-1-(trifluoromethyl)ethyl]phenyl]borate, lithium tetrakis [3-[1-methoxy-2,2,2-trifluoro-1-(trifluoromethyl)ethyl]-5-(trifluoromethyl)phenyl]borate, sodium tetrakis [3-[1-methoxy-2,2,2-trifluoro-1-(trifluoromethyl)ethyl]-5-(trifluoromethyl)phenyl]borate, silver tetrakis[3-[1-methoxy-2,2,2-trifluoro-1-(trifluoromethyl)ethyl]-5-(trifluoromethyl)phenyl]borate, thallium tetrakis[3-[1-methoxy-2,2,2-trifluoro-1-(trifluoromethyl)ethyl]-5-(trifluoromethyl)phenyl]borate, lithium tetrakis[3-[2,2,2-trifluoro-1-(2,2,2-trifluoroethoxy)-1-(trifluoromethyl) ethyl]-5-(trifluoromethyl)phenyl]borate, sodium tetrakis[3-[2,2,2-trifluoro-1-(2,2,2-trifluoroethoxy)-1-(trifluoromethyl)ethyl]-5-(trifluoromethyl)phenyl]borate, silver tetrakis [3-[2,2,2-trifluoro-1-(2,2,2-trifluoroethoxy)-1-(trifluoromethyl)ethyl]-5-(trifluoromethyl)phenyl]borate, thallium tetrakis[3-[2,2,2-trifluoro-1-(2,2,2-trifluoroethoxy)-1-(trifluoromethyl)ethyl]-5-(trifluoromethyl)phenyl]borate, trimethylsilylium tetrakis (pentafluorophenyl)borate, trimethylsilylium etherate tetrakis(pentafluorophenyl)borate, triethylsilylium tetrakis (pentafluorophenyl)borate, triphenylsilylium tetrakis (pentafluorophenyl)borate, tris(mesityl)silylium tetrakis (pentafluorophenyl)borate, tribenzylsilylium tetrakis (pentafluorophenyl)borate, trimethylsilylium methyltris (pentafluorophenyl)borate, triethylsilylium methyltris (pentafluorophenyl)borate, triphenylsilylium methyltris (pentafluorophenyl)borate, tribenzylsilylium methyltris (pentafluorophenyl)borate, trimethylsilylium tetrakis(2,3,4, 5-tetrafluorophenyl)borate, triethylsilylium tetrakis(2,3,4,5-tetrafluorophenyl)borate, triphenylsilylium tetrakis(2,3,4,5-tetrafluorophenyl)borate, tribenzylsilylium tetrakis(2,3,4,5-tetrafluorophenyl)borate, trimethylsilylium tetrakis(2,3,4,5-tetrafluorophenyl)borate, triphenylsilylium tetrakis(2,3,4,5-tetrafluorophenyl)borate, trimethylsilylium tetrakis(3,4,5-trifluorophenyl)borate, tribenzylsilylium tetrakis(3,4,5-trifluorophenyl)aluminate, triphenylsilylium methyltris(3,4, 5-trifluorophenyl)aluminate, triethylsilylium tetrakis(1,2,2-trifluoroethenyl)borate, tricyclohexylsilylium tetrakis(2,3,4, 5-tetrafluorophenyl)borate, dimethyloctadecylsilylium tetrakis(pentafluorophenyl)borate, tris(trimethyl)silyl) silylium methyltri(2,3,4,5-tetrafluorophenyl)borate, 2,2'-dimethyl-1,1'-binaphthylmethylsilylium tetrakis (pentafluorophenyl)borate, 2,2'-dimethyl-1,1'-binaphthylmethylsilylium tetrakis(3,5-bis(trifluoromethyl) phenyl)borate, lithium tetrakis(pentafluorophenyl) aluminate, trityl tetrakis(pentafluorophenyl)aluminate, trityl (perfluorobiphenyl)fluoroaluminate, lithium(octyloxy)tris (pentafluorophenyl)aluminate, lithium tetrakis(3,5-bis (trifluoromethyl)phenyl)aluminate, sodium tetrakis (pentafluorophenyl)aluminate, trityl tetrakis (pentafluorophenyl)aluminate, sodium(octyloxy)tris (pentafluorophenyl)aluminate, sodium tetrakis(3,5-bis (trifluoromethyl)phenyl)aluminate, potassium tetrakis (pentafluorophenyl)aluminate, trityl tetrakis (pentafluorophenyl)aluminate, potassium (octyloxy)tris (pentafluorophenyl)aluminate, potassium tetrakis(3,5-bis (trifluoromethyl)phenyl)aluminate, magnesium tetrakis (pentafluorophenyl)aluminate, magnesium(octyloxy)tris (pentafluorophenyl)aluminate, magnesium tetrakis(3,5-bis (trifluoromethyl)phenyl)aluminate, calcium tetrakis (pentafluorophenyl)aluminate, calcium (octyloxy)tris (pentafluorophenyl)aluminate, and calcium tetrakis(3,5-bis (trifluoromethyl)phenyl)aluminate.

Examples of WCA salts having a weakly coordinating anion described under Formula III include but are not limited to $LiB(OC(CF_3)_3)_4$, $LiB(OC(CF_3)_2(CH_3))_4$, $LiB(OC(CF_3)_2H)_4$, $LiB(OC(CF_3)(CH_3)H)_4$, $TlB(OC(CF_3)_3)_4$, $TlB(OC(CF_3)_2H)_4$, $TlB(OC(CF_3)(CH_3)H)_4$, $TlB(OC(CF_3)_2(CH_3))_4$, $(Ph_3C)B(OC(CF_3)_3)_4$, $(Ph_3C)B(OC(CF_3)_2(CH_3))_4$, $(Ph_3C)B(OC(CF_3)_2H)_4$, $(Ph_3C)B(OC(CF_3)(CH_3)H)_4$, $AgB(OC(CF_3)_3)_4$, $AgB(OC(CF_3)_2H)_4$, $AgB(OC(CF_3)(CH_3)H)_4$, $LiB(O_2C_6F_4)_2$, $TlB(O_2C_6F_4)_2$, $Ag(toluene)_2B(O_2C_6F_4)_2$, and $Ph_3CB(O_2C_6F_4)_2$. $LiB(OCH_2(CF_3)_2)_4$, $[Li(HOCH_3)_4]B(O_2C_6Cl_4)_2$, $[Li(HOCH_3)_4]B(O_2C_6F_4)_2$, $[Ag(toluene)_2]B(O_2C_6Cl_4)_2$, $LiB(O_2C_6Cl_4)_2$, $(LiAl(OC(CF_3)_2Ph)_4)$, $(TlAl(OC(CF_3)_2Ph)_4)$, $(AgAl(OC(CF_3)_2Ph)_4)$, $(Ph_3CAl(OC(CF_3)_2\ Ph)_4$, $(LiAl(OC(CF_3)_2C_6H_4{-}CH_3)_4)$, $(ThAl(OC(CF_3)_2\ C_6H_4CH_3)_4)$, $(AgAl(OC(CF_3)_2C_6H_4CH_3)_4)$, $(Ph_3CAl(OC(CF_3)_2C_6H_4CH_3)_4)$, $LiAl(OC(CF_3)_3)_4$, $ThAl(OC(CF_3)_3)_4$, $AgAl(OC(CF_3)_3)_4$, $Ph_3CAl(OC(CF_3)_3)_4$, $LiAl(OC(CF_3)(CH_3)H)_4$, $TlAl(OC(CF_3)(CH_3)H)_4$, $AgAl(OC(CF_3)(CH_3)H)_4$, $Ph_3CAl(OC(CF_3)(CH_3)H)_4$, $LiAl(OC(CF_3)_2\ H)_4$, $TlAl(OC(CF_3)_2H)_4$, $AgAl(OC(CF_3)_2H)_4$, $Ph_3CAl(OC(CF_3)_2H)_4$, $LiAl(OC(CF_3)_2C_6H_4\text{-}4\text{-}i\text{-}Pr)_4$, $TlAl(OC(CF_3)_2C_6H_4\text{-}4\text{-}i\text{-}Pr)_4$, $AgAl(OC(CF_3)_2C_6H_4\text{-}4\text{-}i\text{-}Pr)_4$, $Ph_3CAl(OC(CF_3)_2C_6H_4\text{-}4\text{-}i\text{-}Pr)_4$, $LiAl(OC(CF_3)_2C_6H_4\text{-}4\text{-}t\text{-}butyl)_4$, $TlAl(OC(CF_3)_2C_6H_4\text{-}4\text{-}t\text{-}butyl)_4$, $AgAl(OC(CF_3)_2C_6H_4\text{-}4\text{-}t\text{-}butyl)_4$, $Ph_3CAl(OC(CF_3)_2C_6H_4\text{-}4\text{-}t\text{-}butyl)_4$, $LiAl(OC(CF_3)_2C_6H_4\text{-}4\text{-}SiMe_3)_4$, $TlAl(OC(CF_3)_2C_6H_4\text{-}4\text{-}Si\ Me_3)_4$, $AgAl(OC(CF_3)_2C_6H_4\text{-}4\text{-}Si\ Me_3)_4$, $Ph_3CAl(OC(CF_3)_2C_6H_4\text{-}4\text{-}Si\ Me_3)_4$, $LiAl(OC(CF_3)_2C_6H\text{-}4\text{-}Si\text{-}i\text{-}Pr_3)_4$, $TlAl(OC(CF_3)_2C_6H_4\text{-}4\text{-}Si\text{-}i\text{-}Pr_3)_4$, $AgAl(OC(CF_3)_2C_6H_4\text{-}4\text{-}Si\text{-}i\text{-}Pr_3)_4$, $Ph_3CAl(OC(CF_3)_2C_6H_4\text{-}4\text{-}Si\text{-}i\text{-}Pr_3)_4$, $LiAl(OC(CF_3)_2C_6H_2\text{-}2,6\text{-}(CF_3)_2\text{-}4\text{-}Si\text{-}i\text{-}Pr_3)_4$, $TlAl(OC(CF_3)_2C_6H_2\text{-}2,6\text{-}(CF_3)_2\text{-}4\text{-}Si\text{-}i\text{-}Pr_3)_4$, $AgAl(OC(CF_3)_2C_6H_2\text{-}2,6\text{-}(CF_3)_2\text{-}4\text{-}Si\text{-}i\text{-}Pr_3)_4$, $Ph_3CAl(OC(CF_3)_2C_6H_2\text{-}2,6\text{-}(CF_3)_2\text{-}4\text{-}Si\text{-}i\text{-}Pr_3)_4$, $LiAl(OC(CF_3)_2C_6H_3\text{-}3,5\text{-}(CF_3)_2)_4$, $TlAl(OC(CF_3)_2C_6H_3\text{-}3,5\text{-}(CF_3)_2)_4$, $AgAl(OC(CF_3)_2C_6H_3\text{-}3,5\text{-}(CF_3)_2)_4$, $Ph_3CAl(OC(CF_3)_2C_6H_3\text{-}3,5\text{-}(CF_3)_2)_4$, $LiAl(OC(CF_3)_2C_6H_2\text{-}2,4,6\text{-}(CF_3)_3)_4$, $TlAl(OC(CF_3)_2C_6H_2\text{-}2,4,6\text{-}(CF_3)_3)_4$, $AgAl(OC(CF_3)_2C_6H_2\text{-}2,4,6\text{-}(CF_3)_3)_4$, $Ph_3CAl(OC(CF_3)_2C_6H_2\text{-}2,4,6\text{-}(CF_3)_3)_4$, $LiAl(OC(CF_3)_2C_6F_5)_4$ (LiWCA-H), $TlAl(OC(CF_3)_2C_6F_5)_4$, $AgAl(OC(CF_3)_2C_6F_5)_4$, and $Ph_3CAl(OC(CF_3)_2C_6F_5)_4$.

Examples of boratobenzene salts include but are not limited to [1,4-dihydro-4-methyl-1-(pentafluorophenyl)]-2-borinyl lithium, [1,4-dihydro-4-methyl-1-(pentafluorophenyl)]-2-borinyl triphenylmethylium, 4-(1,1-dimethyl)-1,2-dihydro-1-pentafluorophenyl)-2-borinyl lithium, 4-(1,1-dimethyl)-1,2-dihydro-1-(pentafluorophenyl)-2-borinyl triphenylmethylium, 1-fluoro-1,2-dihydro-4-(pentafluorophenyl)-2-borinyl lithium, 1-fluoro-1,2-dihydro-4-(pentafluorophenyl)-2-borinyl triphenylmethylium, 1-[3,5-bis(trifluoromethyl) phenyl]-1,2-dihydro-4-(pentafluorophenyl)-2-borinyl lithium, and 1-[3,5-bis(trifluoromethyl)phenyl]-1,2-dihydro-4-(pentafluorophenyl)-2-borinyl triphenylmethylium.

Examples of WCA carborane and halocarborane salts include but are not limited to silver dodecahydro-1-carbadodecaborate, $LiCB_{11}(CH_3)_{12}$, $LiCB_{11}H_{12}$, $(Me_3NH)[CB_{11}H_{12}]$, $(Me_4N)[1\text{-}C_2H_5CB_{11}H_{11}]$, $(Me_4N)[1\text{-}Ph_3SiCB_{11}H_{11}]$, $(Me_4N)[1\text{-}CF_3CB_{11}H_{11}]$, $Cs[12\text{-}BrCB_{11}H_{11}]$, $Ag[12\text{-}BrCB_{11}H_{11}]$, $Cs[7,12\text{-}Br_2CB_{11}H_{10}]$, $Cs[12\text{-}ClCB_{11}H_{11}]$, $Cs[7,12\text{-}C_{12}CB_{11}H_{10}]$, $Cs[1\text{-}H\text{-}CB_{11}F_{11}]$, $Cs[1\text{-}CH_3\text{-}CB_{11}F_{11}]$, $(i\text{-}Pr_3)Si[1\text{-}CF_3\text{—}CB_{11}F_{11}]$, $Li[12\text{-}CB_{11}H_{11}F]$, $Li[7,12\text{-}CB_{11}H_{11}F_2]$, $Li[7,9,12\text{-}CB_{11}H_{11}F_3]$, $(i\text{-}Pr_3)Si[CB_{11}H_6Br_6]$, $Cs[CB_{11}H_6Br_6]$, $Li[6\text{-}CB_9H_9F]$, $Li[6,8\text{-}CB_9H_8F_2]$, $Li[6,7,8\text{-}CB_9H_7F_3]$, $Li[6,7,8,9\text{-}CB_9H_6F_4]$, $Li[2,6,7,8,9\text{-}CB_9H_5F_5]$, $Li[CB_9H_5Br_5]$, $Ag[CB_{11}H_6Cl_6]$, $Tl[CB_{11}H_6Cl_6]$, $Ag[CB_{11}H_6F_6]$, $Tl[CB_{11}H_6F_6]$, $Ag[CB_{11}H_6I_6]$, $Tl[CB_{11}H_6I_6]$, $Ag[CB_{11}H_6Br_6]$, $Tl[CB_{11}H_6Br_6]$, $Li[6,7,9,10,11,12\text{-}CB_{11}H_6F_6]$, $Li[2,6,7,8,9,10\text{-}CB_9H_5F_5]$, $Li[1\text{-}H\text{-}CB_9F_9]$, $Tl[12\text{-}CB_{11}H_{11}(C_6H_5)]$, $Ag[1\text{-}C_6F_5\text{-}CB_{11}H_5Br_6]$, $Li[CB_{11}Me_{12}]$, $Li[CB_{11}(CF_3)_{12}]$, $Li[CB_{11}H_6I_6]$, $Li[CB_9H_5Br_5]$, $Li[Co(B_9C_2H_{11})_2]$, $Li[CB_{11}(CH_3)_{12}]$, $Li[CB_{11}(C_4H_9)_{12}]$, $Li[CB_{11}(C_6H_{13})_{12}]$, $Na[Co(C_2B_9H_{11})_2]$, and $Na[Co(Br_3C_2B_9H_8)_2]$. Additional halocarborane salts are disclosed in International Patent Publication WO 98/43983.

Monomers

The catalysts of the present invention are suitable for the preparation of a wide range of polymers comprising cyclic repeating units. The polycyclic polymers are prepared by the in-mold addition polymerization of a polycycloolefin monomer(s) in the presence of a catalytic amount of a catalyst of Formula I or the procatalyst components described above. As stated herein the terms "polycycloolefin", "polycyclic", and "norbornene-type" (NB) monomer are used interchangeably and mean that the monomer contains at least one norbornene moiety as shown below:

The simplest polycyclic monomer of the invention is the bicyclic monomer, bicyclo[2.2.1]hept-2-ene, commonly referred to as norbornene. The term norbornene-type monomer is meant to include norbornene, substituted norbornene (s), and any substituted and unsubstituted higher cyclic derivatives thereof so long as the monomer contains at least one norbornene or substituted norbornene moiety. The substituted norbornenes and higher cyclic derivatives thereof contain a pendant hydrocarbyl substituent(s) or a pendant functional substituent(s) containing an oxygen atom. The norbornene-type monomers are represented by the structure below:

VII

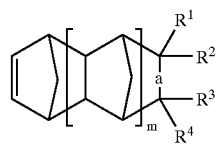

wherein "a" represents a single or double bond, $R^1$ to $R^4$ independently represents a hydrocarbyl or functional substituent, m is an integer from 0 to 5, and when "a" is a double bond one of $R^1$, $R^2$ and one of $R^3$, $R^4$ is not present.

When the substituent is a hydrocarbyl group, halohydrocarbyl, or perhalocarbyl group $R^1$ to $R^4$ independently represent hydrocarbyl, halogenated hydrocarbyl and perhalogenated hydrocarbyl groups selected from hydrogen, linear and branched $C_1$–$C_{10}$ alkyl, linear and branched, $C_2$–$C_{10}$ alkenyl, linear and branched $C_2$–$C_{10}$ alkynyl, $C_4$–$C_{12}$ cycloalkyl, $C_4$–$C_{12}$ cycloalkenyl, $C_6$–$C_{12}$ aryl, and $C_7$–$C_{24}$ aralkyl, $R^1$ and $R^2$ or $R^3$ and $R^4$ can be taken together to represent a $C_1$–$C_{10}$ alkylidenyl group. Representative alkyl groups include but are not limited to methyl, ethyl, propyl, isopropyl, butyl, isobutyl, sec-butyl, tert-butyl, pentyl, neopentyl, hexyl, heptyl, octyl, nonyl, and decyl. Representative alkenyl groups include but are not limited to vinyl, allyl, butenyl, and cyclohexenyl. Representative alkynyl groups include but are not limited to ethynyl, 1-propynyl, 2-propynyl, 1-butynyl, and 2-butynyl. Representative cycloalkyl groups include but are not limited to cyclopentyl, cyclohexyl, and cyclooctyl substituents. Representative aryl groups include but are not limited to phenyl, naphthyl, and anthracenyl. Representative aralkyl groups include but are not limited to benzyl, and phenethyl. Representative alkylidenyl groups include methylidenyl, and ethylidenyl groups.

The preferred perhalohydrocarbyl groups include perhalogenated phenyl and alkyl groups. The halogenated alkyl groups useful in the invention are linear or branched and have the formula $C_zX''_{2z+1}$ wherein X'' is a halogen as set forth above and z is selected from an integer of 1 to 10. Preferably X'' is fluorine. Preferred perfluorinated substituents include perfluorophenyl, perfluoromethyl, perfluoroethyl, perfluoropropyl, perfluorobutyl, and perfluorohexyl. In addition to the halogen substituents, the cycloalkyl, aryl, and aralkyl groups of the invention can be further substituted with linear and branched $C_1$–$C_5$ alkyl and haloalkyl groups, aryl groups and cycloalkyl groups.

When the pendant group(s) is a functional substituent, $R^1$ to $R^4$ independently represent a radical selected from —$(CH_2)_nC(O)OR^5$, —$(CH_2)_n$—$C(O)OR^5$, —$(CH_2)_n$—$OR^5$, —$(CH_2)_n$—$OC(O)R^5$—$(CH_2)_n$—$C(O)R^5$—$(CH_2)$—$OC(O)OR^5$, —$(CH_2)_nSiR^5$, —$(CH_2)_nSi(OR^5)_3$, and —$(CH_2)_nC(O)OR^6$, and the group:

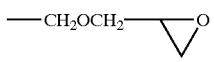

wherein n independently represents an integer from 0 to 10 and $R^5$ independently represents hydrogen, linear and branched $C_1$–$C_{10}$ alkyl, linear and branched, $C_2$–$C_{10}$ alkenyl, linear and branched $C_2$–$C_{10}$ alkynyl, $C_5$–$C_{12}$ cycloalkyl, $C_6$–$C_{14}$ aryl, and $C_7$–$C_{24}$ aralkyl. Representative hydrocarbyl groups set forth under the definition of $R^5$ are the same as those identified above under the definition of $R^1$ to $R^4$. As set forth above under $R^1$ to $R^4$, the hydrocarbyl groups defined under $R^5$ can be halogenated and perhalogenated. The $R^6$ radical represents a moiety selected from —$C(CH_3)_3$, —$Si(CH_3)_3$, —$CH(R^7)OCH_2CH_3$, —$CH(R^7)OC(CH_3)_3$ or the following cyclic groups:

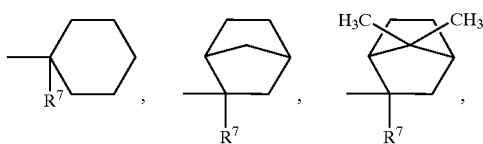

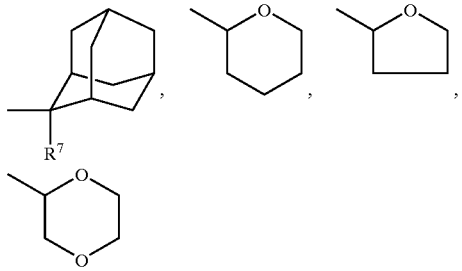

wherein $R^7$ represents hydrogen or a linear or branched ($C_1$–$C_5$) alkyl group. The alkyl groups include methyl, ethyl, propyl, i-propyl, butyl, i-butyl, t-butyl, pentyl, t-pentyl and neopentyl. In the above structures, the single bond line projecting from the cyclic groups indicates the position where the cyclic group is bonded to the acid substituent. Examples of $R^6$ radicals include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-t-butoxy ethyl.

The $R^6$ radical can also represent dicyclopropylmethyl (Dcpm), and dimethylcyclopropylmethyl (Dmcp) groups which are represented by the following structures:

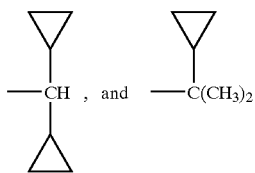

In Structure VII above, $R^1$ and $R^4$ together with the two ring carbon atoms to which they are attached can represent a substituted or unsubstituted cycloaliphatic group containing 4 to 30 ring carbon atoms or a substituted or unsubstituted aryl group containing 6 to 18 ring carbon atoms or combinations thereof. The cycloaliphatic group can be monocyclic or polycyclic. When unsaturated the cyclic group can contain monounsaturation or multiunsaturation, with monounsaturated cyclic groups being preferred. When substituted, the rings contain monosubstitution or multisubstitution wherein the substituents are independently selected from hydrogen, linear and branched $C_1$–$C_5$ alkyl, linear and branched $C_1$–$C_5$ haloalkyl, linear and branched $C_1$–$C_5$ alkoxy, halogen, or combinations thereof. $R^1$ and $R^4$ can be taken together to form the divalent bridging group, —C(O)—Q—(O)C—, which when taken together with the two ring carbon atoms to which they are attached form a pentacyclic ring, wherein Q represents an oxygen atom or the group $N(R^8)$, and $R^8$ is selected from hydrogen, halogen, linear and branched $C_1$–$C_{10}$ alkyl, and $C_6$–$C_{18}$ aryl. A representative structure is shown in below.

VIIa

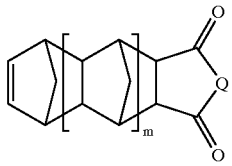

wherein m is an integer from 0 to 5.

Crosslinked polymers can be prepared by copolymerizing the norbornene-type monomer(s) set forth under Structure VII above with a multifunctional norbornene-type crosslinking monomer(s). By multifunctional norbornene-type crosslinking monomer is meant that the crosslinking monomer contains at least two norbornene-type moieties (norbornene-type double bonds), each functionality being addition polymerizable in the presence of the catalyst system of the present invention. The crosslinkable monomers include fused multicyclic ring systems and linked multicyclic ring systems. Examples of fused crosslinkers are illustrated in structures below. For brevity, norbornadiene is included as a fused multicyclic crosslinker and is considered to contain two polymerizable norbornene-type double bonds.

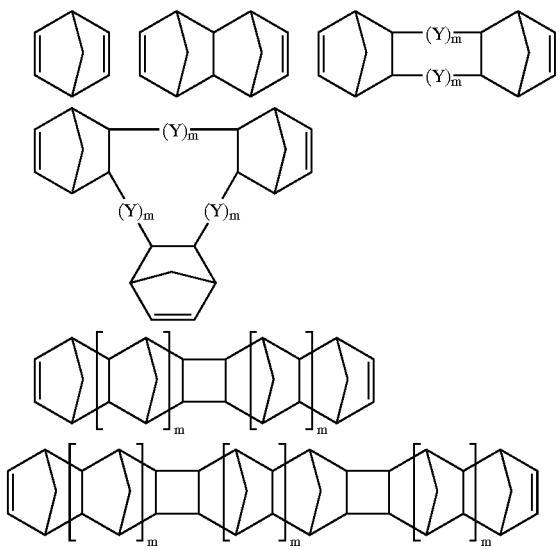

wherein Y represents a methylene (—CH$_2$—) group and m independently represents an integer from 0 to 5, and when m is 0, Y represents a single bond. Representative monomers under the forgoing formulae are set forth below.

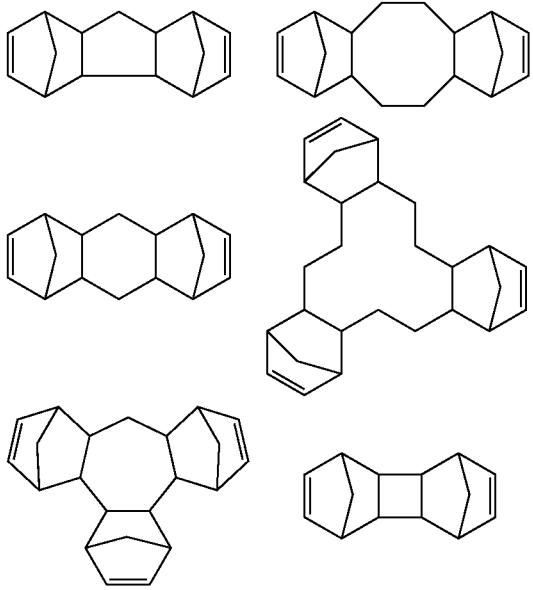

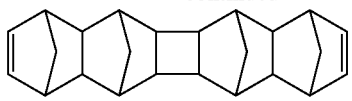

A linked multicyclic crosslinker is illustrated generically in Structure VIII below.

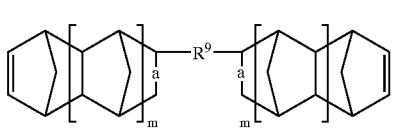

VIII wherein "a" independently represents a single or double bond, m independently is an integer from 0 to 5, $R^9$ is a divalent radical selected from divalent hydrocarbyl radicals and divalent ether radicals. By divalent is meant that a free valence at each terminal end of the radical is attached to a norbornene-type moiety. Preferred divalent hydrocarbyl radicals are alkylene radicals and divalent aromatic radicals. The alkylene radicals are represented by the formula —($C_dH_{2d}$)— where d represents the number of carbon atoms in the alkylene chain and is an integer from 1 to 10. The alkylene radicals are preferably selected from linear and branched ($C_1$–$C_{10}$) alkylene such as methylene, ethylene, propylene, butylene, pentylene, hexylene, heptylene, octylene, nonylene, and decylene. When branched alkylene radicals are contemplated, it is to be understood that a hydrogen atom in the alkylene backbone is replaced with a linear or branched ($C_1$ to $C_5$) alkyl group.

The divalent aromatic radicals are selected from divalent phenyl, and divalent naphthyl radicals. The divalent ether radicals are represented by the group —$R^{10}$—O—$R^{10}$—, wherein $R^{10}$ independently is the same as $R^9$. Examples of specific linked multicyclic crosslinkers are represented as in Structures VIIa to VIIIe as follows.

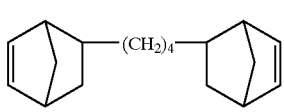

VIIIa

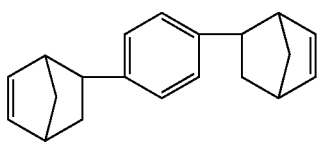

VIIIc

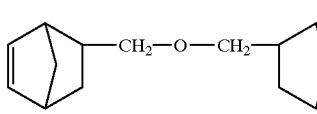

VIIIb

The amount of multifunctional crosslinker to be employed in the polycycloolefin monomer composition preferably ranges from about 0.25 to about 99.75 percent by weight of the total monomer composition.

An economical route for the preparation of hydrocarbyl substituted and functionally substituted norbornene monomers relies on the Diels-Alder addition reaction in which CPD or substituted CPD is reacted with a suitable dienophile at elevated temperatures to form the substituted norbornene-type adduct generally shown by the following reaction scheme:

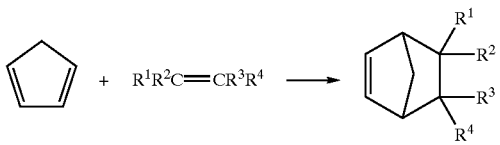

wherein $R^1$ to $R^4$ independently represent hydrogen, hydrocarbyl, and/or a functional group as previously described.

Other norbornene type adducts can be prepared by the thermal pyrolysis of dicyclopentadiene (DCPD) in the presence of a suitable dienophile. The reaction proceeds by the initial pyrolysis of DCPD to CPD followed by the Diels-Alder addition of CPD and the dienophile to give the adducts shown below:

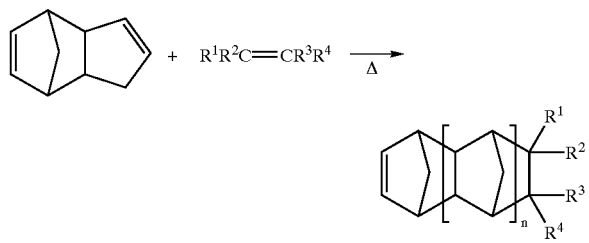

wherein n represents the number of cyclic units in the monomer and $R^1$ to $R^4$ independently represent hydrogen, hydrocarbyl, and/or a functional group as previously defined. Norbornadiene and higher Diels-Alder adducts thereof similarly can be prepared by the thermal reaction of CPD and DCPD in the presence of an acetylenic reactant as shown below.

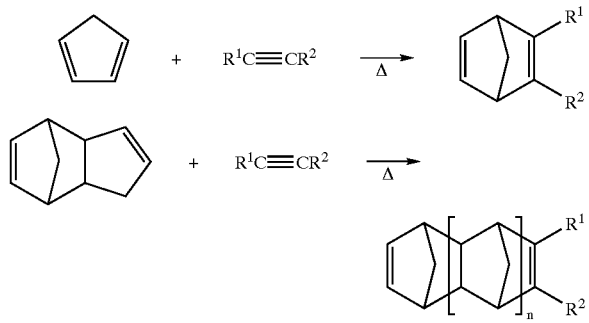

wherein n, $R^1$ and $R^2$ are as defined above.

Norbornadiene may be employed as a crosslinker in this invention, however, higher homologs are preferred. Norbornadiene can be converted into higher homologs or Diels-Alder products using a variety of dimerization catalysts or heating it with cyclopentadiene. In the case of the crosslinking monomer norbornadiene dimer an alternative synthesis is employed in which norbornadiene is coupled catalytically to yield a mixture of isomers of norbornadiene dimer as shown below:

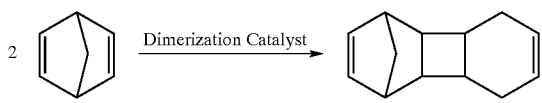

The dimerization of norbornadiene is easily achieved by numerous catalysts to yield a mixed composition of up to six isomers, i.e., Wu et al. U.S. Pat. No. 5,545,790). The preferred isomers are the exo-trans-exo, endo-trans-endo, and exo-trans-endo-1,4,4a,4b,5,8,8a,8b-octahydro-1,4:5,8-dimethanobiphenylene ("norbornadiene dimer" or "[NBD]$_2$"). The exo-trans-exo norbornadiene dimer is the most preferred crosslinker. Heating norbornadiene dimer with dicyclopentadiene or cyclopentadiene can produce higher oligomers of norbornadiene dimer. Other crosslinkers are prepared by the reaction of cyclopentadiene with olefins containing two or more reactive olefins, e.g., cyclooctadiene, 1,5-hexadiene, 1,7-octadiene and tricycloheptatriene.

The more preferred crosslinkable monomers are those containing two reactive norbornene type moieties (containing two polymerizable double bonds). One preferred monomer is 5,5'-(1,2-ethanediyl)bisbicyclo[2.2.1]hept-2-ene (NBCH$_2$CH$_2$NB) prepared by the reaction of 5-(3-butenyl)bicyclo[2.2.1]hept-2-ene and cyclopentadiene via a Diels-Alder reaction. The higher homolog of 5-(3-butenyl) bicyclo[2.2.1]hept-2-ene is also a co-monomer of choice, i.e., 2-(3-butenyl)-1,2,3,4,4a,5,8,8a-octahydro-1,4:5,8-dimethanonaphthalene. Similarly, 1,4,4a, 5,6,6a, 7,10,10a, 11,12, 12a-dodecahydro-1, 4:7, 10-dimethanodibenzo[a,e]cyclooctene is prepared in the Diels Alder reaction between 1,4,4a, 5,6,9,10, 10a-octahydro-1,4-methanobenzocyclooctene and cyclopentadiene. The higher homolog of between 1,4,4a, 5,6,9,10,10a-octahydro-1,4-methanobenzocyclooctene is also a comonomer of choice, i.e., 1,4,4a,5,5a,6,7,10,11,11a,12,12a-dodecahydro-1,4:5, 12-dimethanocycloocta[b]naphthalene. The symmetric and asymmetric trimers of cyclopentadiene are also useful crosslinking reagents, i.e., 4,4a, 4b, 5,8,8a, 9,9a-octahydro-1,4:5,8-dimethano-1H-fluorene and 3a,4,4a, 5,8,8a, 9,9a-octahydro-4,9:5,8-dimethano-1H-benz[f]indene, respectively. Another preferred monomer is obtained from the reaction of cyclopentadiene and norbornadiene, i.e., 1,4,4a, 5,8,8a-hexahydro-1,4:5,8-dimethanonaphthalene. Divinylbenzene and excess cyclopentadiene forms the symmetric crosslinker 5,5'-(1,4-phenylene)bisbicyclo[2.2.1]hept-2-ene.

Examples of preferred polymerizable norbornene-type monomers include but are not limited to, norbornene (bicyclo[2.2.1]hept-2-ene), 5-methyl-2-norbornene, ethylnorbornene, propylnorbornene, isopropylnorbornene, butylnorbornene, isobutylnorbornene, pentylnorbornene, hexylnorbornene, heptylnorbornene, octylnorbornene, decylnorbornene, dodecylnorbornene, octadecylnorbornene, trimethoxysilylnorbornene, butoxynorbornene, p-tolylnorbornene, methylidene norbornene, phenylnorbornene, ethylidenenorbornene, vinylnorbornene, exo-dicyclopentadiene, endo-dicyclopentadiene, tetracyclododecene, methyltetracyclododecene, dimethyltetracyclododecene, ethyltetracyclododecene, ethylidenyl tetracyclododecene, phenyltetracyclodecene, tetramers of cyclopentadiene, propenylnorbornene, 5,8-methylene-5a,8a-dihydrofluorene, cyclohexenylnorbornene, dimethanohexahydronaphthalene, endo,exo-5,6-dimethoxynorbornene, endo,endo-5,6-dimethoxynorbornene, 2,3-dimethoxynorbornadiene, 5,6-bis(chloromethyl)bicyclo[2.2.1]hept-2-ene, 5-tris(ethoxy) silylnorbornene, 2-dimethylsilylbicyclo[2.2.1]hepta-2,5-diene, 2,3-bistrifluoromethylbicyclo[2.2.1]hepta-2,5-diene, 5-fluoro-5-pentafluoroethyl-6-,6-bis(trifluoromethyl) bicyclo[2.2.1]hept-2-ene, 5,6-difluoro-5-heptafluoroisopropyl-6-trifluoromethyl)bicyclo[2.2.1]hept-2-ene, 2,3,3,4,4,5,5,6-octafluorotricyclo[5.2.1.O]dec-8-ene, and 5-trifluoromethylbicyclo[2.2.1]hept-2-ene, 5-a- naphthyl-2-norbornene, 5,5-dimethyl-2-norbornene, 1,4,4a, 9,9a, 10-hexahydro-9, 10[1',2']-benzeno-1,4-methanoanthracene, indanylnorbornene (i.e., 1,4,4,9-tetrahydro-1,4-methanofluorene, the reaction product of CPD and indene), 6,7,10,10-tetrahydro-7,10-methanofluoranthene (i.e., the reaction product of CPD with acenaphthalene), 1,4,4,9,9,10-hexahydro-9,10[1',2']-benzeno-1,4-methanoanthracene, endo,endo-5,6-dimethyl-2-norbornene, endo,exo-5,6-dimethyl-2-norbornene, exo, exo-5,6-dimethyl-2-norbornene, 1,4,4,5,6,9,10,13,14,14-decahydro-1,4-methanobenzocyclododecene (i.e., reaction product of CPD and 1,5,9-cyclododecatriene), 2,3,3,4,7,7-hexahydro-4,7-methano-1H-indene (i.e., reaction product of CPD and cyclopentene), 1,4,4,5,6,7,8,8-octahydro-1,4-methanonaphthalene (i.e., reaction product of CPD and cyclohexene), 1,4,4,5,6,7,8,9,10,10-decahydro-1,4-methanobenzocyclooctene (i.e., reaction product of CPD and cyclooctene), and 1,2,3,3,3,4,7,7,8,8,decahydro-4,7-methanocyclopent[a]indene.

The importance of employing multifunctional norbornene-type crosslinking monomers in the monomer reaction mixture are twofold: 1) the multifunctional norbornene-type monomers are capable of crosslinking polymer chains thereby enhancing the impact resistance, solvent resistance and heat distortion properties of molded article; and 2) the multifunctional norbornene-type monomers release more energy than monofunctional (containing one polymerizable norbornene moiety) norbornene-type monomers upon polymerization thereby increasing the exotherm temperature of the polymerization reaction.

Crucial to the success of reaction injection molding (RIM) of norbornene-type monomers is the quantity of energy released during bulk polymerization. For example, in polydicyclopentadiene reaction injection molding systems, the release of ring strain during ring opening metathesis polymerization (ROMP) of dicyclopentadiene (DCPD) results in a concomitant polymerization exotherm of approximately 180° C. The internal temperature of the in situ generated polymer rises above the glass transition temperature (Tg= 150° C.) of polyDCPD. Thus, in a DCPD based RIM thermoset molding system, this polymerization exotherm and the temperature excursion provide for excellent monomer to polymer conversions. In this invention the internal temperature of the addition polymerized polymer formulation should preferably rise to just above the glass transition temperature (Tg) of the desired polymer to achieve the highest conversion.

It has been determined experimentally (fundamental theoretical techniques, i.e., molecular mechanical calculations, solution reaction calorimetry, and bulk processing) that the addition polymerization of norbornene (bicyclo[2.2.1]hept-2-ene) liberates more energy than does the ring-opening metathesis polymerization of norbornene, i.e., –19.6 kcal/mol (AP) versus–14.4 kcal/mol (ROMP)). In addition, it was measured/determined that substituted norbornenes produce slightly less energy than the parent norbornene when polymerized.

In order to harness as much as the polymerization energy as possible, thereby driving the reaction to completion, the polymerization enthalpy per unit mass of the monomer must be as high as possible. Since the glass transition temperatures of addition polymerized polynorbornenes are much higher than equivalent ROMP polynorbornenes, it is desirable to achieve the release all the polymerization energy in addition polymerization, such that the internal temperature of the polymer reaches to about its glass transition temperature or beyond. In other words, it has been determined the higher the double bond concentration in a unit mass of monomer the higher the potential polymerization exotherm energy. Therefore, it is desired to have monomers which exhibit a low carbon to norbornene double bond ratio. For instance, the carbon atom to double bond ratio in norbornene is 7. In heptylnorbornene the ratio is 14. Therefore, a mass of polymerizing norbornene would be expected to reach an internal temperature of approximately twice that of heptyl-norbornene. For addition polymerization, the polymerization reaction time frame should be as short as possible to ensure that the internal temperature of the polymer being formed can reach the highest temperature possible.

In the method of the present invention it is preferable to employ monomers with a carbon atom to double bond ration of about 3 to about 17, and more preferably from about 3.5 to about 9. Monomers possessing a low carbon to norbornene bond ratio are norbornadiene (ratio of 3.5), dimethanohexahydronaphthalene (TDD) (ratio of 6), and norbornadiene dimer (ratio of 7) are favored in this invention. However, it should be noted that the glass transition temperature of the final polymer is also important in selecting the starting monomer identities.

In the polymerization of polycyclic olefins, conditions must be selected such that the final temperature of the polymer is high enough to permit mobility of the monomer within the matrix of the polymer being formed. This is typically above, but within 1° C. to 100° C. of the glass transition temperature of the polymer being molded. Generally preferred are polymerization exotherm temperatures in the range from 200° C. to 300° C. In some cases, however, coherent articles may be produced even though the maximum temperature in the mold is substantially lower than the glass transition temperature of the polymer.

The smallest polycarbocyclic multifunctional norbornene-type monomer is norbornadiene which has a carbon to polymerizable double bond ratio of 3.5, i.e., two double bonds per 7-carbons. Multifunctional norbornene-type monomers useful in RIM can be derived from norbornadiene and its adducts. These monomers are dimeric and trimeric crosslinking agents, and isomerized products of norbornadiene, i.e.,

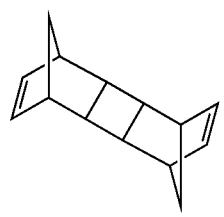

Norbornadiene Dimer
exo-trans-exo
(2 + 2 dimer)

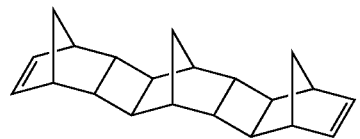

Norbornadiene Trimer

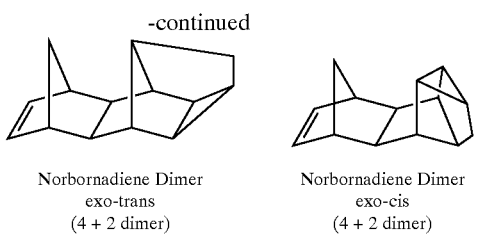

Norbornadiene Dimer
exo-trans
(4 + 2 dimer)

Norbornadiene Dimer
exo-cis
(4 + 2 dimer)

Other polycycloolefin monomers contemplated herein also include monomers disclosed in Layer U.S. Pat. No. 4,301,306 and Layer U.S. Pat. No. 4,324,717, all of which contain the norbornene structure depicted above.

Minchak in U.S. Pat. No. 4,426,502, discloses a bulk polymerization process for "norbornene-type monomers" which include norbornene, dicyclopentadiene, tricyclopentadiene (symmetrical and unsymmetrical cyclopentadiene trimer), tetracyclododecene and other cycloolefin monomers containing a norbornene-type group. Dicyclopentadiene is a common cycloolefin monomer used to prepare ring-opened metathesis polymerized polymers in that it is readily available as a by-product in ethylene production. For such bulk polymerizations, liquid reagents are preferred in that they are handled more easily than solids, provided they are not too viscous. Problems arise with the use of dicyclopentadiene in that it is a solid at ambient temperature when sufficiently pure for use in bulk polymerization reactions. The melting point for high purity dicyclopentadiene is generally above about 31° C. to 32° C. Although dicyclopentadiene can be rendered liquid with slight heating, this high melting temperature presents a significant disadvantage in commercial processes. For example, in a continuous system, feedlines for monomer must be heated to prevent solidification of the dicyclopentadiene. In addition, when shipping the monomer, considerable trouble and expense is realized in melting the monomers when they arrive at their destination for use in polymerization processes. However, high purity dicyclopentadiene has been found to be necessary for bulk polymerization processes to obtain useful products. Impurities will often provide liquid dicyclopentadiene mixtures but will also retard polymerization. Adding an inert solvent or diluent will adversely affect the products obtained in that the unreacted component will reduce impact properties and/or leach from the finished article, rendering it useless.

Likewise, it should be noted that the utility of norbornene monomer (bicyclo[2.2.1]hept-2-ene) in RIM applications is reduced because it is also a solid at room temperature. In addition, norbornene is characterized by its relatively low boiling point and flash point and these physical attributes may cause problems during its RIM processing. The preferred norbornene monomers are mixtures of endo-and exo-stereoisomers, since these materials are often liquids. The use of two or more different monomers is preferred. Mixing components depresses the freezing points of the monomer mix in contrast with using a single monomer component. In addition, anyone skilled in the art would be able to determine the preferred norbornene monomer composition required to achieve the requisite polymer properties. In this way the monomer mixture is usable under a wider range of handling conditions. When a solid norbornene-type monomer is employed, the monomer can be dissolved or swollen in solvent or co-mixed with other monomers. Also, a solid norbornene-type monomer(s) can be efficiently addition polymerized by heating the monomer(s) to its melting point, or beyond and inducing dissolution of the ingredients of the catalyst system.

Norbornene monomers prepared by the Diels-Alder reaction are obtained as endo or exo isomers in varying compositions dependant on the starting dienophiles. The endo and exo forms of the norbornene monomers are essentially incorporated equally into the polymer. If, however, for a particular reason one isomer composition is favored over another, e.g., monomer composition is liquid at room temperature, then the reaction monomers may be isomerized in the presence of a suitable Lewis acid or solid acid. The endo-form of aromatic group-containing norbornenes can be converted to their exo-form yielding an isomer mixture of aromatic group-containing norbornenes by contacting a solid acid catalyst with endo-isomers to obtain an exo-isomer-rich monomer mixture, see for example, T. Sagane, T. Toshihiro, Y. Tsuji, and Y. Toda in Eur. Pat. Appl 499226 A1 920819. The disclosure of which is hereby incorporated by reference.

Monomer Purity

Commercial cyclic olefins are available in various levels of purity, ranging from 84% to about 99.9%, the upper purity ranges being the result of distillation, cracking and reforming, and further treatment for removal of contamination and olefins which would not co-polymerize under polymerization conditions.

The norbornene-type monomers used may contain a nominal amount of similar hydrocarbons, however, if present should not be of a type which could adversely affect the reaction. If the norbornene-type monomer employed contains undesirable hydrocarbons, the later can be removed by known means. It is preferred to remove any impurities that may interfere with the polymerization reaction. Even after these steps have been taken the monomer may still contain some impurities. The purity of the monomers should preferably be greater than about 90%, more preferably greater than about 95% pure, and still more preferably greater than about 99%, and most preferably above about 99.5% to ensure as complete as possible monomer to polymer conversion.

Water, inadvertently added to the formulation components during their preparation, may be detrimental to the storage stability of the catalyst components. Water can enter the formulation as an impurity in the cycloolefin monomers and in the inert compounding ingredients that are mainly impact modifiers, plasticizers. flame retardants, blowing agents, internal mold release agents, fillers and reinforcements. Before either the procatalyst or activator is added to the formulation, the level of water in the mixture of cycloolefin monomers and inert compounding ingredients preferably should be lower than approximately 50 ppm, and more preferably between 10 and 0 ppm. To be assured that the level of water in the cycloolefin monomers is less than 50 ppm before the cocatalyst or halometal activator is added, it can be dried via azeotropic distillation. Because water and most cycloolefin monomers form heterogeneous azeotropes, distilling off a small portion of the partially cycloolefin monomers will remove most of the water contamination. The azeotrope (i.e., distilled off cycloolefin monomers plus water) can be passed through molecular sieves to remove the water from the azeotrope and the cycloolefin monomers returned to the component.

Polymerization Method

Broadly stated, the process of the invention involves combining a plurality of reactant streams to form a reactive monomer composition, which is then conveyed into a mold where polymerization is allowed to proceed. Each of the reactant streams contains a catalyst system component and a carrier liquid. When the reactant streams are combined the active catalyst is formed in situ. The carrier liquid can be a solvent for the catalyst system component or the norbornene-type monomer to be polymerized. At least one of the reactant streams must contain at least one norbornene-type monomer. In one embodiment of the invention a reactant stream comprising a procatalyst of the previously described formula [R'ML'$_x$A'] is combined with a reactant stream comprising the WCA activator salt component. The reactive composition that is formed is then conveyed into a mold where polymerization takes place. At least one, preferably both, of the reactant streams comprise at least one norbornene-type monomer.

In another embodiment, a reactant stream containing a procatalyst of the previously described formula [R!MA']$_2$ is combined with second and/or third reactant stream, the second stream comprises a Group 15 electron donor compound and the third stream comprises a WCA activator salt component. In this embodiment, if a two stream process is employed, the Group 15 electron donor component can be placed in the procatalyst stream or in the activator stream. At least one, preferably all, of the reactant streams comprise at least one norbornene-type monomer. The reactive formulation thus formed is then conveyed into a mold where polymerization takes place.

In an alternative embodiment, a reactant stream containing a solution of the preformed single component catalyst of Formula I is combined with a monomer stream comprising at least one norbornene-type monomer. The reactive composition is subsequently conveyed into a mold where the polymerization reaction is allowed to proceed to completion. In this embodiment suitable carrier solvents for the catalyst component include but are not limited to alkane and cycloalkane solvents such as pentane, hexane, heptane, and cyclohexane; halogenated alkane solvents such as dichloromethane, chloroform, carbon tetrachloride, ethylchloride, 1,1-dichloroethane, 1,2-dichloroethane, 1-chloropropane, 2-chloropropane, 1-chlorobutane, 2-chlorobutane, 1-chloro-2-methylpropane, and 1-chloropentane; ethers such as THF and diethylether; aromatic solvents such as benzene, xylene, toluene, mesitylene, chlorobenzene, and o-dichlorobenzene; and halocarbon solvents such as Freon® 112; and mixtures thereof. Preferred solvents include benzene, fluorobenzene, o-difluorobenzene, p-difluorobenzene, pentafluorobenzene, hexafluorobenzene, o-dichlorobenzene, chlorobenzene, toluene, o-, m-, and p-xylenes, mesitylene, cyclohexane, THF, dichloromethane, liquid rubbers, and liquid antioxidants.

In general, methods for practicing the foregoing embodiments with liquid feed streams is known in the art as reaction injection molding (RIM), resin transfer molding (RTM) and other commercial bulk-polymerization techniques of thermoplastic or thermosetting resins.

In a preferred polymerization technique the foregoing polymerization methods can be practiced via RIM polymerization. In the RIM polymerization technique, a stream of the Group 10 metal procatalyst component in the monomer to be polymerized and a monomer stream containing the activator are combined in the mixing head of the RIM machine just prior to injection of the combined stream into a mold where an almost instantaneous polymerization occurs yielding a molded product. In this case, the two streams are fed from two individual containers. Successful processing of two or more components based on monomer solutions can only occur when the components are storage stable, i.e., do not undergo spontaneous polymerization in the absence of an activating species, change viscosity, or deteriorate in reactivity over time. The polymerization systems provided by this invention comprise at least two storage stable components whose composition is essentially norbornene-type monomer, one of which contains the procatalyst, the other contains the activator. When these storage stable formulations are combined in RIM system it is possible to prepare either a thermoplastic or thermoset object (based on the initial monomers selected), but a thermoset polymeric object is preferred.

Alternatively, after mixing the two reactant solutions the reactive mixture can be injected into the preheated mold in several portions as disclosed in U.S. Pat. No. 4,426,502 which is hereby incorporated by reference in its entirety.

The invention is not limited to a two reactant stream process each containing monomer. It will be obvious to one skilled in the art that there may be situations where it is desirable to have monomer incorporated in just one stream or to employ more than two streams where the third (or plurality of streams) contain an additional reactant(s), moderators or additive(s).

Monomer to Procatalyst Reactant Ratio

The molding of addition polymerizable monomers can be achieved using a procatalyst (based on Ni or Pd) to monomer molar ratio preferably above about 100:1 on a molar basis, more preferably about 200:1, and more preferably about 500:1. For a polycycloolefin, such as butylnorbornene, the ratio of procatalyst (based on Ni or Pd) to monomer will preferably be from about 100:1 to about 1,000,000:1, more preferably 100:1 to 500,000:1, still more preferably from 100:1 to about 25,000:1, and most preferably about 500:1 to about 25,000:1.

WCA Salt to Procatalyst Reactant Ratio

The molding of addition polymerizable monomers can be achieved using a WCA salt activator to procatalyst (based on Ni or Pd) molar ratio preferably from about 100:1 to 0.5:1 on a molar basis, more preferably about 5:1 to 1:1, and most preferably about 2:1 to 1:1.

Monomer Temperature, Mold Temperature, and Other Processing Temperatures

The rate of addition polymerization catalyst formation will depend on the initiation temperature, therefore gel and cure times can be controlled by adjusting the polymerization temperature. In general, as the temperature at which the reaction is carried out is increased the reaction rate will also increase. For every 8° C. temperature rise the reaction rate will approximately double. Consequently, to keep the reaction rate controlled at higher reaction temperatures a less active formulation of the addition polymerization catalyst system may be used. As the temperature at which the reaction is carried out is increased, the gel and cure times will decrease.

The monomer may be at a temperature in the range from chilled to elevated temperatures when charged to the mold. In general, it is anticipated that the components will not be heated beyond their flash points prior to entering the mold. Temperatures from below 0° C. up to the boiling point of the monomers may be employed. Generally preferred are feed temperatures in the range from 10° C. to 300° C., preferably from 10° C. to 200° C., and, most preferably from 20° C. to 100° C.

Since the polymerization reaction is exothermic, the temperature in the mold during the course of the polymerization is usually higher than the temperature of the feed, unless a chilled mold is employed. The initial mold temperature will generally be within the range −20° C. to about 300° C., preferably about 0° C. to about 200° C., and most preferably from 20° C. and 100° C. Temperature distribution in the mold is affected by such factors as mold geometry, characteristics of the mold as a heat sink or heat supplying means, reactivity of catalyst and monomer, and the like. To some extent, the selection of suitable temperatures and heat exchange conditions will have to be based on experience with a given system of mold, feed and catalyst.

After the polymerization reaction is complete, the molded object may be subjected to an additional post cure treatment at a temperature in the range of about 100° C. to 300° C. for about 15 minutes to 24 hours, preferable 1 to 2 hours. Such a post cure treatment can enhance polymeric properties including glass transition temperature and heat distortion temperature. In addition, postcuring is desirable but not essential, to bring the samples to their final stable dimensional states, to minimize residual odors, and to improve final physical properties. The invention RIM process prepares either a norbornene type thermoplastic homopolymer or copolymer or a thermosetted norbornene type homopolymer or copolymer.

Mold and Day Tank Pressures

The pressure should be such that the monomer in the mold is maintained in liquid phase or in supercritical phase. Suitable pressures in the mold are in the range from 0 to 2,500 psi gauge, depending on the monomer and the temperature employed. The mold pressure is generally in the range of about atmospheric to 1000 psi, preferably from 0 to 100 psi, and most preferably from 0 to 15 psi.

Fill Time

After injection of the procatalyst and activator components into the mold, there is an interval of time, called the "induction time" before the onset of a rapid exotherm from the exothermic polymerization reaction. In a commercial RIM process, this induction time should be sufficiently long to permit filling the mold, typically about two minutes, preferable less than thirty seconds. Once the polymerization is initiated, polymerization should occur quite rapidly, usually within one minute and preferable within 10 seconds, and is accompanied by a rapid rise in temperature. The time required to complete polymerization, however, is a function of the reactivity of the monomer and the catalyst, and the temperature maintained in the mold. Substantially complete reaction may be obtained in as little at 1 second or over a period as long as several hours. One advantage of addition polymerization thermoset recipes is that they do not gel up as rapidly as ROMP formulations.

These component streams are completely compatible with conventional RIM equipment. For those addition polymerization components that are known to be inhibited by oxygen it may be necessary to store the components under an inert gas but, surprisingly, it is not necessary to blanket the mold with an inert gas. The streams are combined in the mixing head of a RIM machine. Turbulent mixing is easy to achieve because the process involves low molecular weight, rapidly diffusing components. Typically the mixing heads have orifices about 0.032 inch in diameter and a jet velocity of about 400 ft/sec. After being combined the mixture is injected into a mold, a rapid exothermic reaction occurs as the polynorbornene polymer sets up. The mold can be opened in as little as 20 to 30 seconds after the combined streams have been injected. In this short time heat removal is not complete and the polymer is hot and flexible. The polymer can be removed from the mold immediately while hot or after cooling. After the polymer has cooled it will become a rigid solid. The total cycle time may be as low as 0.5 minute.

Modifying Rate of Catalyst Generation, Controlling Catalyst Reactivity, and Polymerization Activity The present invention may be practiced under a relatively wide variety of conditions of reaction time, temperature, pressure, reactant phase, and mixing. Selection of conditions is a function of the reactivity of the feed monomer(s), the activity and selectivity of the catalyst, and the type of polymer desired.

Control over gel and cure time is particularly important in the practice of reaction injection molding and other bulk polymerization processes. The control of gel and cure in this invention is derived from a number of sources. "Indigenous" (meaning native or established by the components) or "exogenous" (meaning external additives or other reactives that can be added to the system).

By far the simplest method of controlling the reactivity of the catalyst system is by regulating the character of the phosphorus ligands attached to the allylpalladium derivatives are key to the molding indigenous reactivity control agents. For example, (π-allyl)palladium triflate tricyclohexylphosphine procatalyst reacts more slowly than the corresponding (π-allyl)palladium triflate triisopropylphosphine procatalyst in the presence of lithium tetrakis (hexafluorophenylpropoxy)aluminate. The allyl substituents may also be changed to control the gel and cure times of the of the generated catalyst system. By way of illustration the crotyl palladium triflate triisopropylphosphine procatalyst reacts more slowly than the corresponding (π-allyl) palladium triflate triisopropylphosphine procatalyst in the presence of lithium tetrakis(hexafluorophenylpropoxy) aluminate. Likewise, the character of the leaving group (A') of the procatalyst can influence the rate of the reaction. The derivative (π-allyl)palladium triflate triisopropylphosphine, i.e., (π-allyl)Pd($O_3SCF_3$)(P(i-Pr)$_3$), is activated more slowly with lithium tetrakis(hexafluorophenylpropoxy)aluminate than the corresponding (π-allyl)palladium triflimide triisopropylphosphine procatalyst, i.e., (π-allyl)Pd(N(Tf)$_2$)(P(i-Pr)$_3$).

Likewise, the desired gel and cure of the system can be achieved by proper selection of the weakly coordinating activator salt or mixture of activators (exogenous reactivity control). Further, the gel and cure control can be moderated by changing the number of atoms within the weakly coordinating anion, thus expanding the size of the anion and its charge distribution.

The use of Lewis base rate moderators in this system is optional, i.e., external or "exogenous" modification, resulting in further gel and cure time control. Suitable exogenous rate moderators include, for example, water, tetrahydrofuran (THF), 2-methyltetrahydrofuran (2-Me-THF), diethyl ether (($C_2H_5$)$_2$O), methyl-tert-butyl ether ($CH_3OC(CH_3)_3$), dimethoxyethane ($CH_3OCH_2CH_2OCH_3$), diglyme ($CH_3OCH_2OCH_2OCH_3$), trimethylphosphine (PMe$_3$), triethylphosphine (PEt$_3$), tributylphosphine (PBu$_3$), tri(ortho-tolyl)phosphine (P-o-tolyl$_3$), tri-tert-butylphosphine (P-tert-Bu$_3$), tricyclopentylphosphine (PCyclopentyl$_3$), tricyclohexylphosphine (PCy$_3$), triisopropylphosphine (P(i-

Pr)₃), trioctylphosphine P(octyl)₃, triphenylphosphine (PPh₃), tri(pentafluorophenyl)phosphine (P(C₆F₅)₃), methyldiphenylphosphine (PMePh₂), dimethylphenylphosphine (PMe₂Ph), trimethylphosphite (P(OMe)₃), triethylphosphite (P(OEt)₃), triisopropylphosphite (P(O-i-Pr)₃), ethyl diphenylphosphinite (P(OEt)Ph₂), tributylphosphite (P(OBu)₃), triphenylphosphite (P(OPh)₃), diethylphenylphosphonite (P(OEt)₂Ph), and tribenzylphosphine (P(CH₂Ph)₃), 2-cyclohexenone, and triphenylphosphine oxide. The preferred exogenous rate moderators are triphenylphosphine and triphenylphosphine oxide.

Preferably, the ratio of moderator to procatalyst calculated on a molar basis is ranges from about 0.001 to 100, more preferably, from about 0.01 to about 10, and most preferably, from about 0.1 to 2.0.

Further, the exogenous control over reactivity can be achieved by attaching the Lewis base species to a polymerizable monomer. In this way, the moderator can be polymerized into the polymeric structure giving the system important functionality. Examples of suitable functional groups are ethers, trialkoxysilanes, esters, carboxylic acids, and alcohols. Specific examples are triethoxysilylnorbornene, norbornene methanol, and butoxynorbornene.

Other Feed Components

Various additives can be included to modify the properties of polynorbornene polymers. The preparation of molded articles according to the present invention can be carried out in the presence of non-interfering additives, such as, for example, solvents, blowing agents, fillers, fibers, pigments, dyes, lubricants, antioxidants, antiozonants, UV absorbing agents, crosslinking agents, odor absorbing or masking agent, flame retardants, light stabilizers, plasticizers, foaming agents, whiskers for surface smoothing, tougheners, reinforcing agents, impact and polymeric modifiers and viscosifiers. Because of the rapid polymerization time the additives must be incorporated before the polycyclic olefin charge sets up in the mold. These components are most conveniently added to the reaction as constituents of one or more of the reactant streams, as liquids or as solutions in the monomer before being injected into the mold. Fillers can also be charged to the mold cavity, prior to charging the reaction streams, if the fillers are such that the reaction stream can readily flow around them to fill and the remaining void space in the mold. It is essential that the additives not affect catalytic activity.

Antioxidants and antiozonants include any antioxidant or antiozonant used in the rubber or plastics industry. An "Index of Commercial Antioxidants and Antiozonants, Fourth Edition" is available from Goodyear Chemicals, The Goodyear Tire and Rubber Company, Akron, Ohio 44316. The antioxidants can be phenol, phosphorus, sulfur, or amine based compounds. The antioxidants can be used singly, or preferably, in combination. The formulation ratio is more than 0.05 part preferably 0.5 to 100 parts by weight of norbornene polymer. The antioxidant may be copolymerized with the monomer such as 5-(3,5-di-tert-butyl-4-hydroxybenzyl-2-norbornene, which is a norbornenylphenol based compound (See Japanese Kokai No. 57-83522).

Conventionally produced olefin polymers typically contain stabilizers against oxidative degradation which would occur in unstabilized polymer while it is being melted, as in an extruder, for forming in the melt. Since the method of this invention results in articles in final form which is not melted prior to or during use, such article need not be stabilized to the same extent customary in convention polyolefins. Compounds selected for this purpose should not interfere to a significant extent with the polymerization reaction. Suitable stabilizers may be selected from the following group: 2,6-di-tert-butyl-4-methylphenol (BHT); styrenated phenol, such as Wingstay S (Goodyear); 2- and 3-tert-butyl-4-methoxyphenol; alkylated hindered phenols, such as Wingstay C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox 53 and Permanax WSO; 2.2°-ethylidenebis(4,6-di-tert-butylphenol); 2,2'-methylenebis(4-methyl-6-(1-methylcyclohexyl)phenol); 4,4'-butylidenebis (6-tert-butyl-3-methylphenol); polybutylated Bisphenol A; 4,4'-thiobis(6-tert-butyl-3-methylphenol); 4,4'-methylenebis (2,6-dimethylphenol); 1,1'-thiobis(2-naphthol); methylene bridged polyaklylphenol, such as Ethyl antioxidant 738; 2,2'-thiobis(4-methyl-6-tert-butylphenol); 2,2'-isobutylidenebis(4,6-dimethylphenol); 2,2'-methylenebis(4-methyl-6-cyclohexylphenol); butylated reaction product of p-cresol and dicyclopentadiene, such as Wingstay L; tetrakis (methylene-3,5-di-tert-butyl-4-hydroxyhydrocinnamate) methane, i.e., Irganox 1010; 1,3,5-trimethyl-2,4,6-tris(3,5-di-tert-butyl-4-hydroxybenzyl)benzene, e.g., Ethanox 330; 1,3,5-tris(3,5-di-tert-butyl-4-hydroxybenzyl)isocyanurate, i.e., Good-rite 3114, 2,5-di-tert-amylhydroquinone, tert-butylhydroquinone, tris(nonylphenylphosphite), bis(2,4-di-tert-butyl)pentaerythritol)diphosphite, distearyl pentaerythritol diphosphite, phosphited phenols and bisphenols, such as Naugard 492, phosphite/phenolic antioxidant blends, such as Irganox B215; di-n-octadecyl(3,5-di-tert-butyl-4-hydroxybenzyl)phosphonate, such as Irganox 1093; 1,6-hexamethylene bis(3-(3,5-di-tert-butyl-4-hydroxyphenylpropionate), such as Irganox 259, and octadecyl-3,5-di-tert-butyl-4-hydroxyhydrocinnamate, i.e., Irganox 1076, tetrakis(2,4-di-tert-butylphenyl)4,4'-biphenylylenediphosphonite, diphenylamine, and 4,4'-diemthoxydiphenylamine. Such materials are normally employed at levels of about 0.05% to 5% based on the polymer, but more preferably 0.1% to 1% based on the polymer.

The method of this invention is also suitable for production of reinforced polymers by use of conventional fillers or reinforcing components in particular or filamentary form, e.g., short segments of fiber glass, carbon fiber, silica, alumina, carbon black, silicates, aluminosilicates such as mica, talc, clays, vermiculite and asbestos, and calcium silicates, such as wollastonite. These compounds which increase the polymer's flexural modulus with only a small sacrifice in impact resistance. It is surprising that in spite of the highly polar nature of their surfaces these fillers can be added without appreciably affecting the polymerization rate. Preferably, such fillers may be surface treated with a silane coupling agent. From about 5% to 75% by weight may be incorporated. This and all subsequent percentages are based on the weight of the final product. The addition of fillers which have modified surface properties are particularly advantageous. The exact amount of a particular filler to be used in a particular situation will be easily determinable and will depend on the preferences of the practitioner. The addition of fillers also serves to decrease the mold shrinkage of the product. After a short post cure at 150–200° C. an unfilled product will shrink from about 3.0 to about 3.5% whereas adding 20–25 wt % filler will decrease the shrinkage to 1.5–2% and adding 33 wt % filler will further decrease shrinkage to about 1%.

In some embodiments of this invention, a preformed elastomer that is soluble in the reactant streams is added to the metathesis catalyst system in order to increase the impact strength of the polymer or other mechanical properties, and to aid the moldability. An important factor in selecting an elastomer is in its ability to dissolve in the monomer. A short dissolution time is preferred indicating that the elastomer is quite easily dissolved in the monomer. The addition of an elastomer can increase the polymer's impact strength 5–10 fold with only a slight decrease in flexural modulus. The elastomer is dissolved in either or both of the reactant streams in an amount from about 1 to about 15 weight percent, based on the weight of monomer. A preferred concentration range for the elastomer is between 3 and 10 wt %. The elastomer can be dissolved in either or both of the polycyclic olefin streams in the 5–10 wt % range without causing an excessive increase in the solution viscosity. A target viscosity range at room temperature would about 100–1000 cps and more preferable 200–500 cps. It is preferable that the elastomer be miscible with the polycyclic olefin monomer between 10° C. and 100° C. Suitable elastomers include, for example, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, ethylene-propylene-diene terpolymers, ethylene-vinyl acetate and nitrile rubbers. Preferred elastomers are polybutadiene Diene 55AC10 (Firestone), polybutadiene Diene 55AM5 (Firestone), Nordel® 1070 EPDM rubber (DuPont-Dow), Polysar Butyl 301 (Bayer), polybutadiene Taktene 710 (Bayer), Ethylene-Octene Engage 8150 (DuPont-Dow), styrene-butadiene Kraton D1184 (Shell), and polyisobutylene Vistanex MML-140 (Exxon). Various polar elastomers can also be used. The amount of elastomer used is determined by its molecular weight and is limited by the viscosity of the resultant streams. The streams cannot be so viscous that adequate mixing is not possible. The Brookfield viscosity of polycyclic olefins are between about 5 and 10 cps at 35° C. Increasing the viscosity to between about 100 cps and about 1000 cps alters the mold filling characteristics of the combined streams. An increase in viscosity reduces leakage from the mold and simplifies the use of fillers by decreasing the settling rates of the solids. Although the elastomer can be dissolved in either one or both of the streams it is desirable that it be dissolved in both. When the two streams have similar viscosity more uniform mixing is obtained.

As an alternative, preformed elastomers that are essentially insoluble in the reactant streams can also be used to improve impact resistance of reaction injection molded, addition-polymerized norbornene monomers. Core shell polymer particles can be defined as polymer particles have a core and a shell having different physical and/or chemical properties. With elastomeric core-shell particles it is meant that at least the core of the particles consists of elastomeric material. Elastomeric core-shell polymer particles have found use in stabilizing the impact properties of molded thermoset polymers of cycloolefins, such as ROMP DCPD polymers. For example, see PCT Int. Appl., WO 9419385 A1 940901. Elastomeric core-shell particles of a size not exceeding 2 $\mu$m are dispersed in the starting monomers in an amount of from 0.5 to 20 weight percent relative to the weight of the monomer. Elastomeric core-shell particle having a size in the range of from 0.01 to 2 $\mu$m and more preferably in the range of from 0.1 to 1 $\mu$m. Examples of elastomeric core-shell particles suitable for use in the present invention are those marketed under their trademark PARALOID EXL, and in particular the PARALOID EXL2300/3300 elastomeric core-shell polymer series and/or the PARALOID EXL2600/3600 elastomeric core-shell polymer series and/or the PARALOID KM elastomeric core-shell polymer series and/or the PARALOID BTA elastomeric core-shell polymer series.

Since sensitivity to added compounds may be different for each system, it is desirable to determine experimentally whether a compound to be added may interfere with the reaction.

Monomer to Polymer Conversion

It is essential in the practice of this invention that conversion of monomer to polymer be substantially complete, i.e., greater than 90%, preferably at least 95%, and most preferably at least 99%, and the result is a coherent polymer mass which fills the mold completely.

The following examples are detailed descriptions of methods of preparation and use of certain compositions of the present invention. The detailed preparations fall within the scope of, and serve to exemplify, the more generally described methods of preparation set forth above. The examples are presented for illustrative purposes only, and are not intended as a restriction on the scope of the invention.

In the examples in which polymerization studies are set forth, the following general procedures were followed. All procedures were performed in a dry nitrogen or argon atmosphere or in vacuum in a Braun Inert Atmosphere Dry Box or its equivalent or using Schlenk techniques. Schlenk techniques are described in *The Manipulation of Air-Sensitive Compounds*, Second Edition, D. F. Shriver and M. A. Drezdzon, John Wiley and Sons, Inc., New York, 1986. All liquid transfers were preformed by cannula or syringe to maintain inert atmospheric conditions.

Commercially available or prepared polycyclic monomers used should be of high purity. Preferably, monomers should be purified so that the polycyclic monomer contain no impurities that reduce catalyst activity. This may be achieved by distillation or by passing the monomers through a BTS and a 3A molecular column for removal of residual oxygen and water, respectively, before use. It is often desirable to purify the starting material by treatment with silica gel to remove monomer oxidation products. However, the catalysts of this invention can polymerize less pure grades of polycyclic monomers when the appropriate procatalysts and activators are employed at the appropriate concentration.

Polymerizations were conducted in argon or nitrogen flushed test tubes, serum vials, glass bottles, reaction vessels, or other molds. In general, the polymerizations were accomplished by adding the catalyst precursor ("procatalyst") or activator, whether in solution or in monomer, to the corresponding component in monomer. Mixing of the ingredients was accomplished with a vortex, magnetic stir bar, static, mechanical, or impingement mixing. In certain examples, MIXPAC System 200 Pneumatic Dispenser (operating pressure 73 psi) for 1:1 mixing was employed in the static mixing of "A" and "B" norbornene based RIM formulations and transferring the monomer and catalyst mixture into a mold. The reaction mixtures were maintained at ambient temperature or heat at constant temperature with heating baths or hot surfaces. Gel times ($t_{gel}$) were estimated by observing the initial viscosity change where the mixture changed from a flowable to a nonflowable mass. This was often evident by the observation that the magnetic stir bar stopped stirring due to the viscosity increase of the polymerizing mass. The polymerization temperature ($t_{gel}$) at the gel point was also recorded. The time to particular exotherm temperatures, i.e., $t_{100° C.}$ or $t_{200° C.}$, were recorded when the polymerization exotherm raised the temperature of the polymerizing mass to that temperature, and to the maximum temperature ($t_{Tmax}$) of the polymerization. The maximum temperature ($t_{Mmax}$) of the polymerization was also recorded. The residual monomer level in the polynorbornene samples was obtained by thermogravimetric analysis (TGA) at 300° C.

In addition to measuring gel and cure times and residual monomer level in the following examples, a measurement of swell value was made. The swell value is an indication of the degree of crosslinking in the polymer, i.e., lower swell values indicate a higher degree of crosslinking. The swell value was determined by removing a sample of polymer from its polymerization vessel and carefully cutting it into smaller pieces. Burrs were removed, and each piece was weighed to the nearest milligram. The samples were then placed in a volume of toluene (50 ml of toluene for each gram of polymer), heated to reflux for 16 hours (overnight) and cooled. After this time, each sample was removed from the flask and placed in a small dish of fresh toluene. The slices were removed, patted dry, and weighed individually. The swell values were calculated using the following formula: swell (%)=$(w_2-w_1)/w_1 \times 100\%$, where $w_1$=the initial weight of the polynorbornene sample and $w_2$=the weight of the solvent-swollen polynorbornene sample. Since the swell value is an indication of the degree of crosslinking in the polymer, low values are preferred.

The ASTM method used to measure the heat distortion temperature of the polymer samples is ASTM D648–95. The immersion medium employed was General Electric silicon oil SF96-50.

The monomer to polymer conversion was measured by thermogravimetric analysis and the conversion taken at 300° C.

Monomer 1

Purification of 5,5'-(1,2-ethanediyl)bisbicyclo[2.2.1]hept-2-ene.

5,5'-(1,2-ethanediyl)bisbicyclo[2.2.1]hept-2-ene (a crosslinker) was obtained as a mixture with 2-(3-butenyl)-,2,3,4,4a,5,8,8a-octahydro-1,4:5,8-dimethanonapthalene (63:37). The mixture was chilled to precipitate the desired product as white crystals that were isolated by filtration. The product was obtained in 92% purity in this manner. Recrystallization from hexane (20 ml to 40 g of product) gave the product in 97.5% purity.

Monomer 2

(Preparation of exo-trans-exo-Norbornadiene Dimer from norbornadiene)

Norbornadiene was prepared in a manner similar to the process disclosed by R. L. Pruett and E. A. Rick in "Oligomers of Bicycloheptadiene" (U.S. Pat. No. 3,440,294). In refluxing toluene, a Ni(COD)$_2$ catalyst was employed in the preferential dimerization of norbornadiene to exo-trans-exo-1,4:5,8-dodecahydrodimethanobiphenylene (norbornadiene dimer). The mixed product was distilled to high purity and the exo-trans-exo isomer was separated from the other isomers by fractional crystallization. The purest product was obtained by recrystallization of the desired product in cold toluene. The final product was of greater than 98% purity.

Monomer 3

Preparation of 1,2,3,4,4,5,8,8-octahydro-1,4:5,8-dimethanonapthalene (DMN or TDD)

Norbornadiene was reacted with cyclopentadiene at 220° C. at a molar ratio of 1:2. The product was then distilled under vacuum to a purity of greater than 98% TDD.

Monomer 4

Preparation of Exo-7-pentylnorbornene

To methyl acrylate (761 g, 8.84 moles) cooled to –10° C. was added drop wise 557 g, 8.4 moles of cyclopentadiene. Slow addition was necessary to ensure that the exothermic reaction was maintained at 0° C. or lower. The reaction mixture was stirred overnight at room temperature. The excess methyl acrylate was removed under reduced pressure before distilling the pure exo/endo-norbornene carboxylic acid methyl ester. To a 5 L flask charged with 1,603 g of 25 wt % sodium methoxide methanol solution was added drop wise 700.63 g of exo/endo-norbornene carboxylic acid methyl ester. The reaction mixture was then refluxed at 90° C. for 48 hours. After this time, the reaction vessel was cooled to 0° C. and 1.5 liters of cold water were slowly added. The methanol was then stripped away from the reaction via distillation until a total reaction volume of 2 liters was attained. A further 500 ml of water were added to the reaction and the reaction refluxed overnight. The remaining methanol was then removed under reduced pressure. The sodium salt of the norbornene carboxylic acid and water mixture was cooled to –10° C. and neutralized by the drop wise addition of a cold aqueous solution of concentrated sulfuric acid (206 ml, 3.71 moles, added to 1000 g of ice). Water (500 ml) was then added to dilute the reaction further and remove additional heat generated during the neutralization step. Neutralization of the reaction mixture with additional conc. sulfuric acid continued until the pH of the solution tested to 2 (approximately 30 ml of 18M H$_2$SO$_4$). At this preferred pH the desired exo-enriched reaction product was driven out of the water phase and separated as a cloudy layer. The exo/endo-norbornene carboxylic acid product was separated from the water layer by extraction into diethyl ether (3×250 ml). The solution was dried over magnesium sulfate and then the ether removed to yield 545.6 g of crude product. The exo-enriched carboxylic acid was purified by distillation to yield 472 g of 55% exo-/45% endo-norbornene carboxylic acid.

The purified exo enriched norbornene carboxylic acid was added to a 5 L flask and neutralized with a 10% aqueous solution of sodium hydroxide (1.2 eq., 163.6 g, 4.09 moles in 1472 g of H$_2$O). The reaction was kept below 10° C. At room temperature, a solution of iodine (435 g, 1.71 moles), potassium iodide (350 g), sodium bicarbonate (91.26 g, 1.08 moles), and water (1 L) was added to the neutralized norbornene carboxylic acid mixture. The reaction was stirred for approximately 54 hours. At this stage the I$_2$, KI, and NaHCO$_3$ composition causes iodolactonization to occur with only the endo isomer of the sodium norbornene carboxylate. Thus, the exo isomer remains in the water phase while the endo-isomer becomes soluble in ether under the basic conditions employed. The reaction was divided into 3×1400 ml portions and each portion was extracted with 5×200 ml diethyl ether. The iodine containing aqueous phase of the exo-isomer was then reacted with 100 g of sodium thiosulfate to reduce the iodine to iodide. The aqueous solution was chilled and acidified to pH 2 with conc. sulfuric acid (55.6 ml of 18 M, 2.05 moles). The reaction mixture changed in color from light amber to a murky yellow. Pure exo-norbornene carboxylic acid was then extracted from the aqueous mixture using 8×200 ml of diethyl ether. The diethyl ether phases were stirred overnight with sodium thiosulfate (62.05 g, 0.25 moles) in 200 ml of water. This procedure removed any adventitious iodine that often appeared at this stage. The ether phase was then dried with magnesium sulfate, and the solvent removed under vacuum. Yield of crude exo-norbornene carboxylic acid was 367 g. The exo-norbornene carboxylic acid was purified by distillation.

A 5 L flask was charged with 46 grams of lithium aluminum hydride and 1500 ml of diethyl ether. A solution was the exo-norbornene carboxylic acid was added slowly to the $LiAlH_4$ keeping the reaction temperature below 10° C. during the next two 2 hours. The reaction was then warmed to room temperature and then refluxed for 2 hours. The reaction was then cooled to 0° C. and the excess $LiAlH_4$ destroyed by the slow addition of water, while keeping the temperature below 10° C. The reaction was then stirred at room temperature overnight. The reaction mixture was then cooled to 0° C. and 120 ml of concentrated sulfuric acid in 1 liter of water was added to the mixture. An additional 55 ml of conc. $H_2SO_4$ was added to the mixture to ensure complete dissolution of the salts. The ether layer was then separated and the water layer extracted with 3×150 ml of diethyl ether. The ether layers were then washed with brine solution and dried over magnesium sulfate. Evaporation of the diethyl ether yielded 135 g of essentially pure exo-5-norbornene-2-methanol.

Into a 2 liter flask was charged 127 g of pure exo-5-norbornene-2-methanol and pyridine (350 g) and the mixture was purged with nitrogen for 30 minutes. The reaction was cooled to −10° C. and p-toluenesulphonyl chloride was added slowly was a solid. The reaction temperature was kept at 0° C. during the addition. The reaction was then stirred at room temperature for approximately 60 hours. After this time, the reaction was added to a solution of 350 ml concentrated hydrochloric acid (in 1000 g of wet ice). The mixture was stirred for 45 minutes until all the ice melted. A beige precipitate formed during this time and was collected by filtration. The solid was dissolved in diethyl ether (400 ml). The water phase was extracted with 2×100 ml of diethyl ether. All ether phases were combined and washed with 500 ml of a saturated sodium carbonate solution and dried with magnesium sulfate. The exo-5-tosylatomethyl-2-norbornene was isolated as a beige precipitate.

To a 2 L flask were charged lithium bromide (209 g, 2.4 moles) and 500 ml of dried acetone. After the lithium bromide dissolved, the exo-5-tosylatomethyl-2-norbornene (223.2 g, 0.8 moles) in 500 ml of acetone was added to the reaction vessel. The reaction was then refluxed at 65° C. overnight. The cooled reaction mixture was then added to a mixture of 400 ml of distilled water and 500 ml of diethyl ether. The acetone ether phase was separated from the water phase and the water phase washed with 3×100 ml diethyl ether. The diethyl ether solution was dried with magnesium sulfate and the exo-5-bromomethyl-2-norbornene (153.7 g) isolated by removing the ether under vacuum. Pure exo-5-bromomethyl-2-norbornene (150.3 g) was isolated by distillation at 42° C./0.07 mm Hg).

To a 250 ml three-necked flask were added CuCN (11.2 g, 0.125 moles), and 75 ml of dried tetrahydrofuran. The reaction vessel was distilled to −78° C. in a toluene/liquid nitrogen cooling mixture. n-Butyllithium (100 ml, 2.5 M in hexane) was added maintaining the temperature below −78° C. This step took approximately 3.5 hours to complete and a tan brown product was observed. The reaction mixture was warmed to −20° C. and the reaction mixture became homogeneous. The reaction mixture was then re-cooled to −78° C. and the exo-5-bromomethyl-2-norbornene (13.75 g, 0.0735 moles) was added about −60° C. After the exo-5-bromomethyl-2-norbornene addition the reaction was warmed to 0° C. and stirred for 3.5 hours. At −10° C., the reaction was terminated by slowly adding about 5 ml of 9:1 ammonium chloride (saturated):ammonium hydroxide (concentrated) solution. A total of about 100 ml $NH_4Cl/NH_4OH$ were added to the reaction mixture. Diethyl ether was added to the reaction mixture and the solution filtered through Celite® filtering aid to remove the copper metal deposits. The amber diethyl ether layer was washed with water dried over magnesium sulfate and the ether evaporated to yield 16.0 g of crude exo-5-pentyl-2-norbornene. The product was distilled at 20° C. at 0.15 mm Hg to yield a pure sample of exo-5-pentyl-2-norbornene (65% yield).

Monomer 5

Preparation of Exo-7-heptylnorbornene

To a 250 ml three neck flask were added CuCN (8.96 g, 0.125 moles), and 75 ml of dried tetrahydrofuran. The reaction vessel was distilled to −78° C. in an ethanol/liquid nitrogen cooling mixture. Chilled n-hexylllithium (100 ml, 2.5 M in hexane at −10° C.) was added maintaining the temperature below −78° C. This step took approximately 1 hour to complete and a light tan brown product was observed. The reaction mixture was warmed to −10° C. at which time the reaction mixture became homogeneous. The reaction mixture was then re-cooled to −78° C. and exo-5-bromomethyl-2-norbornene (11.0 g) was added about −70° C. After the exo-5-bromomethyl-2-norbornene addition the reaction was warmed to 0° C. and stirred for 3.5 hours. At −10° C., the reaction was terminated by slowly adding about 5 ml of 9:1 ammonium chloride (saturated):ammonium hydroxide (concentrated) solution. The reaction was stirred at room temperature for 18 hours. Diethyl ether (150 ml) was added to the reaction mixture and the solution filtered through Celite® filtering aid to remove the copper metal deposits. The pale yellow diethyl ether layer was washed with water, dried over magnesium sulfate, and the ether evaporated to yield 12.2 g of crude exo-5-heptyl-2-norbornene. The product was distilled at 45° C. at 0.15 mm Hg to yield a pure sample of exo-5-heptyl-2-norbornene (70% yield).

Monomer 6

Preparation of 5-butoxy-2-norbornene

Dicyclopentadiene was heated with butyl vinyl ether to form the Diels-Alder product of 5-butoxy-2-norbornene. The product was then purified by vacuum distillation.

Monomer 7

Preparation exo-,exo-5,6-dimethylnorbornene

Endo-Nadic anhydride was thermally isomerized to generate exo-nadic anhydride. Pure exo-nadic anhydride was reduced using Vitride® reducing agent to yield the exo-, exo-5,6-dimethanonorbornene. This material was converted to exo-, exo-5,6-bistosylatodimethylnorbornene product using toluene sulphonylchloride. Reduction of the exo-, exo-5,6-bistosylatodimethylnorbornene with $LiAlH_4$ yielded the desired product exo-, exo-5,6-dimethylnorbornene.

Monomer 8

Preparation of exo-, exo-5,6-dipentylnorbornene

Endo-Nadic anhydride was thermally isomerized to generate exo-nadic anhydride. Pure exo-nadic anhydride was reduced using Vitride® reducing agent to yield the exo-, exo-5,6-dimethanonorbornene. This material was converted to exo-, exo-5,6-bistosylatodimethylnorbornene product using toluene sulphonylchloride. Refluxing exo-, exo-5,6-Bistosylatodimethylnorbornene with lithium bromide in acetone converted it to exo-,exo-5,6-dibromomethylnorbornene. Reaction of exo-, exo-5,6-dibromomethylnorbornene with n-butyllithium and copper cyanide yielded the desired product exo-,exo-5,6-dipentylnorbornene.

Procatalyst 1

Preparation of (π-allyl)(tricyclohexylphosphine)(perfluorophenyl)palladium(II)

To a stirred solution of (allyl)(tricyclophosphine)palladium(II) chloride (189 mg) in 5 ml THF at 0° C. was added a solution of $Zn(C_6F_5)_2$(dimethoxyethane) (100 mg) in 5 ml THF. The reaction was stirred for 1 hour at room temperature and the solvent removed under vacuum. The resulting solid was extracted with 10 ml hexane, filtered, and the solvent removed under vacuum to give the product as a white powder (159 mg, 64%).

Procatalyst 2

Preparation of (π-allyl)(tricyclohexylphosphine)palladium(II) Chloride

To a stirred solution of π-allyl palladium chloride dimer (1.0 g) in THF was added tricyclohexylphosphine (1.53 g) in THF. After stirring for 0.5 hours the solvent was removed under vacuum to give the product as a pale yellow powder.

Procatalyst 3

Preparation of (π-allyl(tricyclohexylphosphine)palladium (II) p-tolylsulfonate

To a slurry of silver p-toluenesulfonate (300 mg) in THF was added (π-allyl)(tricyclophosphine)palladium(II) chloride (500 mg) in THF. After stirring overnight, the reaction was filtered and the solution stripped down to give a white foam which was washed with hexane to give the product as a white powder.

Procatalyst 4

Preparation of bis(tricyclohexylphosphine)(hydrido)palladium(II) Chloride

To a slurry of (1,5-cyclooctadiene)palladium(II) chloride (2.0 g) in 20 ml methanol was added 1.67 g of a 25 wt. % solution of sodium methoxide in methanol diluted with 20 ml methanol. After 0.5 hours, (2-methoxy-3-cyclooctenyl) palladium chloride dimer was isolated as a white powder by filtration in air and dried under vacuum (1.67 g, 85%).

To a slurry of (2-methoxy-3-cyclooctenyl)palladium chloride dimer (500 mg) in 25 ml methanol was added tricyclohexylphosphine (1.0 g) as a solid. The reaction was stirred until it became homogeneous. Stirring was stopped and the solution was cooled in a −20° C. freezer. The product was isolated as a gray crystalline solid by filtration in air and dried under vacuum (900 mg, 72%).

Procatalyst 5

Preparation of bis(triisopropylphosphine)(hydrido)palladium(II) Chloride

To a slurry of (2-methoxy-3-cyclooctenyl)palladium chloride dimer (0.5 g) in 25 ml methanol was added triisopropylphosphine (0.57 g). The reaction was stirred until it became homogeneous. Stirring was stopped and the solution was cooled in a −20° C. freezer overnight. A small amount of black solid was filtered off in air, and the solvent was removed under vacuum to give a sticky yellow solid. The product was recrystallized from hexane and dried under vacuum to give the product as a white solid.

Procatalyst 6

Preparation of bis(tricyclohexylphosphine)(hydrido)palladium(II) Nitrate

To a slurry of tricyclohexylphosphine (4.86 g) in 75 ml ethanol was added palladium(II) nitrate (2.0 g) as a solid at −35° C. A yellow precipitate formed immediately. After 1.5 hours, toluene (150 ml) was added and the reaction warmed to −5° C. Sodium borohydride (0.33 g) was added in 25 ml ethanol, and the reaction was allowed to warm to room temperature. After 40 hours, the reaction was filtered and the solvent removed to give a tan solid. The product was washed with 75 ml ethyl ether and several times with hexane. Recrystallization from toluene/hexane gave the product as tan crystals (3.3 g, 53%).

Procatalyst 7

Preparation of (π-allyl)(tricyclohexylphosphine)palladium(II) Trifluoromethane sulfonate.

To a stirred solution of (π-allyl)palladium chloride dimer (1.0 g) in THF was added tricyclohexylphosphine (1.53 g) in THF. After stirring for 0.5 hours, silver trifluoromethanesulfonate (1.4 g) was added as a solution in THF. The reaction was stirred for 1 hour, filtered and the solvent removed to give the product as a white powder (2.8 g, 89%).

Procatalyst 8

Preparation of bis(tricyclohexylphosphine)(hydrido)palladium(II) Trifluoroacetate To a slurry of palladium(II) trifluoroacetate (2.89 g) in 75 ml ethanol at −30° C. was added tricyclohexylphosphine (4.86 g) as a solid. The thick, olive green slurry was stirred for 2 hours, warmed to 0° C. and 150 ml toluene was added. Sodium borohydride (0.33 g) in 25 ml ethanol was added drop wise and the reaction was stirred for 21 hours. The reaction was filtered and the solvents removed under vacuum to give a brown solid. Washing with hexane and recrystallization from toluene/hexane gave the product as an off-white crystalline solid (1.25 g, 18%).

Procatalyst 9

Preparation of bis(triisopropylphosphine)(hydrido)palladium(II) Trifluoromethanesulfonate To a partial slurry of thallium trifluoromethanesulfonate (38 mg) in 5 ml ethyl ether was added bis(triisopropylphosphine)(hydrido)palladium(II) chloride (50 mg) in 5 ml ethyl ether. After 1 hour, the reaction was filtered, and the solvent removed to give the product as a pale yellow solid.

Procatalyst 10

Preparation of bis(tricyclohexylphosphine)(hydrido) palladium(II) Formate

To a slurry of bistricyclohexylphosphine palladium(0) (200 mg) in 10 ml ethyl ether was added formic acid (30.4 mg) in 1 ml methanol. The solution immediately became homogeneous. After 1 hour, the solvents were removed under vacuum and the resulting white solid was washed with hexane and dried to give the product.

Procatalyst 11

Preparation of (1,1-dimethyl-π-allyl (triisopropylphosphine)palladium(II) Trifluoroacetate To trifluoroacetic anhydride (100 g) in 200 ml hexane was slowly added a solution of 3-methyl-2-buten-1-ol (37.2 g) and pyridine (37.67 g). An ice bath was used to keep the temperature at 20° C. After stirring for 1.5 hours, a white precipitate was filtered off, and the solvents were removed under vacuum to give the product 3-methyl-2-butenyltrifluoroacetate as a somewhat volatile liquid (47 g, 60%).

To a solution of bis(dibenzylidineacetone)palladium(0) (2.3 g) in 30 ml THF and 8 ml acetonitrile was added 3-methyl-2-butenyltrifluoroacetate (0.80 g). After 20 mins., the solution had changed from deep purple to dark green in color. The solvents were removed under vacuum to give a black, metallic-looking solid. Extraction in air with 50 ml 10% acetonitrile in water, filtration and removal of solvents under vacuum gave (1,1-dimethyl-π-allylpalladium(II) trifluoroacetate dimer as a yellow solid (0.48 g, 42%).

To a solution of(1,1-dimethyl π-allylpalladium(II) trifluoroacetate dimer (200 mg) in THF was added 111 mg triisopropylphosphine in THF. After 0.5 hours, the solvent was removed to give a sticky yellow solid. The product was recrystallized from hexane to give a yellow solid.

Procatalyst 12

Preparation of (π-allyl)(triphenylphosphine)palladium(II) Trifluoromethanesulfonate To a solution of (π-allyl)palladium chloride dimer (0.5 g) in THF was added triphenylphosphine (0.717 g) in THF. After stirring several minutes, silver trifluoromethanesulfonate (0.702 g) was added as a solid. The reaction was stirred for 0.5 hours, the silver chloride (AgCl) was filtered off, and the solvent removed to give the product as a pale yellow solid (1.32 g, 86%).

Procatalyst 13

Preparation of (π-allyl(triisopropylphosphine)palladium (II) Trifluoromethanesulfonate To a solution of (π-allyl)palladium chloride dimer (1.0 g) in 25 ml methylene chloride was slowly added triisopropylphosphine (0.876 g) in 5 ml methylene chloride. The resulting pale yellow solution was slowly added to a slurry of silver trifluoromethanesulfonate (1.4 g) in 25 ml methylene chloride. After stirring for 1.5 hours, the silver chloride (AgCl) was filtered off, and the solvent removed under vacuum to give the product as a pale yellow solid (2.4 g, 96%).

Procatalyst 14

Preparation of (2-chloro-π-allyl(triisopropylphosphine)palladium(II) Trifluoroacetate To trifluoroacetic anhydride (22.7 g) in 100 ml hexane was slowly added a solution of 2-chloro-2-propen-1-ol (110.0 g) and pyridine (8.55 g) in 20 ml hexane. An ice bath was used to keep the temperature below 10° C. After stirring for 1.5 hours at room temperature, a white precipitate was filtered off, and the solvents were removed under vacuum to give the product 2-chloro-2-propenyltrifluoroacetate as a somewhat volatile liquid (5 g, 23%).

To a solution of bis(dibenzylidineacetone)palladium(0) (2.3 g) in 25 ml THF and 8 ml acetonitrile was added 2-chloro-2-propenyltrifluoroacetate (0.90 g) in 5 ml THF. After 20 mins., the solution had changed from deep purple to dark green in color. The solvents were removed under vacuum to give a black, metallic-looking solid. Extraction in air with 25 ml 10% acetonitrile in water, filtration and removal of solvents under vacuum gave (2-chloro-2-propenyl)palladium trifluoroacetate dimer as a yellow solid (0.50 g, 40%).

To a solution of (2-chloro-2-propenyl)palladium trifluoroacetate dimer (200 mg) in 15 ml methylene chloride was added 103 mg triisopropylphosphine in 5 ml methylene chloride. After 0.5 hours, the solvent was removed to give a sticky yellow solid. The product was recrystallized from hexane to give a yellow solid.

Procatalyst 15

$(Me_2NCH_2C_6H_4)Pd(O_3SCF_3)PCy_3$

Ortho-metallated phenylmethlyenedimethylaminopalladium chloride dimer (0.25 g) was dissolved in dichloromethane (25 ml). Triisopropylphosphine (0.145 g) was mixed with dichloro methane (5 ml) and added to the solution of the palladium derivative, After stirring for 30 minutes at room temperature, the mixture was added to a slurry of silver triflate (0.233 g) and stirred in the dark. The silver chloride precipitate was removed by filtering the solution through Celite® filtering aid. Removal of the solvent yielded a green yellow oil. Addition of hexanes and Freon® 1,1,2 to this oil yielded a light yellow solid $((Me_2NCH_2C_6H_4)Pd(O_3SCF_3)P(i-Pr)_3)$.

Procatalyst 16

Preparation of (allyl)(triisopropylphosphine)palladium (II) Trifluoroacetate

To a solution of allylpalladiumchloride dimer (0.5 g) in 20 ml methylene chloride was slowly added triisopropylphosphine (0.437 g) in 5 ml methylene chloride. The resulting pale yellow solution was slowly added to a slurry of silver trifluoroacetate (0.604 g) in 15 ml methylene chloride. After stirring for 0.5 hours, AgCl was filtered off and the solvent removed under vacuum to give the product as a pale yellow solid.

Procatalyst 17

Preparation of (allyl)(tricyclopentylphosphine)palladium (II) Trifluoromethane Sulfonate To a solution of allylpalladiumchloride dimer (0.5 g) in 20 ml methylene chloride was slowly added tricyclopentylphosphine (0.651 g) in 5 ml methylene chloride. The resulting pale yellow solution was slowly added to a slurry of silver trifluoromethane sulfonate (0.702 g) in 15 ml methylene chloride. After stirring for 0.5 hours, AgCl was filtered off and the solvent removed under vacuum to give the product as a pale yellow solid (1.0 g, 68%).

Catalyst 18

Preparation of [(π-allyl)Pd(P-i-Pr$_3$)(NCCH$_3$)][B(O$_2$C$_6$H$_2$-3,5-CMe$_3$)$_2$]

At room temperature, Li[B(O$_2$C$_6$H$_2$-3,5-CMe$_3$)$_2$] (1.0 g, containing adventitious acetonitrile) was reacted with (π-allyl)Pd(O$_3$SCF$_3$)(P(i-Pr)$_3$) (1.0 g) in approximately 50 ml toluene. After the reaction had stirred overnight the yellow solution was stripped to dryness. The product was washed with 20 ml hexane and the yellow solid collected. Based on proton, phosphorus, and fluorine NMR spectroscopic analysis the product was identified as [(allyl)Pd(P(i-Pr)$_3$)(NCCH$_3$)][B(O$_2$C$_6$H$_2$-3,5-CMe$_3$)$_2$].

Catalyst 19

Preparation of [(π-allyl)Pd(P-i-Pr$_3$)(NCCH$_3$)][B(O$_2$C$_6$Cl$_4$)$_2$]

Figure 2:
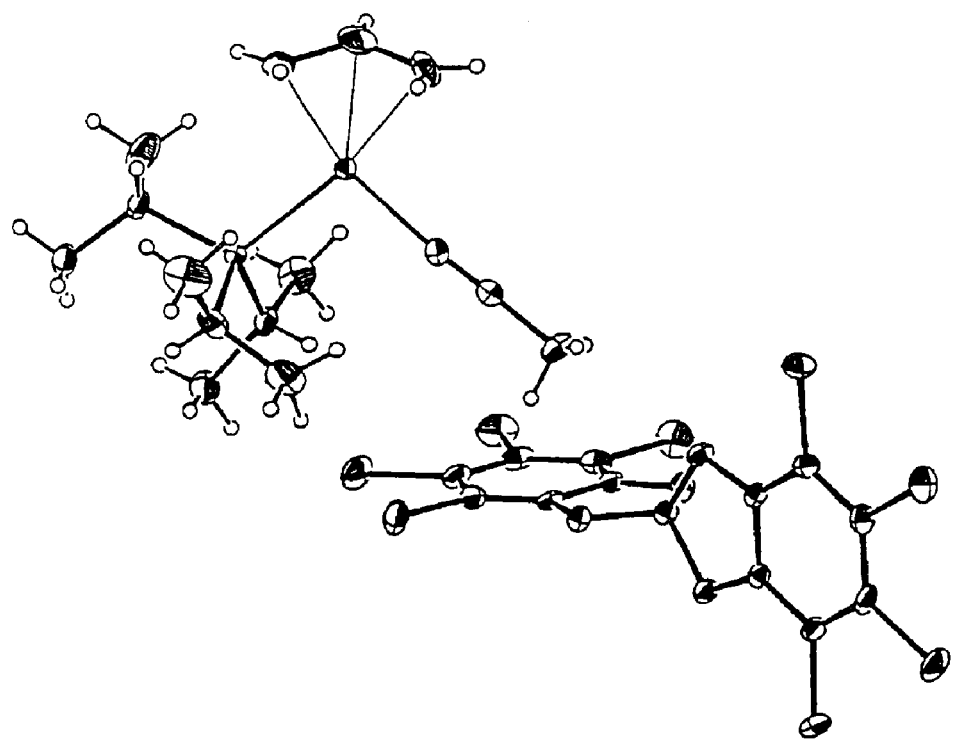
FIG. 2 represents an (ORTEP) of $[(allyl)PdP(i-Pr)_3(NCCH_3)][B(O_2C_6Cl_4)_2]$.

At room temperature, Li(HOMe)$_4$[B(O$_2$C$_6$Cl$_4$)$_2$].(0.58 g) was reacted with (π-allyl)Pd(O$_3$SCF$_3$)(P(i-Pr)$_3$) (1.0 g) in approximately 20 ml acetonitrile. After the reaction had stirred overnight the yellow solution was stripped to an orange solution. The product was redissolved in minimum dichloromethane and chilled to −32° C. The crystals that formed were collected and dried. Based on proton, phosphorus, and fluorine NMR spectroscopic analysis the product was identified as [(π-allyl)Pd(P(i-Pr)$_3$)(NCCH$_3$)][B(O$_2$C$_6$Cl$_4$)$_2$]. A single X-ray determination confirmed the structure as [(π-allyl)Pd(P(i-Pr)$_3$)(NCCH$_3$)][B(O$_2$C$_6$Cl$_4$)$_2$]. The molecular structure of this catalyst is depicted in FIG. 2.

Procatalyst 20

Preparation of (crotyl)(triisopropylphosphine)palladium (II) trifluoromethanesulfonate To a solution of crotylpalladiumchloride dimer (0.5 g) in 20 ml methylene chloride was slowly added triisopropylphosphine (0.407 g) in 5 ml methylene chloride. The resulting pale yellow solution was slowly added to a slurry of silver trifluoromethane sulfonate (0.652 g) in 15 ml methylene chloride. After stirring for 0.5 hours, AgCl was filtered off and the solvent removed under vacuum to give the product as a pale yellow solid.

Procatalyst 21

Preparation of bis trifluoromethanesulfonimide, silver salt and Preparation of (π-allyl)(tricyclohexylphosphine) palladium (II) bistrifluoromethane-sulfonimide To a solution of bistrifluoromethanesulfonimide (2.0 g) in 15 ml of water was added silver carbonate (11.18 g) as a solid. The solution was heated to 65° C. over 0.5 hour, filtered, and the water removed under vacuum. The product was dissolved in ethyl ether and filtered to remove solid impurities. Removal of the ether under vacuum gave the product as a white solid, Ag[N(SO$_2$CF$_3$)$_2$].

To a stirred solution of 50 mg π-allylpalladiumchloride dimer in 3 ml methylene chloride was added 77 mg tricyclohexylphosphine in 2 ml methylene chloride. After stirring for 5 min, this solution was added to a slurry of 106 mg silver bistrifluoromethanesulfimide in 3 ml methylene chloride. The reaction was stirred for 30 minutes, silver chloride filtered off, and the solvent removed to give the product as a tan solid.

Procatalyst 22

Preparation of (π-allyl)(triphenylphosphine)palladium(II) Bistrifluoromethanesulfonimide To a stirred solution of 50 mg allylpalladiumchloride dimer in 3 ml methylene chloride was added 72 mg triphenylphosphine in 2 ml methylene chloride. After stirring for 5 min, this solution was added to a slurry of 106 mg silver bistrifluoromethanesulfimide in 3 ml methylene chloride. The reaction was stirred for 0.5 hours, silver chloride filtered off, and the solvent removed to give a yellow foam. Stirring in hexane followed by filtration gave the product as a yellow solid.

Procatalyst 23

Preparation of (π-allyl)(tricyclopentylphosphine)palladium Bistrifluoromethanesulfonimide To a stirred solution of 250 mg allylpalladiumchloride dimer in 3 ml methylene chloride was added 326 mg tricyclopentylphosphine in 2 ml methylene chloride. After stirring for 5 min, this solution was added to a slurry of 557 mg silver bistrifluoromethanesulfimide in 3 ml methylene chloride. The reaction was stirred for 0.5 hours, silver chloride filtered off, and the solvent removed to give a brown oil. Stirring in hexane followed by filtration gave the product as a light brown solid.

Activator 1

Preparation of [(C$_{18}$H$_{37}$)$_2$NHCH$_3$]B(C$_6$F$_5$)$_4$

To a slurry of (C$_{18}$H$_{37}$)$_2$NCH$_3$ (0.50 g) in 50 ml hexane was added 1.17 ml of a 1 M solution of hydrochloric acid in ethyl ether. A white precipitate was formed immediately. After 1 hour, the [(C$_{18}$H$_{37}$)$_2$NHCH$_3$]Cl was isolated by filtration in air and dried under vacuum.

A solution of [(C$_{18}$H$_{37}$)$_2$NHCH$_3$]Cl (0.05 g) and Li(Et$_2$O)$_{2.5}$B(C$_6$F$_5$)$_4$ (0.076 g) in 25 ml cyclohexane was refluxed for 2.5 hours. The solution was filtered to remove LiCl and the solvent removed to give the product as a brown colored oil.

Activator 2

Preparation of LiWCA-H (lithium tetrakis [hexafluoropropoxyphenyl]aluminate)

To a slurry of lithium aluminum hydride (0.0777 g) in 15 ml hexane was added 1,1,1,3,3,3-hexafluoro-2-phenyl-2-propanol (RFOH) (1.0 g) in 15 ml hexane. After stirring overnight, the solution was filtered through Celite® and the solvent removed to give the product as a white solid (0.85 g, 85%).

Activator 3

Preparation of LiWCA-H in Butylnorbornene

To a slurry of lithium aluminum hydride (0.078 g) in 10 g butylnorbornene was added 1,1,1,3,3,3-hexafluoro-2-phenyl-2-propanol (1.0 g) in 10 g butylnorbornene. After stirring overnight, the reaction was filtered to give a clear, somewhat viscous solution.

To a solution of 1.5 mg (π-allyl)Pd(O$_3$SCF$_3$)(P-i-Pr)$_3$ in 9.0 g butylnorbornene was added 75 mg of the above stock solution in 1.0 g butylnorbornene. The polymerization proceeded slowly. An additional 0.25 ml of the stock solution was added. The polymerization gelled immediately and reached a temperature of 210° C.

Activator 4

Preparation of LiWCA-CH$_3$ R$^f$OH:LiAlH$_4$=4:2

To a slurry of lithium aluminum hydride (0.367 g) in 100 ml hexane was added 1,1,1,3,3,3-hexafluoro-2-(p-tolyl)-isopropanol (5.0 g). After stirring overnight, the solution was filtered through Celite® filtering aid and the solvent removed to give the product as a white solid (4.7 g, 91%).

Activator 5

Preparation of Li[(CH$_3$(CH$_2$)$_7$)$_2$O]$_{2.5}$FABA

To a solution of LiFABA (0.25 g) in 10 ml ethyl ether was added n-octylether (0.174 g). After stirring overnight, the solvent was removed to give a product as a brown colored oil.

Activator 6

Preparation of LiWCA-H R$^f$OH:LiAlH$_4$=4:1.2

To a slurry of lithium aluminum hydride (0.696 g) in 2.0 L hexane (dried over LiAlH$_4$) was added 1,1,1,3,3,3-hexafluoro-2-phenyl-2-propanol (14.9 g). The reaction was stirred over the weekend, filtered, and the solvent removed to give the product as a white solid (14.0 g, 91%).

Activator 7

Preparation of LiWCA-H R$^f$OH:LiAlH$_4$=4:1.5

To a slurry of lithium aluminum hydride (0.05 g) in 80 ml hexane was added 1,1,1,3,3,3-hexafluoro-2-phenyl-2-propanol (0.86 g). The reaction was stirred overnight, filtered, and the solvent removed to give the product as a white solid (0.63 g, 71%). Duplication the prior reaction on a larger reaction scale (i.e., lithium aluminum hydride=2.34 g; 1,1,1,3,3,3-hexafluoro-2-phenyl-2-propanol=40 g) resulted in isolation of LiWCA-H as a white crystalline product. Yield=38 g, 92%.

Activator 8

Preparation of Li(HOCH$_3$)$_{2.5}$[B(C$_6$F$_5$)$_4$]

0.11 g of ether free Li[B(C$_6$F$_5$)$_4$] was dissolved in methanol (4 ml) to give an orange solution. After stirring for two hours, the methanol was removed under vacuum to yield a white solid Li(HOCH$_3$)$_{2.5}$[B(C$_6$F$_5$)$_4$].

Activator 9

Preparation of Li(HO-i-Pr)$_3$[B(C$_6$F$_5$)$_4$]

0.100 g of Li(OEt$_2$)$_{2.5}$[B(C$_6$F$_5$)$_4$] was dissolved in isopropanol (5 ml) to give an orange solution. After stirring for two hours, the isopropanol was removed under vacuum to yield a white solid. Proton NMR analysis showed that all the coordinated diethyl ether was replaced. Based on TGA and internal reference measurements using proton NMR spectroscopic analysis the product was determined to be Li(HO-i-Pr)$_3$ [B(C$_6$F$_5$)$_4$].

Activator 10

Preparation of Li(HO-n-Pr)$_3$[B(C$_6$F$_5$)$_4$]

0.100 g of Li(OEt$_2$)$_{2.5}$[B(C$_6$F$_5$)$_4$] was dissolved in n-propanol (4 ml) to give an orange solution. After stirring for fifteen minutes, the solvent was removed under vacuum to yield an off-white solid. Proton NMR analysis showed that all the coordinated diethyl ether was replaced. The product was characterized as being Li(HO-n-Pr)$_3$[B(C$_6$F$_5$)$_4$].

Activator 11

Preparation of Li(HO-t-Bu)$_3$[B(C$_6$F$_5$)$_4$]

tert-Butanol (0.21 ml) was added to 0.50 g of Li(OEt$_2$)$_{2.5}$[B(C$_6$F$_5$)$_4$] dissolved in dichloromethane (10 ml) to yield a clear, colorless solution. After stirring for one hour, the solvents were removed under vacuum to yield a white solid. Proton NMR analysis showed that all the coordinated diethyl ether had been removed. The product was characterized as Li(HO-t-BU)$_3$[B(C$_6$F$_5$)$_4$].

Activator 12

Preparation of Mixed Aluminate Activator Li[OC(CF$_3$)$_2$C$_6$H$_5$)$_4$]/Li[OC(CF$_3$)$_2$H)$_4$]

A mixture of Li[OC(CF$_3$)$_2$C$_6$H$_5$)$_4$] (0.143 g) and Li[OC(CF$_3$)$_2$H)$_4$] (0.100 g) were dissolved together in about 5 ml of Freon 112. After stirring for two hours at room temperature the solvent was removed in vacuo to give a white solid.

Activator 13

Preparation of [Li(HOMe)$_4$][B(O$_2$C$_6$Cl$_4$)$_2$]

At room temperature, 5.20 g of trimethoxyboron (B(OCH$_3$)$_3$ was added drop wise in a dry box to a 50 ml volume of a 1 M solution of lithium methoxide in methanol. The reaction was stirred at room temperature for 24 hours and the solvent then removed under vacuum to give the desired product lithium tetramethylborate, Li[B(OMe)$_4$], in quantitative yield.

Tetrachlorocatechol (2.95 g) was dissolved/slurried in approximately 20 ml dichloromethane (not all the material was soluble). This material was added to a solution of lithium tetramethoxyborate (Li[B(OMe)$_4$] (0.75 g) in approximately 20 ml dichloromethane (again not all the material was soluble prior to addition). Upon mixing all the components dissolved. After approximately 30 minutes a white precipitate begins to form. The solution was filtered and the white solid dried (0.40 g). The purple solution was stripped almost to dryness and a white precipitate remained. This was filtered and the white solid collected (1.3 g). The solution was put in the freezer at −30° C. and after one hour crystals had grown. The solution was stored overnight and collected in the morning (1.18 g). Total yield=90% of Li(HOMe)$_4$[B(O$_2$C$_6$Cl$_4$)$_2$]. Mass spectra should that all the materials were the same product. Thermogravimetric analysis (TGA) was employed to determine the number of methanol molecules and a single X-ray determination confirmed the structure as Li(HOMe)$_4$[B(O$_2$C$_6$Cl$_4$)$_2$]. The molecular structure of this activator is depicted in FIG. 1.

Activator 14

Preparation of Li[B(O$_2$C$_6$H$_2$-3,5-CMe$_3$)$_2$]

3,5-di-tert-butylcatechol (2.0 g) and lithium tetramethoxyborate (Li[B(OMe)$_4$] (0.61 g) were reacted in acetonitrile (30 ml) at room temperature. The reactants dissolved completely in the solvent and the solution turned green after about 15 minutes, blue after about one hour. After stirring overnight the mixture was stripped to dryness and a bluish solid obtained. The product was characterized by proton NMR to be quite pure Li[B(O$_2$C$_6$H$_2$-3,5-CMe$_3$)$_2$] and found to contain an undetermined amount of solvated acetonitrile.

Activator 15

Preparation of Li(solvent)$_x$[B(O$_2$C$_6$Br$_4$)$_2$]

Tetrabromocatechol (1.0 g) and lithium tetramethoxyborate (Li[B(OMe)$_4$] (0.61 g) were reacted in acetonitrile (30 ml) at room temperature. The reactants dissolved completely in the solvent and the solution turned green after about 15 minutes, blue after about 1 hour. After stirring overnight the mixture was stripped to dryness and an off-white solid obtained. The product was characterized by proton NMR to be quite pure Li(HOMe)$_4$[B(O$_2$C$_6$Br$_4$)$_2$]. Alternatively, the solvent could be solvating acetonitrile.

Activator 16

Preparation of 4-tert-butyl-N,N-dimethylanilinium tetrakispentafluorophenyl-borate To a solution of 4-tert-butyl-N,N-dimethylanilinium chloride (36.8 mg) in 3 ml methylene chloride was added LiFABA in 2 ml methylene chloride. After stirring 0.5 hours, LiCl was filtered off, and the solvent removed under vacuum to give a white foam. Recrystallization from ethyl ether/hexane gave the product as a white crystalline solid.

Activator 17

Preparation of Lithium (trisperfluorophenyl)(hexyl)borate

To a stirred solution of 17 mg trisperfluorophenylboron in 3 ml methylene chloride was added hexyllithium (13.3 μl of a 2.5 M solution in hexane). After stirring for 1 hour, 1 ml ethyl ether was added, stirred for several minutes, and the solvent removed to give the product as a colorless oil.

COMPARATIVE EXAMPLE 1

Polymerization of hexylnorbornene

A reactant ratio of monomer:procatalyst:activator=2,000:1:1. Trityl tetrakis(pentafluorophenyl)borate (36 mg) was stirred in 9 g of hexylnorbornene. To this suspension was added palladiumbis(acetylacetonate) (Pd(acetylacetonate)$_2$) (9 mg) in 1 g of hexylnorbornene. The suspension was stirred at room temperature for 3 hours during which time the solution viscosity increased slightly. After 54 hours of stirring at room temperature a hard yellow puck was obtained. Yield by TGA=98.0%.

EXAMPLE 1

A two-component polymerization system was prepared giving a reactant ratio of monomer:procatalyst:activator=10,000:1:2. Component A: LiWCA-H (9.4 mg) was dissolved in 1.0 g methylnorbornene. Component B: 5.0 mg (allyl)Pd(O$_2$CCF$_3$)PCy$_3$ was dissolved in 9.0 g methylnorbornene. A and B components were injected into a high-pressure reactor at 55° C. and the pressure raised to 900 psi. After 10 min. a solid object was removed from the reactor. Yield by TGA=83.4%.

EXAMPLE 2

A two-component polymerization system was prepared giving a reactant ratio of monomer:procatalyst:activator=10,000:1:2. Component A: LiFABA (9.8 mg) was dissolved in 0.71 g triethoxysilylnorbornene. Component B: 3.0 mg (allyl)Pd(O$_2$CCF$_3$)PCy$_3$ was dissolved in 9.5 g hexylnorbornene. A and B components were mixed at 60° C. A solid object was obtained. Yield by TGA=96.0%.

EXAMPLE 3

A two-component polymerization system was prepared giving a reactant ratio of monomer:procatalyst:activator=10,000:1:2. Component A: LiFABA (9.8 mg) was dissolved in 0.71 g triethoxysilylnorbornene and 0.50 g hexylnorbornene. Component B: 3.3 mg (allyl)Pd(O$_3$SCF$_3$)PCy$_3$ was dissolved in 9.0 g hexylinorbornene. A and B components were mixed at 55° C. and the following reaction parameters describe the reaction: $t_{gel}$=40 s, $t_{100°\ C.}$=50 s, $t_{200°\ C.}$=55 s, $t_{Tmax}$=110 s, $t_{gel}$=85° C., $t_{Tmax}$=257° C. A solid object was obtained. Yield by TGA=96.4%.

EXAMPLE 4

A two-component polymerization system was prepared giving a reactant ratio of monomer:procatalyst:activator=10,000:1:2. Component A: NaBAr$_f$(10.0 mg) was dissolved in 0.71 g triethoxysilylnorbornene and 0.50 g hexylnorbornene. Component B: 4.1 mg (PCy$_3$)$_2$Pd(H)(NO$_3$) was dissolved in 9.0 g hexylnorbornene. A and B components were mixed at 55° C. and the following reaction parameters describe the reaction: $t_{gel}$=6 min., $t_{100°\ C.}$=6:20 min., $t_{200°\ C.}$=6:40 min., $t_{Tmax}$=7:20 min., $t_{gel}$=85° C., $t_{Tmax}$=235° C. A solid object was obtained. Yield by TGA=96.1%.

EXAMPLE 5

A two-component polymerization system was prepared giving a reactant ratio of monomer:procatalyst:activator=10,000:1:2. Component A: LiWCA-H (11.2 mg) was dissolved in 1.0 g hexylnorbornene. Component B: 3.2 mg (allyl)Pd(O$_3$SCF$_3$)PCy$_3$ was dissolved in 9.0 g hexylnorbornene. A and B components were mixed at 60° C. and the following reaction parameters describe the reaction: $t_{gel}$=2 s, $t_{200°\ C.}$=5 s, $t_{Tmax}$=15 s, $t_{Tmax}$=216° C. A solid object was obtained. Yield by TGA=97.2%. Swell in toluene overnight: 133%.

EXAMPLE 6

A two-component polymerization system was prepared giving a reactant ratio of monomer:procatalyst:activator=10,000:1:2. Component A: LiFABA (9.8 mg) was dissolved in 0.71 g triethoxysilylnorbornene and 0.50 g hexylnorbornene. Component B: 4.1 mg (PCy$_3$)$_2$Pd(H)(NO$_3$) was dissolved in 9.0 g hexylnorbornene. A and B components were mixed at 58° C. and the following reaction parameters describe the reaction: $t_{gel}$=120 s, $t_{100°\ C.}$=128 s, $t_{200°\ C.}$=130 s, $t_{Tmax}$=180 s, $t_{gel}$=86° C., $t_{Tmax}$=207° C. A solid object was obtained. Yield by TGA=96.1%.

EXAMPLE 7

A two-component polymerization system was prepared giving a reactant ratio of monomer:procatalyst:activator=10,000:1:2. Component A: LiFABA (9.8 mg) was dissolved in 0.71 g triethoxysilylnorbornene and 0.50 g hexylnorbornene containing 2.0% Kraton® 1726. Component B: 3.3 mg (allyl)Pd(O$_3$SCF$_3$)PCy$_3$ was dissolved in 9.0 g hexylnorbornene containing 2.0% Kraton® 1726. A and B components were mixed at 60° C. and the following reaction parameters describe the reaction: $t_{gel}$=10 s, $t_{100°\ C.}$=15 s, $t_{200°\ C.}$=19 s, $t_{Tmax}$=45 s, $t_{gel}$=85° C., $t_{Tmax}$=211° C. A solid object was obtained. Yield by TGA=95.9%.

EXAMPLE 8

A two-component polymerization system was prepared giving a reactant ratio of monomer:procatalyst:activator=10,000:1:2. Component A: LiFABA (9.8 mg) was dissolved in 0.71 g triethoxysilylnorbornene and 0.50 g hexylnorbornene containing 2.0% Kraton® 1101. Component B: 3.3 mg (allyl)Pd(O$_3$SCF$_3$)PCy$_3$ was dissolved in 9.0 g hexylnorbornene containing 2.0% Kraton® 1101. A and B components were mixed at 60° C. and the following reaction parameters describe the reaction: $t_{gel}$=20 s, $t_{100°\ C.}$=24 s, $t_{200°\ C.}$=26 s, $t_{Tmax}$=60 s, $t_{gel}$=85° C., $t_{Tmax}$=211° C. A solid object was obtained. Yield by TGA=95.8%.

EXAMPLE 9

A two-component polymerization system was prepared giving a reactant ratio of monomer:procatalyst:activator=10,000:1:2. Component A: LiFABA (9.8 mg) was dissolved in 0.71 g triethoxysilylnorbornene. Component B: 3.3 mg (allyl)Pd(O$_3$SCF$_3$)PCy$_3$ was dissolved in 8.5 g hexylnorbornene and 0.90 g tetracyclodocecadiene. A and B components were mixed at 60° C. and the following reaction parameters describe the reaction: $t_{gel}$=15 s, $t_{100° C.}$=20 s, $t_{200° C.}$=33 s, =140 s, $t_{gel}$=75° C., $t_{Tmax}$210° C. A solid object was obtained. Yield by TGA=89.1%.

EXAMPLE 10

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.7 mg (allyl)Pd(O$_3$SCF$_3$)PCy$_3$ was dissolved in 9.5 g hexylnorbornene. A and B components were mixed at 60° C. and the following reaction parameters describe the reaction: $t_{gel}$=30 s, $t_{100° C.}$=40 s, $t_{200° C.}$=46 s, $t_{Tmax}$=75 s, $t_{gel}$=85° C., $t_{Tmax}$=213° C. A solid object was obtained. Yield by TGA=95.0%.

EXAMPLE 11

A two-component polymerization system was prepared giving a reactant ratio of monomer:procatalyst:activator=5,000:1:1. Component A: DANFABA (N,N-dimethylaniliniumtetrakis(pentafluorophenyl)borate) (9.0 mg) was dissolved in 0.71 g triethoxysilylnorbornene. Component B: 6.7 mg (allyl)Pd(C$_6$F$_5$)PCy$_3$ was dissolved in 9.5 g hexylnorbornene. A and B components were mixed at 60° C. and the following reaction parameters describe the reaction: $t_{gel}$=2:00 min., $t_{100° C.}$=2:30 min., $t_{200° C.}$=2:35 min., $t_{Tmax}$=3:00 min., $t_{gel}$=75° C., $t_{Tmax}$=214° C. A solid object was obtained. Yield by TGA=95.6%.

EXAMPLE 12

A two-component polymerization system was prepared giving a reactant ratio of monomer:procatalyst:activator=10,000:1:2. Component A: LiWCA-H (11.3 mg) was dissolved in 0.71 g triethoxysilylnorbornene. Component B: 3.2 mg (allyl)Pd(O$_3$SCF$_3$)PCy$_3$ was dissolved in 9.5 g hexylnorbornene. A and B components were mixed at 60° C. and the following reaction parameters describe the reaction: $t_{gel}$=26 s, $t_{100° C.}$=29 s, $t_{200° C.}$=34 s, $t_{Tmax}$=55 s, $t_{gel}$=98° C., $t_{Tmax}$=208° C. A solid object was obtained. Yield by TGA=94.2%.

EXAMPLE 13

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 8.5 g hexylnorbornene and 0.90 g tetracyclodocecadiene. A and B components were mixed at 60° C. and the following reaction parameters describe the reaction: $t_{gel}$=22 s, $t_{100° C.}$=38 s, $t_{200° C.}$=75 s, $t_{Tmax}$=105 s, $t_{gel}$=76° C., $t_{Tmax}$=203° C. A solid object was obtained. Yield by TGA=88.2%. Swell in toluene overnight: 66%.

EXAMPLE 14

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 g (allyl)Pd(O$_3$SCF$_3$)PCy$_3$ was dissolved in 8.5 g hexylnorbornene and 1.0 g norbornadiene dimer. A and B components were mixed at 60° C. and the following reaction parameters describe the reaction: $t_{gel}$=13 s, $t_{100° C.}$=24 s, $t_{200° C.}$=40 s, $t_{Tmax}$=75 s, $t_{gel}$=73° C., $t_{Tmax}$=203° C. A solid object was obtained. Yield by TGA=88.2%. Swell in toluene overnight: 42%.

EXAMPLE 15

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 9.7 g hexylnorbornene containing 2.0% Kraton® 1657. A and B components were mixed at 60° C. and the following reaction parameters describe the reaction: $t_{gel}$=24 s, $t_{100° C.}$=30 s, to 200oc=36 s, $t_{Tmax}$=70 s, $t_{gel}$=80° C., $t_{Tmax}$=212° C. A solid object was obtained. Yield by TGA=95.7%.

EXAMPLE 16

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 9.5 g hexylnorbornene. A and B components were mixed at 80° C. and the following reaction parameters describe the reaction: $t_{gel}$=15 s, $t_{100° C.}$=15 s, $t_{200° C.}$=26 s, $t_{Tmax}$=55 s, $t_{gel}$=100° C., $t_{Tmax}$=224° C. A solid object was obtained. Yield by TGA=90.8%.

EXAMPLE 17

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 9.5 g hexylnorbornene. A and B components were mixed at 100° C. and the following reaction parameters describe the reaction: $t_{gel}$=6 s, t 200° C.=16 s, $t_{Tmax}$=45 s, $t_{gel}$=130° C., $t_{Tmax}$=235° C. A solid object was obtained. Yield by TGA=88.7%.

EXAMPLE 18

A two-component polymerization system was prepared giving a reactant ratio of monomer:procatalyst:activator=20,000:1:2. Component A: LiFABA (96 mg) was dissolved in 13.97 g triethoxysilylnorbornene. Component B: 31.7 mg (allyl)Pd(O$_3$SCF$_3$)PCy$_3$ was dissolved in 186 g hexylnorbornene. A and B components were mixed at 60° C., stirred for 15 s and the solution poured into a 19×8 cm aluminum pan. A solid object was obtained. Yield by TGA=95.0%.

EXAMPLE 19

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 9.5 g hexylnorbornene. A and B components were mixed at 28° C. and the following reaction parameters describe the reaction: $t_{gel}$=3:30 min., $t_{100° C.}$=5:20 min., $t_{Tmax}$=5:35, $t_{gel}$=40° C., $t_{Tmax}$=174° C. A solid object was obtained. Yield by TGA=98.1%.

EXAMPLE 20

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.7 mg (allyl)Pd(O$_3$C$_6$H$_4$CH$_3$)PCy$_3$ was dissolved in 9.5 g hexylnorbornene. A and B components were mixed at 60° C. and the following reaction parameters describe the reaction: $t_{gel}$=1:30 min., $t_{100°\ C.}$=1:45 min., $t_{200°\ C.}$=2:08 min., $t_{Tmax}$=2:30 min., $t_{gel}$=80° C., $t_{Tmax}$=207° C. A solid object was obtained. Yield by TGA=95.1%.

EXAMPLE 21

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 9.9 g hexylnorbornene containing 4.0% Kraton® 1657. A and B components were mixed at 60° C. and the following reaction parameters describe the reaction: $t_{gel}$=26 s, $t_{100°\ C.}$=35 s, $t_{200°\ C.}$=44 s, $t_{Tmax}$=80 s, $t_{gel}$=74° C., $t_{Tmax}$=205° C. A solid object was obtained. Yield by TGA=94.8%.

EXAMPLE 22

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)(PdO$_3$SCF$_3$)PCy$_3$ was dissolved in 4.76 g hexylnorbornene and 4.56 g phenylnorbornene. A and B components were mixed at 60° C. and the following reaction parameters describe the reaction: $t_{gel}$=1:20 min., $t_{100°\ C.}$=3:00 min., $t_{200°\ C.}$=3:30 min., $t_{Tmax}$=4:00, $t_{gel}$=74° C., $t_{Tmax}$=211° C. A solid object was obtained. Yield by TGA=92.5%.

EXAMPLE 23

A two-component polymerization system was prepared giving a reactant ratio of monomer:procatalyst:activator=20,000:1:1. Component A: LiFABA (2.5 mg) was dissolved in 0.71 g triethoxysilylnorbornene. Component B: 1.6 mg (allyl)Pd(O$_3$SCF$_3$)PCy$_3$ was dissolved in 9.5 g hexylnorbornene. A and B components were mixed at 60° C. and the following reaction parameters describe the reaction: $t_{gel}$=55 s, $t_{100°\ C.}$=75 s, $t_{200°\ C.}$=90 s, $t_{Tmax}$=110 s, $t_{gel}$=78° C., $t_{Tmax}$=209° C. A solid object was obtained. Yield by TGA=94.9%.

EXAMPLE 24

A two-component polymerization system was prepared giving a reactant ratio of monomer:procatalyst:activator=20,000:1:2. Component A: LiFABA (339 mg) was dissolved in 60 g triethoxysilylnorbornene. Component B: 112 mg (allyl)Pd(O$_3$SCF$_3$)PCy$_3$ was dissolved in 718 g hexylnorbornene and 75.1 g tetracyclodocecadiene. A and B components were mixed at 60° C. A solid object was obtained. Yield by TGA=89.4%.

EXAMPLE 25

A two-component polymerization system was prepared giving a reactant ratio of monomer:procatalyst:activator=15,000:1:2. Component A: LiFABA (6.5 mg) was dissolved in 0.71 g triethoxysilylnorbornene. Component B: 2.2 mg (allyl)Pd(O$_3$SCF$_3$)PCy$_3$ was dissolved in 8.5 g hexylnorbornene and 0.90 g tetracyclodocecadiene. A and B components were mixed at 60° C. and the following reaction parameters describe the reaction: $t_{gel}$=15 s. $t_{100°\ C.}$=25 s. $t_{Tmax}$=60 s, $t_{gel}$=75° C., $t_{Tmax}$=197° C. A solid object was obtained. Yield by TGA=89.4%.

EXAMPLE 26

A two-component polymerization system was prepared giving a reactant ratio of monomer:procatalyst:activator=20,000:1:2. Component A: LiFABA (361 mg) was dissolved in 52.6 g triethoxysilylnorbornene. Component B: 119 mg (allyl)Pd(O$_3$SCF$_3$)PCy$_3$ was dissolved in 702 g hexylnorbornene. A and B components were mixed at 60° C. and the following reaction parameters describe the reaction: $t_{gel}$=35 s, $t_{100°\ C.}$=50 s, $t_{200°\ C.}$=57 s, $t_{Tmax}$=80 s, $t_{gel}$=80° C., $t_{Tmax}$=217° C. A solid object was obtained. Yield by TGA=94.2%.

EXAMPLE 27

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 9.5 g hexylnorbornene. A and B components were mixed at 40° C. and the following reaction parameters describe the reaction: $t_{gel}$=1:40 min., $t_{100°\ C.}$=2:15, $t_{Tmax}$=2:45 min., $t_{gel}$=60° C., $t_{Tmax}$=190° C. A solid object was obtained. Yield by TGA=97.14%.

EXAMPLE 28

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 9.5 g hexylnorbornene. A and B components were mixed at 50° C. and the following reaction parameters describe the reaction: $t_{gel}$=1:05 min., $t_{100°\ C.}$=1:33 min., $t_{200°\ C.}$=1:44 min., $t_{Tmax}$=2:00 min., $t_{gel}$=67° C., $t_{Tmax}$=203° C. A solid object was obtained. Yield by TGA=96.3%.

EXAMPLE 29

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 8.7 g hexylnorbornene containing 4.0% Kraton® 1657 and 0.9 g tetracyclodocadiene. A and B components were mixed at 50° C. and the following reaction parameters describe the reaction: $t_{gel}$=44 s, $t_{100°\ C.}$=1:23 min., $t_{Tmax}$=2:30, $t_{gel}$=60° C., $t_{Tmax}$=191° C. A solid object was obtained. Yield by TGA=89.3%.

EXAMPLE 30

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd(O$_3$SCF$_3$)PCy$_3$ was dissolved in 8.5 g hexylnorbornene and 1.2 g 5,5'-(1,2-ethanediyl)bisbicyclo[2.2.1]hept-2-ene. A and B components were mixed at 60° C. and the following reaction parameters describe the reaction: $t_{gel}$=20 s, $t_{100°\ C.}$=40 s, $t_{200°\ C.}$=43 s, $t_{Tmax}$=75 s, $t_{gel}$=64° C., $t_{Tmax}$=209° C. A solid object was obtained. Yield by TGA=92.5%.

EXAMPLE 31

A two-component polymerization system was prepared giving a reactant ratio of monomer:procatalyst:activator=20,000:1:2. Component A: LiWCA-H (5.7 mg) was dissolved in 1.0 g hexylnorbornene. Component B: 1.6 mg (allyl)Pd($O_3SCF_3$)$PCy_3$ was dissolved in 8.5 g hexylnorbornene and 0.60 g 5,5'-(1,2-ethanediyl)bisbicyclo[2.2.1]hept-2-ene. A and B components were mixed at 45° C. and the following reaction parameters describe the reaction: $t_{gel}$=15 s, $t_{100° C.}$=23 s, $t_{Tmax}$=42 s, $t_{gel}$=55° C., $t_{Tmax}$=197° C. A solid object was obtained. Yield by TGA=93.3%. Swell in toluene overnight: 71%.

EXAMPLE 32

A two-component polymerization system was prepared giving a reactant ratio of monomer:procatalyst:activator=20,000:1:2. Component A: LiWCA-H (5.7 mg) was dissolved in 1.0 g hexylnorbornene. Component B: 1.6 mg (allyl)Pd($O_3SCF_3$)$PCy_3$ was dissolved in 8.0 g hexylnorbornene and 1.2 g 5,5'-(1,2-ethanediyl)bisbicyclo[2.2.1]hept-2-ene. A and B components were mixed at 45° C. and the following reaction parameters describe the reaction: $t_{gel}$=14 s, $t_{100° C.}$=22 s, $t_{Tmax}$=50 s, $t_{gel}$=56° C., $t_{Tmax}$=197° C. A solid object was obtained. Yield by TGA=90.8%. Swell in toluene overnight: 83%.

EXAMPLE 33

A two-component polymerization system was prepared giving a reactant ratio of monomer:procatalyst:activator=20,000:1:2. Component A: LiFABA (4.9 mg) was dissolved in 1.43 g triethoxysilylnorbornene. Component B: 1.6 mg (allyl)Pd($O_3SCF_3$)$PCy_3$ was dissolved in 8.0 g hexylnorbornene and 1.2 g 5,5'-(1,2-ethanediyl)bisbicyclo[2.2.1]hept-2-ene. A and B components were mixed at 45° C. and the following reaction parameters describe the reaction: $t_{gel}$=1:45 min., $t_{100° C.}$=3:20 min., $t_{175° C.}$=3:30 min., $t_{Tmax}$=4:00, $t_{gel}$=55° C., $t_{Tmax}$=180° C. A solid object was obtained. Yield by TGA=92.4%.

EXAMPLE 34

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd($O_3SCF_3$)$PCy_3$ was dissolved in 8.5 g hexylnorbornene and 1.2 g 5,5'-(1,2-ethanediyl)bisbicyclo[2.2.1]hept-2-ene. A and B components were mixed at 45° C. and the following reaction parameters describe the reaction: $t_{gel}$=55 s, $t_{100° C.}$=2:00 min., $t_{Tmax}$=2:20 min., $t_{gel}$=54° C., $t_{Tmax}$=192° C. A solid object was obtained. Yield by TGA=92.6%.

EXAMPLE 35

A two-component polymerization system was prepared giving a reactant ratio of monomer:procatalyst:activator:moderator=20,000:1:2:1. Component A: LiFABA (4.9 mg) was dissolved in 0.71 g triethoxysilylnorbornene. Component B: 1.6 mg (allyl)Pd($O_3SCF_3$)$PCy_3$ and 0.8 mg tricyclohexylphosphine were dissolved in 9.5 g hexylnorbornene. A and B components were mixed at 45° C. and the following reaction parameters describe the reaction: $t_{gel}$=1:45 min., $t_{100° C.}$=2:25, $t_{Tmax}$=2:45 min., $t_{gel}$=62° C., $t_{Tmax}$=197° C. A solid object was obtained. Yield by TGA=97.7%.

EXAMPLE 36

A two-component polymerization system was prepared giving a reactant ratio of monomer:procatalyst:activator:moderator=20,000:1:2:2. Component A: LiFABA (4.9 mg) was dissolved in 0.71 g triethoxysilylnorbornene. Component B: 1.6 mg (allyl)Pd($O_3SCF_3$)$PCy_3$ and 1.6 mg tricyclohexylphosphine were dissolved in 9.5 g hexylnorbornene. A and B components were mixed at 50° C. and the following reaction parameters describe the reaction: $t_{gel}$=5:00 min., $t_{100° C.}$=6:20, $t_{Tmax}$=7:00 min., $t_{gel}$=64° C., $t_{Tmax}$=182° C. A solid object was obtained. Yield by TGA=97.4%.

EXAMPLE 37

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd($O_3SCF_3$)$PCy_3$ was dissolved in 8.5 g hexylnorbornene and 1.2 g 5,5'-(1,2-ethanediyl)bisbicyclo[2.2.1]hept-2-ene. A and B components were mixed at 45° C. A solid object was obtained. Yield by TGA=92.7%.

EXAMPLE 38

A two-component polymerization system was prepared giving a reactant ratio of monomer:procatalyst:activator:activator=20,000:1:1:1. Component A: LiFABA (2.4 mg) and LiWCA-H (2.9 mg) were dissolved in 0.71 g of triethoxysilylnorbornene. Component B: 1.6 mg (allyl)Pd($O_3SCF_3$)$PCy_3$ was dissolved in 9.5 g hexylnorbornene. A and B components were mixed at 45° C. and the following reaction parameters describe the reaction: $t_{gel}$=1:10 min., $t_{100° C.}$=1:40 min., $t_{Tmax}$=1:55 min., $t_{gel}$=68° C., $t_{Tmax}$=198° C. A solid object was obtained. Yield by TGA=97.2%.

EXAMPLE 39

A two-component polymerization system was prepared giving a reactant ratio of monomer:procatalyst:activator=20,000:1:5. Component A: LiFABA (12.2 mg) was dissolved in 0.71 g triethoxysilylnorbornene. Component B: 1.6 mg (allyl)Pd($O_3SCF_3$)$PCy_3$ was dissolved in 9.5 g hexylnorbornene. A and B components were mixed at 45° C. and the following reaction parameters describe the reaction: $t_{gel}$=1:20 min., $t_{100° C.}$=1:50 min., $t_{Tmax}$=2:15 min., $t_{gel}$=64° C., $t_{Tmax}$=193° C. A solid object was obtained. Yield by TGA=96.8%.

EXAMPLE 40

A two-component polymerization system was prepared giving a reactant ratio of monomer:procatalyst:activator=20,000:1:2. Component A: LiFABA (4.9 mg) was dissolved in 0.71 g triethoxysilylnorbornene. Component B: 1.6 mg (allyl)Pd($O_3SCF_3$)$PCy_3$ was dissolved in 8.5 g hexylnorbornene and 0.6 g methylnorbornene. A and B components were mixed at 45° C. and the following reaction parameters describe the reaction: $t_{gel}$=1:30 min., $t_{100° C.}$=2:05 min., $t_{200° C.}$=2:20 min., $t_{Tmax}$=2:22 min., $t_{gel}$=62° C., $t_{Tmax}$=201° C. A solid object was obtained. Yield by TGA=96.9%.

EXAMPLE 41

A two-component polymerization system was prepared giving a reactant ratio of monomer:procatalyst:activator=20,000:1:2. Component A: LiFABA (4.9 mg) was dissolved in 1.27 g triethoxysilylnorbornene. Component B: 2.0 mg (allyl)Pd($O_3SCF_3$)$PCy_3$ was dissolved in 10.3 g methylnorbornene. A and B components were injected into a high pressure reactor at 50° C. and the pressure raised to 900 psi. The following reaction parameters describe the reaction: $t_{100°C.}$=40 s, $t_{200°C.}$=42 s, $t_{Tmax}$=1:40 min., $t_{Tmax}$=250° C. A solid object was obtained. Yield by TGA=84.8%.

EXAMPLE 42

A two-component polymerization system was prepared giving a reactant ratio of monomer:procatalyst:activator=30,000:1:2. Component A: LiWCA-H (3.8 mg) was dissolved in 1.0 g hexylnorbornene. Component B: 1.1 mg (allyl)Pd ($O_3SCF_3$)$PCy_3$ was dissolved in 9.0 g hexylnorbornene. A and B components were mixed at 45° C. and the following reaction parameters describe the reaction: $t_{gel}$=10 s, $t_{100°C.}$=22 s, $t_{200°C.}$=39 s, $t_{Tmax}$=55 s, $t_{gel}$=65° C., $t_{Tmax}$=202° C. A solid object was obtained. Yield by TGA=95.8%.

EXAMPLE 43

A two-component polymerization system was prepared giving a reactant ratio of monomer:procatalyst:activator=20,000:1:2. Component A: LiWCA-H (5.7 mg) was dissolved in 1.0 g hexylnorbornene. Component B: 1.6 mg (allyl)Pd ($O_3SCF_3$)$PCy_3$ was dissolved in 8.8 g hexylnorbornene and 0.18 g tetracyclodocecadiene. A and B components were mixed at 45° C. and the following reaction parameters describe the reaction: $t_{gel}$=9 s, $t_{100°C.}$=15 s, $t_{200°C.}$=36 s, $t_{Tmax}$=50 s, $t_{gel}$=60° C., $t_{Tmax}$=201° C. A solid object was obtained. Yield by TGA=93.8%. Swell in toluene overnight: 157%.

EXAMPLE 44

A two-component polymerization system was prepared giving a reactant ratio of monomer:procatalyst:activator=20,000:1:2. Component A: LiWCA-H (5.7 mg) was dissolved in 1.0 g hexylnorbornene. Component B: 1.6 mg (allyl)Pd ($O_3SCF_3$)$PCy_3$ was dissolved in 8.5 g hexylnorbornene and 0.44 g tetracyclodocecadiene. A and B components were mixed at 45° C. and the following reaction parameters describe the reaction: $t_{gel}$=7 s, $t_{100°C.}$=12 s, $t_{200°C.}$=18 s, $t_{Tmax}$=43 s, $t_{gel}$=60° C., $t_{Tmax}$=206° C. A solid object was obtained. Yield by TGA=91.9%. Swell in toluene overnight: 106%.

EXAMPLE 45

A two-component polymerization system was prepared giving a reactant ratio of monomer:procatalyst:activator=20,000:1:2. Component A: LiWCA-H (5.7 mg) was dissolved in 1.0 g hexylnorbornene. Component B: 1.6 mg (allyl)Pd ($O_3SCF_3$)$PCy_3$ was dissolved in 8.8 g hexylnorbornene and 0.24 g 5,5'-(1,2-ethanediyl)bisbicyclo[2.2.1]hept-2-ene. A and B components were mixed at 45° C. and the following reaction parameters describe the reaction: $t_{gel}$=7 s, $t_{100°C.}$=12 s, $t_{200°C.}$=18 s, $t_{Tmax}$=43 s, $t_{gel}$=60° C., $t_{Tmax}$=206° C. A solid object was obtained. Yield by TGA=95.5%. Swell in toluene overnight: 108%.

EXAMPLE 46

A two-component polymerization system was prepared giving a reactant ratio of monomer:procatalyst:activator=60,000:1:2. Component A: LiWCA-H (1.9 mg) was dissolved in 1.0 g hexylnorbornene. Component B: 0.6 mg (allyl)Pd ($O_3SCF_3$)$PCy_3$ was dissolved in 9.0 g hexylnorbornene. A and B components were mixed at 45° C. and the following reaction parameters describe the reaction: $t_{gel}$=30 s, $t_{100°C.}$=55 s, $t_{Tmax}$=1:30 min., $t_{gel}$=60° C., $t_{Tmax}$=199° C. A solid object was obtained. Yield by TGA=95.6%.

EXAMPLE 47

A two-component polymerization system was prepared giving a reactant ratio of monomer:procatalyst:activator=20,000:1:1. Component A: LiWCA-H (2.8 mg) was dissolved in 1.0 g hexylnorbornene. Component B: 1.6 mg (allyl)Pd ($O_3SCF_3$)$PCy_3$ was dissolved in 8.8 g hexylnorbornene and 0.24 g 5,5'-(1,2-ethanediyl)bisbicyclo[2.2.1]hept-2-ene. A and B components were mixed at 45° C. and the following reaction parameters describe the reaction: $t_{gel}$=14 s, $t_{100°C.}$=21 s, $t_{200°C.}$=35 s, $t_{Tmax}$=50 s, $t_{gel}$=60° C., $t_{Tmax}$=202° C. A solid object was obtained. Yield by TGA=95.8%. Swell in toluene overnight: 108%.

EXAMPLE 48

A two-component polymerization system was prepared giving a reactant ratio of monomer:procatalyst:activator=50,000:1:1. Component A: LiWCA-H (1.6 mg) was dissolved in 1.0 g hexylnorbornene. Component B: 0.6 mg (allyl)Pd ($O_3SCF_3$)$PCy_3$ was dissolved in 8.8 g hexylnorbornene and 0.24 g 5,5'-(1,2-ethanediyl)bisbicyclo[2.2.1]hept-2-ene. A and B components were mixed at 45° C. and the following reaction parameters describe the reaction: $t_{gel}$=48 s, $t_{100°C.}$=1:55 min., $t_{150°C.}$=2:13 min., $t_{Tmax}$=2:45 min., $t_{gel}$=55° C., $t_{Tmax}$=187° C. A solid object was obtained. Yield by TGA=93.8%.

EXAMPLE 49

A two-component polymerization system was prepared giving a reactant ratio of monomer:procatalyst:activator:moderator=20,000:1:1:1. Component A: LiWCA-H (2.8 mg) was dissolved in 1.0 g hexylnorbornene. Component B: 1.6 mg (allyl)Pd($O_3SCF_3$)$PCy_3$ and 0.8 mg tricyclohexylphosphine was dissolved in 8.8 g hexylnorbornene and 0.24 g 5,5'-(1,2-ethanediyl)bisbicyclo[2.2.1]hept-2-ene. A and B components were mixed at 45° C. and the following reaction parameters describe the reaction: $t_{gel}$=2:00 min., $t_{100°C.}$=7:30 min., $t_{150°C.}$=8:30 min., $t_{Tmax}$=10:00 min., $t_{gel}$=55° C., $t_{Tmax}$=166° C. A solid object was obtained. Yield by TGA=96.5%. $T_g$ by DMA=307° C.

EXAMPLE 50

A two-component polymerization system was prepared giving a reactant ratio of monomer:procatalyst:activator=20,000:1:1. Component A: LiWCA-H (2.8 mg) was dissolved in 1.0 g hexylnorbornene. Component B: 1.6 mg (allyl)Pd ($O_3SCF_3$)$PCy_3$ was dissolved in 8.0 g hexylnorbornene and 0.61 g methylnorbornene. A and B components were mixed at 45° C. and the following reaction parameters describe the reaction: $t_{gel}$=15 s, $t_{100°C.}$=18 s, $t_{200°C.}$=25 s, $t_{Tmax}$=35 s, $t_{gel}$=68° C., $t_{Tmax}$=210° C. A solid object was obtained. Yield by TGA=97.0%. $T_g$ by DMA=245° C.

EXAMPLE 51

A two-component polymerization system was prepared giving a reactant ratio of monomer:procatalyst:activator:moderator=20,000:1:1:0.1. Component A: LiWCA-H (2.8 mg) was dissolved in 1.0 g hexylnorbornene. Component B: 1.6 mg (allyl)Pd($O_3SCF_3$) $PCy_3$ and 0.08 mg of tricyclohexylphosphine were dissolved in 9.0 g hexylnorbornene. A and B components were mixed at 45° C. and the following reaction parameters describe the reaction: $t_{gel}$=16 s, $t_{100°\ C.}$=25 s, $t_{200°\ C.}$=40 s, $t_{gel}$=60° C., $t_{Tmax}$=200° C. A solid object was obtained. Yield by TGA=95.7%.

EXAMPLE 52

A two-component polymerization system was prepared giving a reactant ratio of monomer:procatalyst:activator:moderator=20,000:1:1:0.2. Component A: LiWCA-H (2.8 mg) was dissolved in 1.0 g hexylnorbornene. Component B: 1.6 mg (allyl)Pd(O$_3$SCF$_3$)PCy$_3$ and 0.16 mg of tricyclohexylphosphine were dissolved in 9.0 g hexylnorbornene. A and B components were mixed at 45° C. and the following reaction parameters describe the reaction: $t_{gel}$=14 s, $t_{100°\ C.}$=24 s, $t_{200°\ C.}$=40 s, $t_{gel}$=60° C., $t_{Tmax}$=200° C. A solid object was obtained. Yield by TGA 95.4%.

EXAMPLE 53

A two-component polymerization system was prepared giving a reactant ratio of monomer:procatalyst:activator=20,000:1:1. Component A: LiWCA-H (3.4 mg) was dissolved in 1.0 g hexylnorbornene. Component B: 1.9 mg (allyl)Pd(O$_3$SCF$_3$)PCy$_3$ was dissolved in 9.0 g hexylnorbornene. A and B components were mixed at 45° C. and the following reaction parameters describe the reaction: $t_{gel}$=24 s, $t_{100°\ C.}$=32 s, $t_{200°\ C.}$=37 s, $t_{Tmax}$=50 s, $t_{gel}$=70° C., $t_{Tmax}$=218° C. A solid object was obtained. Yield by TGA=88.8%.

EXAMPLE 54

A two-component polymerization system was prepared giving a reactant ratio of monomer:procatalyst:activator:moderator=20,000:1:1:0.5. Component A: LiWCA-H (2.8 mg) was dissolved in 1.0 g hexylnorbornene. Component B: 1.6 mg (allyl)Pd(O$_3$SCF$_3$)PCy$_3$ and 0.40 mg of tricyclohexylphosphine were dissolved in 9.0 g hexylnorbornene. A and B components were mixed at 45° C. and the following reaction parameters describe the reaction: $t_{gel}$=20 s, $t_{100°\ C.}$=33 s, $t_{200°\ C.}$=44 s, $t_{Tmax}$=52 s, $t_{gel}$=63° C., $t_{Tmax}$=202° C. A solid object was obtained. Yield by TGA=95.4%.

EXAMPLE 55

A two-component polymerization system was prepared giving a reactant ratio of monomer:procatalyst:activator=20,000:1:1. Component A: LiWCA-H (4.0 mg) was dissolved in 1.0 g hexylnorbornene. Component B: 2.3 mg (allyl)Pd(O$_3$SCF$_3$)PCy$_3$ was dissolved in 11.0 g hexylnorbornene. A and B components were injected into a high pressure reactor at 45° C., the pressure raised to 900 psi and the following reaction parameters describe the reaction: $t_{100°\ C.}$=13 s, $t_{200°\ C.}$=18 s, $t_{Tmax}$=35, $t_{Tmax}$=218° C. A solid object was obtained. Yield by TGA=89.0%.

EXAMPLE 56

A two-component polymerization system was prepared giving a reactant ratio of monomer:procatalyst:activator:moderator=20,000:1:1:1. Component A: LiWCA-H (2.8 mg) was dissolved in 1.0 g hexylnorbornene. Component B: 1.6 mg (allyl)Pd(O$_3$SCF$_3$)PCy$_3$ and 0.8 mg of tricyclohexylphosphine were dissolved in 9.0 g hexylnorbornene. A and B components were mixed at 45° C. and the following reaction parameters describe the reaction: $t_{gel}$=15 min., $t_{gel}$=55° C. A soft gel was obtained.

EXAMPLE 57

A two-component polymerization system was prepared giving a reactant ratio of monomer:procatalyst:activator=20,000:1:1. Component A: LiWCA-H (2.8 mg) was dissolved in 1.0 g hexylnorbornene. Component B: 1.6 mg (allyl)Pd(O$_3$SCF$_3$)PCy$_3$ was dissolved in 7.0 g hexylnorbornene and 1.22 g methylnorbornene. A and B components were mixed at 45° C. and the following reaction parameters describe the reaction: $t_{gel}$=40 s, $t_{100°\ C.}$=58 s, $t_{Tmax}$=63 s, $t_{gel}$=42° C., $t_{Tmax}$=181° C. A solid object was obtained. Yield by TGA=96.6%. $T_g$ by DMA=248° C.

EXAMPLE 58

A two-component polymerization system was prepared giving a reactant ratio of monomer:procatalyst:activator=20,000:1:1. Component A: LiWCA-H (2.8 mg) was dissolved in 1.0 g hexylnorbornene containing 2.0% Kraton® 1726. Component B: 1.6 mg (allyl)Pd(O$_3$SCF$_3$)PCy$_3$ was dissolved in 9.0 g hexylnorbornene containing 2.0% Kraton® 1726 and 0.24 g 5,5'-(1,2-ethanediyl)bisbicyclo[2.2.1]hept-2-ene. A and B components were mixed at 25° C. and the following reaction parameters describe the reaction: $t_{gel}$=36 s, $t_{100°\ C.}$=52 s, $T_{tmax}$=60 s, $t_{gel}$=37° C., $t_{Tmax}$=157° C. A solid object was obtained. Yield by TGA=97.8%. Swell in toluene overnight: 100%. Tg by DMA=292° C.

EXAMPLE 59

A two-component polymerization system was prepared giving a reactant ratio of monomer:procatalyst:activator=20,000:1:1. Component A: LiWCA-H (3.0 mg) was dissolved in 1.0 g hexylnorbornene. Component B: 1.7 mg (allyl)Pd(O$_3$SCF$_3$)PCy$_3$ was dissolved in 6.5 g hexylnorbornene and 1.9 g methylnorbornene. A and B components were mixed at 25° C. and the following reaction parameters describe the reaction: $t_{gel}$=55 s, $t_{100°\ C.}$=1:16 min., $t_{Tmax}$=63 s, $t_{gel}$=42° C., $t_{Tmax}$=181° C. A solid object was obtained. Yield by TGA=96.6%. Tg by DMA=245° C.

EXAMPLE 60

A two-component polymerization system was prepared giving a reactant ratio of monomer:procatalyst:activator=20,000:1:1. Component A: LiWCA-H (2.8 mg) was dissolved in 1.0 g hexylnorbornene containing 2.0% Kraton® 1726. Component B: 1.6 mg (allyl)Pd(O$_3$SCF$_3$)PCy$_3$ was dissolved in 7.0 g hexylnorbornene containing 2.0% Kraton® 1726 and 1.22 g methylnorbornene and 0.24 g 5,5'-(1,2-ethanediyl)bisbicyclo[2.2.1]hept-2-ene. A and B components were mixed at 25° C. and the following reaction parameters describe the reaction: $t_{gel}$=31 s, $t_{100°\ C.}$=41 s, $t_{Tmax}$=63 s, $t_{gel}$=44° C., $t_{Tmax}$=182° C. A solid object was obtained. Yield by TGA=96.8%. Swell in toluene overnight: 95%. Tg by DMA=277° C.

EXAMPLE 61

A two-component polymerization system was prepared giving a reactant ratio of monomer:procatalyst:activator=20,000:1:1. Component A: LiWCA-H (36.2 mg) was dissolved in 10 g hexylnorbornene. Component B: 20.7 mg (allyl)Pd(O$_3$SCF$_3$)PCy$_3$ was dissolved in 116 g hexylnorbornene and 3.1 g 5,5'-(1,2-ethanediyl)bisbicyclo[2.2.1]hept-2-ene. A and B components were mixed at 23° C. and the following reaction parameters describe the reaction: $t_{gel}$=2:00 min., $t_{100°\ C.}$=3:15, $t_{Tmax}$=4:30, $t_{gel}$=40° C., $t_{Tmax}$=176° C. A solid object was obtained. Yield by TGA=97.2%. Swell in toluene overnight: 133%.

EXAMPLE 62

A two-component polymerization system was prepared giving a reactant ratio of monomer:procatalyst:activator=20, 000:1:1. Component A: LiWCA-H (36.2 mg) was dissolved in 10 g hexylnorbornene containing 2.0% Kraton® 1657. Component B: 20.7 mg (allyl)Pd($O_3SCF_3$)$PCy_3$ was dissolved in 118 g hexylnorbornene containing 2.0% Kraton® 1657 and 3.1 g 5,5'-(1,2-ethanediyl)bisbicyclo[2.2.1]hept-2-ene. A and B components were mixed at 25° C. and the following reaction parameters describe the reaction: $t_{gel}$=45 s, $t_{100°\ C.}$=1:25 min., $t_{Tmax}$=2:10 min., $t_{gel}$=39° C., $t_{Tmax}$=186° C. A solid object was obtained. Yield by TGA=97.4%.

EXAMPLE 63

A two-component polymerization system was prepared giving a reactant ratio of monomer:procatalyst:activator=20,000:1:1. Component A: LiWCA-H (2.8 mg) was dissolved in 1.0 g hexylnorbornene. Component B: 1.3 mg (allyl)Pd($O_3SCF_3$)P(i-pr)$_3$ was dissolved in 9.0 g hexylnorbornene. A and B components were mixed at 25° C. and the following reaction parameters describe the reaction: $t_{gel}$=52 s, $t_{100°\ C.}$=1:20 min., $t_{Tmax}$=1:50, $t_{gel}$=45° C., $t_{Tmax}$=182° C. A solid object was obtained. Yield by TGA=98.6%.

EXAMPLE 64

A two-component polymerization system was prepared giving a reactant ratio of monomer:procatalyst:activator=10,000:1:2. Component A: LiFABA (9.8 mg) was dissolved in 0.71 g triethoxysilylnorbornene. Component B: 4.1 mg ($PCy_3$)$_2$Pd(H)$NO_3$ was dissolved in 9.5 g hexylnorbornene. A and B components were mixed at 45° C. and the following reaction parameters describe the reaction: $t_{gel}$=5:00 min., $t_{100°\ C.}$=6:10, $t_{Tmax}$=6:30 min., $t_{gel}$=62° C., $t_{Tmax}$=192° C. A solid object was obtained. Yield by TGA=98.0%.

EXAMPLE 65

A two-component polymerization system was prepared giving a reactant ratio of monomer:procatalyst:activator=20,000:1:1. Component A: LiWCA-H (4.0 mg) was dissolved in 1.0 g butylnorbornene. Component B: 2.3 mg (allyl)Pd($O_3SCF_3$)$PCy_3$ was dissolved in 11.0 g butylnorbornene. A and B components were mixed at 25° C. and the following reaction parameters describe the reaction: $t_{gel}$=1:40 min., $t_{100°\ C.}$=2:02 min. $t_{200°\ C.}$=2:08 min., $t_{Tmax}$=2:30 min., $t_{gel}$=46° C., $t_{Tmax}$=212° C. A solid object was obtained. Yield by TGA=94.2%.

EXAMPLE 66

A two-component polymerization system was prepared giving a reactant ratio of monomer:procatalyst:activator=10,000:1:1. Component A: LiWCA-H (8.0 mg) was dissolved in 1.0 g butylnorbornene. Component B: 4.6 mg (allyl)Pd($O_3SCF_3$)$PCy_3$ was dissolved in 1.0 g butylnorbornene. A and B components were mixed at 25° C. and the following reaction parameters describe the reaction: $t_{gel}$=40 s, $t_{100°\ C.}$=45 s, $t_{200°\ C.}$=47 s, $t_{Tmax}$=50 s, $t_{gel}$=55° C., $t_{Tmax}$=208° C. A solid object was obtained. Yield by TGA=96.0%.

EXAMPLE 67

A two-component polymerization system was prepared giving a reactant ratio of monomer:procatalyst:activator=10,000:1:1. Component A: LiWCA-H (6.7 mg) was dissolved in 1.0 g butylnorbornene. Component B: 3.8 mg (allyl)Pd($O_3SCF_3$)$PCy_3$ was dissolved in 8.8 g butylnorbornene and 0.21 g tetracyclododecadiene. A and B components were mixed at 25° C. and the following reaction parameters describe the reaction: $t_{gel}$=42 s, $t_{100°\ C.}$=49 s, $t_{200°\ C.}$=55 s, $t_{Tmax}$=70 s, $t_{gel}$=50° C., $t_{Tmax}$=212° C. A solid object was obtained. Yield by TGA=91.2%. Swell in toluene overnight: 108%.

EXAMPLE 68

A two-component polymerization system was prepared giving a reactant ratio of monomer:procatalyst:activator=10,000:1:1. Component A: LiWCA-H (6.7 mg) was dissolved in 1.0 g butylnorbornene. Component B: 3.8 mg (allyl)Pd($O_3SCF_3$)$PCy_3$ was dissolved in 8.8 g butylnorbornene and 0.24 g 5,5'-(1,2-ethanediyl)bisbicyclo[2.2.1]hept-2-ene. A and B components were mixed at 25° C. and the following reaction parameters describe the reaction: $t_{gel}$=55 s, $t_{100°\ C.}$=1:05 min., $t_{200°\ C.}$=1:09 min., $t_{Tmax}$=1:20 min., $t_{gel}$=49° C., $t_{Tmax}$=208° C. A solid object was obtained. Yield by TGA=92.8%. Swell in toluene overnight: 91%.

EXAMPLE 69

A two-component polymerization system was prepared giving a reactant ratio of monomer:procatalyst:activator=10,000:1:1. Component A: LiWCA-H (6.9 mg) was dissolved in 1.0 g cyclohexenylnorbornene. Component B: 4.0 mg (allyl)Pd($O_3SCF_3$)$PCy_3$ was dissolved in 11.0 g cyclohexenylnorbornene. A and B components were mixed at 45° C. and the following reaction parameters describe the reaction: $t_{gel}$=1:55 min., $t_{100°\ C.}$=2:55 min., $t_{Tmax}$=4:15 min., $t_{gel}$=60° C., $t_{Tmax}$=150° C. A solid, brittle object was obtained. Yield by TGA=91.5%.

EXAMPLE 70

A two-component polymerization system was prepared giving a reactant ratio of monomer:procatalyst:activator=20,000:1:1. Component A: LiWCA-H (2.8 mg) was dissolved in 1.0 g hexylnorbornene containing 4.0% Kraton® 1657. Component B: 1.6 mg (allyl)Pd($O_3SCF_3$)$PCy_3$ was dissolved in 9.2 g hexylnorbornene containing 4.0% Kraton® 1657 and 0.24 g 5,5'-(1,2-ethanediyl)bisbicyclo[2.2.1]hept-2-ene. A and B components were mixed at 25° C. and the following reaction parameters describe the reaction: $t_{gel}$=1:05 min., $t_{100°\ C.}$=2:10 min., $t_{Tmax}$=2:50 min., $t_{gel}$=38° C., $t_{Tmax}$=163° C. A solid object was obtained. Yield by TGA=97.2%. Swell in toluene overnight: 122%.

EXAMPLE 71

A two-component polymerization system was prepared giving a reactant ratio of monomer:procatalyst:activator=20,000:1:2. Component A: LiFABA (4.9 mg) was dissolved in 1.0 g hexylnorbornene. Component B: 1.6 mg (allyl)Pd($O_3SCF_3$)$PCy_3$ was dissolved in 9.2 g hexylnorbornene and 0.24 g 5,5'-(1,2-ethanediyl)bisbicyclo[2.2.1]hept-2-ene and 0.18 g 2-(3-butenyl)-1,2,3,4,4a,5,8,8a-octahydro-1,4:5,8-dimethanonapthalene. A and B components were mixed at 45° C. and the following reaction parameters describe the reaction: $t_{gel}$=1:15 min., $t_{100°\ C.}$=1:55 min., $t_{Tmax}$=2:05 min., $t_{gel}$=60° C., $t_{Tmax}$=200° C. A solid object was obtained. Yield by TGA=97.7%. Swell in toluene overnight: 123%.

EXAMPLE 72

A two-component polymerization system was prepared giving a reactant ratio of monomer:procatalyst:activator=10,000:1:1. Component A: LiWCA-H (128 mg) was dissolved in 10 g butylnorbornene. Component B: 73 mg (allyl)Pd($O_3SCF_3$)$PCy_3$ was dissolved in 181 g butylnorbornene. A and B components were mixed at 25° C., the reaction was stirred for several seconds, then poured into a 8×18 cm aluminum pan. A solid object was obtained. Yield by TGA=94.5%. Tg by DMA=304° C. HDT=80° C. A sample of the product was placed in a vacuum oven at 200° C./0.1 torr for 20 hours. Residual monomer by TGA=3.1%. HDT=210° C.

EXAMPLE 73

A two-component polymerization system was prepared giving a reactant ratio of monomer:procatalyst:activator=10,000:1:1. Component A: LiWCA-H (134 mg) was dissolved in 10 g butylnorbornene. Component B: 77 mg (allyl)Pd(O$_3$SCF)PCy$_3$ was dissolved in 185 g butylnorbornene and 5.7 g 5,5'-(1,2-ethanediyl)bisbicyclo[2.2.1]hept-2-ene. A and B components were mixed at 25° C., the reaction was stirred for several seconds, then poured into a 8×18 cm aluminum pan. A solid object was obtained. Yield by TGA=91.9%. Swell in toluene overnight: 82%. HDT=66° C.

A sample of the product was placed in a vacuum oven at 200° C./0.1 torr for 20 hours. Residual monomer by TGA=4.1%. HDT=204° C. A sample of the product was placed in a vacuum oven at 200° C./0.1 torr for 96 hours. Residual monomer by TGA 2.0%. Swell in toluene: 106%. HDT=207° C.

EXAMPLE 74

A two-component polymerization system was prepared giving a reactant ratio of monomer:procatalyst:activator=20,000:1:1. Component A: LiWCA-H (2.8 mg) was dissolved in 1.0 g hexylnorbornene containing 4.0% Kraton® 1726. Component B: 1.6 mg (allyl)Pd(O$_3$SCF$_3$)PCy$_3$ was dissolved in 9.2 g hexylnorbornene containing 4.0% Kraton® 1726 and 0.24 g 5,5'-(1,2-ethanediyl)bisbicyclo[2.2.1]hept-2-ene. A and B components were mixed at 25° C. A solid object was obtained. Yield by TGA=97.1%.

EXAMPLE 75

A two-component polymerization system was prepared giving a reactant ratio of monomer:procatalyst:activator=10,000:1:1. Component A: LiWCA-H (6.7 mg) was dissolved in 1.0 g butylnorbornene. Component B: 3.8 mg (allyl)Pd(O$_3$SCF$_3$)PCy$_3$ was dissolved in 8.0 g butylnorbornene and 1.43 g 5,5'-(1,2-ethanediyl)bisbicyclo[2.2.1]hept-2-ene. A and B components were mixed at 25° C. and the following reaction parameters describe the reaction: $t_{gel}$=23 s, $t_{100° C.}$=33 s, $t_{Tmax}$=55 s, $t_{gel}$=43° C., $t_{Tmax}$=179° C. A solid object was obtained. Yield by TGA=90.2%.

EXAMPLE 76

A two-component polymerization system was prepared giving a reactant ratio of monomer:procatalyst:activator=10,000:1:1. Component A: LiWCA-H (5.7 mg) was dissolved in 1.0 g hexylnorbornene containing 4.0% Kraton® 1726. Component B: 3.2 mg (allyl)Pd(O$_3$SCF$_3$)PCy$_3$ was dissolved in 9.2 g hexylnorbornene containing 4.0% Kraton® 1726 and 0.24 g 5,5'-(1,2-ethanediyl)bisbicyclo[2.2.1]hept-2-ene. A and B components were mixed at 25° C. and the following reaction parameters describe the reaction: $t_{gel}$=37 s, $t_{100° C.}$=52 s, $t_{200° C.}$=1:02 min., $t_{Tmax}$=1:40 min., $t_{gel}$=40° C., $t_{Tmax}$=208° C. A solid object was obtained. Yield by TGA=97.4%.

EXAMPLE 77

A two-component polymerization system was prepared giving a reactant ratio of monomer:procatalyst:activator=20,000:1:1. Component A: LiWCA-H (4.5 mg) was dissolved in 1.0 g ethylnorbornene. Component B: 2.8 mg (allyl)Pd(O$_3$SCF$_3$)PCy$_3$ was dissolved in 10.0 g ethylnorbornene. A and B components were mixed at 25° C. and the following reaction parameters describe the reaction: $t_{gel}$=1:07 min., $t_{100° C.}$=1:16 min., $t_{200° C.}$=1:20 min., $t_{Tmax}$=1:30 min., $t_{gel}$=50° C., $t_{Tmax}$=233° C. A solid, object containing bubbles was obtained. Yield by TGA=88.3%.

EXAMPLE 78

A two-component polymerization system was prepared giving a reactant ratio of monomer:procatalyst:activator=5,000:1:1. Component A: LiWCA-H (13.4 mg) was dissolved in 1.0 g butylnorbornene. Component B: 7.6 mg (allyl)Pd(O$_3$SCF$_3$)PCy$_3$ was dissolved in 8.8 g butylnorbornene and 0.24 g 5,5'-(1,2-ethanediyl)bisbicyclo[2.2.1]hept-2-ene. A and B components were mixed at 25° C. and the following reaction parameters describe the reaction: $t_{gel}$=33 s, $t_{100° C.}$=34 s, $t_{Tmax}$=36 s, $t_{gel}$=60° C., $t_{Tmax}$=217° C. A solid object was obtained. Yield by TGA=97.0%.

EXAMPLE 79

A two-component polymerization system was prepared giving a reactant ratio of monomer:procatalyst:activator=20,000:1:1. Component A: LiWCA-H (4.5 mg) was dissolved in 1.0 g ethylnorbornene. Component B: 2.6 mg (allyl)Pd(O$_3$SCF$_3$)PCy$_3$ was dissolved in 10.0 g ethylnorbornene. A and B components were mixed at 25° C. and the polymerization vial sealed with a crimp-cap. A solid object with almost no bubbles was obtained. Yield by TGA=89.5%. Tg by DMA=266° C.

EXAMPLE 80

A two-component polymerization system was prepared giving a reactant ratio of monomer:procatalyst:activator=20,000:1:1. Component A: LiWCA-H (4.5 mg) was dissolved in 1.0 g ethylnorbornene. Component B: 2.6 mg (allyl)Pd(O$_3$SCF$_3$)PCy$_3$ was dissolved in 10.0 g ethylnorbornene. A and B components were injected into a pressure reactor at 25° C. and the pressure raised to 100 psi. A solid object was obtained. Yield by TGA=92.6%.

EXAMPLE 81

A two-component polymerization system was prepared giving a reactant ratio of monomer:procatalyst:activator=10,000:1:1. Component A: LiWCA-H (134 mg) was dissolved in 10 g butylnorbornene. Component B: 77 mg (allyl)Pd(O$_3$SCF$_3$)PCy$_3$ was dissolved in 170 g butylnorbornene and 21 g tetracyclododecadiene. A and B components were mixed at 25° C., and poured into a 8×18 cm aluminum pan. A solid object was obtained. Yield by TGA=89.0%. HDT=70° C.

A sample of the product was postcured in a vacuum oven at 200° C./0.1 torr for 72 hours. Residual monomer by TGA=5.0%. HDT=196° C.

EXAMPLE 82

A two-component polymerization system was prepared giving a reactant ratio of monomer:procatalyst:activator=10,000:1:1. Component A: LiWCA-H (134 mg) was dissolved in 10 g butylnorbornene. Component B: 77 mg (allyl)Pd(O$_3$SCF$_3$)PCy$_3$ was dissolved in 180 g butylnorbornene and 10.5 g tetracyclododecadiene. A and B components were mixed at 25° C., and poured into a 8×18 cm aluminum pan. A solid object was obtained. Yield by TGA=91.9%. HDT=99° C.

A sample of the product was postcured in a vacuum oven at 200° C./0.1 torr for 72 hours. Residual monomer by TGA=3.9%. HDT=204° C.

EXAMPLE 83

A two-component polymerization system was prepared giving a reactant ratio of monomer:procatalyst:activator=10, 000:1:1. Component A: LiFABA (5.8 mg) was dissolved in 0.85 g triethoxysilylnorbornene. Component B: 5.2 mg $(PCy_3)_2Pd(H)(O_2CCF_3)$ was dissolved in 9.5 g butylnorbornene. A and B components were mixed at 45° C. and the following reaction parameters describe the reaction: $t_{gel}$= 4:00 min., $t_{100° C.}$=4:27 min., $t_{200° C.}$=4:31 min., $t_{Tmax}$=4:42 min., $t_{gel}$=68° C., $t_{Tmax}$=220° C. A solid object was obtained. Yield by TGA=96.8%.

EXAMPLE 84

A two-component polymerization system was prepared giving a reactant ratio of monomer:procatalyst:activator=10,000:1:1. Component A: LiFABA (5.8 mg) was dissolved in 0.85 g triethoxysilylnorbornene. Component B: 5.2 mg $(PCy_3)_2Pd(H)(O_2CCF_3)$ was dissolved in 9.5 g butylnorbornene. A and B components were mixed at 60° C. and the following reaction parameters describe the reaction: $t_{gel}$= 1:13 min., $t_{100° C.}$=1:23 min., $t_{200° C.}$=1:27 min., $t_{Tmax}$=1:48 min., $t_{gel}$=85° C., $t_{Tmax}$=232° C. A solid object was obtained. Yield by TGA=93.3%.

EXAMPLE 85

A two-component polymerization system was prepared giving a reactant ratio of monomer:procatalyst:activator=10,000:1:1. Component A: LiWCA-H (6.7 mg) was dissolved in 1.0 g butylnorbornene. Component B: 3.1 mg (allyl)Pd$(O_3SCF_3)P(i-pr)_3$ was dissolved in 9.0 g butylnorbornene. A and B components were mixed at 25° C. A solid object was obtained. Yield by TGA=98.3%.

EXAMPLE 86

A two-component polymerization system was prepared giving a reactant ratio of monomer:procatalyst:activator=10,000:1:2. Component A: LiFABA (11.6 mg) was dissolved in 0.85 g triethoxysilylnorbornene. Component B: 5.2 mg $(PCy_3)_2Pd(H)(O_2CCF_3)$ was dissolved in 9.5 g butylnorbornene. A and B components were mixed at 63° C. and the following reaction parameters describe the reaction: $t_{gel}$=48 s, $t_{100° C.}$=54 s, $t_{200° C.}$=59 s, $t_{Tmax}$=1:05 min., $t_{gel}$=87° C., $t_{Tmax}$=235° C. A solid object was obtained. Yield by TGA=94.6%.

EXAMPLE 87

A two-component polymerization system was prepared giving a reactant ratio of monomer:procatalyst:activator=20,000:1:1. Component A: LiWCA-H (3.3 mg) was dissolved in 1.0 g butylnorbornene. Component B: 1.5 mg (allyl)Pd$(O_3SCF_3)P(i-pr)_3$ was dissolved in 9.0 g butylnorbornene. A and B components were mixed at 25° C. and the following reaction parameters describe the reaction: $t_{gel}$=15 s, $t_{100° C.}$=17 s, $t_{200° C.}$=20 s, $t_{Tmax}$=40 s, $t_{gel}$=45° C., $t_{Tmax}$=214° C. A solid object was obtained. Yield by TGA=97.9%.

EXAMPLE 88

A two-component polymerization system was prepared giving a reactant ratio of monomer:procatalyst:activator=10,000:1:1. Component A: LiWCA-H (6.7 mg) was dissolved in 1.0 g butylnorbornene. Component B: 3.1 mg (allyl)Pd$(O_3SCF_3)P(i-pr)_3$ was dissolved in 8.8 g butylnorbornene and 0.21 g tetracyclododecadiene. A and B components were mixed at 25° C. and the following reaction parameters describe the reaction: $t_{gel}$=13 s, $t_{100° C.}$=18 s, $t_{200° C.}$=23 s, $t_{Tmax}$=35 s, $t_{gel}$=40° C., $t_{Tmax}$=205° C. A solid object was obtained. Yield by TGA=96.9%.

EXAMPLE 89

A two-component polymerization system was prepared giving a reactant ratio of monomer:procatalyst:activator=40,000:1:1. Component A: LiWCA-H (1.7 mg) was dissolved in 1.0 g butylnorbornene. Component B: 0.8 mg (allyl)Pd$(O_3SCF_3)P(i-pr)_3$ was dissolved in 8.8 g butylnorbornene and 0.21 g tetracyclododecadiene. A and B components were mixed at 25° C. and the following reaction parameters describe the reaction: $t_{gel}$=21 s, $t_{100° C.}$=34 s, $t_{200° C.}$=44 s, $t_{Tmax}$=60 s, $t_{gel}$=40° C., $t_{Tmax}$=205° C. A solid object was obtained. Yield by TGA=93.9%.

EXAMPLE 90

A two-component polymerization system was prepared giving a reactant ratio of monomer:procatalyst:activator=10,000:1:1. Component A: LiWCA-H (6.7 mg) was dissolved in 1.0 g butylnorbornene. Component B: 3.8 mg $(PCy_3)_2Pd(H)O_3SCF_3$ was dissolved in 9.0 g butylnorbornene. A and B components were mixed at 45° C. and the following reaction parameters describe the reaction: $t_{gel}$=1:05 min., $t_{100° C.}$=1:14 min., $t_{200° C.}$=1:17 min., $t_{Tmax}$=1:30 min., $t_{gel}$=70° C., $t_{Tmax}$=222° C. A solid object was obtained. Yield by TGA=93.5%.

EXAMPLE 91

A two-component polymerization system was prepared giving a reactant ratio of monomer:procatalyst:activator=20,000:1:1. Component A: LiFABA (2.9 mg) was dissolved in 0.85 g triethoxysilylnorbornene. Component B: 1.5 mg (allyl)Pd$(O_3SCF_3)P(i-pr)_3$ was dissolved in 9.5 g butylnorbornene. A and B components were mixed at 25° C. and the following reaction parameters describe the reaction: $t_{gel}$= 3:20 min., $t_{100° C.}$=5:10 min., $t_{Tmax}$=5:45 min., $t_{gel}$=37° C., $t_{Tmax}$=190° C. A solid object was obtained. Yield by TGA=96.8%.

EXAMPLE 92

A two-component polymerization system was prepared giving a reactant ratio of monomer:procatalyst:activator=20,000:1:1. Component A: LiFABA (2.9 mg) was dissolved in 0.85 g triethoxysilylnorbornene. Component B: 1.5 mg (allyl)Pd$(O_3SCF_3)P(i-pr)_3$ was dissolved in 9.5 g butylnorbornene. A and B components were mixed at 45° C. and the following reaction parameters describe the reaction: $t_{gel}$=41 s, $t_{100° C.}$=52 s, $t_{200° C.}$=56 s s, $t_{Tmax}$=1:02 min., $t_{gel}$=68° C., $t_{Tmax}$=220° C. A solid object was obtained. Yield by TGA=93.8%.

EXAMPLE 93

A two-component polymerization system was prepared giving a reactant ratio of monomer:procatalyst:activator=20,000:1:1. Component A: LiWCA-H (3.4 mg) was dissolved in 1.0 g butylnorbornene containing 5.0% Kraton® 1726. Component B: 1.6 mg (allyl)Pd$(O_3SCF_3)P(i-pr)_3$ was dissolved in 9.5 g butylnorbornene containing 5.0% Kraton® 1726. A and B components were mixed at 25° C. and the following reaction parameters describe the reaction: $t_{gel}$=17 s, $t_{100° C.}$=23 s, $t_{200° C.}$=35 s, $t_{Tmax}$=60 s, $t_{gel}$=40° C., $t_{Tmax}$=203° C. A solid object was obtained. Yield by TGA=97.0%.

EXAMPLE 94

A two-component polymerization system was prepared giving a reactant ratio of monomer:procatalyst:activator=20,000:1:1. Component A: LiWCA-H (33.5 mg) was dissolved in 50 g butylnorbornene. Component B: 15.3 mg (allyl)Pd$(O_3SCF_3)P(i-pr)_3$ was dissolved in 50 g butylnorbornene. A and B components were loaded into a MIXPAC mixing gun

EXAMPLE 95

A two-component polymerization system was prepared giving a reactant ratio of monomer:procatalyst:activator=20,000:1:1. Component A: LiWCA-H (50.3 mg) was dissolved in 75 g butylnorbornene. Component B: 22.9 mg (allyl)Pd(O$_3$SCF$_3$)P(i-pr)$_3$ was dissolved in 75 g butylnorbornene. A and B components were loaded into a MIXPAC mixing gun and shot through a 5-18 static mixer into a nitrogen purged Teflon® cup. A solid object was obtained. Yield by TGA=97.5%.

EXAMPLE 96

A two-component polymerization system was prepared giving a reactant ratio of monomer:procatalyst:activator=20,000:1:1. Component A: LiWCA-H (33.5 mg) was dissolved in 50 g butylnorbornene containing 5.0% Kraton® 1726 and 3.5 g tetracyclododecadiene. Component B: 13.3 mg (allyl)Pd(O$_3$SCF$_3$)P(i-pr)$_3$ was dissolved in 50 g butylnorbornene containing 5.0% Kraton® 1726 and 3.5 g tetracyclododecadiene. A and B components were loaded into a MIXPAC mixing gun and shot through a 5-18 static mixer into a nitrogen purged Teflon® cup. A solid object was obtained. Yield by TGA=92.0%.

EXAMPLE 97

A two-component polymerization system was prepared giving a reactant ratio of monomer:procatalyst:activator=20,000:1:1. Component A: LiWCA-H (33.5 mg) was dissolved in 51.5 g butylnorbornene containing 5.0% Kraton® 1726 and 1.4 g tetracyclododecadiene. Component B: 13.3 mg (allyl)Pd(O$_3$SCF$_3$)P(i-pr)$_3$ was dissolved in 51.5 g butylnorbornene containing 5.0% Kraton® 1726 and 1.4 g tetracyclododecadiene. A and B components were loaded into a MIXPAC mixing gun and shot through a 5-18 static mixer into a nitrogen purged Teflon® cup. A solid object was obtained. Yield by TGA=94.4%.

EXAMPLE 98

A two-component polymerization system was prepared giving a reactant ratio of monomer:procatalyst:activator=20,000:1:1. Component A: LiWCA-CH$_3$ (3.4 mg) was dissolved in 1.0 g butylnorbornene. Component B: 1.5 mg (allyl)Pd(O$_3$SCF$_3$)P(i-pr)$_3$ was dissolved in 9.0 g butylnorbornene. A and B components were mixed at 25° C. and the following reaction parameters describe the reaction: $t_{gel}$=15 s, $t_{100° C.}$=22 s, $t_{200° C.}$=24 s, $t_{Tmax}$=45 s, $t_{gel}$=40° C., $t_{Tmax}$=214° C. A solid object was obtained. Yield by TGA=96.5%.

EXAMPLE 99

A two-component polymerization system was prepared giving a reactant ratio of monomer:procatalyst:activator=20,000:1:1. Component A: LiWCA-H (33.5 mg) was dissolved in 50 g butylnorbornene. Component B: 15.3 mg (allyl)Pd(O$_3$SCF$_3$)P(i-pr)$_3$ was dissolved in 50 g butylnorbornene. A and B components were loaded into a MIXPAC mixing gun and shot through a 10-24 static mixer into a nitrogen purged plaque mold at 85° C. A solid object was obtained. Yield by TGA=97.3%.

EXAMPLE 100

A two-component polymerization system was prepared giving a reactant ratio of monomer:procatalyst:activator=20,000:1:1. Component A: LiWCA-H (48.8 mg) was dissolved in 75 g butylnorbornene containing 5.0% Kraton® 1726 and 1.5 g tetracyclododecadiene. Component B: 22.2 mg (allyl)Pd(O$_3$SCF$_3$)P(i-pr)$_3$ was dissolved in 75 g butylnorbornene containing 5.0% Kraton® 1726 and 1.5 g tetracyclododecadiene. A and B components were loaded into a MIXPAC mixing gun and shot through a 5-18 static mixer into a nitrogen purged plaque mold at 85° C. A solid object was obtained. Yield by TGA=95.4%.

EXAMPLE 101

A two-component polymerization system was prepared giving a reactant ratio of monomer:procatalyst:activator=20,000:1:1. Component A: LiWCA-H (2.8 mg) was dissolved in 1.0 g hexylnorbornene. Component B: 1.3 mg (allyl)Pd(O$_3$SCF$_3$)P(i-pr)$_3$ was dissolved in 9.0 g hexylnorbornene. A and B components were mixed at 25° C. and the following reaction parameters describe the reaction: $t_{gel}$=40 s, $t_{100° C.}$=160 s, $t_{Tmax}$=1:20, $t_{gel}$=40° C., $t_{Tmax}$=181° C. A solid object was obtained. Yield by TGA=98.4%.

EXAMPLE 102

A two-component polymerization system was prepared giving a reactant ratio of monomer:procatalyst:activator=10,000:1:1. Component A: LiWCA-H (98 mg) was dissolved in 75 g butylnorbornene containing 3.0% Diene 55 AC10®. Component B: 44.8 mg (allyl)Pd(O$_3$SCF$_3$)P(i-pr)$_3$ was dissolved in 75 g butylnorbornene containing 3.0% Diene 55 AC10®. A and B components were loaded into a MIXPAC mixing gun and shot through a 5-18 static mixer into a nitrogen purged plaque mold at 75° C. A solid object was obtained. Yield by TGA=96.6%.

EXAMPLE 103

A two-component polymerization system was prepared giving a reactant ratio of monomer:procatalyst:activator=10,000:1:1. Component A: LiWCA-H (0.690 g) was dissolved in 610 g hexylnorbornene. Component B: 0.313 g (allyl)Pd(O$_3$SCF$_3$)P(i-pr)$_3$ was dissolved in 610 g hexylnorbornene. A and B components were mixed at 35° C. as high pressure streams in a micro-RIM machine mix head. Four solid objects was obtained from four trials. Yield by TGA=98.3%, 97.6%, 97.6%, 97.8%.

EXAMPLE 104

A two-component polymerization system was prepared giving a reactant ratio of monomer:procatalyst:activator=20,000:1:1. Component A: Li(Oct$_2$O)$_{2.5}$FABA (3.4 mg) was dissolved in 1.0 g butylnorbornene. Component B: 1.5 mg (allyl)Pd(O$_3$SCF$_3$)P(i-pr)$_3$ was dissolved in 9.0 g butylnorbornene. A and B components were mixed at 25° C. and the following reaction parameters describe the reaction: $t_{gel}$=17 s, $t_{100° C.}$=18 s, $t_{200° C.}$=21 s, $t_{Tmax}$=35 s, $t_{gel}$=55° C., $t_{Tmax}$=213° C. A solid object was obtained. Yield by TGA=96.5%.

EXAMPLE 105

A two-component polymerization system was prepared giving a reactant ratio of monomer:procatalyst:activator=20,000:1:1. Component A: LiWCA-H (3.4 mg) was dissolved in 1.0 g butylnorbornene. Component B: 2.0 mg (allyl)Pd(O$_3$SCF$_3$)P(o-tolyl)$_3$ was dissolved in 9.0 g butylnorbornene. A and B components were mixed at 25° C. and the following reaction parameters describe the reaction: $t_{gel}$=2:45 min., $t_{100° C.}$=4:03 min., $t_{Tmax}$=5:00 min., $t_{gel}$=37° C., $t_{Tmax}$=167° C. A solid object was obtained. Yield by TGA=82.8%.

EXAMPLE 106

A two-component polymerization system was prepared giving a reactant ratio of monomer:procatalyst:activator=20,000:1:1. Component A: LiWCA-H (3.4 mg) was dissolved in 1.0 g butylnorbornene. Component B: 2.4 mg (allyl)Pd(O$_3$SCF$_3$)P(naphthyl)$_3$ was dissolved in 9.0 g butylnorbornene. A and B components were mixed at 25° C. and the following reaction parameters describe the reaction: t$_{gel}$=35 s, t$_{100°\ C.}$=50 s, t$_{200°\ C.}$=60 s, t$_{Tmax}$=1:30 min., t$_{gel}$=45° C., t$_{Tmax}$=209° C. A solid object was obtained. Yield by TGA=91.1%.

EXAMPLE 107

A two-component polymerization system was prepared giving a reactant ratio of monomer:procatalyst:activator=20,000:1:1. Component A: LiWCA-H (3.4 mg) was dissolved in 1.0 g butylnorbornene. Component B: 2.4 mg (allyl)Pd(O$_3$SCF$_3$)PPh$_3$ was dissolved in 9.0 g butylnorbornene. A and B components were mixed at 25° C. and the following reaction parameters describe the reaction: t$_{gel}$=40 s, t$_{100°\ C.}$=55 s, t$_{Tmax}$=1:30 min., t$_{gel}$=40° C., t$_{Tmax}$=196° C. A solid object was obtained. Yield by TGA=95.3%.

EXAMPLE 108

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.5 mg (1,1-dimethylallyl)Pd(O$_2$CCF$_3$)P(i-pr)$_3$ was dissolved in 9.0 g butylnorbornene. A and B components were mixed at 25° C. and the following reaction parameters describe the reaction: t$_{gel}$=1:08 min., t$_{100°\ C.}$=1:14 min., t$_{100°\ C.}$=1:16 min., t$_{Tmax}$=1:25 min., t$_{gel}$=55° C., t$_{Tmax}$=211° C. A solid object was obtained. Yield by TGA 97.0%.

EXAMPLE 109

A two-component polymerization system was prepared giving a reactant ratio of monomer:procatalyst:activator=20,000:1:1. Component A: LiWCA-H (33.5 mg) was dissolved in 51 g butylnorbornene containing 2.5% Nordel® 1070. Component B: 15.3 mg (allyl)Pd(O$_3$SCF$_3$)P(i-pr)$_3$ was dissolved in 51 g butylnorbornene containing 2.5% Nordel® 1070. A and B components were loaded into a MIXPAC mixing gun and shot through a 8-24 static mixer into a Teflon® cup. A solid object was obtained. Yield by TGA=95.9%.

EXAMPLE 110

A two-component polymerization system was prepared giving a reactant ratio of monomer:procatalyst:activator=20,000:1:1. Component A: LiWCA-H (33.5 mg) was dissolved in 51 g butylnorbornene containing 2.5% Vistanex® MML-140. Component B: 15.3 mg (allyl)Pd(O$_3$SCF$_3$)P(i-pr)$_3$ was dissolved in 51 g butylnorbornene containing 2.5% Vistanex® MML-140. A and B components were loaded into a MIXPAC mixing gun and shot through a 8-24 static mixer into a Teflon® cup. A solid object was obtained. Yield by TGA=95.8%.

EXAMPLE 111

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.5 mg (allyl)Pd(O$_3$SCF$_3$)PCy$_3$ was dissolved in 8.8 g butylnorbornene and 0.21 g tetracyclododecadiene. A and B components were mixed at 25° C. and the following reaction parameters describe the reaction: t$_{gel}$=12 s, t$_{100°\ C.}$=18 s, t$_{200°\ C.}$=24 s, t$_{Tmax}$=35 s, t$_{gel}$=45° C., t$_{Tmax}$=202° C. A solid object was obtained. Yield by TGA=94.5%.

EXAMPLE 112

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.5 mg (allyl)Pd(O$_3$SCF$_3$)PCy$_3$ was dissolved in 8.5 g butylnorbornene and 0.53 g tetracyclododecadiene. A and B components were mixed at 25° C. and the following reaction parameters describe the reaction: t$_{gel}$=11 s, t$_{100°\ C.}$=18 s, t$_{200°\ C.}$26 s, t$_{Tmax}$=40 s, t$_{gel}$=45° C., t$_{Tmax}$=205° C. A solid object was obtained. Yield by TGA=90.8%.

EXAMPLE 113

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.5 mg (allyl)Pd(O$_3$SCF$_3$)PCy$_3$ was dissolved in 8.0 g butylnorbornene and 1.05 g tetracyclododecadiene. A and B components were mixed at 25° C. and the following reaction parameters describe the reaction: t$_{gel}$=10 s, t$_{100°\ C.}$=18 s, t$_{Tmax}$=45 s, t$_{gel}$=40° C., t$_{Tmax}$=200° C. A solid object was obtained. Yield by TGA=86.8%.

EXAMPLE 114

A two-component polymerization system was prepared giving a reactant ratio of monomer:procatalyst:activator=20,000:1:2. Component A: LiWCA-H (6.8 mg) was dissolved in 1.0 g butylnorbornene. Component B: 1.5 mg (allyl)Pd(O$_3$SCF$_3$)P(i-pr)$_3$ was dissolved in 9.0 g butylnorbornene. A and B components were mixed at 25° C. and the following reaction parameters describe the reaction: t$_{gel}$=8 s. t$_{100°\ C.}$=10 s, t$_{200°\ C.}$=13 s, t$_{Tmax}$=25 s, t$_{gel}$=45° C., t$_{Tmax}$=213° C. A solid object was obtained. Yield by TGA=97.4%.

EXAMPLE 115

A two-component polymerization system was prepared giving a reactant ratio of monomer:procatalyst:activator=20,000:1:2. Component A: LiWCA-H (6.8 mg) was dissolved in 1.0 g butylnorbornene. Component B: 1.5 mg (allyl)Pd(O$_3$SCF$_3$)PCy$_3$ was dissolved in 8.8 g butylnorbornene and 0.21 g tetracyclododecadiene. A and B components were mixed at 25° C. and the following reaction parameters describe the reaction: t$_{gel}$=9 s, t$_{100°\ C.}$=13 s, t$_{200°\ C.}$=17 s, t$_{Tmax}$=30 s, t$_{gel}$=45° C., t$_{Tmax}$=210° C. A solid object was obtained. Yield by TGA=93.5%.

EXAMPLE 116

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.5 mg (1,1-dimethylallyl)Pd(O$_2$CCF$_3$)PCy$_3$ was dissolved in 8.8 g butylnorbornene and 0.21 g tetracyclododecadiene. A and B components were mixed at 25° C. and the following reaction parameters describe the reaction: t$_{gel}$=56 s. t$_{100°\ C.}$=59 s, t 200° C.=1:03 min., t$_{Tmax}$=1:1 S min., t$_{gel}$=40° C., t$_{Tmax}$=214° C. A solid object was obtained. Yield by TGA=96.6%.

EXAMPLE 117

A two-component polymerization system was prepared giving a reactant ratio of monomer:procatalyst:activator=20,000:1:1. Component A: LiWCA-CH$_3$ (3.4 mg) was dissolved in 1.0 g butylnorbornene. Component B: 1.5 mg (1,1-dimethylallyl)Pd(O$_2$CCF$_3$)PCy$_3$ was dissolved in 8.8 g butylnorbornene and 0.21 g tetracyclododecadiene. A and B components were mixed at 25° C. and the following reaction parameters describe the reaction: $t_{gel}$=31 s, $t_{100°\,C.}$=37 s, $t_{200°\,C.}$=41 s, $t_{Tmax}$=60 s, $t_{gel}$=40° C., $t_{Tmax}$=207° C. A solid object was obtained. Yield by TGA=93.4%.

EXAMPLE 118

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.6 mg (2-chloroallyl)Pd(O$_2$CCF$_3$)P(i-pr)$_3$ was dissolved Or, in 9.0 g butylnorbornene. A and B components were mixed at 25° C. and the following reaction parameters describe the reaction: $t_{gel}$=21 s, $t_{100°\,C.}$=27 s, $t_{200°\,C.}$=29 s, $t_{Tmax}$=50 s, $t_{gel}$=45° C., $t_{Tmax}$=210° C. A solid object was obtained. Yield by TGA 94.8%.

EXAMPLE 119

A two-component polymerization system was prepared giving a reactant ratio of monomer:procatalyst:activator=20,000:1:1. Component A: LiWCA-H (34 mg) was dissolved in 50 g butylnorbornene containing 2.5% Vistanex® MML-140 and 1.3 g tetracyclododecadiene. Component B: 15 mg (allyl)Pd(O$_3$SCF$_3$)P(i-pr)$_3$ was dissolved in 50 g butylnorbornene containing 2.5% Vistanex® MML-140. A and B components were loaded into a MIXPAC mixing gun and shot through a 8-24 static mixer into a Teflon® cup. A solid object was obtained. Yield by TGA=94.4%.

EXAMPLE 120

A two-component polymerization system was prepared giving a reactant ratio of monomer:procatalyst:activator=20,000:1:1. Component A: LiWCA-H (34 mg) was dissolved in 50 g butylnorbornene containing 2.5% Nordel® 1070 and 1.3 g tetracyclododecadiene. Component B: 15 mg (allyl)Pd(O$_3$SCF$_3$)P(i-pr)$_3$ was dissolved in 50 g butylnorbornene containing 2.5% Nordel® 1070. A and B components were loaded into a MIXPAC mixing gun and shot through a 8-24 static mixer into a Teflon® cup. A solid object was obtained. Yield by TGA=93.1%.

EXAMPLE 121

A two-component polymerization system was prepared giving a to reactant ratio of monomer:procatalyst:activator=500:1:1. Component A: LiWCA-CH$_3$ (0.11 g) was dissolved in 9.0 g of hexylnorbornene and heated to 50° C. Component B: 30 mg [(allyl)Pd(O$_2$CCF$_3$)]$_2$ was dissolved in 1.0 g hexylnorbornene at ambient temperature. A and B components were mixed and the reaction polymerized within 30 seconds, turned dark at 160° C., and $t_{Tmax}$=225° C. A solid object was obtained. Yield by TGA=98.4%

EXAMPLE 122

A two-component polymerization system was prepared giving a reactant ratio of monomer:procatalyst:activator=1000:1:1. Component A: LiWCA-CH$_3$ (0.055 g) was dissolved in 9.0 g of hexylnorbornene and heated to 50° C. Component B: 15 mg [(allyl)Pd(O$_2$CCF$_3$)]$_2$ was dissolved in 1.0 g hexylnorbornene at ambient temperature. A and B components were mixed and heated to 70° C. The reaction polymerized within 30 seconds, turned dark at 180° C., and $t_{Tmax}$=215° C. A solid object was obtained. Yield by TGA=98.1%.

EXAMPLE 123

A two-component polymerization system was prepared giving a reactant ratio of monomer:procatalyst:activator=1000:1:1. Component A: LiWCA-H (0.055 g) was dissolved in 9.0 g of hexylnorbornene at ambient temperature. Component B: 15 mg [(allyl)Pd(O$_2$CCF$_3$)]$_2$ was dissolved in 1.0 g hexylnorbornene at ambient temperature. A and B components were mixed and a bright yellow solution was observed. The reaction gelled within 15 seconds and polymerized within 30 seconds and $t_{Tmax}$=205° C. A solid object was obtained. Yield by TGA=>99.5%.

EXAMPLE 124

A two-component polymerization system was prepared giving a reactant ratio of monomer:procatalyst:activator=1000:1:1. Component A: LiWCA-H (0.055 g) was dissolved in 8.0 g of hexylnorbornene and 1.0 g of tetracyclododecadiene at ambient temperature. Component B: 15 mg [(allyl)Pd(O$_2$CCF$_3$)]$_2$ was dissolved in 1.0 g hexylnorbornene at ambient temperature. A and B components were mixed and a bright yellow solution was observed. The reaction gelled within 45 seconds and polymerized within 3 minutes and $t_{Tmax}$=190° C. A dark yellow, solid object was obtained. Yield by TGA=93.8%.

EXAMPLE 125

A two-component polymerization system was prepared giving a reactant ratio of monomer:procatalyst:activator=1000:1:1. Component A: LiWCA-H (0.055 g) was dissolved in 9.0 g of hexylnorbornene and 0.5 g of norbornadiene dimer at ambient temperature. Component B: 15 mg [(allyl)Pd(O$_2$CCF$_3$)]$_2$ was dissolved in 1.0 g hexylnorbornene at ambient temperature. A and B components were mixed and heated to 55° C. A bright yellow solution was observed. The reaction gelled within 15 seconds and polymerized within 2 minutes and $t_{Tmax}$=210° C. A dark yellow, solid object was obtained. Yield by TGA=94.5%.

EXAMPLE 126

A two-component polymerization system was prepared giving a reactant ratio of monomer:procatalyst:activator=1000:1:1. Component A: Lithium tetrakis(pentafluorophenyl)borate (LiFABA) (0.049 g) was stirred in 9.0 g of hexylnorbornene. The LiFABA did not dissolve. Component B: 15 mg [(allyl)Pd(O$_2$CCF$_3$)]$_2$ was dissolved in 1.0 g hexylnorbornene at ambient temperature. A and B components were mixed and heated at 60° C. A bright yellow solution was observed. The reaction gelled immediately with the maximum reaction temperature reached was recorded at 205° C. seconds and polymerized within 2 minutes and $t_{Tmax}$=210° C. A shiny, solid object was obtained. Yield by TGA=91.2%.

EXAMPLE 127

A two-component polymerization system was prepared giving a reactant ratio of monomer:procatalyst:activator=5000:1:1. Component A: Lithium tetrakis(pentafluorophenyl)borate (0.010 g) was dissolved in 9.0 g of hexylnorbornene at ambient temperature. Component B: 15 mg [(allyl)Pd(O$_2$CCF$_3$)]$_2$ was dissolved in 1.0 g hexylnorbornene at ambient temperature. A and B components were mixed and slowly heated. The reaction gelled when the polymerizing mass reached to 65° C. A white precipitate was observed in the reaction. The reaction polymerized within 3 minutes and $t_{Tmax}$=185° C. A solid object was obtained. Yield by TGA=92.3%.

EXAMPLE 128

A two-component polymerization system was prepared giving a reactant ratio of monomer:procatalyst:activator=1,000:1:1. Component A: Lithium tetrakis(pentafluorophenyl)borate (0.048 g) was stirred in 9.0 g of hexylnorbornene and heated to 60° C. The LiFABA did not completely dissolve. Component B: 20 mg [(allyl)PdCl]$_2$ was stirred in 1.0 g hexylnorbornene and heated to 60° C. Similarly, all the [(allyl)PdCl]$_2$ did not dissolve completely, but a yellow colored solution was obtained. A and B components were mixed and the reaction gelled in 45 seconds. The reaction turned black at approximately 150° C. and reached a maximum polymerization exotherm temperature of 150° C. A solid object was obtained. Yield by TGA=89.6%.

EXAMPLE 129

A two-component polymerization system was prepared giving a reactant ratio of monomer:procatalyst:activator=1,000:1:1. Component A: LiWCA-H (0.056 g) was stirred in 9.0 g of hexylnorbornene. Component B: 10 mg [(allyl)PdCl]$_2$ was stirred in 1.0 g hexylnorbornene and heated to 50° C. All of the [(allyl)PdCl]$_2$ did not dissolve completely, but a partially yellow colored solution was obtained. A and B components were mixed at room temperature with no apparent reaction. To this mixture was then added 25 mg of tricyclohexylphosphine (PCy$_3$) and heated. The reaction immediately turned bright orange-yellow, began to heat and gelled at 20 seconds. The polymerized mass achieved a maximum polymerization exotherm temperature of 225° C. In the presence of PCy$_3$, there was no darkening of the polymer as the temperature rose to its polymerization exotherm. A solid polymer object was obtained. Yield by TGA=95.0%.

EXAMPLE 130

A two-component polymerization system was prepared giving a reactant ratio of monomer:procatalyst:activator=1,000:1:1. Component A: LiWCA-H (0.056 g) were dissolved in 9.0 g of hexylnorbornene. Component B: 15 mg of [(allyl)Pd(O$_2$CCF$_3$)]$_2$ and 25 mg of tricyclohexylphosphine (PCy$_3$) were mixed in 1.0 g hexylnorbornene and a white slurry formed. A and B components were mixed at room temperature and a yellow color formed immediately. The following reaction parameters describe the polymerization: $t_{gel}$=9 s, and $t_{Tmax}$=225° C. The reaction solution polymerized within two minutes. A hard yellow colored polymeric object was obtained. Yield by TGA=98.5%.

EXAMPLE 131

A two-component polymerization system was prepared giving a reactant ratio of monomer:procatalyst:activator=1,000:1:1. Component A: LiWCA-H (0.056 g) and 25 mg of tricyclohexylphosphine (PCy$_3$) were dissolved in 9.0 g of hexylnorbornene. Component B: 15 mg of [(allyl)Pd(O$_2$CCF$_3$)]$_2$ was stirred in 1.0 g hexylnorbornene. A and B components were mixed at room temperature and a flocculent yellow material formed immediately. The reaction did not polymerize for the first two minutes after mixing. The following reaction parameter describes the polymerization: $t_{Tmax}$=180° C. The reaction solution slowly polymerized within two minutes. A solid polymer object was obtained. Yield by TGA=97.1%.

EXAMPLE 132

A two-component polymerization system was prepared giving a reactant ratio of monomer:procatalyst:activator=1,000:1:1. Component A: LiWCA-H (0.056 g) and [(allyl)Pd(O$_2$CCF$_3$)]$_2$ (15 mg) were mixed 3.0 g of hexylnorbornene. This suspension was stirred at room temperature. Component B: 25 mg of tricyclohexylphosphine (PCy$_3$) were dissolved in 7.0 g of hexylnorbornene. A and B components were mixed at room temperature and heated to 65° C. The procatalyst and activator slurry slowly dissolved/reacted as the mass was heated. The reaction solution polymerized to a hard yellow puck and $t_{Tmax}$=205° C. Yield by TGA=96.4%.

EXAMPLE 133

A two-component polymerization system was prepared giving a reactant ratio of monomer:procatalyst:activator=1,000:1:1. Component A: LiWCA-H (56 mg) was dissolved in 9.0 g of hexylnorbornene. Component B: 26 mg (allyl)Pd(O$_2$CCF$_3$)PCy$_3$ was slurried in 1.0 g hexylnorbornene. A and B components were mixed and the polymerization was completed within 30 seconds. $t_{Tmax}$=200° C. A hard orange colored puck was obtained. Yield by TGA=98.5%.

EXAMPLE 134

A two-component polymerization system was prepared giving a reactant ratio of monomer:procatalyst:activator=2,000:1:1. Component A: LiWCA-H (28 mg) was dissolved in 8.5 g of hexylnorbornene and 0.5 g of norbornadiene dimer. Component B: 7 mg [(allyl)Pd(O$_2$CCF$_3$)]$_2$ was slurried in 1.0 g methylnorbornene. A and B components were mixed, the solution turned yellow, and gelled within 20 seconds. The polymerization exotherm reached 200° C. A hard yellow colored puck was obtained. Yield by TGA=92.3%.

EXAMPLE 135

A two-component polymerization system was prepared giving a reactant ratio of monomer:procatalyst:activator=1,000:1:1. Component A: LiWCA-H (0.59 g) was dissolved in 95 g of hexylnorbornene and 5 g of norbornadiene dimer. Component B: 0.16 g[(allyl)Pd(O$_2$CCF$_3$)]$_2$ was dissolved in 5 g hexylnorbornene. A and B components were mixed at 40° C. The following reaction parameters describe the reaction: $t_{gel}$=15 s, $t_{Tmax}$=251° C. An odorless solid object was obtained. Yield by TGA=95.4%.

EXAMPLE 136

A two-component polymerization system was prepared giving a reactant ratio of monomer:procatalyst:activator=2,000:1:5. Component A: LiWCA-H (28 mg) was dissolved in 9 g of hexylnorbornene. Component B: 3 mg [(allyl)Pd(O$_2$CCF$_3$)]$_2$ was dissolved in 5 g hexylnorbornene. A and B components were mixed at ambient temperature to yield a transparent, odorless puck. Yield by TGA=93.6%.

EXAMPLE 137

A two-component polymerization system was prepared giving a reactant ratio of monomer:procatalyst:activator=2, 000:1:1. Component A: LiWCA-H (56 mg) was dissolved in 8.5 g of hexylnorbornene and 0.5 g of norbornadiene dimer. Component B: 10 mg [(allyl)PdCl]$_2$ was slurried in 1.0 g methylnorbornene. A and B components were mixed, the solution turned yellow. The polymerization yielded a hard yellow colored puck. Yield by TGA=93.0%.

EXAMPLE 138

A two-component polymerization system was prepared giving a reactant ratio of monomer:procatalyst:activator=20,000:1:10. Component A: Li[Al(OC(CF$_3$)$_2$H)$_4$] (20 mg) was dissolved in 9.0 g of hexylnorbornene and heated to 60° C. Component B: 1.5 mg (allyl)Pd(O$_2$CCF$_3$)PCy$_3$ was dissolved in 1.0 g hexylnorbornene at 40° C. A and B components were mixed and the following reaction parameters describe the reaction: $t_{gel}$=9 s, t 110° C.=13 s, t 201° C.=17 s, $t_{Tmax}$=75 s, $t_{gel}$=69° C., $t_{Tmax}$=260° C. A solid object was obtained. Yield by TGA=96.6%.

EXAMPLE 139

A two-component polymerization system was prepared giving a reactant ratio of monomer:procatalyst:activator=20,000:1:2. Component A: LiWCA-CH$_3$ (12.0 mg) was dissolved in 9.0 g of hexylnorbornene and heated to 50° C. Component B: 1.5 mg (allyl)Pd(O$_2$CCF$_3$)PCy$_3$ was dissolved in 1.0 g hexylnorbornene at ambient temperature. A and B components were mixed and the following reaction parameters describe the reaction: $t_{gel}$=34 s, t 105° C.=46 s, t 201° C.=70 s, $t_{Tmax}$=105 s, $t_{gel}$=67° C., $t_{Tmax}$=223° C. A solid object was obtained. Yield by TGA=96.6%.

EXAMPLE 140

A two-component polymerization system was prepared giving a reactant ratio of monomer:procatalyst:activator=20,000:1:2. Component A: LiWCA-H (12.0 mg) was dissolved in 9.0 g of hexylnorbornene and heated to 50° C. Component B: 1.5 mg (allyl)Pd(O$_2$CCF$_3$)PCy$_3$ was dissolved in 1.0 g hexylnorbornene at ambient temperature. A and B components were mixed and the following reaction parameters describe the reaction: $t_{gel}$=70 s, t 101° C.=88 s, t 200° C.=145 s, $t_{Tmax}$=180 s, $t_{gel}$=68° C., $t_{Tmax}$=211° C. A solid object was obtained. Yield by TGA=95.1%.

EXAMPLE 141

A two-component polymerization system was prepared giving a reactant ratio of monomer:procatalyst:activator=20,000:1:2. Component A: LiWCA-H (12.0 mg) was dissolved in 9.0 g of hexylnorbornene and heated to 50° C. Component B: 1.5 mg (allyl)Pd(O$_2$CCF$_3$)PCy$_3$ was dissolved in 1.0 g hexylnorbornene at ambient temperature. A and B components were mixed and the following reaction parameters describe the reaction: $t_{gel}$=70 s, t 101° C.=88 s, t 200° C.=145 s, $t_{Tmax}$=180 s, $t_{gel}$=68° C., $t_{Tmax}$=211° C. A solid object was obtained. Yield by TGA=95.1%.

EXAMPLE 142

A two-component polymerization system was prepared giving a reactant ratio of monomer:procatalyst:activator=1,000:1:1. Component A: LiWCA-H (56 mg) was dissolved in 8.5 g of hexylnorbornene and 0.5 g of exo-trans-exo-norbornadiene dimer and heated to 50° C. Component B: 15 mg (π-allyl)Pd(O$_2$CCF$_3$)PCy$_3$ was dissolved in 1.0 g hexylnorbornene at 40° C. A and B components were mixed and the reaction turned bright orange and gelled within 15 seconds. The maximum polymerization was measured at 245° C. A solid orange-yellow puck was obtained. Yield by TGA=96.8%.

EXAMPLE 143

A two-component polymerization system was prepared giving a reactant ratio of monomer:procatalyst:activator=2,000:1:1. Component A: LiWCA-H (28 mg) was dissolved in 8.5 g of hexylnorbornene and 0.5 g of exo-trans-exo-norbornadiene dimer and heated to 55° C. Component B: 7.5 mg (π-allyl)Pd(O$_2$CCF$_3$)PCy$_3$ was dissolved in 1.0 g hexylnorbornene at 40° C. A and B components were mixed at 45° C. and the reaction mixture immediately turned orange, gelled within 15 seconds and reached a maximum temperature of 241° C. An odorless yellow puck was obtained. Yield by TGA=95.7%.

EXAMPLE 144

A two-component polymerization system was prepared giving a reactant ratio of monomer:procatalyst:activator=10,000:1:2. Component A: LiWCA-H (11.5 mg) was dissolved in 9.0 g of hexylnorbornene. Component B: 3 mg (π-allyl)Pd(O$_2$CCF$_3$)PCy$_3$ was dissolved in 1.0 g hexylnorbornene. A and B components were mixed at ambient temperature and the reaction mixture immediately turned yellow, gelled within 30 seconds and reached a maximum temperature of 251° C. An odorless yellow puck was obtained. Yield by TGA=97.0%.

EXAMPLE 145

A two-component polymerization system was prepared giving a reactant ratio of monomer:procatalyst:activator=20,000:1:2. Component A: LiWCA-H (5.5 mg) was dissolved in 7.5 g of hexylnorbornene and 0.5 g of exo-trans-exo-norbornadiene dimer and heated to 55° C. Component B: 7.5 mg (π-allyl)Pd(O$_2$CCF$_3$)PCy$_3$ was dissolved in 1.0 g hexylnorbornene. A and B components were mixed at ambient and the reaction mixture turned immediately yellow, gelled at 35 seconds and reached a maximum temperature of 210° C. An odorless yellow puck was obtained. Yield by TGA 93.2%.

EXAMPLE 146

A two-component polymerization system was prepared giving a reactant ratio of monomer:procatalyst:activator=20,000:1:2. Component A: LiWCA-H (5.6 mg) was dissolved in 8.0 g of hexylnorbornene and 1.0 g of 1,2,3,4,4a,5,8,8a-octahydro-1,4:5,8-dimethanonapthalene. Component B: 1.5 mg (π-allyl)Pd(O$_2$CCF$_3$)PCy$_3$ was dissolved in 1.0 g hexylnorbornene at ambient temperature. A and B components were mixed at ambient and the reaction mixture turned immediately yellow, gelled within 30 seconds and reached a maximum temperature of 225° C. An odorless yellow puck was obtained. Yield by TGA=88.3%.

EXAMPLE 147

A two-component polymerization system was prepared giving a reactant ratio of monomer:procatalyst:activator=20,000:1:2. Component A: LiWCA-H (5.6 mg) was dissolved in 9.0 g of hexylnorbornene. Component B: 1.5 mg (π-allyl)Pd(O$_2$CCF$_3$)PCy$_3$ was dissolved in 1.0 g hexylnorbornene. A and B components were mixed at ambient and the reaction mixture turned immediately yellow, gelled within 20 seconds and reached a maximum temperature of 241° C. An odorless orange puck was obtained. Yield by TGA=95.4%.

EXAMPLE 148

A two-component polymerization system was prepared giving a reactant ratio of monomer:procatalyst:activator=15, 000:1:1. Component A: LiWCA-CH$_3$ (45 mg) was dissolved in 115 g of hexylnorbornene and 6 g of exo-trans-exo-norbornadiene dimer. Component B: 24 mg (π-allyl)Pd (O$_2$CCF$_3$)PCy$_3$ was dissolved in 6 g hexylnorbornene. A and B components were mixed at ambient and the reaction mixture turned immediately yellow, gelled within 30 seconds and reached a maximum temperature of 248° C. An odorless yellow puck was obtained. Yield by TGA=96.2%.

EXAMPLE 149

A two-component polymerization system was prepared giving a reactant ratio of monomer:procatalyst:activator=20,000:1:2. Component A: LiWCA-H (11 mg) was dissolved in 8.5 g of hexylnorbornene and 0.5 g of exo-trans-exo-norbornadiene dimer. Component B: 3.2 mg (π-allyl)Pd (O$_2$CCF$_3$)PCy$_3$ was dissolved in 1.0 g methylnorbornene. A and B components were mixed at room temperature, gelled within 50 seconds, and the polymerization reached an internal temperature of 242° C.

EXAMPLE 150

A two-component polymerization system was prepared giving a reactant ratio of monomer:procatalyst:activator=20,000:1:2. Component A: LiWCA-H (11.5 mg) was dissolved in 7 g of hexylnorbornene and 2 g of exo-trans-exo-norbornadiene dimer. Component B: 3 mg (π-allyl)Pd (O$_2$CCF$_3$)PCy$_3$ was dissolved in 1.0 g methylnorbornene. A and B components were mixed at 28° C. The following reaction parameters describe the reaction: $t_{gel}$=12 s, t 104° C.=30 s, $t_{201° C.}$=42 s, $t_{Tmax}$=95 s, $t_{gel}$=38° C., $t_{Tmax}$=220° C. A solid object was obtained. Yield by TGA=89.0%.

EXAMPLE 151

A two-component polymerization system was prepared giving a reactant ratio of monomer:procatalyst:activator=10,000:1:1. Component A: LiWCA-H (11.5 mg) was dissolved in 9 g of hexylnorbornene. Component B: 3 mg (π-allyl)Pd (O$_2$CCF$_3$)PCy$_3$ was dissolved in 1.0 g methylnorbornene. A and B components were mixed at 29° C. The following reaction parameters describe the reaction: $t_{gel}$=28 s, $t_{100° C.}$=40 s, $t_{200° C.}$=45 s, $t_{Tmax}$=85 s, $t_{gel}$=50° C., $t_{Tmax}$=247° C. A solid object was obtained. Yield by TGA=96.4%.

EXAMPLE 152

A two-component polymerization system was prepared giving a reactant ratio of monomer:procatalyst:activator=10,000:1:1. Component A: LiWCA-H (11.5 mg) was dissolved in 9 g of hexylnorbornene. Component B: 3 mg (π-allyl)Pd (O$_2$CCF$_3$)PCy$_3$ was dissolved in 1.0 g methylnorbornene. A and B components were mixed at 29° C. The following reaction parameters describe the reaction: $t_{gel}$=28 s, $t_{100° C.}$=40 s, $t_{200° C.}$=45 s, $t_{Tmax}$=85 s, $t_{gel}$=50° C., $t_{Tmax}$=247° C. A solid object was obtained. Yield by TGA=96.4%.

EXAMPLE 153

A two-component polymerization system was prepared giving a reactant ratio of monomer:procatalyst:activator=10,000:1:1. Component A: LiWCA-H (11.5 mg) was dissolved in 7 g of hexylnorbornene. Component B: 3 mg (π-allyl)Pd (O$_2$CCF$_3$)PCy$_3$ was dissolved in 1.0 g hexylnorbornene. A and B components were mixed at 31° C. The following reaction parameters describe the reaction: $t_{gel}$=18 s, t 118° C.=28 s, t 214° C.=31 s, $t_{Tmax}$=75 s, $t_{gel}$=50° C., $t_{Tmax}$=268° C. A solid object was obtained. Yield by TGA=96.4%.

EXAMPLE 154

A two-component polymerization system was prepared giving a reactant ratio of monomer:procatalyst:activator=20,000:1:1. Component A: LiWCA-H (5.5 mg) was dissolved in 7 g of hexylnorbornene and 2 g of norbornene. Component B: 1.5 mg (π-allyl)Pd(O$_2$CCF$_3$)PCy$_3$ was dissolved in 1.0 g hexylnorbornene. A and B components were mixed at 29° C. The following reaction parameters describe the reaction: $t_{gel}$=40 s, $t_{100° C.}$=80 s, $t_{207° C.}$=83 s, $t_{Tmax}$=165 s, $t_{gel}$=41° C., $t_{Tmax}$=260° C. A solid object was obtained. Yield by TGA=92.4%.

EXAMPLE 155

A two-component polymerization system was prepared giving a reactant ratio of monomer:procatalyst:activator=50,000:1:2. Component A: LiWCA-H (6.8 mg) was dissolved in 23 g of hexylnorbornene and 6 g of norbornene. Component B: 1.8 mg (π-allyl)Pd(O$_2$CCF$_3$)PCy$_3$ was dissolved in 1.0 g hexylnorbornene. A and B components were mixed at 58° C. The following reaction parameters describe the reaction: $t_{gel}$=25 s, $t_{103° C.}$=45 s, $t_{204° C.}$=60 s, $t_{Tmax}$=118, $t_{gel}$=70° C., $t_{Tmax}$=241° C. A solid object was obtained. Yield by TGA=80.8%.

EXAMPLE 156

A two-component polymerization system was prepared giving a reactant ratio of monomer:procatalyst:activator=50,000:1:2. Component A: LiWCA-H (6.8 mg) was dissolved in 24 g of hexylnorbornene and 5 g of norbornene. Component B: 1.8 mg (π-allyl)Pd(O$_2$CCF$_3$)PCy$_3$ was dissolved in 1.0 g hexylnorbornene. A and B components were mixed at 65° C. The following reaction parameters describe the reaction: $t_{gel}$=12 s, $t_{100° C.}$=25 s, $t_{212° C.}$=36 s, $t_{Tmax}$=87 s, $t_{gel}$=72° C., $t_{Tmax}$=270° C. A solid object was obtained. Yield by TGA=80.8%.

EXAMPLE 157

A two-component polymerization system was prepared giving a reactant ratio of monomer:procatalyst:activator=25,000:1:2. Component A: LiWCA-H (13.6 mg) was dissolved in 24 g of hexylnorbornene and 5 g of methylnorbornene. Component B: 1.8 mg (π-allyl)Pd(O$_2$CCF$_3$)PCy$_3$ was dissolved in 1.0 g methylnorbornene. A and B components were mixed at 60° C. The following reaction parameters describe the reaction: $t_{gel}$=12 s, $t_{100° C.}$=20 s, $t_{200° C.}$=22 s, $t_{Tmax}$=175 s, $t_{gel}$=71° C., $t_{Tmax}$=269° C. A solid object was obtained. Yield by TGA=91.7%.

EXAMPLE 158

A two-component polymerization system was prepared giving a reactant ratio of monomer:procatalyst:activator=25,000:1:2. Component A: LiWCA-H (13.6 mg) was dissolved in 26 g of hexylnorbornene and 3 g of exo-trans-exo-norbornadiene dimer. Component B: 1.8 mg (π-allyl)Pd (O$_2$CCF$_3$)PCy$_3$ was dissolved in 1.0 g methylnorbornene. A and B components were mixed at 60° C. The following reaction parameters describe the reaction: $t_{gel}$=10 s, $t_{100° C.}$=17 s, $t_{200° C.}$=26 s, $t_{Tmax}$=85 s, $t_{gel}$=66° C., $t_{Tmax}$=250° C. A solid object was obtained. Yield by TGA=90.8%.

EXAMPLE 159

A two-component polymerization system was prepared giving a reactant ratio of monomer:procatalyst:activator=25,000:1:2. Component A: LiWCA-H (8.0 mg) was dissolved in 24 g of hexylnorbornene and 5 g of methylnorbornene. Component B: 4.5 mg (π-allyl)Pd(O$_2$CCF$_3$)PCy$_3$ was dissolved in 1.0 g methylnorbornene. A and B components were mixed at 60° C. The following reaction parameters describe the reaction: $t_{gel}$=14 s, $t_{101°\ C.}$=20 s, $t_{199°\ C.}$=28 s, $t_{Tmax}$=120 s, $t_{gel}$=76° C., $t_{Tmax}$=288° C. A solid object was obtained. Yield by TGA=86.0%.

EXAMPLE 160

A two-component polymerization system was prepared giving a reactant ratio of monomer:procatalyst:activator=25,000:1:2. Component A: LiWCA-H (32 mg) was dissolved in 117 g of butylnorbornene. Component B: 17 mg (π-allyl)Pd(O$_2$CCF$_3$)PCy$_3$ was dissolved in 3 g methylnorbornene. A and B components were mixed at 60° C. The following reaction parameters describe the reaction: $t_{gel}$=15 s, $t_{100°\ C.}$=22 s, $t_{210°\ C.}$=27 s, $t_{Tmax}$=105 s, $t_{gel}$=73° C., $t_{Tmax}$=288° C. A solid object was obtained. Yield by TGA=88.4%.

EXAMPLE 161

A two-component polymerization system was prepared giving a reactant ratio of monomer:procatalyst:activator=25,000:1:2. Component A: LiWCA-H (32 mg) was dissolved in 117 g of butylnorbornene and 12 g of exo-trans-exo-norbornadiene dimer. Component B: 17 mg (π-allyl)Pd(O$_2$CCF$_3$)PCy$_3$ was dissolved in 3 g butylnorbornene. A and B components were mixed at 60° C. The following reaction parameters describe the reaction: $t_{gel}$=10 s, t 106° C.=18 s, t 200° C.=23 s, $t_{Tmax}$=127 s, $t_{gel}$=70° C., $t_{Tmax}$=278° C. A solid object was obtained. Yield by TGA=89.4%.

EXAMPLE 162

A two-component polymerization system was prepared giving a reactant ratio of monomer:procatalyst:activator=25,000:1:1. Component A: LiWCA-H (6.7 mg) was dissolved in 29 g of hexylnorbornene. Component B: 3.6 mg (π-allyl)Pd(O$_2$CCF$_3$)PCy$_3$ was dissolved in 1 g hexylnorbornene. A and B components were mixed at 70° C. The following reaction parameters describe the reaction: $t_{gel}$=10 s, $t_{100°\ C.}$=12 s, $t_{206°\ C.}$=17 s, $t_{Tmax}$=100 s, $t_{gel}$=82° C., $t_{Tmax}$=272° C. A solid object was obtained. Yield by TGA=90.4%.

EXAMPLE 163

A two-component polymerization system was prepared giving a reactant ratio of monomer:procatalyst:activator=50,000:1:1. Component A: LiWCA-H (3.5 mg) was dissolved in 29 g of hexylnorbornene. Component B: 1.8 mg (π-allyl)Pd(O$_2$CCF$_3$)PCy$_3$ was dissolved in 1 g hexylnorbornene. A and B components were mixed at 60° C. The following reaction parameters describe the reaction: $t_{gel}$=30 s, $t_{100°\ C.}$=41 s, $t_{205°\ C.}$=56 s, $t_{Tmax}$=90 s, $t_{gel}$=79° C., $t_{Tmax}$=260° C. A solid object was obtained. Yield by TGA=93.5%.

EXAMPLE 164

A two-component polymerization system was prepared giving a reactant ratio of monomer:procatalyst:activator=25,000:1:1. Component A: LiWCA-H (3.5 mg) was dissolved in 27.5 g of hexylnorbornene and 1.5 g of exo-trans-exo-norbornadiene dimer. Component B: 3.4 mg (π-allyl)Pd(O$_2$CCF$_3$)PCy$_3$ was dissolved in 1 g hexylnorbornene. A and B components were mixed at 80° C. The following reaction parameters describe the reaction: $t_{gel}$=6 s, t 104° C.=10 s, t 205° C.=20 s, $t_{Tmax}$=80 s, $t_{gel}$=86° C., $t_{Tmax}$=250° C. A solid object was obtained. Yield by TGA=92.5%.

EXAMPLE 165

A two-component polymerization system was prepared giving a reactant ratio of monomer:procatalyst:activator=25,000:1:1. Component A: LiWCA-H (27 mg) was dissolved in 117 g of hexylnorbornene. The activator/monomer solution was degassed under vacuum prior to mixing with the procatalyst. Component B: 15 mg (π-allyl)Pd(O$_2$CCF$_3$)PCy$_3$ was dissolved in 3 g hexylnorbornene. A and B components were mixed at 60° C. The following reaction parameters describe the reaction: $t_{gel}$=25 s, $t_{100°\ C.}$=40 s, $t_{203°\ C.}$=50 s, $t_{Tmax}$=75 s, $t_{gel}$=74° C., $t_{Tmax}$=241° C. A solid puck with no voids was obtained.

EXAMPLE 166

A two-component polymerization system was prepared giving a reactant ratio of monomer:procatalyst:activator=25,000:1:1. Component A: LiWCA-H (27 mg) was dissolved in 111 g of hexylnorbornene and 1.5 g of exo-trans-exo-norbornadiene dimer. The activator/monomer solution was degassed under vacuum prior to mixing with the procatalyst. Component B: 15 mg (π-allyl)Pd(O$_2$CCF$_3$)PCy$_3$ was dissolved in 3 g hexylnorbornene. A and B components were mixed at 70° C. The following reaction parameters describe the reaction: $t_{gel}$=9 s, t 106° C.=16 s, t 204° C.=24 s, $t_{Tmax}$=140 s, $t_{gel}$=78° C., $t_{Tmax}$=267° C. A solid puck with no voids was obtained.

EXAMPLE 167

A two-component polymerization system was prepared giving a reactant ratio of monomer:procatalyst:activator=25,000:1:1. Component A: LiWCA-H (27 mg) was dissolved in 9 g of exo-pentylnorbornene. The activator/monomer solution was degassed under vacuum prior to mixing with the procatalyst. Component B: 1.3 mg (π-allyl)Pd(O$_2$CCF$_3$)PCy$_3$ was dissolved in 1 g exo-pentylnorbornene. A and B components were mixed at 60° C. The following reaction parameters describe the reaction: $t_{gel}$=180 s, $t_{160°\ C.}$=480 s, $t_{Tmax}$=720 s, $t_{gel}$=86° C., $t_{Tmax}$=234° C. A solid puck with no voids was obtained. Yield by TGA=89.4%.

EXAMPLE 168

A two-component polymerization system was prepared giving a reactant ratio of monomer:procatalyst:activator=25,000:1:1. Component A: LiWCA-H (2.4 mg) was dissolved in 9 g of hexylnorbornene. Component B: 1.3 mg (π-allyl)Pd(O$_3$SCF$_3$)PCy$_3$ was dissolved in 1 g hexylnorbornene. A and B components were mixed at 60° C. The following reaction parameters describe the reaction: $t_{gel}$=7 s, t 140° C.=10 s, t 208° C.=13 s, $t_{Tmax}$=60 s, $t_{gel}$=74° C., $t_{Tmax}$=260° C. A solid puck with no voids was obtained. Yield by TGA=97.0%.

EXAMPLE 169

A two-component polymerization system was prepared giving a reactant ratio of monomer:procatalyst:activator=25,000:1:1. Component A: LiWCA-H (2.4 mg) was dissolved in 9 g of hexylnorbornene. Component B: 1.3 mg (Me$_2$NCH$_2$C$_6$H$_4$)Pd(O$_3$SCF$_3$)PCy$_3$ was dissolved in 1 g hexylnorbornene. A and B components were mixed at 60° C. and the reaction medium turned yellow. The following reaction parameters describe the reaction: $t_{gel}$=135 s, $t_{100°\ C.}$=185 s, $t_{209°\ C.}$=193 s, $t_{Tmax}$=240 s, $t_{gel}$=71° C., $t_{Tmax}$=262° C. A solid puck with no voids was obtained. Yield by TGA=94.4%.

EXAMPLE 170

A two-component polymerization system was prepared giving a reactant ratio of monomer:procatalyst:activator=25, 000:1:5. Component A: $Li(OEt_2)_{2.5}[B(C_6F_5)_4]$ (10 mg) was dissolved in 0.7 g of triethoxysilylnorbornene. Component B: 1.2 mg $(\pi\text{-allyl})Pd(O_2CCF_3)PCy_3$ was dissolved in 1 g hexylnorbornene. A and B components were mixed at 60° C. and the reaction medium turned yellow, and polymerized within 60 seconds, wherein $t_{Tmax}$=220° C. A clear solid puck with no voids was obtained. Yield by TGA=95.0%.

EXAMPLE 171

A two-component polymerization system was prepared giving a reactant ratio of monomer:procatalyst:activator=25,000:1:2. Component A: $Li(OEt_2)_{2.5}[B(C_6F_5)_4]$ (10 mg) was dissolved in 8 g of hexylnorbornene and 1 g of butoxynorbornene. Component B: 1.2 mg $(\pi\text{-allyl})Pd(O_3SCF_3)PCy_3$ was dissolved in 1 g hexylnorbornene. A and B components were mixed at 50° C. and the reaction medium turned yellow. $t_{gel}$=230 s, $t_{101°\,C.}$=430 s, $t_{Tmax}$=660 s, $t_{gel}$=70° C., $t_{Tmax}$=175° C. A clear solid puck with no voids was obtained. Yield by TGA=93.49%.

EXAMPLE 172

A two-component polymerization system was prepared giving a reactant ratio of monomer:procatalyst:activator=25,000:1:2. Component A: $Li(OEt_2)_{2.5}[B(C_6F_5)_4]$ (4 mg) was dissolved in 1 g of triethoxysilylnorbornene and 8 g of hexylnorbornene. Component B: 1.3 mg $(\pi\text{-allyl})Pd(O_3SCF_3)PCy_3$ was dissolved in 1 g hexylnorbornene. A and B components were mixed at 55° C. The following reaction parameters describe the reaction: $t_{gel}$=180 s, $t_{100°\,C.}$=270 s, $t_{208°\,C.}$=345s, $t_{Tmax}$=375s, $t_{gel}$=82° C., $t_{Tmax}$=261° C. A solid puck with no voids was obtained. Yield by TGA=94.7%.

EXAMPLE 173

A two-component polymerization system was prepared giving a reactant ratio of monomer:procatalyst:activator=35,000:1:2. Component A: $Li(OEt_2)_{2.5}[B(C_6Fs)_4]$ (32 mg) was dissolved in 6 g of triethoxysilylnorbornene and 111 g of hexylnorbornene. Component B: 15 mg $(\pi\text{-allyl})Pd(O_3SCF_3)PCy_3$ was dissolved in 3 g hexylnorbornene. A and B components were mixed at 60° C. A solid clear slab with no voids was obtained. Yield by TGA=96.5%.

EXAMPLE 174

A two-component polymerization system was prepared giving a reactant ratio of monomer:procatalyst:activator=25,000:1:2. Component A: $Na[B(C_6H_3\text{-}3,5\text{-}(CF_3)_2)_4]$ (4 mg) was dissolved in 1 g of triethoxysilylnorbornene and 8 g of hexylnorbornene. Component B: 1.1 mg $(\pi\text{-allyl})Pd(O_2CCF_3)PCy_3$ was dissolved in 1 g hexylnorbornene. A and B components were mixed at room temperature and the solution turned yellow immediately. The polymerizing mass reached a maximum internal temperature of 244° C. A solid puck with no voids was obtained. Yield by TGA=92.9%.

EXAMPLE 175

A two-component polymerization system was prepared giving a reactant ratio of monomer:procatalyst:activator=25,000:1:2. Component A: LiWCA-H (9 mg) was dissolved in 19 g of rubberized hexylnorbornene (1 wt. % EPDM). Component B: 2.4 mg $(\pi\text{-allyl})Pd(O_2CCF_3)PCy_3$ was dissolved in 1 g rubberized hexylnorbornene. A and B components were mixed at 100° C. The following reaction parameters describe the reaction: $t_{gel}$=5 s, $t_{206°\,C.}$=10 s, $t_{Tmax}$=375 s, $t_{gel}$=110° C., $t_{Tmax}$=251° C. During the course of the reaction the solution changed color from clear yellow to a cloudy off white. A solid puck was obtained. Yield by TGA=91.8%.

EXAMPLE 176

A two-component polymerization system was prepared giving a reactant ratio of monomer:procatalyst:activator=25,000:1:2. Component A: LiWCA-H (9 mg) was dissolved in 0.7 g of triethoxysilylnorbornene and 19 g of rubberized hexylnorbornene (1 wt. % EPDM). Component B: 2.5 mg $(\pi\text{-allyl})Pd(O_2CCF_3)PCy_3$ was dissolved in 0.3 g triethoxysilylnorbornene. A and B components were mixed at 53° C. The following reaction parameters describe the reaction: $t_{gel}$=285 s, t 103° C.=390 s, t 203° C.=465 s, $t_{Tmax}$=525 s, $t_{gel}$=75° C., $t_{Tmax}$=216° C. A solid puck was obtained. Yield by TGA=90.0%.

EXAMPLE 177

A two component polymerization system was prepared giving a reactant ratio of monomer:procatalyst:activator=25,000:1:2. Component A: $Li(OEt_2)_{2.5}[B(C_6F_5)_4]$ (9 mg) was dissolved in 1.0 g of triethoxysilylnorbornene and 18 g of rubberized hexylnorbornene (1 wt. % EPDM). Component B: 2.4 mg $(\pi\text{-allyl})Pd(O_2CCF_3)PCy_3$ was dissolved in 1.0 g triethoxysilylnorbornene. A and B components were mixed at 60° C. The following reaction parameters describe the reaction: $t_{gel}$=135 s, $t_{100°\,C.}$=165 s, $t_{200°\,C.}$=190 s, $t_{Tmax}$=305 s, $t_{gel}$=94° C., $t_{Tmax}$=243° C. A solid puck was obtained. Yield by TGA=94.7%.

EXAMPLE 178

A two-component polymerization system was prepared giving a reactant ratio of monomer:procatalyst:activator=25,000:1:2. Component A: $[Ph_3C][Al(OC(CF_3)_2C_6H_5)_4]$ (7 mg) was stirred in 1 g of triethoxysilylnorbornene and 8 g of hexylnorbornene. This solution was heated to 60° C. to dissolve the activator. Component B: 2.4 mg $(\pi\text{-allyl})Pd(O_2CCF_3)PCy_3$ was dissolved in 1.0 g hexylnorbornene. A and B components were mixed at 60° C. A solid puck was obtained.

EXAMPLE 179

A two-component polymerization system was prepared giving a reactant ratio of monomer:procatalyst:activator=25,000:1:2. Component A: LiWCA-H (9 mg) was dissolved in 19.0 g of hexylnorbornene containing 2 wt. % Firestone 1107 polybutadiene. Component B: 2.5 mg $(\pi\text{-allyl})Pd(O_2CCF_3)PCy_3$ was dissolved in 1.0 g hexlylnorbornene. A and B components were mixed and heated in a 100° C. bath. A solid puck was obtained. Yield by TGA=92.9%.

EXAMPLE 180

A two-component polymerization system was prepared giving a reactant ratio of monomer:procatalyst:activator=25,000:1:2. Component A: LiWCA-H (9 mg) was dissolved in 0.7 g of triethoxysilylnorbornene and 19 g of rubberized hexylnorbornene (1 wt. % EPDM). Component B: 2.5 mg $(\pi\text{-allyl})Pd(O_2CCF_3)\,PCy_3$ was dissolved in 0.3 g triethoxysilylnorbornene. A and B components were mixed at 70° C. The following reaction parameters describe the reaction: $t_{gel}$=230 s, t 108° C.=230 s, t 203° C.=345 s, $t_{Tmax}$=465 s, $t_{gel}$=108° C., $t_{Tmax}$=253° C. A solid puck was obtained. Yield by TGA=93.9%.

EXAMPLE 181

A two-component polymerization system was prepared giving a reactant ratio of monomer:procatalyst:activator=25,000:1:2. Component A: LiWCA-H (2.4 mg) was dissolved in 0.7 g of triethoxysilylnorbornene and 19 g of rubberized hexylnorbornene (1 wt. % EPDM). Component B: 1.7 mg (π-allyl)Pd (O$_2$CCF$_3$)P (i-Pr)$_3$ was dissolved in 1 g hexylnorbornene. A and B components were mixed at 53° C. The following reaction parameters describe the reaction: t$_{gel}$=8 s and t$_{Tmax}$=255° C. A solid puck was obtained. Yield by TGA=96.7%.

EXAMPLE 182

A two-component polymerization system was prepared giving a reactant ratio of monomer:procatalyst:activator=20,000:1:1. Component A: LiWCA-H (4 mg) was dissolved in 9 g of ethylnorbornene. Component B: 1.9 mg (π-allyl)Pd (O$_3$SCF$_3$)P(i-Pr)$_3$ was dissolved in 3 g ethylnorbornene. The activator/monomer solution was degassed under vacuum prior to mixing with the procatalyst. A and B components were mixed at $_{23}$° C. The following reaction parameters describe the reaction: t$_{gel}$=390 s, t$_{100° C.}$=407 s, t$_{204° C.}$=415 s, t$_{Tmax}$=425 s, t$_{gel}$=51° C., t$_{Tmax}$=213° C. A solid puck was obtained.

EXAMPLE 183

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.5 mg (allyl)Pd (O$_3$SCF$_3$)P(i-pr)$_3$ was dissolved in 8.5 g butylnorbornene and 0.31 g norbornadiene. A and B components were mixed at 25° C. A solid object was obtained. Yield by TGA=94.1%. Swell in toluene overnight: 158%.

EXAMPLE 184

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.4 mg (allyl)Pd (O$_2$CCF$_3$)P(i-pr)$_3$ was dissolved in 9.0 g butylnorbornene. A and B components were mixed at 25° C. and the following reaction parameters describe the reaction: t$_{gel}$=4:00 min., t$_{100° C.}$=4:37 min., t$_{200° C.}$=4:40 min., t$_{Tmax}$=5:00 min., t$_{gel}$=38° C., t$_{Tmax}$=210° C. A solid object was obtained. Yield by TGA=96.7%.

EXAMPLE 185

A two-component polymerization system was prepared giving a reactant ratio of monomer:procatalyst:activator=20,000:1:2. Component A: LiFABA (5.8 mg) was dissolved in 0.71 g triethoxysilylnorbornene. Component B: 1.4 mg (allyl)Pd(O$_2$CCF$_3$)P(i-pr)$_3$ was dissolved in 9.5 g butylnorbornene. A and B components were mixed at 45° C. and the following reaction parameters describe the reaction: t$_{gel}$=20 s, t$_{100° C.}$=23 s, t$_{200° C.}$=24 s, t$_{Tmax}$=30 s, t$_{gel}$=71° C., t$_{Tmax}$=222° C. A solid object was obtained. Yield by TGA=94.4%.

EXAMPLE 186

A two-component polymerization system was prepared giving a reactant ratio of monomer:procatalyst:activator=20,000:1:2. Component A: LiFABA (5.8 mg) was partially dissolved in 0.71 g triethoxysilylnorbornene. Component B: 1.4 mg (allyl)Pd(P(i-Pr)$_3$)P(i-pr)$_3$ was dissolved in 9.5 g butylnorbornene. A and B components were opened to the air, stirred for 5 min., mixed at 25° C. and the following reaction parameters describe the reaction: t$_{gel}$=3:00, t$_{100° C.}$=3:36 min., t$_{Tmax}$=4:00 min., t$_{gel}$=40° C., t$_{Tmax}$=197° C. A solid object was obtained. Yield by TGA=95.9%.

EXAMPLE 187

A two-component polymerization system was prepared giving a reactant ratio of monomer:procatalyst:activator=20,000:1:1. Component A: LiWCA-H (3.4 mg) was partially dissolved in 1.0 g butylnorbornene. Component B: 1.4 mg (allyl)Pd(O$_2$CCF$_3$)P(i-pr)$_3$ was dissolved in 9.0 g butylnorbornene. A and B components were mixed at 45° C. and the following reaction parameters describe the reaction: t$_{gel}$=17 s, t$_{100° C.}$=21 s, t$_{200° C.}$=22 s, t$_{Tmax}$=40 s, t$_{gel}$=58° C., t$_{Tmax}$=222° C. A solid object was obtained. Yield by TGA=92.3%.

EXAMPLE 188

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.5 mg (allyl)Pd (O$_3$SCF$_3$)P(i-pr)$_3$ was dissolved in 8.9 g butylnorbornene and 0.10 g dicyclopentadiene. A and B components were mixed at 25° C. and the following reaction parameters describe the reaction: t$_{gel}$=12 s, t$_{100° C.}$=16 s, t$_{200° C.}$=20 s, t$_{Tmax}$=45 s, t$_{gel}$=40° C., t$_{Tmax}$=213° C. A solid object was obtained. Yield by TGA=96.4%.

EXAMPLE 189

LiWCA-H (3.4 mg) and 1.4 mg (allyl)Pd(O$_2$CCF$_3$)P(i-pr)$_3$ were combined in 1 ml methylene chloride and stirred for several minutes. This was added to 10.0 g butylnorbornene (reactant ratio of monomer:procatalyst:activator=20,000:1:1) at 25° C. and the following reaction parameters describe the reaction: t$_{gel}$=1:00 min., t$_{100° C.}$=1:10 min., t$_{200° C.}$=1:12 min., t$_{Tmax}$=1:30 min., t$_{gel}$=40° C., t$_{Tmax}$=209° C. A solid object was obtained. Yield by TGA=96.3%.

EXAMPLE 190

LiFABA (5.8 mg) and 1.4 mg (allyl)Pd(O$_2$CCF$_3$)P(i-pr)$_3$ were combined in 0.25 ml methylene chloride and stirred for several minutes. This solution was added to 10.0 g butylnorbornene (reactant ratio of monomer:procatalyst:activator=20,000:1:2) at 45° C. and the following reaction parameters describe the reaction: t$_{gel}$=5 s, t$_{100° C.}$=7 s, t$_{200° C.}$=9 s, t$_{Tmax}$=25 s, t$_{gel}$=60° C., t$_{Tmax}$=222° C. A solid object was obtained. Yield by TGA=92.6%.

EXAMPLE 191

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.8 mg (allyl)Pd (O$_3$SCF$_3$)P(cyclopentyl)$_3$ was dissolved in 9.0 g butylnorbornene. A and B components were mixed at 25° C. and the following reaction parameters describe the reaction: t$_{gel}$=23 s, t$_{100° C.}$=29 s, t$_{200° C.}$=30 s, t$_{Tmax}$=50 s, t$_{gel}$=49° C., t$_{Tmax}$=217° C. A solid object was obtained. Yield by TGA=96.3%.

EXAMPLE 192

A two-component polymerization system was prepared giving a reactant ratio of monomer:procatalyst:activator=20,000:1:2. Component A: LiFABA (5.8 mg) was dissolved in 0.71 g triethoxysilylnorbornene. Component B: 1.8 mg (allyl)Pd(O$_3$SCF$_3$)P(cyclopentyl)$_3$ was dissolved in 9.0 g butylnorbornene. A and B components were mixed at 25° C.

and the following reaction parameters describe the reaction: $t_{gel}$=29 s, $t_{100° C.}$=36 s, $t_{200° C.}$=38 s, $t_{Tmax}$=60 s, $t_{gel}$=65° C., $t_{Tmax}$=226° C. A solid object was obtained. Yield by TGA= 94.2%.

EXAMPLE 193

A two-component polymerization system was prepared giving a reactant ratio of monomer:procatalyst:procatalyst:activator=20,000:0.5:0.5:1. Component A: LiWCA-H (3.4 mg) was dissolved in 1.0 g butylnorbornene. Component B: 0.7 mg (allyl)Pd(O$_2$CCF$_3$)P(i-pr)$_3$ and 0.8 mg (allyl)Pd(O$_3$SCF$_3$)P(i-pr)$_3$ were dissolved in 9.0 g butylnorbornene. A and B components were mixed at 25° C. and the following reaction parameters describe the reaction: $t_{gel}$=23 s, $t_{100° C.}$=30 s, $t_{200° C.}$=34 s, $t_{Tmax}$=50 s, $t_{gel}$=43° C., $t_{Tmax}$=207° C. A solid object was obtained. Yield by TGA=94.9%.

EXAMPLE 194

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.8 mg (allyl)Pd(O$_3$SCF$_3$)P(cyclopentyl)$_3$ was dissolved in 8.5 g butylnorbornene and 0.5 g butenylnorbornene. A and B components were mixed at 25° C. and the following reaction parameters describe the reaction: $t_{gel}$=15 s, $t_{100° C.}$=19 s, $t_{200° C.}$=21 s, $t_{Tmax}$=40 s, $t_{gel}$=52° C., $t_{Tmax}$=221° C. A solid object was obtained. Yield by TGA=95.7%.

EXAMPLE 195

A two-component polymerization system was prepared giving a reactant ratio of monomer:procatalyst:activator=20,000:1:1. Component A: LiWCA-H (3.4 mg) was dissolved in 1.0 g butylnorbornene. Component B: 1.8 mg (allyl)Pd(O$_3$SCF$_3$)P(cyclopentyl)$_3$ was dissolved in 8.0 g butylnorbornene and 1.0 g butenylnorbornene. A and B components were mixed at 25° C. and the following reaction parameters describe the reaction: $t_{gel}$=23 s, $t_{100° C.}$=26 s, $t_{200° C.}$=29 s, $t_{Tmax}$=40 s, $t_{gel}$=58° C., $t_{Tmax}$=223° C. A solid object was obtained. Yield by TGA=96.4%.

EXAMPLE 196

A two-component polymerization system was prepared giving a reactant ratio of monomer:procatalyst:activator=50,000:1:1. Component A: LiWCA-H (1.3 mg) was dissolved in 1.0 g butylnorbornene. Component B: 0.7 mg (allyl)Pd(O$_3$SCF$_3$)P(cyclopentyl)$_3$ was dissolved in 9.0 g butylnorbornene. A and B components were mixed at 25° C. and the following reaction parameters describe the reaction: $t_{gel}$=37 s, $t_{100° C.}$=49 s, $t_{200° C.}$=54 s, $t_{Tmax}$=1:10 min., $t_{gel}$=44° C., $t_{Tmax}$=210° C. A solid object was obtained. Yield by TGA= 94.8%.

EXAMPLE 197

A two-component polymerization system was prepared giving a reactant ratio of monomer:procatalyst:activator= 100,000:1:1. Component A: LiWCA-H (5.0 mg) was dissolved in 74 g butylnorbornene. Component B: 2.3 mg (allyl)Pd(O$_3$SCF$_3$)P(i-pr)$_3$ was dissolved in 9.0 g butylnorbornene. A and B components were mixed at 40° C. and the following reaction parameters describe the reaction: $t_{gel}$=18 s, $t_{100° C.}$=35 s, $t_{200° C.}$=47 s, $t_{Tmax}$=1:00 min., $t_{gel}$=58° C., $t_{Tmax}$=215° C. A solid object was obtained. Yield by TGA= 86.2%

EXAMPLE 198

A two-component polymerization system was prepared giving a reactant ratio of monomer:procatalyst:activator= 100,000:1:2. Component A: LiFABA (8.7 mg) was dissolved in 1.0 g triethoxysilylnorbornene. Component B: 2.3 mg (allyl)Pd(O$_3$SCF$_3$)P(i-pr)$_3$ was dissolved in 74 g butylnorbornene. A and B components were mixed at 45° C. and the following reaction parameters describe the reaction: $t_{gel}$=27 s, $t_{100° C.}$=52 s, $t_{200° C.}$=60 s, $t_{Tmax}$=1:10 min., $t_{gel}$=55° C., $t_{Tmax}$=216° C. A solid object was obtained. Yield by TGA=89.3%

EXAMPLE 199

A two-component polymerization system was prepared giving a reactant ratio of monomer:procatalyst:activator=20,000:1:1. Component A: LiWCA-H (3.2 mg) was dissolved in 1.0 g tetracyclododecadiene. Component B: 1.4 mg (allyl)Pd(O$_3$SCF$_3$)(P-i-Pr)$_3$ was dissolved in 9.0 g tetracyclododecadiene. A and B components were mixed at 25° C. and the following reaction parameters describe the reaction: $t_{gel}$=18 s, $t_{100° C.}$=27 s, $t_{Tmax}$=50 s, $t_{gel}$=40° C., $t_{Tmax}$=163° C. A solid object was obtained. Yield by TGA=89.7%.

EXAMPLE 200

A two component polymerization system was prepared giving a reactant ratio of monomer:procatalyst:activator=20,000:1:1. Component A: LiWCA-H (3.4 mg) was dissolved in 1.0 g butylnorbornene. A stock solution of Component B: 15.3 mg (π-allyl)Pd(O$_3$SCF$_3$)(P(i-Pr)$_3$) was dissolved in 90.0 g butylnorbornene. Component A was mixed with 9.0 g Component B at 25° C. and the following reaction parameters describe the reaction: $t_{gel}$=14 s, $t_{100° C.}$=17 s, $t_{200° C.}$=22 s, $t_{Tmax}$=45 s, T$_{gel}$=50° C., $t_{Tmax}$=214° C. A solid object was obtained. Yield by TGA=97.8%.

The stock solution of Component B was stored at room temperature in a dry box in the dark for four months.

A two component polymerization system was prepared giving a reactant ratio of monomer:procatalyst:activator=20,000:1:1. Component A: LiWCA-H (3.4 mg) was dissolved in 1.0 g butylnorbornene. Component B: 9.0 g "aged" stock solution. A and B were mixed at 25° C. and the following reaction parameters describe the reaction: $t_{gel}$=22 s, $t_{100° C.}$=30 s, $t_{200° C.}$=33 s, $t_{Tmax}$=45 s, T$_{gel}$=40° C., $t_{Tmax}$=213° C. A solid object was obtained. Yield by TGA=96.9%.

EXAMPLE 201

A two component polymerization system was prepared giving a reactant ratio of monomer:procatalyst:activator=20,000:1:1. Component A: LiWCA-H (3.4 mg) was dissolved in 1.0 g butylnorbornene. Component B: 1.6 mg (crotyl)Pd(O$_3$SCF$_3$)(P(i-Pr)$_3$) was dissolved in 9.0 g butylnorbornene. A and B components were mixed at 25° C. and the following reaction parameters describe the reaction: $t_{gel}$=80 s, $t_{100° C.}$=90 s, $t_{200° C.}$=94 s, $t_{Tmax}$=110 s, T$_{gel}$=38° C., $t_{Tmax}$=210° C. A solid object was obtained. Yield by TGA=97.7%.

EXAMPLE 202

A two component polymerization system was prepared giving a reactant ratio of monomer procatalyst:activator= 20,000:1:1. Component A: LiWCA-H (3.4 mg) was dissolved in 1.0 g butylnorbornene. Component B: 1.6 mg (π-allyl)Pd(O$_3$SCF$_3$)(P(i-Pr)$_3$) and 0.01 g Disperse Blue 14 were dissolved in 9.0 g butylnorbornene. A and B components were mixed at 25° C. and the following reaction parameters describe the reaction: $t_{gel}$=14 s, $t_{100°\,C.}$=19 s, $t_{200°\,C.}$=21 s, $t_{Tmax}$=45 s, $T_{gel}$=43° C., $t_{Tmax}$=212° C. A solid object was obtained. Yield by TGA=94.6%.

EXAMPLE 203

A two component polymerization system was prepared giving a reactant ratio of monomer:procatalyst:activator=20,000:1:1. Component A: LiWCA-H (3.4 mg) was dissolved in 1.0 g butylnorbornene. Component B: 1.6 mg (7T-allyl) Pd(O$_3$SCF$_3$)(P(i-Pr)$_3$) and 0.01 g Disperse Red 1 were dissolved in 9.0 g butylnorbornene. A and B components were mixed at 25° C. and the following reaction parameters describe the reaction: $t_{gel}$=11 s, $t_{100°\,C.}$=14 s, $t_{200°\,C.}$=17 s, $t_{Tmax}$=30 s, $T_{gel}$=45° C., $t_{Tmax}$=211° C. A solid object was obtained. Yield by TGA=95.6%.

EXAMPLE 204

A two component polymerization system was prepared giving a reactant ratio of monomer:procatalyst:activator=20,000:1:1. Component A: LiWCA-H (3.4 mg) was dissolved in 1.0 g butylnorbornene. Component B: 1.6 mg (π-allyl) Pd(O$_3$SCF$_3$)(P(i-Pr)$_3$) and 0.1 g BHT-norbornene were dissolved in 9.0 g butylnorbornene. A and B components were mixed at 25° C. and the following reaction parameters describe the reaction: $t_{gel}$=11 s, $t_{100°\,C.}$=14 s, $t_{200°\,C.}$=17 s, $t_{Tmax}$=30 s, $T_{gel}$=45° C., $t_{Tmax}$=214° C. A solid object was obtained. Yield by TGA=96.8%.

EXAMPLE 205

A two component polymerization system was prepared giving a reactant ratio of monomer:procatalyst:activator=20,000:1:1. Component A: LiWCA-H (3.4 mg) was dissolved in 1.0 g butylnorbornene. Component B: 1.6 mg (π-allyl) Pd(O$_3$SCF$_3$)(P(i-Pr)$_3$) and 0.05 g BHT were dissolved in 9.0 g butylnorbornene. A and B components were mixed at 25° C. and the following reaction parameters describe the reaction: $t_{gel}$=13 s, $t_{100°\,C.}$=17 s, $t_{200°\,C.}$=19 s, $t_{Tmax}$=45 s, $T_{gel}$=46° C., $t_{Tmax}$=215° C. A solid object was obtained. Yield by TGA=96.1%.

EXAMPLE 206

A two component polymerization system was prepared giving a reactant ratio of monomer:procatalyst:activator=20,000:1:1. Component A: Li[B(C$_6$F$_5$)$_3$(hexyl)] (2.0 mg) was dissolved in 1.0 g butylnorbornene. Component B: 1.6 mg (allyl)Pd(O$_3$SCF$_3$)(P(i-Pr)$_3$) was dissolved in 9.0 g butylnorbornene. A and B components were mixed at 25° C. and the following reaction parameters describe the reaction: $t_{gel}$=19 s, $t_{100°\,C.}$=24 s, $t_{Tmax}$=60 s, $T_{gel}$=45° C., $t_{Tmax}$=170° C. A solid object was obtained. Yield by TGA=83.6%.

EXAMPLE 207

A two component polymerization system was prepared giving a reactant ratio of monomer:procatalyst:activator=20,000:1:1. Component A: LiWCA-H (3.4 mg) was dissolved in 1.0 g butylnorbornene. Component B: 1.6 mg (7T-allyl) Pd[N(SO$_2$CF$_3$)$_2$](P(i-Pr)$_3$) was dissolved in 9.0 g butylnorbornene. A and B components were mixed at 25° C. and the following reaction parameters describe the reaction: $t_{gel}$=45 s, $t_{100°\,C.}$=58 s, $t_{200°\,C.}$=66 s, $t_{Tmax}$=90 s, $T_{gel}$=46° C., $t_{Tmax}$=212° C. A solid object was obtained. Yield by TGA=96.6%.

EXAMPLE 208

A two component polymerization system was prepared giving a reactant ratio of monomer:procatalyst:activator=20,000:1:1. Component A: LiWCA-H (3.4 mg) was dissolved in 1.0 g butylnorbornene. Component B: 1.6 mg (π-allyl) Pd[N(SO$_2$CF$_3$)$_2$](P(i-Pr)$_3$) was dissolved in 9.0 g butylnorbornene. A and B components were mixed at 45° C. and the following reaction parameters describe the reaction: $t_{gel}$=10 s, $t_{100°\,C.}$=14 s, $t_{200°\,C.}$=25 s, $t_{Tmax}$=45 s, $T_{gel}$=64° C., $t_{Tmax}$=218° C. A solid object was obtained. Yield by TGA=93.0%.

EXAMPLE 209

A two component polymerization system was prepared giving a reactant ratio of monomer:procatalyst:activator=20,000:1:1. Component A: Li[B(C$_6$F$_5$)$_3$(hexyl)] (2.0 mg) was dissolved in 1.0 g butylnorbornene. Component B: 1.6 mg (π-allyl)Pd[N(SO$_2$CF$_3$)$_2$](P(i-Pr)$_3$) was dissolved in 9.0 g butylnorbornene. A and B components were mixed at 25° C. and the following reaction parameters describe the reaction: $t_{gel}$=21 s, $t_{100°\,C.}$=28 s, $t_{200°\,C.}$=35 s, $t_{Tmax}$=60 s, $T_{gel}$=55° C., $t_{Tmax}$=190° C. A solid object was obtained. Yield by TGA=88.4%.

EXAMPLE 210

A two component polymerization system was prepared giving a reactant ratio of monomer:procatalyst:activator=20,000:1:1. Component A: 4-tert-butyl-N,N-dimethylanilinium tetrakispentafluorophenylborate (2.9 mg) was slurried in 9.0 g butylnorbornene. Component B: 1.6 mg (allyl)Pd(C$_6$F$_5$)PCy$_3$ was dissolved in 1.0 g butylnorbornene. A and B components were mixed at 45° C. and the following reaction parameters describe the reaction: $t_{gel}$=4:30 min $t_{100°\,C.}$=5:30 min $t_{200°\,C.}$=5:42, $t_{Tmax}$=5:55, $T_{gel}$=58° C., $t_{Tmax}$=211° C. A solid object was obtained. Yield by TGA=92.0%.

EXAMPLE 211

A two component polymerization system was prepared giving a reactant ratio of monomer:procatalyst:activator=20,000:1:1. Component A: LiWCA-H (3.4 mg) was dissolved in 1.0 g butylnorbornene. Component B: 2.4 mg (allyl)Pd[N(SO$_2$CF$_3$)$_2$]PPh$_3$ was slurried in 9.0 g butylnorbornene. A and B components were mixed at 25° C. and the following reaction parameters describe the reaction: $t_{gel}$=1:25 min, $t_{100°\,C.}$=2:00, $t_{Tmax}$=3:00, $T_{gel}$=41° C., $t_{Tmax}$=191° C. A solid object was obtained. Yield by TGA=95.8%.

EXAMPLE 212

A two component polymerization system was prepared giving a reactant ratio of monomer:procatalyst:activator=20,000:1:1. Component A: LiWCA-H (3.4 mg) was dissolved in 1.0 g butylnorbornene. Component B: 1.6 mg (π-allyl) Pd(O$_3$SCF$_3$)(P(i-Pr)$_3$) and 0.05 g Ethanox® 330 were dissolved in 9.0 g butylnorbornene. A and B components were mixed at 25° C. and the following reaction parameters describe the reaction: $t_{gel}$=14 s, $t_{100°\,C.}$=17 s, $t_{200°\,C.}$=19 s, $t_{Tmax}$=35 s, $T_{gel}$=43° C., $t_{Tmax}$=215° C. A solid object was obtained. Yield by TGA=97.0%.

EXAMPLE 213

A two component polymerization system was prepared giving a reactant ratio of monomer:procatalyst:activator=20,000:1:1. Component A: LiWCA-H (3.4 mg) was dissolved in 1.0 g butylnorbornene. Component B: 2.2 mg (π-allyl) Pd[N(SO$_2$CF$_3$)$_2$]P(cyclopentyl)$_3$ was dissolved in 9.0 g butylnorbornene. A and B components were mixed at 25° C. and the following reaction parameters describe the reaction: $t_{gel}$=15 s, $t_{100°\,C.}$=20 s, $t_{200°\,C.}$=24 s, $t_{Tmax}$=60 s, $T_{gel}$=40° C., $t_{Tmax}$=217° C. A solid object was obtained. Yield by TGA=96.6%.

EXAMPLE 214

A tile of polybutyl norbornene was RIM molded using a 1:1 blend of butylnorbornene and butylnorbornene through the mix head of a University of Minnesota Micro-RIM machine. A reactant ratio of 20,000:1:1 (BuNB:(π-allyl)Pd (O$_3$SCF$_3$)(P(i-Pr)$_3$):LiWCA-H) was employed. This plaque was painted with a U.S. Paint consisting of F-1152 Primer, F-2010 Black Base Coat F-3053 Clear Coat. The paints were mixed using a 4:1 paint to G3010 catalyst ratio. They were reduced 25% by volume using T003 reducer.

A 10–15 minute flash time was used between coats to remove solvents. 1,After the clear coat, a 25 minute flash time was used before curing. The cure time used was 30 minutes at 180° F. This sample was tested using the ASTM cross hatch test and it passed.

EXAMPLE 215

A tile of polybutyl norbornene was RIM molded using a 1:1 blend of butylnorbornene and butylnorbornene through the mix head of a University of Minnesota Micro-RIM machine. A reactant ratio of 20,000:1:1 (BuNB:(π-allyl)Pd (O$_3$SCF$_3$)(P(i-Pr)$_3$):LiWCA-H) was employed. This plaque was painted with a U.S. Paint consisting of F-1152 Primer, F-2010 Black Base Coat, F-3053 Clear Coat. The paints were mixed using a 4:1 paint to G3010 catalyst ratio. They were reduced 25% by volume using T003 reducer.

A 10–15 minute flash time was used between coats to remove solvents. After the clear coat, a 25 minute flash time was used before curing. The cure time used was 30 minutes at 180° F.

The difference between this example and Example 224 is that a polypropylene primer was used before the 1152 primer. The polypropylene primer employed was used "as is," i.e., no catalyst was added and the paint was not diluted prior to application. The primer used is U.S. Paint product V-3008

This sample was tested using the ASTM cross hatch test and it passed.

EXAMPLE 216

A two component polymerization system was prepared giving a reactant ratio of monomer:procatalyst:activator=20,000:1:1. Component A: LiWCA-H (3.4 mg) was dissolved in 1.0 g butylnorbornene. Component B: 1.1 mg (allyl)Pd (O$_3$SCF$_3$)(P(i-Pr)$_3$) and 0.4 mg (crotyl)Pd(O$_3$SCF$_3$)(P(i-Pr)$_3$) was dissolved in 9.0 g butylnorbornene. A and B components were mixed at 30° C. and the following reaction parameters describe the reaction: $t_{gel}$=25 s, $t_{100° C.}$=30 s, $t_{200° C.}$=33 s, $t_{Tmax}$=40 s, $T_{gel}$=50° C., $t_{Tmax}$=216° C. A solid object was obtained. Yield by TGA=94.8%.

EXAMPLE 217

A two component polymerization system was prepared giving a reactant ratio of monomer:procatalyst:activator=20,000:1:1. Component A: LiWCA-H (3.4 mg) was dissolved in 1.0 g butylnorbornene. Component B: 0.7 mg (allyl)Pd (O$_3$SCF$_3$)(P(i-Pr)$_3$) and 0.8 mg (crotyl)Pd(O$_3$SCF$_3$)(P(i-Pr)$_3$) was dissolved in 9.0 g butylnorbornene. A and B components were mixed at 30° C. and the following reaction parameters describe the reaction: $t_{gel}$=58 s, $t_{100° C.}$=1:05 min, $t_{200° C.}$=1:08 min, $t_{Tmax}$=1:30 min, $T_{gel}$=46° C., $t_{Tmax}$=216° C. A solid object was obtained. Yield by TGA=94.8%.

EXAMPLE 218

A two component polymerization system was prepared giving a reactant ratio of monomer:procatalyst:activator=20,000:1:1. Component A: LiWCA-H (3.4 mg) was dissolved in 1.0 g butylnorbornene. Component B: 0.4 mg (allyl)Pd (O$_3$SCF$_3$)(P(i-Pr)$_3$) and 1.1 mg (crotyl)Pd(O$_3$SCF$_3$)(P(i-Pr)$_3$) was dissolved in 9.0 g butylnorbornene. A and B components were mixed at 30° C. and the following reaction parameters describe the reaction: $t_{gel}$=1:19 min, $t_{100° C.}$=1:27 min, $t_{200° C.}$=1:29 min, $t_{Tmax}$=1:50 min, $T_{gel}$=49° C., $t_{Tmax}$=216° C. A solid object was obtained. Yield by TGA=94.4%.

EXAMPLE 219

A two component polymerization system was prepared giving a reactant ratio of monomer:procatalyst:activator:moderator=20,000:1:1:0.1. Component A: LiWCA-H (3.4 mg) was dissolved in 1.0 g butylnorbornene. Component B: 1.5 mg (allyl)Pd(O$_3$SCF$_3$)(P(i-Pr)$_3$) and 0.09 mg PPh$_3$ was dissolved in 9.0 g butylnorbornene. A and B components were mixed at 30° C. and the following reaction parameters describe the reaction: $t_{gel}$=13 s, $t_{100° C.}$=17 s, $t_{200° C.}$=20 s, $t_{Tmax}$=40 s, $T_{gel}$=45° C., $t_{Tmax}$=215° C. A solid object was obtained. Yield by TGA=94.1%.

EXAMPLE 220

A two component polymerization system was prepared giving a reactant ratio of monomer:procatalyst:activator:moderator=20,000:1:1:0.5. Component A: LiWCA-H (3.4 mg) was dissolved in 1.0 g butylnorbornene. Component B: 1.5 mg (allyl)Pd(O$_3$SCF$_3$)(P(i-Pr)$_3$) and 0.45 mg PPh$_3$ was dissolved in 9.0 g butylnorbornene. A and B components were mixed at 30° C. and the following reaction parameters describe the reaction: $t_{gel}$=40 s, $t_{100° C.}$=55 s, $t_{200° C.}$=60 s, $t_{Tmax}$=1:15 min, $T_{gel}$=49° C., $t_{Tmax}$=210° C. A solid object was obtained. Yield by TGA=95.8%.

EXAMPLE 221

A two component polymerization system was prepared giving a reactant ratio of monomer:procatalyst:activator:moderator=20,000:1:1:0.1. Component A: LiWCA-H (3.4 mg) was dissolved in 1.0 g butylnorbornene. Component B: 1.5 mg (allyl)Pd(O$_3$SCF$_3$)(P(i-Pr)$_3$) and 0.09 mg PPh$_3$O was dissolved in 9.0 g butylnorbornene. A and B components were mixed at 30° C. and the following reaction parameters describe the reaction: $t_{gel}$=21 s, $t_{100° C.}$=25 s, $t_{200° C.}$=28 s, $t_{Tmax}$=40 s, $T_{gel}$=50° C., $t_{Tmax}$=214° C. A solid object was obtained. Yield by TGA=95.2%.

EXAMPLE 222

A two component polymerization system was prepared giving a reactant ratio of monomer:procatalyst:activator:moderator=20,000:1:1:0.5. Component A: LiWCA-H (3.4 mg) was dissolved in 1.0 g butylnorbornene. Component B: 1.5 mg (allyl)Pd(O$_3$SCF$_3$)(P(i-Pr)$_3$) and 0.45 mg PPh$_3$O was dissolved in 9.0 g butylnorbornene. A and B components were mixed at 30° C. and the following reaction parameters describe the reaction: $t_{gel}$=50 s, $t_{100° C.}$=1:02 min, $t_{200° C.}$=1:05, $t_{Tmax}$=1:30 min, $T_{gel}$=55° C., $t_{Tmax}$=214° C. A solid object was obtained. Yield by TGA=95.9%.

EXAMPLE 223

A two component polymerization system was prepared giving a reactant ratio of monomer:procatalyst:activator:moderator=20,000:1:1:0.7.

Component A: LiWCA-H (3.4 mg) was dissolved in 1.0 g butylnorbornene. Component B: 1.5 mg (allyl)Pd($O_3SCF_3$) (P(i-Pr)$_3$) and 0.65 mg PPh$_3$O was dissolved in 9.0 g butylnorbornene. A and B components were mixed at 30° C. and the following reaction parameters describe the reaction: $t_{gel}$=61 seconds, $t_{100° C.}$=74 seconds, $t_{200° C.}$=78 seconds, $t_{Tmax}$=100 seconds, $T_{gel}$=50° C., $t_{Tmax}$=211° C. A solid object was obtained. Yield by TGA=95.4%.

EXAMPLE 224

Li(HOCH$_3$)$_{2.5}$[B(C$_6$F$_5$)$_4$] (0.0052 g) was stirred in BuNB overnight. A solution of (allyl)Pd(P(i-Pr)$_3$)(O$_3$SCF$_3$) (0.0015 g in 5 g of BuNB) was added. The reaction gelled in under 2 minutes and exothermed to yield a solid object.

EXAMPLE 225

A two component polymerization system was prepared giving a reactant ratio of monomer:procatalyst:activator=20,000:1:1. Component A: Li(HO-i-Pr)$_3$[B(C$_6$F$_5$)$_4$] (Activator 10) (2.8 mg) was dissolved in 5 g butylnorbornene. Component B: 1.5 mg (π-allyl)Pd(O$_3$SCF$_3$)(P(i-Pr)$_3$) was dissolved in 5 g butylnorbornene. A and B components were mixed at 25° C. and the following reaction parameters describe the reaction: $t_{gel}$=130 s, $t_{100° C.}$=160 s, $t_{Tmax}$=175 s, $T_{gel}$=43° C., $t_{Tmax}$=206° C. A solid object was obtained. Yield by TGA=95.1%.

EXAMPLE 226

A two component polymerization system was prepared giving an approximate reactant ratio of monomer:procatalyst:activator=20,000:1:1.5. Component A: Li(HO-i-Pr)$_3$[B(C$_6$F$_5$)$_4$] (Activator 10) (4.2 mg) was dissolved in 5 g butylnorbornene. Component B: 1.5 mg (π-allyl)Pd(O$_3$SCF$_3$)(P(i-Pr)$_3$) was dissolved in 5 g butylnorbornene. A and B components were mixed at 28° C. and the following reaction parameters describe the reaction: $t_{gel}$=23 s, $T_{gel}$=47° C., $t_{Tmax}$=213° C. A solid object was obtained. Yield by TGA=94.4%.

EXAMPLE 227

A two component polymerization system was prepared giving an approximate reactant ratio of monomer:procatalyst:activator=20,000:1:2. Component A: Li(HO-i-Pr)$_3$[B(C$_6$F$_5$)$_4$] (Activator 10) (5.6 mg) was dissolved in 5 g butylnorbornene. Component B: 1.5 mg (π-allyl)Pd(O$_3$SCF$_3$)(P(i-Pr)$_3$) was dissolved in 5 g butylnorbornene. A and B components were mixed at 27° C. and the following reaction parameters describe the reaction: $t_{gel}$=24 s, $t_{100° C.}$=34 s, $t_{Tmax}$=74 s, $T_{gel}$=49° C., $t_{Tmax}$=212° C. A solid object was obtained. Yield by TGA=94.4%.

EXAMPLE 228

A two component polymerization system was prepared giving a reactant ratio of monomer:procatalyst:activator=20,000:1:1. Component A: Li[OC(CF$_3$)$_2$C$_6$H$_5$)$_4$]/Li[OC(CF$_3$)$_2$H)$_4$] (Activator 13) (2.9 mg) was dissolved in 5 g butylnorbornene. Component B: 1.5 mg (π-allyl)Pd(O$_3$SCF$_3$)(P(i-Pr)$_3$) was dissolved in 5 g butylnorbornene. A and B components were mixed at 30° C. and the following reaction parameters describe the reaction: $t_{gel}$=67 s, $t_{100° C.}$=81 s, $t_{200° C.}$=90 s, $t_{Tmax}$=100 s, $T_{gel}$=51° C., $t_{Tmax}$=207° C. A solid object was obtained. Yield by TGA=93.1%.

EXAMPLE 229

A two component polymerization system was prepared giving a reactant ratio of monomer:procatalyst:activator=20,000:1:1. Component A: Li(OEt$_2$)$_{2.5}$[B(C$_6$F$_5$)$_4$] (0.067 ml of a 0.05 M THF solution was added to the B Component. Component B: 1.5 mg (π-allyl)Pd(O$_3$SCF$_3$)(P(i-Pr)$_3$) was dissolved in 10 g butylnorbornene. A and B components were mixed at 28° C. and the following reaction parameters describe the reaction: $t_{gel}$=72 s, $t_{200° C.}$=90 s, $t_{Tmax}$=95 s, $T_{gel}$=48° C., $t_{Tmax}$=212° C. A solid object was obtained. Yield by TGA=95.4%.

EXAMPLE 230

A two component polymerization system was prepared giving a reactant ratio of monomer:procatalyst:activator=20,000:1:1. Component A: Li[OC(CF$_3$)$_2$C$_6$H$_5$)$_4$] (0.0034 g) was dissolved in 1.5 ml of 2 wt % Diene 55AM5 butylnorbornene solution was added to the B Component. Component B: 1.5 mg (π-allyl)Pd(O$_3$SCF$_3$)(P(i-Pr)$_3$) was dissolved in 9 g of 2 wt % Diene 55AM5 solution. A and B components were mixed at 27° C. and the following reaction parameters describe the reaction: $t_{gel}$=30 s, $t_{131° C.}$=60 s, $t_{187° C.}$=75 s, $t_{Tmax}$=90 s, $T_{gel}$=32° C., $t_{Tmax}$=192° C. A solid object was obtained.

EXAMPLE 231

A two component polymerization system was prepared giving an approximate reactant ratio of monomer:procatalyst:activator=20,000:1:1. Component A: Li(HO-n-Pr)$_{2.5}$[B(C$_6$F$_5$)$_4$] (Activator 11) (2.9 mg) was dissolved in 5 ml of butylnorbornene was added to the B-Component. Component B: 1.5 mg (π-allyl)Pd(O$_3$SCF$_3$) (P(i-Pr)$_3$) was dissolved in 5 ml of butylnorbornene. A and B components were mixed at 27° C. and the following reaction parameters describe the reaction: $t_{gel}$=30 s, $t_{100° C.}$=53 s, $t_{Tmax}$=75 s, $T_{gel}$=42.4° C., $t_{Tmax}$=>201° C. A solid object was obtained. Yield by TGA=94.5%.

EXAMPLE 232

A two component polymerization system was prepared giving an approximate reactant ratio of monomer:procatalyst:activator=20,000:1:1. Component A: Li(HO-t-Bu)$_3$[B(C$_6$F$_5$)$_4$] (Activator 12) (2.9 mg) was stirred in 5 ml of butylnorbornene for 30 minutes and was added to the B Component. Component B: 1.5 mg (π-allyl)Pd (O$_3$SCF$_3$)(P(i-Pr)$_3$) was dissolved in 5 ml of butylnorbornene. A and B components were mixed at 27° C. and the following reaction parameters describe the reaction: $t_{gel}$=63 s, $t_{90° C.}$=75 s, $t_{Tmax}$=100 s, $T_{gel}$=45° C., $t_{Tmax}$=205° C. A solid object was obtained.

EXAMPLE 233

A two component polymerization system was prepared giving a reactant ratio of monomer:procatalyst:activator=20,000:1:1. Component A: Li[OC(CF$_3$)$_2$C$_6$H$_5$)$_4$] (3.5 mg) was dissolved in 1 ml of butylnorbornene and was added to the B Component. Component B: 1.5 mg (π-allyl)Pd(O$_3$SCF$_3$) (P(i-Pr)$_3$) was dissolved in 9.55 g of butylnorbornene and 0.66 g of tricyclopentadiene. A and B components were mixed at 27° C. and the following reaction parameters describe the reaction: $t_{gel}$=30 s, $t_{121° C.}$=40 s, $t_{Tmax}$=75 s, $T_{gel}$=46° C., $t_{Tmax}$=208° C. A solid object was obtained.

EXAMPLE 234

A two component polymerization system was prepared giving a reactant ratio of monomer:procatalyst:activator=20,000:1:1. Component A: Li[OC(CF$_3$)$_2$C$_6$H$_5$)$_4$] (3.5 mg) was dissolved in 1 ml of butylnorbornene and was added to the B Component. Component B: 1.5 mg (π-allyl)Pd(O$_3$SCF$_3$)(P(i-Pr)$_3$) was dissolved in 9.05 g of butylnorbornene and 1.33 g of tricyclopentadiene. A and B components were mixed at 27° C. and the following reaction parameters describe the reaction: t$_{gel}$=25 s, t$_{75°\,C.}$=35 s, t$_{193°\,C.}$=45 s, t$_{Tmax}$=80 s, T$_{gel}$=42° C., t$_{Tmax}$=203° C. A solid object was obtained.

EXAMPLE 235

A two component polymerization system was prepared giving a reactant ratio of monomer:procatalyst:activator=20,000:1:1. Component A: Li[OC(CF$_3$)$_2$C$_6$H$_5$)$_4$]⁻ (3.5 mg) was dissolved in 1 ml of butylnorbornene and was added to the B Component. Component B: 1.5 mg (π-allyl)Pd(O$_3$SCF$_3$)(P(i-Pr)$_3$) was dissolved in 8.54 g of butylnorbornene and 1.99 g of tricyclopentadiene. A and B components were mixed at 27° C. and the following reaction parameters describe the reaction: t$_{gel}$=25 s, t$_{98°\,C.}$=30 s, t$_{196°\,C.}$=40 s, t$_{Tmax}$=60 s, T$_{gel}$=42° C., t$_{Tmax}$=202° C. A solid object was obtained.

EXAMPLE 236

(π-allyl)Pd(O$_3$SCF$_3$)(P(i-Pr)$_3$) (0.32 g) was reacted with Li[B(O$_2$C$_6$H$_2$-3,5-CMe$_3$)$_2$] (Activator 15) in dichloromethane for 16 hours. The reaction was filtered and stripped to dryness yielding a yellow solid characterized as [(π-allyl)Pd(P(i-Pr)$_3$)(solvent)][B(O$_2$C$_6$H$_2$-3,5-CMe$_3$)$_2$] (solvent=acetonitrile, methanol, or dichloromethane). For the polymerization experiment the reaction product was assumed to be [(π-allyl)Pd(P(i-Pr)$_3$)(B(O$_2$C$_6$H$_2$-3,5-CMe$_3$)$_2$] and a molar reactant ratio of 10,000:1 was employed (BuNB:Pd). Thus, (π-allyl)Pd(P(i-Pr)$_3$)(B(O$_2$C$_6$H$_2$-3,5-CMe$_3$)$_2$) (0.004 g) was dissolved in butylnorbornene (9 g) and heated slowly to 100° C. There was no apparent reaction, i.e., no thickening of the solution nor a spontaneous polymerization exotherm. Subsequent addition of Li[OC(CF$_3$)$_2$C$_6$H$_5$)$_4$] (3.5 mg) dissolved in butylnorbornene (1 g) resulted in an immediate polymerization exotherm that reached 205° C. A solid object was recovered. Yield by TGA=86.3%.

EXAMPLE 237

(π-allyl)Pd(O$_3$SCF$_3$)(P(i-Pr)$_3$) (0.32 g) was reacted with Li[B(O$_2$C$_6$H$_2$-3,5-CMe$_3$)$_2$] (Activator 15) in dichloromethane for 16 hours. The reaction was filtered and stripped to dryness yielding a yellow solid characterized as [(π-allyl)Pd(P(i-Pr)$_3$)(methanol)][B(O$_2$C$_6$H$_2$-3,5-CMe$_3$)$_2$]. A molar reactant ratio of 10,000:1 was employed (BuNB:Pd). Thus, [(π-allyl)Pd(P(i-Pr)$_3$)(methanol)](B(O$_2$C$_6$H$_2$-3,5-CMe$_3$)$_2$) (0.004 g) was dissolved in butylnorbornene (9 g) and heated to 45° C. There was no apparent reaction, i.e., no thickening of the solution nor a spontaneous polymerization exotherm. Subsequent addition of Li[OC(CF$_3$)$_2$C$_6$H$_5$)$_4$] (3.5 mg) dissolved in butylnorbornene (1 g) resulted in no apparent reaction. The mixture was then heated to 100° C. at which point the mixture gelled and, subsequently, the mixture provided its own polymerization exotherm that reached 203° C. A solid object was recovered. Yield by TGA=93.3%.

EXAMPLE 238

(π-allyl)Pd(O$_3$SCF$_3$)(P(i-Pr)$_3$) (0.32 g) was reacted with Li[B(O$_2$C$_6$H$_2$-3,5-CMe$_3$)$_2$] (Activator 15) in dichloromethane for 16 hours. The reaction was filtered and stripped to dryness yielding a yellow solid characterized as [(π-allyl)Pd(P(i-Pr)$_3$)(methanol)][B(O$_2$C$_6$H$_2$-3,5-CMe$_3$)$_2$]. A BuNB:Pd molar reactant ratio of 10,000:1 was employed. [(π-allyl)Pd(P(i-Pr)$_3$)(methanol)](B(O$_2$C$_6$H$_2$-3',5-CMe$_3$)$_2$) (0.004 g) was dissolved in 20 ml toluene containing butylnorbornene (9 g). The reaction mixture was heated to 50° C. After 16 hours the mixture was poured into isopropanol and no polymer was formed.

EXAMPLE 239

(π-allyl)Pd(O$_3$SCF$_3$)(P(i-Pr)$_3$) (0.32 g) was reacted with Li[B(O$_2$C$_6$Cl$_4$)$_2$] in dichloromethane for 16 hours. The reaction was filtered and stripped to dryness yielding a yellow solid characterized as [(π-allyl)Pd(P(i-Pr)$_3$)(NCCH$_3$)][B(O$_2$C$_6$Cl$_4$)$_2$] (solvent=acetonitrile, methanol, or dichloromethane). For the polymerization experiment the reaction product was assumed to be [(π-allyl)Pd(P(i-Pr)$_3$)(NCCH$_3$)](B(O$_2$C$_6$H$_2$-3,5-CMe$_3$)$_2$) and a BuNB:Pd molar reactant ratio of 10,000:1 was employed. [(π-allyl)Pd(P(i-Pr)$_3$)(NCCH$_3$)](B(O$_2$C$_6$H$_2$-3,5-CMe$_3$)$_2$) (0.005 g) was dissolved in butylnorbornene (9 g) and 20 ml toluene and the mixture heated at 50° C. for 16 hours. After this time the reaction medium was of higher viscosity than at the beginning of the experiment. The reaction mixture was poured into acetone to precipitate the polymer. The polymer was redissolved in toluene (150 ml) and reprecipitated in 1:3 mixture of acetone/isopropanol to give 2.04 g of polybutylnorbornene (Mw=490,000, Mn=292,000, and PDI=1.68).

EXAMPLE 240

[(π-allyl)Pd(P(i-Pr)$_3$)(NCCH$_3$)][B(O$_2$C$_6$Cl$_4$)$_2$] (0.005 g) was dissolved in 9 g of butylnorbornene. There was apparent reaction at room temperature, so the reaction mixture was slowly heated to approximately 100° C. at which time the mixture started to gel and polymerized resulting in a polymerization exotherm of great than 180° C. and a hard polymer. In contrast, when [(π-allyl)Pd(P(i-Pr)$_3$)(NCCH$_3$)](B(O$_2$C$_6$H$_2$-3,5-CMe$_3$)$_2$) was employed under identical conditions no reaction occurred.

EXAMPLE 241

[(π-allyl)Pd(P(i-Pr)$_3$)(NCCH$_3$)] [B(O$_2$C$_6$Cl$_4$)$_2$] (0.005 g) was dissolved in 9 g of butylnorbornene such that a molar BuNB:Pd reactant ratio of 10,000:1 was employed. There was initially no apparent reaction. A solution of Li[Al(OC(CF$_3$)$_2$C$_6$H$_5$)$_4$] (3.5 mg) in butylnorbornene (1 g) was then added to the palladium procatalyst monomer solution. A spontaneously polymerization exotherm began and the reaction mass polymerized into a hard puck. Yield by TGA=97.4%.

EXAMPLE 242

A two component polymerization system was prepared giving a reactant ratio of monomer:procatalyst:activator of 20,000:1:1. Component A: LiWCA-H (Li[Al(OC(CF$_3$)$_2$C$_6$F$_5$)$_4$]) (3.4 mg) was dissolved in 1.0 g butylnorbornene. Component B: 1.5 mg (π-allyl)Pd(O$_3$SCF$_3$)(P(i-Pr)$_3$) and 0.1 g (approximately 15 volume %) 3M K-I Scotchlite Brand Glass Bubbles were mixed in 9.0 g butylnorbornene. The A and B components were mixed at 23° C. and the following reaction parameters describe the reaction: t$_{100°\,C.}$=23 s, t$_{200°\,C.}$=28 s, t$_{Tmax}$=40 so t$_{Tmax}$=211° C. A solid object was obtained. This object floated when dropped into a water bath.

EXAMPLE 243

A two component polymerization system was prepared giving a reactant ratio of monomer:procatalyst:activator of 20,000:1:1. Component A: LiWCA-H (Li[Al(OC(CF$_3$)$_2$C$_6$F$_5$)$_4$]) (3.4 mg) was dissolved in 1.0 g butylnorbornene. Component B: 1.5 mg (π-allyl)Pd(O$_3$SCF$_3$)(P(i-Pr)$_3$) and 1.00 g (approximately 50 volume %) 3M K-1 Scotchlite Brand Glass Bubbles were mixed 9.0 g butylnorbornene. A and B components were mixed at 25° C. and the following reaction parameters describe the reaction: $t_{100° C.}$=25 s, $t_{Tmax}$=30 s, $T_{gel}$=45° C., and $t_{Tmax}$=185° C. A solid object was obtained. This object floated when dropped into a water bath.

What is claimed is:

1. A storage stable reactant formulation for in-mold polymerization consisting essentially of a procatalyst and a monomer wherein said procatalyst is a compound of the formula:

[R'ML'$_x$A']

wherein M represents a Group 10 transition metal; R' represents hydrogen or an anionic ligand selected from the groups consisting of linear and branched C$_1$–C$_{20}$ alkyl, C$_5$–C$_{10}$ cycloalkyl, linear and branched C$_2$–C$_{20}$ alkenyl, C$_6$–C$_{15}$ cycloalkenyl, allylic ligands or canonical forms thereof, C$_6$–C$_{30}$ aryl, C$_6$–C$_{30}$ heteroatom containing aryl, and C$_7$–C$_{30}$ aralkyl, each of the foregoing groups can be optionally substituted with hydrocarbyl and/or heteroatom substituents preferably selected from linear or branched C$_1$–C$_5$ alkyl, linear or branched C$_1$–C$_5$ haloalkyl, linear or branched C$_2$–C$_5$ alkenyl and haloalkenyl, halogen, sulfur, oxygen, nitrogen, phosphorus, and phenyl optionally substituted with linear or branched C$_1$–C$_5$ alkyl, linear or branched C$_1$–C$_5$ haloalkyl, and halogen;

L' represents a Group 15 neutral electron donor ligand; A' is an anionic leaving group; x is 1 or 2;

and the monomer comprises a multi-functional polycycloolefin containing at least two polymerizable norbornene-type moieties.

2. The reactant composition of claim 1 wherein M is selected from the group consisting of nickel, palladium, and platinum.

3. The reactant composition of claim 1 wherein R' is selected from the group consisting of hydrogen; linear and branched C$_1$–C$_{20}$ alkyl; linear and branched C$_2$—C$_{20}$ a alkenyl; allylic ligands and canonical forms thereof; substituted and unsubstituted C$_5$–C$_{10}$ cycloalkyl; substituted and unsubstituted C$_6$–C$_{15}$ cycloalkenyl; substituted and unsubstituted C$_7$–C$_{30}$ aralkyl; substituted and unsubstituted, C$_6$–C$_{30}$ aryl; C$_6$–C$_{30}$ heteroatom containing aryl; wherein said heteroatom is selected from the group consisting of sulfur, oxygen, nitrogen, phosphorus, wherein the substituents in said substituted radicals are selected from the group consisting of linear or branched C$_1$–C$_5$ alkyl, linear or branched C$_1$–C$_5$ haloalkyl, linear or branched C$_2$–C$_5$ alkenyl, haloalkenyl, halogen, and phenyl optionally substituted with linear or branched C$_1$–C$_5$ alkyl, linear or branched C$_1$–C$_5$ haloalkyl, and halogen; and a hydrocarbyl containing ligand selected from the formulae:

—C$_{d'}$H$_{2d'}$—, —C$_{d'}$H$_{2d'}$X→ each of said ligands together with the Group 10 metal form a metallacycle or heteroatom containing metallacycle, wherein d' represents an integer from 3 to 10, and X→ represents an alkenyl or heteroatom containing moiety that coordinates to the Group 10 metal center.

4. The reactant composition of claim 3 wherein said allylic ligand is represented by the formula:

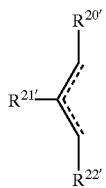

wherein R$^{20'}$, R$^{21'}$, and R$^{22'}$ each independently represent hydrogen, halogen, linear and branched C$_1$–C$_5$ alkyl, C$_5$–C$_{10}$ cycloalkyl, linear and branched C$_1$–C$_5$ alkenyl, C$_6$–C$_{30}$ aryl, and C$_7$–C$_{30}$ aralkyl, each of the foregoing radicals optionally substituted with a substituent selected from linear and branched C$_1$–C$_5$ alkyl, linear and branched C$_1$–C$_5$ haloalkyl, halogen, and phenyl which can optionally be substituted with linear and branched C$_1$–C$_5$ alkyl, linear and branched C$_1$–C$_5$ haloalkyl, and halogen; any two of R$^{20'}$, R$^{21'}$, and R$^{22'}$ can be linked together with the carbon atoms to which they are attached to form a cyclic or multi-cyclic ring, each optionally substituted with linear or branched C$_1$–C$_5$ alkyl, linear or branched C$_1$–C$_5$ haloalkyl, and halogen.

5. The reactant composition of claim 1 wherein said group 15 electron donor ligand is selected from the group consisting of amines, pyridines, arsines, stibines and organophosphorus containing compounds.

6. The reactant composition of claim 5 wherein said organophosphorus containing ligand is selected from a compound of the formula:

P(R$^7$)$_g$[X'(R$^7$)$_h$]$_{3-g}$ wherein X' is oxygen, sulfur, nitrogen, or silicon; g is 0, 1, 2, or 3; his 1, 2, or 3, with the proviso that when X' is a silicon atom, h is 3, when X' is an oxygen or sulfur atom h is 1, and when X' is a nitrogen atom, h is 2; R$^{7'}$ is independently selected from hydrogen, linear and branched C$_1$–C$_{10}$ alkyl, C$_5$–C$_{10}$ cycloalkyl, linear and branched C$_1$–C$_{10}$ alkoxy, allyl, linear and branched C$_2$–C$_{10}$ alkenyl, C$_6$–C$_{12}$ aryl, C$_6$–C$_{12}$ aryloxy, C$_6$–C$_{12}$ arylsulfides, C$_7$–C$_{18}$ aralkyl, cyclic ethers and thioethers, tri(linear and branched C$_1$–C$_{10}$ alkyl)silyl, tri(C$_6$–C$_{12}$ aryl)silyl, tri(linear and branched C$_1$–C$_{10}$ alkoxy)silyl, triaryloxysilyl, tri(linear and branched C$_1$–C$_{10}$ alkyl)siloxy, and tri(C$_6$–C$_{12}$ aryl)siloxy, wherein each of the foregoing substituents can be optionally substituted with linear or branched C$_1$–C$_5$ alkyl, linear or branched C$_1$–C$_5$ haloalkyl, C$_1$–C$_5$ alkoxy, halogen, and combinations thereof; when g is 0 and X' is oxygen, any two or 3 of R$^{7'}$ can be taken together with the oxygen atoms to which they are attached to form a cyclic moiety; when g is 3 any two of R$^{7'}$ can be taken together with the phosphorus atom to which they are attached to represent a phosphacycle of the formula:

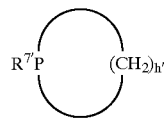

wherein R$^{7'}$ is as previously defined and h' is an integer from 4 to 11.

7. The reactant composition of claim 6 wherein g is 3 and R$^{7'}$ is independently selected from the group consisting of hydrogen, linear and branched C$_1$–C$_{10}$ alkyl, C$_5$–C$_{10}$ cycloalkyl, linear and branched C$_1$–C$_{10}$ alkoxy, allyl, linear and branched C$_2$–C$_{10}$ alkenyl, C$_6$–C$_{12}$ aryl, and C$_6$–C$_{12}$ aryloxy.

8. The reactant composition of claim 5 wherein said organophosphorus containing ligand is a phosphine selected from the group consisting of trimethylphosphine, triethylphosphine, tri-n-propylphosphine, triisopropylphosphine, tri-n-butylphosphine, tri-sec-butylphosphine, tri-i-butyl-phosphine, tri-t-butylphosphine, tricyclopentylphosphine, triallyl-phosphine, tricyclohexylphosphine, triphenylphosphine, trinaphthylphosphine, tri-p-tolyl-phosphine, tri-o-tolylphosphine, tri-m-tolylphosphine, tribenzylphosphine, tri(p-trifluoromethyl-phenyl)phosphine, tris(trifluoromethyl) phosphine, tri(p-fluoro-phenyl)phosphine, tri(p-trifluoromethylphenyl)phosphine, allyldiphenylphosphine, benzyldiphenylphosphine, bis(2-furyl)phosphine, bis(4-methoxyphenyl)-phenylphosphine, bis(4-methylphenyl)phosphine, bis(3,5-bis(trifluoromethyl)-phenyl)phosphine, t-butylbis(trimethylsilyl) phosphine, t-butyl-diphenyl phosphine, cyclohexyldiphenylphosphine, diallylphenylphosphine, dibenzylphosphine, dibutylphenylphosphine, dibutylphosphine, di-t-butylphosphine, dicyclohexylphosphine, diethylphenylphosphine, di-i-butylphosphine, dimethylphenylphosphine, dimethyl(tri-methylsilyl) phosphine, diphenylphosphine, diphenylpropylphosphine, diphenyl(p-tolyl) phosphine, diphenyl(trimethylsilyl) phosphine, diphenylvinyl-phosphine, divinylphenyl phosphine, ethyldiphenylphosphine, (2-methoxyphenyl)methylphenylphosphine, tri-n-octylphosphine, tris(3,5-bis (trifluoromethyl)phenyl) phosphine, tris(3-chlorophenyl) phosphine, tris(4-chloro-phenyl)phosphine, tris(2,6-dimethoxyphenyl)phosphine, tris(3-fluorophenyl) phosphine, tris(2-furyl)] phosphine, tris(2-methoxyphenyl) phosphine, tris(3-methoxyphenyl)phosphine, tris(4-methoxyphenyl)phosphine, tris(3-methoxypropyl) phosphine, tris(2-thienyl)-phosphine, tris(2,4,6-trimethylphenyl)phosphine, tris(trimethylsilyl)phosphine, isopropyldiphenylphosphine, dicyclohexylphenylphosphine, (+)-neomenthyldiphenyl phosphine, tribenzylphosphine, diphenyl-(2-methoxy-phenyl)phosphine, diphenyl (pentafluorophenyl)phosphine, bis(pentafluorophenyl)-phenylphosphine, and tris (pentafluorophenyl)phosphine.

9. A storage stable reactant composition for in-mold polymerization consisting essentially of an activator salt and a monomer wherein said activator salt is represented by the formula:

$$[C(L")_z]_b[WCA]_d$$

wherein C represents a proton, an alkali metal cation, an alkaline earth metal cation, a transition metal cation or an organic group containing cation, L" is a labile neutral electron donor ligand, and WCA is a weakly coordinating counteranion, z is an integer from 0 to 8, and b and d represent the number of times the cation complex and weakly coordinating counteranion complex, respectively, are taken to balance the electronic charge on the overall salt complex, and the monomer comprises a multifunctional polycycloolefin containing at least two polymerizable norbornene-type moieties.

10. The reactant composition of claim 9 wherein said labile neutral electron donor ligand is selected from the group consisting of DMF, DMSO, cyclooctadiene, water, chlorinated alkanes, alcohols, ethers, ketones, nitriles, arenes, phosphine oxides, organic carbonates and esters.

11. The reactant composition of claim 1 wherein said anionic leaving group is selected from the group consisting of halogen, nitrate, triflate, triflimide trifluoroacetate, tosylate, $AlBr_4^-$, $AlF_4^-$, $AlCl_4^-$, $AlF_3O_3SCF_3^-$, $AsCl_6^-$, $SbCl_6^-$, $SbF_6^-$, $PF_6^-$, $BF_4^-$, $ClO_4^-$, $HSO_4^-$, carboxylates, acetates, acetylacetonates, carbonates, aluminates, borates, hydrocarbyl and halogenated hydrocarbyl selected from hydride, linear and branched $C_1$–$C_5$ alkyl, linear and branched $C_1$–$C_5$ haloalkyl, $C_5$–$C_{10}$ cycloalkyl, $C_5$–$C_{10}$ cyclohaloalkyl, $C_6$–$C_{10}$ aryl, and $C_6$–$C_{10}$ haloaryl, wherein said cyclohaloalkyl and haloaryl groups are monosubstituted or multisubstituted with a halogen group selected from bromine, chlorine, fluorine, and iodine.

12. The reactant composition of claim 1 wherein said procatalyst is a compound selected from the group consisting of bis(triisopropylphosphine)(hydrido)palladium chloride, bis(triisopropylphosphine) (hydrido)palladium nitrate, bis(triisopropylphosphine)-(hydrido)palladium triflate, (allyl)palladium(triisopropylphosphine) chloride, (methallyl) palladium(triisopropylphosphine) chloride, (crotyl)palladium(triisopropylphosphine) chloride, (allyl) palladium(triisopropylphosphine) trifluoroacetate, (1,1-dimethyl-π-allyl-(triisopropylphosphine)palladium trifluoroacetate, (2-chloroallyl)palladium-(triisopropylphosphine) trifluoroacetate, (allyl)palladium (triisopropylphosphine) triflate, (crotyl)palladium (triisopropyl-phosphine) triflate, (methallyl)palladium (triisopropylphosphine) triflate, (allyl)palladium-(triisopropylphosphine) triflimide, (methallyl)palladium (triisopropylphosphine) triflimide, bis(tricyclohexyl-phosphine)(hydrido)palladium chloride, bis (tricyclohexylphosphine)(hydrido) palladium nitrate, bis (tricyclohexylphosphine)(hydrido)palladium trifluoroacetate, bis(tricyclohexyl phosphine)(hydrido) palladium formate, (allyl)palladium(tricyclohexyl-phosphine) chloride, (methallyl)palladium (tricyclohexylphosphine) chloride, (allyl)palladium-(tricyclohexylphosphine) trifluoroacetate, (allyl)palladium-(tricyclohexylphosphine) triflate, (methallyl)palladium (tricyclohexylphosphine) triflate, (crotyl)palladium (tricyclohexylphosphine) triflate, (methallyl)palladium (tricyclohexylphosphine) triflimide, (allyl)palladium-(tricyclohexylphosphine) p-tolylsulfonate, (allyl)palladium (tricyclohexylphosphine) triflimide, (allyl)palladium (tricyclopentylphosphine)chloride, (methallyl)palladium (tricyclopentyl-phosphine) chloride, (allyl)palladium (tricyclepentylphosphine) triflate, (crotyl)palladium-(tricyclopentylphosphine) triflate, (methallyl)palladium (tricyclopentylphosphine) triflate, (allyl)palladium (tricyclopentylphosphine) triflimide, (methallyl)palladium (tricyclopentyl-phosphine)triflimide, (allyl)palladium (triisopropylphosphine)$C_6F_5$, (allyl)palladium(tricyclehexylphosphine) $C_6F_5$, and [(allyl)palladium($HOCH_3$) (triisopropylphosphine)][$B(O_2-3,4,5,6-Cl_4C_6)_2$].

13. The composition of claim 9 wherein said alkali metal cation is selected from the group consisting of lithium, sodium, and potassium; said alkaline earth metal cation is selected from the group consisting of beryllium, magnesium, calcium, strontium, and barium; said transition metal cation is selected from the group consisting of zinc, silver, and thallium; and said organic group cation is selected from ammonium, phosphonium, carbonium and silylium cations.

14. The reactant composition of claim 13 wherein said ammonium cation is selected from a compound of the formulae:

$$[NHR^{41'}{}_3]^+, [NR^{41'}{}_4]^+$$

wherein $R^{41'}$ independently represents a hydrocarbyl, silylhydrocarbyl, or perfluorocarbyl group, each containing 1 to 24 carbon atoms.

15. The reactant composition of claim 13 wherein said carbonium cation is selected from a compound of the formula:

$$[R^{41'}{}_3C]^+$$

wherein $R^{41'}$ independently represents a hydrocarbyl, silylhydrocarbyl, or perfluorocarbyl group, each containing 1 to 24 carbon atoms.

16. The reactant composition of claim 9 wherein said weakly coordinating counteranion is selected from the group consisting of borates, aluminates, boratobenzene anions, carborane anions, and halocarborane anions.

17. The reactant composition of claim 16 wherein the weakly coordinating anion is a borate or aluminate of the formula:

$$[M'(R^{24'})(R^{25'})(R^{26'})(R^{27'})]$$

wherein M' is boron or aluminum and $R^{24'}$, $R^{25'}$, $R^{26'}$, and $R^{27'}$ independently represent fluorine, linear and branched $C_1$–$C_{10}$ alkyl, linear and branched $C_1$–$C_{10}$ alkoxy, linear and branched $C_3$–$C_5$ haloalkenyl, linear and branched $C_3$–$C_{12}$ trialkylsiloxy, $C_{18}$–$C_{36}$ triarylsiloxy, substituted and unsubstituted $C_6$–$C_{30}$ aryl, and substituted and unsubstituted $C_6$–$C_{30}$ aryloxy groups, wherein $R^{24'}$ to $R^{27'}$ can not simultaneously represent alkoxy or simultaneously represent aryloxy, and wherein said aryl and aryloxy groups when substituted are monosubstituted or multisubstituted and said substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_5$ haloalkoxy, linear and branched $C_1$–$C_{12}$ trialkylsilyl, $C_6$–$C_{18}$ triarylsilyl, and halogen selected from chlorine, bromine, and fluorine.

18. The reactant composition of claim 17 wherein said borate is selected from the group consisting of tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetra-fluorophenyl)borate, tetrakis (3,4,5,6-tetrafluorophenyl)borate, tetrakis(3,4,5-trifluorophenyl)borate, methyltris (perfluorophenyl)borate, ethyltris(perfluorophenyl)borate, phenyltris(perfluoro-phenyl)borate, tetrakis(1,2,2-trifluoroethylenyl)borate, tetrakis(4-tri-i-propylsilyl-tetrafluoro-phenyl)borate, tetrakis(4-dimethyl-tert-butylsilyltetrafluorophenyl)borate, (triphenylsiloxy)tris-(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl) phenyl]borate, and tetrakis[3-[2,2,2-trifluoro-1-(2,2,2-trifluoroethoxy)-1-(trifluoromethyl)ethyl]-5-(trifluoromethyl)phenyl]borate.

19. The reactant composition of claim 17 wherein said aluminate is selected from the group consisting of tetrakis(pentafluorophenyl)aluminate, tris(nonafluoro-biphenyl) fluoroaluminate, (octyloxy)tris(pentafluorophenyl)aluminate, tetrakis(3,5-bis(trifluoro-methyl)phenyl) aluminate, and methyltris(pentafluorophenyl) aluminate.

20. The reactant composition of claim 16 wherein the weakly coordinating anion is a borate or aluminate of the formula:

$$[M'(OR^{28'})(OR^{29'})(OR^{30'})(OR^{31'})]$$

M' is boron or aluminum, $R^{28'}$, $R^{29'}$, $R^{30'}$, and $R^{31'}$ independently represent linear and branched $C_1$–$C_{10}$ alkyl, linear and branched $C_1$–$C_{10}$ haloalkyl, $C_2$–$C_{10}$ haloalkenyl, substituted and unsubstituted $C_6$–$C_{30}$ aryl, and substituted and unsubstituted $C_7$–$C_{30}$ aralkyl groups, subject to the proviso that at least three of $R^{28'}$ to $R^{31'}$ must contain a halogen containing substituent; $OR^{28'}$ and $OR^{29'}$ can be taken together to form a chelating substituent represented by —O—$R^{32'}$—O—, wherein the oxygen atoms are bonded to M' and $R^{32'}$ is a divalent radical selected from substituted and unsubstituted $C_6$–$C_{30}$ aryl and substituted and unsubstituted $C_7$–$C_{30}$ aralkyl, wherein said aryl and aralkyl groups when substituted are monosubstituted or multisubstituted and said substituents are independently selected from linear and branched $C_1$–$C_5$ alkyl, linear and branched $C_1$–$C_5$ haloalkyl, linear and branched $C_1$–$C_5$ alkoxy, linear and branched $C_1$–$C_5$ haloalkoxy, linear and branched $C_1$–$C_{12}$ trialkylsilyl, $C_6$–$C_{18}$ triarylsilyl, and halogen selected from chlorine, bromine, and fluorine.

21. The reactant composition of claim 20 wherein said borate is selected from the group consisting of $[B(O_2C_6F_4)_2]^-$, $[B(OC(CF_3)_2(CH_3))_4]^-$, $[B(OC(CF_3)_2H)_4]^-$, $[B(OC(CF_3)(CH_3)H)_4]^-$, and $[B(OCH_2(CF_3))_4]^-$.

22. The reactant composition of claim 20 wherein said aluminate is selected from the group consisting of, $[Al(OC(CF_3)_2Ph)_4]^-$, $[Al(OC(CF_3)_2C_6H_4\text{-}4\text{-}CH_3)_4]^-$, $[Al(OC(CF_3)_3)_4]^-$, $[Al(OC(CF_3)(CH_3)H)_4]^-$, $[Al(OC(CF_3)_2H)_4]^-$, $[Al(OC(CF_3)_2C_6H_4\text{-}4\text{-}i\text{-}Pr)_4]^-$, $[Al(OC(CF_3)_2C_6H_4\text{-}4\text{-}t\text{-}butyl)_4]^-$, $[Al(OC(CF_3)_2C_6H_4\text{-}4\text{-}SiMe_3)_4]^-$, $[Al(OC(CF_3)_2C_6H_4\text{-}4\text{-}Si\text{-}i\text{-}Pr_3)_4]^-$, $[Al(OC(CF_3)_2C_6H_2\text{-}2,6\text{-}(CF_3)_2\text{-}4\text{-}Si\text{-}i\text{-}Pr_3)_4]^-$, $[Al(OC(CF_3)_2C_6H_3\text{-}3,5\text{-}(CF_3)_2)_4]^-$, $[Al(CO(CF_3)_2C_6H_2\text{-}2,4,6\text{-}(CF_3)_3)_4]^-$, and $[Al(OC(CF_3)_2C_6F_5)_4]^-$.

23. The reactant composition of claim 9 wherein said activator salt is selected from the group consisting of lithium tetrakis(pentafluorophenyl)borate, sodium tetrakis(pentafluorophenyl)borate, lithium (diethylether) tetrakis(pentafluorophenyl) borate, lithium(diethylether)$_{2.5}$ tetrakis-(pentafluorophenyl)borate, lithium tris(isopropanol) tetrakis (pentafluoro-phenyl)borate, lithium tetrakis(methanol) tetrakis(pentafluorophenyl)borate, silver tetrakis(pentafluorophenyl)borate, tris(toluene)silver tetrakis (pentafluoro-phenyl)borate, trityl tetrakis (pentafluorophenyl)borate, N,N-dimethylanilinium tetrakis (pentafluorophenyl) borate, lithium tetrakis(3,5-bis (trifluoromethyl) phenyl)borate, sodium tetrakis(3,5-bis (trifluoro-methyl)phenyl)borate, N,N-dimethylanilinium tetrakis[3,5-bis(trifluoromethyl)phenyl]borate, silver tetrakis[3,5-bis(trifluoromethyl)phenyl]borate, tris(toluene) silver tetrakis[3,5-bis(trifluoromethyl) phenyl]borate, thallium tetrakis[3,5-bis(trifluoromethyl)phenyl]borate, LiB $(O_2C_6F_4)_4$, LiB(OC(CH$_3$)(CF$_3$)$_2$)$_4$, LiAl(OC(CF$_3$)$_2$Ph)$_4$, LiAl(OC(CF$_3$)$_2$C$_6$H$_4$CH$_3$)$_4$, LiAl(OC(CH$_3$)(CF$_3$)$_2$)$_4$, LiAl (OC(CF$_3$)$_3$)$_4$, LiAl(OC(CF$_3$)$_2$C$_6$H$_4$-4-i-pr)$_4$, LiAl(OC (CF$_3$)$_2$ C$_6$H$_3$-3,5-(CF$_3$)$_2$)$_4$, LiAl(OC(CF$_3$)$_2$C$_6$H$_2$-2,4,6-(CF$_3$)$_3$)$_4$, and LiAl(OC(CF$_3$)$_2$C$_6$F$_5$)$_4$.

24. The reactant composition claim 1, wherein said polycycloolefin comprises a monomer selected from a compound of the formula:

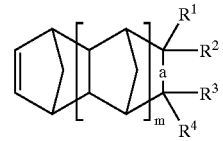

wherein "a" represents a single or double bond; m is an integer from 0 to 5; when "a" is a double bond one of $R^1$, $R^2$ and one of $R^3$, $R^4$ is not present; and $R^1$ to $R^4$ independently represent hydrogen, substituted and unsubstituted linear and branched $C_1$–$C_{10}$ alkyl, linear and branched $C_1$–$C_{10}$ haloalkyl, substituted and unsubstituted linear and branched $C_2$–$C_{10}$ alkenyl, linear and branched $C_2$–$C_{10}$ haloalkenyl, substituted and unsubstituted linear and branched $C_2$–$C_{10}$ alkynyl, substituted and unsubstituted $C_4$–$C_{12}$ cycloalkyl, substituted and unsubstituted $C_4$–$C_{12}$ halocycloalkyl, substituted and unsubstituted $C_4$–$C_{12}$ cycloalkenyl, substituted and unsubstituted $C_4$–$C_{12}$ halocycloalkenyl, substituted and unsubstituted $C_6$–$C_{12}$ aryl, substituted and unsubstituted $C_6$–$C_{12}$ haloaryl and substituted and unsubstituted $C_7$–$C_{24}$ aralkyl, $R^1$ and $R^2$ or $R^3$ and $R^4$ can be taken together to represent a $C_1$–$C_{10}$ alkylidenyl group, —$(CH_2)_nC(O)NH_2$, —$(CH_2)_nC(O)Cl$, $(CH_2)_nC(O)OR^5$, —$(CH_2)_n$—$OR^5$, —$(CH_2)_n$—$OC(O)R^5$, —$(CH_2)_n$—$C(O)R^5$, —$(CH_2)_n$—$OC(O)OR^5$, —$(CH_2)_nSiR^5$, —$(CH_2)_nSi(OR^5)_3$, —$(CH_2)_nC(O)OR^6$, and the group:

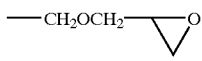

wherein n independently represents an integer from 0 to 10 and $R^5$ independently represents hydrogen, linear and branched $C_1$–$C_{10}$ alkyl, linear and branched, $C_2$–$C_{10}$ alkenyl, linear and branched $C_2$–$C_{10}$ alkynyl, $C_5$–$C_{12}$ cycloalkyl, $C_6$–$C_{14}$ aryl, and $C_7$–$C_{24}$ aralkyl; $R^6$ represents a radical selected from —$C(CH_3)_3$, —$Si(CH_3)_3$, —$CH(R^7)OCH_2CH_3$, —$CH(R^7)OC(CH_3)_3$, dicyclopropylmethyl dimethylcyclo-propylmethyl, or the following cyclic groups:

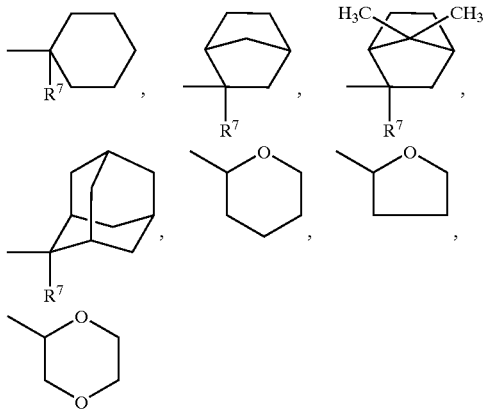

wherein $R^7$ represents hydrogen or a linear or branched ($C_1$–$C_5$) alkyl group; $R^1$ and $R^4$ together with the two ring carbon atoms to which they are attached can represent a substituted or unsubstituted cycloaliphatic group containing 4 to 30 ring carbon atoms, a substituted or unsubstituted aryl group containing 6 to 18 ring carbon atoms and combinations thereof; $R^1$ and $R^4$ can be taken together to form the divalent bridging group, —C(O)—Q—(O)C—, which when taken together with the two ring carbon atoms to which they are attached form a pentacyclic ring, wherein Q represents an oxygen atom or the group $N(R^8)$, wherein $R^8$ is selected from hydrogen, halogen, linear and branched $C_1$–$C_{10}$ alkyl, and $C_6$–$C_{18}$ aryl.

25. The reactant composition of claim 24 wherein said multifunctional polycycloolefin monomer includes a monomer selected from a compound of the formula:

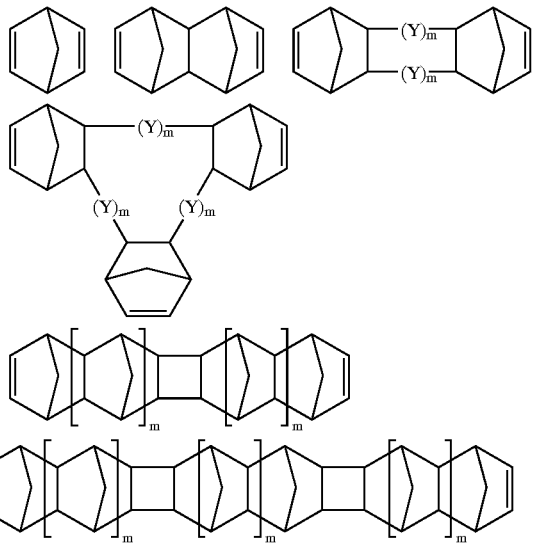

and mixtures thereof, wherein Y represents a (—$CH_2$—) group and m independently represents an integer from 0 to 5, and when m is 0, Y represents a single bond.

26. The reactant composition of claim 24 wherein said multifunctional polycycloolefin monomer is present in a range from 0.25 to 99.75 mole % of the total polycycloolefin monomer composition.

27. The reactant composition of claim 1, wherein said composition further comprises a rate moderator selected from the group consisting of water, tetrahydrofuran, 2-methyltetrahydrofuran, diethyl ether, methyl-tert-butyl ether, dimethoxyethane, diglyme, trimethylphosphine, triethylphosphine, tributylphosphine, tri(ortho-tolyl)phosphine, tri-tertbutyl-phosphine, tricyclopentylphosphine, tricyclohexylphosphine, triisopropylphosphine, trioctylphosphine, triphenylphosphine, tri(pentafluorophenyl)phosphine, methyl-diphenylphosphine, dimethylphenylphosphine, trimethylphosphite, triethylphosphite, triisopropylphosphite, ethyl diphenylphosphinite, tributylphosphite, triphenyl-phosphite, diethylphenylphosphonite, and tribenzylphosphine, 2-cyclohexenone, triphenylphosphine oxide, and mixtures thereof.

* * * * *